United States Patent [19]

Gunter et al.

[11] 4,325,121

[45] Apr. 13, 1982

[54] TWO-LEVEL CONTROL STORE FOR MICROPROGRAMMED DATA PROCESSOR

[75] Inventors: Thomas G. Gunter; Harry L. Tredennick, both of Austin, Tex.

[73] Assignee: Motorola, Inc., Schaumburg, Ill.

[21] Appl. No.: 41,135

[22] Filed: May 21, 1979

Related U.S. Application Data

[63] Continuation-in-part of Ser. No. 961,796, Nov. 17, 1978.

[51] Int. Cl.[3] .................. G06F 9/22

[52] U.S. Cl. .................. 364/200

[58] Field of Search ... 364/200 MS File, 900 MS File

[56] References Cited

U.S. PATENT DOCUMENTS

| | | | |
|---|---|---|---|
| 3,886,523 | 5/1975 | Ferguson et al. | 364/200 |
| 4,008,462 | 2/1977 | Kanda | 364/200 |
| 4,155,120 | 5/1979 | Keefer et al. | 364/200 |
| 4,156,278 | 5/1979 | Wilhite | 364/200 |
| 4,156,279 | 5/1979 | Wilhite | 364/200 |
| 4,168,523 | 9/1979 | Chari et al. | 364/200 |

*Primary Examiner*—Raulfe B. Zache

*Attorney, Agent, or Firm*—Anthony J. Sarli, Jr.; Jeffrey Van Myers; Robert L. King

[57] ABSTRACT

A data processor having an execution unit and which includes a control means having a first and a second control store. The control means has an input for receiving a control store address. In response to the received control store address, the first control store provides sequencing information at a first output for selecting the next control store address. Also, in response to the received control store address, the second control store supplies control information at a second output for controlling the execution unit. The data processor also includes means for receiving a macroinstruction and selection means responsive to the macroinstruction and to the sequencing information for generating the control store address. In a preferred embodiment, the control store address is received by both the input of the first control store and the input of the second control store. Each control word in the first control store has a unique control store address. However, a control word, in the second control store may be selected by many different control store addresses.

5 Claims, 59 Drawing Figures

$A_9A_8$ = 00

| $A_7A_6$ | $A_5A_4$ | $A_3A_2$ = 00, $A_1A_0$ = 00 | 01 | 10 | 11 | $A_3A_2$ = 01, $A_1A_0$ = 00 | 01 | 10 | 11 |
|---|---|---|---|---|---|---|---|---|---|
| 00 | 00 | rstp1 M1 | dvumb halt1 M1 | zzz1d M1 | bser1 M1 | adrw1 I1 | ads13 I1 | aixwØ ldmx1 I1 | asbb5 I1 |
| | 01 | | | | | | | | |
| | 10 | malw2 I1 | mmrw2 B1 | trpv3 B1 | mmiw2 I1 | mmm12 I1 | mmmw2 I1 | mmrw3 I1 | ldmx3 B1 |
| | 11 | | | | | | | | |
| 01 | 00 | rtr4 I1 | sftm2 I1 | mpiw4 I1 | srr15 I1 | stiw2 I1 | stiw3 I1 | stiw4 I1 | stmd3 I1 |
| | 01 | | | | | | | | |
| | 10 | rcal3 bbci2 B1 | mpow2 I1 | mpow3 I1 | dvs16 B1 | leaa2 B1 | rset5 B1 | mrg12 I1 | smal3 I1 |
| | 11 | | | | | | | | |
| 10 | 00 | mmdw1 MI2 | mmmw1 MI2 | mmrl1 MI2 | stop1 MI2 | mmdl1 MI | mmml1 MI | mmil1 MI | rset1 MI |
| | 01 | | | | | | | | |
| | 10 | bbcw3 MB | stmr5 MB | mrgw1 MI2 | leaa1 MI2 | rcal3 M2 | stmr6 M2 | mrgl1 MI | lusp1 MI |
| | 11 | | | | | | | | |
| 11 | 00 | asx16 I1 | asx17 I1 | asx18 I1 | asxw5 I1 | bbcw1 I1 | bcsm1 I1 | bcsm2 I1 | cmmwx I1 |
| | 01 | | | | | | | | |
| | 10 | bbci3 B1 | stmr4 B1 | trpv2 B1 | dvs16 dvs1d B1 | dvuma I1 | rset3 B1 | paaw1 I1 | ldmx4 B1 |
| | 11 | | | | | | | | |

| 00 | 01 | 10 | 11 |
|---|---|---|---|
| push6 I1 | rbrb3 I1 | rcal2 I1 | rlql1 I1 |
| mpil3 I1 | mulm6 B1 | mpilt I1 | popm6 push3 B1 |
| stmr2 I1 | stmw2 I1 | stmx1 I1 | strw2 I1 |
| mrgm1 I1 | mulm3 B1 | btsr3 B1 | mstw1 I1 |
| tasr2 I1 | trap2 II | trap4 II | tsml2 II |
| dvumf B1 | mulm5 B1 | bcsr3 B1 | push5 B1 |
| cpdl2 I1 | cpml2 I1 | cprl2 I1 | cprm2 I1 |
| dvumd B1 | mulm4 B1 | bcsr4 B1 | push4 B1 |

11

| 00 | 01 | 10 | 11 |
|---|---|---|---|
| rmil2 I1 | rmil3 I1 | rmml2 I1 | rmrl2 I1 |
| mpiw3 I1 | dvom3 B1 | mpal2 I1 | mpal3 I1 |
| swap1 I1 | swap2 I1 | tasm1 I1 | tasm2 I1 |
| dvsØ7 B1 | dvsØ5 B1 | mulm1 I1 | mulr1 I1 |
| tsrl2 I1 | unlk3 II | unlk4 II | link3 II |
| nbcm1 I1 | dvum3 dvsØ4 B1 | nnrl2 I1 | paal2 I1 |
| dcnt2 I1 | jmpa1 I1 | jsal2 I1 | malw1 I1 |
| dvs1Ø B1 | trac1 dvur2 DB1 | pdcl1 I1 | pdcl2 I2 |

FIG. 10A CONTINUED

| 01 | | 00 / 00 | 00 / 01 | 00 / 10 | 00 / 11 | 01 / 00 | 01 / 01 | 01 / 10 | 01 / 11 |
|---|---|---|---|---|---|---|---|---|---|
| 00 | 00 | asxw2 MI3 | roaw1 MI4 | asxw3 MI3 | ldmr2 MI3 | asxl3 MI | roal1 MI | asxl4 MI | unlk1 MI |
| | 01 | dvumbMB3 chkr3 | mmxw1 MI4 | nnrw1 MI3 | trap3 MI3 | rset4 M | mmxl1 MI | nnrl1 MI | bser3 MI |
| | 10 | aixw2 MB4 | bsri2 MI4 | aixw1 MI4 | exge1 MI4 | aixl2 MB | bsrw2 MI | aixl1 MI | btsr1 MI |
| | 11 | aixw2 M3 zzz14 | malw3MI3 popm1 | rmdw2 MI2 | zzz1b MI4 | leax2 MB | ldmr1 MI | rmdl3 MI | zzz1c |
| C1 | 00 | | | | | | | | |
| | 01 | chkr4 B1 | dvur3 I1 | nnml2 I1 | tasr1 I1 | peax5 I1 | mawl3 I1 | stmx2 I1 | ldmd3 I1 |
| | 10 | | | | | | | | |
| | 11 | exge1 I1 susp1 | bsri1 I1 | bsrw1 I1 | pinw2 I1 | btsr2 I1 | chkm1 I1 | chkr1 I1 | chkr2 I1 |
| 10 | 00 | | | | | | | | |
| | 01 | | | | | | | | |
| | 10 | | | | | | | | |
| | 11 | | | | | | | | |
| 11 | 00 | trac1 M5 | rorw1 MI7 | adsw1 MI6 | romw1 MI6 | itlx1 M | rorl1 MI | adsl1 MI | romm1 MI |
| | 01 | trap1 MB | cprw1 MI | mpiw1 MI | cpmw1 MI | stiw1 M | cprl1 MI | mpil1 MI | cpml1 MI |
| | 10 | aixw4 MB8 | malw3 MI8 | ablw1 MI8 | aixwØ MI8 | asxl5 MB | smal1 MI | abll1 MI | aixlØ MI |
| | 11 | zzz15 | stmd1 MI | jsal1 MI | jsrxØ MI | leax3 MB | ldmxØ MI | jmal1 MI | jmpxØ MI |

| 00 | 01 | 10 | 11 |
|---|---|---|---|
| asbb2 MI | reaw1 MI | asbb3 MI | popm2 MI |
| itlx6 M | rmxw1 MI | nbcr1 MI | bser5 MI |
| rmxw2 MB | paaw2 MI | leax1 MI | bclr1 MI |
| peax2 MB | rtr2 MI | zzzØ6 | zzzØ7 |
| | | | |
| mpiw2 MI2 | dcnt1 MI2 | aixw1 MI2 ldmx2 | nnmw1 MI2 |
| | | | |
| dvum1 MI2 | adrl1 MI2 | dvur1 MI2 | sccb1 MI2 |
| | | | |
| | | | |
| | | | |
| | | | |
| strw1 M | rorm1 MI | mpow1 MI | roml1 MI |
| zzzØc | cprm1 MI | zzzØd | zzzØe |
| rmxw3 MB | lmal1 MI | ralw1 MI | rmxwØ MI |
| peax3 MB | lmaw1 MI | paal1 MI | leaxØ MI |

11

| 00 | 01 | 10 | 11 |
|---|---|---|---|
| zzzØØ | rcal1 MI | zzzØ1 | zzzØ2 |
| zzzØ3 | rmxl1 MI | zzzØ4 | zzzØ5 |
| rmx12 MB | peax6 MI | peax1 MI | bcsr1 MI |
| stmx4 MB | zzzØ8 | zzzØ9 | zzzØa |
| | | | |
| mpil2 MI | bbci1 MI | stmx3 MI | nnml1 MI |
| | | | |
| dvsØ2 MI | pinl1 MI | dvsØ1 MI | sccr1 MI |
| | | | |
| | | | |
| | | | |
| | | | |
| zzzØ6 | rbrb1 MI | mpol1 MI | cpmm1 MI |
| zzzØf | zzz1Ø | zzz11 | zzz12 |
| rmx13 MB | smaw1 MI | rall1 MI | rmx1Ø MI |
| stmx5 MB | ldmd1 MI | unlk2 MI | peaxØ MI |

FIG. 10B
CONTINUED

| 10 | | 00: 00 | 00: 01 | 00: 10 | 00: 11 | 01: 00 | 01: 01 | 01: 10 | 01: 11 |
|---|---|---|---|---|---|---|---|---|---|
| 00 | 00 | | | | | | | | |
| | 01 | mmxw2 MB2 | jsrx2 MB2 | asxw4 MI2 | b MI2 | mmx12 MB | jmpx2 MB | asbb4 MI | dcnt5 MI |
| | 10 | | | | | | | | |
| | 11 | ablw1 MI2 smal2 | abl13 MI2 | rmmw1 MI2 | ablw2 MI2 | rts2 MI | ads12 MI | rmml1 MI | abl12 MI |
| 01 | 00 | | | | | | | | |
| | 01 | cmmw2 MI2 | cpdw1 MI2 | ldmr5 MI2 | sccb3 MB | cmml2 MI | cpdl1 MI | popm5 MI | smaw3 M2 |
| | 10 | | | | | | | | |
| | 11 | e#w1 MI2 | abww1 MI2 | dvs2Ø M | adsw2 MI2 | lmal3 MI | abwl1 MI | dvs17 MB2 | ldmx5 MI |
| 10 | 00 | | | | | | | | |
| | 01 | jsra1 I1 | jsrd2 II | laaw1 II | ldmx6 II | lead2 I1 | pead2 I1 | link1 I1 | roaw2 B1 |
| | 10 | | | | | | | | |
| | 11 | dvsØ6 I1 | bcsr3 B1 bclr3 | link4 I1 | dvsØ3 B1 dvs1f | dvs15 I1 | mal11 I1 | mal12 I1 | mal13 I1 |
| 11 | 00 | | | | | | | | |
| | 01 | mmxw3 MB2 | jsrx3 MB2 | rmrw1 MI2 | sccb2 MB2 | mmx13 MB | jmpx3 MB | rmiw1 MI | sccr2 MB |
| | 10 | | | | | | | | |
| | 11 | rmrl1 MI2 | bclr4 MB2 | dvsØ3 M2 | dvs1e MB | rmil1 MI | bclr5 MB | dvs1a MB | dvs1b M2 |

| 00 | 01 | 10 | 11 |
|---|---|---|---|
| jmal2 I1 | dvume I1 dvsØ8 | dvs11 I1 | pin13 I1 |
| rrgl2 I1 | rrgm1 I1 | rrgw2 I1 | rset2 I1 |
| dvum9 B1 | dvum9 B1 dvumc | dvs1c B1 | dvum7 B1 dvum8 |
| srr14 B1 | jsaw1 I1 | jsaw2 I1 | jsaw3 I1 |
| dvume MB2 | e#11 MI2 | dvum5 MB2 | itlx4 MI2 |
| rstp3 MI2 | ral13 MI2 | ralw2 MI2 | raqw1 MI2 |
| dvum6 MB2 | dvumb MB2 | mmrw2MB2 dvum4 | dvum7 MB2 |
| srr13 MB | jsrx1 MI2 | ldmd4 MI2 | mmr12 MI2 |

11

| 00 | 01 | 10 | 11 |
|---|---|---|---|
| dvum5 B1 dvs12 | dvumb B1 dvsØe | dvum2 I1 | pinw1 I1 |
| rstp2 I1 | rstp5 I1 | rstw1 I1 | rts3 I1 |
| dvs13 B1 | dvs14 I1 | dvumØ I1 | push2 I1 |
| nbcr3 BI | peaa1 I1 | pead1 I1 | pin12 I1 |
| dvsØf MB | lmal2 MI | dvsØ9 MB | trap5 MI |
| rstp4 MI | rmd12 MI | ral12 MI | raql1 MI |
| dvsØa MB | dvsØd MB | dvumz MB | dvsØc M |
| srrw3 MB2 | jmpx1 MI | trap6 MI | mmi12 MI |

| | | 00 / 00 | 00 / 01 | 00 / 10 | 00 / 11 | 01 / 00 | 01 / 01 | 01 / 10 | 01 / 11 |
|---|---|---|---|---|---|---|---|---|---|
| 00 | 00 | asx12 MI2 | stiw1 MI2 | srrw1 MI2 | srrw2 MI2 | asx15 MI | still MI | srr11 MI | srr12 MI |
| | 01 | | | | | | | | |
| | 10 | bclm1 MI2 | jsrd3 MI2 | cmmw1 MI2 | tcaw2 M2 | trpv1 MI | link2 MI | cmm11 MI | dcnt3 MB |
| | 11 | | | | | | | | |
| 01 | 00 | cmm13 I1 | cmm15 I1 | cmm16 I1 | cmm17 I1 | itlx2 I1 | itlx3 I1 | itlx5 I1 | itlx7 I1 |
| | 01 | | | | | | | | |
| | 10 | exge2 I1 | pdcw2 I1 | extr1 I1 | extr2 I1 | pead3 I1 | leax4 I1 | peax4 I1 | adrw2 I1 |
| | 11 | | | | | | | | |
| 10 | 00 | lead1 MI2 | maqw1 MI2 | bcsr2 MI2 | maww1 MI2 | ldmd2 MI | maql1 MI | bclr2 MI | mawl1 MI |
| | 01 | | | | | | | | |
| | 10 | trac2 MI2 | stmr1 MI2 | raww1 MI2 | rmdw1 MI2 | bser2 MI | push1 MI | rawl1 MI | rmdl1 MI |
| | 11 | | | | | | | | |
| 11 | 00 | pdcw1 MI4 | rrgw1 MI4 | asbb6 MI3 | cmmw3 MI4 | asxw1 MI | tsrw1 MI | rbrb2 MI | cmml4 MI |
| | 01 | | | | | | | | |
| | 10 | 0#11 M4 | smaw2 MI3 | tsmw1 MI3 | ror12 M4 | laal1 M | rtr3 MI | tsml1 MI | dcnt4 MB |
| | 11 | | | | | | | | |

| 00 | 01 | 10 | 11 |
|---|---|---|---|
| tmr13 I1 | roal2 I1 | roal3 I1 | roal4 I1 |
| | | | |
| mmfw2D81 mmaw2 | bcsr5 I1 | bser4 I1 | bser6 I1 |
| | | | |
| adrl2 I1 | morl2 I1 | stmw1 I1 | btsi1 I1 |
| | | | |
| bclm2 I1 | mawl2 I1 | lmaw2 I1 | ablw3 I1 |
| | | | |
| mmrw1 MI2 | mmxwØ MI2 | morw1 MI2 | maww2 MI2 |
| | | | |
| ldmr4 MB2 | jsawØ MI2 | O#w1 MI2 | jsrd1 MI2 |
| | | | |
| asxl1 MI | rrgl1 MI | nbcr2 MI | rtr1 MI |
| | | | |
| ldmr3 MB | stmd2 MI | sftm1 MI | rorm2 M |
| | | | |

11

| 00 | 01 | 10 | 11 |
|---|---|---|---|
| toml2 I1 | toml3 I1 | rorl3 I1 | rorm3 I1 |
| | | | |
| popm6 BI | bsrt3 I1 | bsrw3 I1 | btsm1 I1 |
| | | | |
| zzz17 | zzz18 | zzz19 | zzz1a |
| | | | |
| zzz1e | zzz1f | zzz2Ø | zzz21 |
| | | | |
| mmiw1 MI | mmx1Ø MI | morl1 MI | morw2 MI |
| | | | |
| popm4 MB | jmaw1 MI | laal2 M | jmpd1 MI |
| | | | |
| asbb1 MI | tsrl1 MI | zzz22 | rts1 MI |
| | | | |
| popm3 MB | zzz23 | zzz24 | mulm2 M |
| | | | |

FIG. 10D CONTINUED

| $A_9A_8$ $A_7A_6A_5A_4$ $A_3A_2$ / $A_1A_0$ | 00 | 01 | 10 | 11 |
|---|---|---|---|---|
| 00 0000 00 | rstp1 m | dvumb dm | zzz1d m | bser1 m |
| 00 0000 01 | adrw1 | ads13 | aixw0 d | asbb5 |
| 00 0000 10 | push6 | rbrb3 | rcal2 | rlql1 |
| 00 0000 11 | rmil2 | rmil3 | rmml2 | rmrl2 |
| 00 0100 00 | rtr4 | sftm2 | mpiw4 | srr15 |
| 00 0100 01 | stiw2 | stiw3 | stiw4 | stmd3 |
| 00 0100 10 | stmr2 | stmw2 | stmx1 | strw2 |
| 00 0100 11 | swap1 | swap2 | tasm1 | tasm2 |
| 00 1000 0x | mmdw1 | mmmw1 | mmrl1 | stop1 |
| 00 1000 10 | tasr2 | trap2 | trap4 | tsml2 |
| 00 1000 11 | tsrl2 | unlk3 | unlk4 | link3 |
| 00 1100 00 | asxl6 | asxl7 | asxl8 | asxw5 |
| 00 1100 01 | bbcw1 | bcsm1 | bcsm2 | cmmw4 |
| 00 1100 10 | cpdl2 | cpml2 | cprl2 | cprm2 |
| 00 1100 11 | dcnt2 | jmpa1 | jsal2 | malw1 |
| 01 0000 xx | asxw2 | roaw1 | asxw3 | ldmr2 |

FIG. 11A

| | 00 | 01 | 10 | 11 |
|---|---|---|---|---|
| 00 0010 00 | malw2 | mmrw2 b | trpv3 b | mmiw2 |
| 00 0010 01 | mmml2 | mmmw2 | mmrw3 | ldmx3 b |
| 00 0010 10 | mpil3 | mulm6 b | mpil4 | popm6 db |
| 00 0010 11 | mpiw3 | dvum3 b | mpol2 | mpol3 |
| 00 0110 00 | rcal3 db | mpow2 | mpow3 | dvs16 b |
| 00 0110 01 | leaa2 b | rset5 b | mrgl2 | smal3 |
| 00 0110 10 | mrgm1 | mulm3 b | btsr3 b | mstw1 |
| 00 0110 11 | dvs07 b | dvs05 b | mulm1 | mulr1 |
| 00 1010 0x | rcal3 b | stmr6 b | mrgw1 | leaa1 |
| 00 1010 10 | dvumf b | mulm5 b | bcsr3 b | push5 b |
| 00 1010 11 | nbcm1 | dvum3 db | nnrl2 | paal2 |
| 00 1110 00 | bbci3 b | stmr4 b | trpv2 b | dvs16 db |
| 00 1110 01 | dvuma | rset3 b | paaw1 | ldmx4 b |
| 00 1110 10 | dvumd b | mulm4 b | bcsr4 b | push4 b |
| 00 1110 11 | dvs10 b | trac1 db | pdcl1 | pdcl2 |
| 01 0000 xx | aixw2 b | bsri2 | aixw1 | exge1 |

FIG. 11B

| | 00 | 01 | 10 | 11 |
|---|---|---|---|---|
| 01 0001 xx | dvumb db | mmxw1 | nnrw1 | trap3 |
| 01 0101 00 | chkr4 b | dvur3 | nnml2 | tasr1 |
| 01 0101 01 | peax5 | mawl3 | stmx2 | ldmd3 |
| 01 0101 1x | mpiw2 | dcnt1 | aixw1 d | nnmw1 |
| 01 110x xx | trac1 b | rorw1 | adsw1 | romw1 |
| 10 0001 0x | mmxw2 b | jsrx2 b | asxw4 | b |
| 10 0001 10 | jmal2 | dvume d | dvs11 | pinl3 |
| 10 0001 11 | dvum5 db | dvumb db | dvum2 | pinw1 |
| 10 0101 0x | cmmw2 | cpdw1 | ldmr5 | smaw3 b |
| 10 0101 10 | dvum9 b | dvum9 db | dvs1c b | dvum7 db |
| 10 0101 11 | dvs13 b | dvs14 | dvum0 | push2 |
| 10 1001 00 | jsra1 | jsrd2 | laaw1 | ldmx6 |
| 10 1001 01 | lead2 | pead2 | link1 | roaw2 b |
| 10 1001 1x | dvume b | e#l1 | dvum5 b | itlx4 |
| 10 1101 0x | mmxw3 b | jsrx3 b | rmrw1 | sccb2 b |
| 10 1101 1x | dvum6 b | dvumb b | mmrw2 db | dvum7 b |

FIG. 11 C

| | 00 | 01 | 10 | 11 |
|---|---|---|---|---|
| 01 0011 xx | aixw2 db | malw3 d | rmdw2 | zzz1b |
| 01 0111 00 | exge1 d | bsri1 | bsrw1 | pinw2 |
| 01 0111 01 | btsr2 | chkm1 | chkr1 | chkr2 |
| 01 0111 1x | dvum1 | adrl1 | dvur1 | sccb1 |
| 01 111x xx | aixw4 b | malw3 | ablw1 | aixw0 |
| 10 0011 0x | ablw1 d | abl13 | rmmw1 | ablw2 |
| 10 0011 10 | rrgl2 | rrgm1 | rrgw2 | rset2 |
| 10 0011 11 | rstp2 | rstp5 | rstw1 | rts3 |
| 10 0111 0x | e#w1 | abww1 | dvs17 b | adsw2 |
| 10 0111 10 | srrl4 b | jsaw1 | jsaw2 | jsaw3 |
| 10 0011 11 | nbcr3 b | peaa1 | pead1 | pinl2 |
| 10 1011 00 | dvs06 | bcsr3 db | link4 | dvs03 db |
| 10 1011 01 | dvs15 | mall1 | mall2 | mall3 |
| 10 1010 1x | rstp3 | rall3 | ralw2 | raqw1 |
| 10 1111 0x | rmrl1 | bclr4 b | dvs03 | dvs1b b |
| 10 1111 1x | srrw3 b | jsrx1 | ldmd4 | mmrl2 |

FIG. 11D

| | 00 | 01 | 10 | 11 |
|---|---|---|---|---|
| 11 0000 0x | asxl2 | sriw1 | srrw1 | srrw2 |
| 11 0000 10 | rmrl3 | roal2 | roal3 | roal4 |
| 11 0000 11 | roml2 | roml3 | rorl3 | rorm3 |
| 11 0100 00 | cmml3 | cmml5 | cmml6 | cmml7 |
| 11 0100 01 | itlx2 | itlx3 | itlx5 | itlx7 |
| 11 0100 10 | adrl2 | morl2 | stmw1 | btsi1 |
| 11 0100 11 | zzz17 | zzz18 | zzz19 | zzz1a |
| 11 1000 0x | lead1 | maqw1 | bcsr2 | maww1 |
| 11 1000 1x | mmrw1 | mmxw0 | morw1 | maww2 |
| 11 1100 xx | pdcw1 | rrgw1 | asbb6 | cmmw3 |
| | | | | |
| | | | | |
| | | | | |
| | | | | |
| | | | | |
| | | | | |

FIG. 11E

| | 00 | 01 | 10 | 11 |
|---|---|---|---|---|
| 11 0010 0x | bclm1 | jsrd3 | cmmw1 | rcaw2 b |
| 11 0010 10 | mmrw2 db | bcsr5 | bser4 | bser6 |
| 11 0010 11 | popm6 b | bsri3 | bsrw3 | btsm1 |
| 11 0110 00 | exge2 | pdcw2 | extr1 | extr2 |
| 11 0110 01 | pead3 | leax4 | peax4 | adrw2 |
| 11 0110 10 | bclm2 | mawl2 | lmaw2 | ablw3 |
| 11 0110 11 | zzz1e | zzz1f | zzz20 | zzz21 |
| 11 1010 0x | trac2 | stmr1 | raww1 | rmdw1 |
| 11 1010 1x | ldmr4 b | jsaw0 | o#w1 | jsrd1 |
| 11 1110 xx | o#l1 b | smaw2 | tsmw1 | rorl2 b |
| | | | | |
| | | | | |
| | | | | |
| | | | | |
| | | | | |
| | | | | |

FIG. 11F

IMMEDIATE LINE: 0000 BTST, BCHG, BSET, BCLR, ORI, ANDI, SUBI, ADDI, EORI, CMPI

| | RYD | RYA | (RYA) | (RYA)+ | -(RYA) | (RYA) +$d_{16}$ | (RYA) +(X) +$d_8$ | ABSW | ABSL | (PC) +$d_{16}$ | (PC) +(X) +$d_8$ | # | UNUSED | IR[11:6] |
|---|---|---|---|---|---|---|---|---|---|---|---|---|---|---|
| A1<br>A2<br>A3 | O#W1<br>ROAW1 | TRAP1 | O#W1<br>ADRW1<br>MORW1 | O#W1<br>PINW1<br>MORW1 | O#W1<br>PDCW1<br>MORW1 | O#W1<br>ADSW1<br>MORW1 | O#W1<br>AIXWØ<br>MORW1 | O#W1<br>ABWW1<br>MORW1 | O#W1<br>ABNW1<br>MORW1 | TRAP1 | TRAP1 | O#W1<br>STIW1 | TRAP1 | X01000<br>00X000 BYTE<br>ANDI,EORI,ORI |
| A1<br>A2<br>A3 | O#W1<br>ROAW1 | TRAP1 | O#W1<br>ADRW1<br>MORL1 | O#W1<br>PINW1<br>MORLL | O#W1<br>PCDW1<br>MORL1 | O#W1<br>APSW1<br>MORL1 | O#W1<br>AIXWØ<br>MORL1 | O#W1<br>ABWW1<br>MORL1 | O#W1<br>ABLW1<br>MORL1 | TRAP1 | TRAP1 | O#W1<br>STIW1 | TRAP1 | X01001<br>00X001 WORD<br>ANDI,EORI,ORI |
| A1<br>A2<br>A3 | O#L1<br>ROAL1 | TRAP1 | O#L1<br>ADRL1<br>MORL1 | O#L1<br>PINL1<br>MORL1 | O#L1<br>PDCL1<br>MORL1 | O#L1<br>ADSL1<br>MORL1 | O#L1<br>AIXLØ<br>MORL1 | O#L1<br>RBWL1<br>MORL1 | O#L1<br>ABLL1<br>MORL1 | TRAP1 | TRAP1 | TRAP1 | TRAP1 | X01010<br>00X010 LONG<br>ANDI,EORI,ORI |
| A1<br>A2<br>A3 | TRAP1 | TRAP1 | TRAP1 | TRAP1 | TRAP1 | TRAP1 | TRAP1 | TRAP1 | TRAP1 | TRAP1 | TRAP1 | TRAP1 | TRAP1 | XX1011<br>0XX011<br>X1X011<br>1110XX |
| A1<br>A2<br>A3 | O#W1<br>ROAW1 | TRAP1 | O#W1<br>ADRW1<br>MORW1 | O#W1<br>PINW1<br>MORW1 | O#W1<br>PDCWL<br>MORW1 | O#W1<br>ADSW1<br>MORW1 | O#W1<br>AIXWØ<br>MORW1 | O#W1<br>ABWW1<br>MORW1 | O#W1<br>ABLW1<br>MORW1 | TRAP1 | TRAP1 | TRAP1 | TRAP1 | 01X000 BYTE<br>ADDI,SUBI |
| A1<br>A2<br>A3 | O#W1<br>ROAW1 | TRAP1 | O#W1<br>ADRW1<br>MORW1 | O#W1<br>PINW1<br>MORW1 | O#W1<br>PDCW1<br>MORW1 | O#W1<br>ADSW1<br>MORW1 | O#W1<br>AIXWØ<br>MORW1 | O#W1<br>ABWW1<br>MORW1 | O#W1<br>ABLW1<br>MORW1 | TRAP1 | TRAP1 | TRAP1 | TRAP1 | 01X001 WORD<br>ADDI,SUBI |
| A1<br>A2<br>A3 | O#W1<br>ROAL1 | TRAP1 | O#L1<br>ADRL1<br>MORL1 | O#L1<br>PINL1<br>MORL1 | O#L1<br>PDCL1<br>MORL1 | O#L1<br>ADSL1<br>MORL1 | O#L1<br>AIXLØ<br>MORL1 | O#L1<br>ABWL1<br>MORL1 | O#L1<br>ABLL1<br>MORL1 | TRAP1 | TRAP1 | TRAP1 | TRAP1 | 01X010 LONG<br>ADDI,SUBI |
| A1<br>A2<br>A3 | | | | | | | | | | | | | | |
| IR[5:0] | 000XXX | 001XXX | 010XXX | 011XXX | 100XXX | 101XXX | 110XXX | 111000 | 111001 | 111010 | 111011 | 111100 | 111101<br>11111X | |

IMMEDIATE LINE 0000 ANDI, EORI, ORI, ADDI, SUBI

Figure 16:
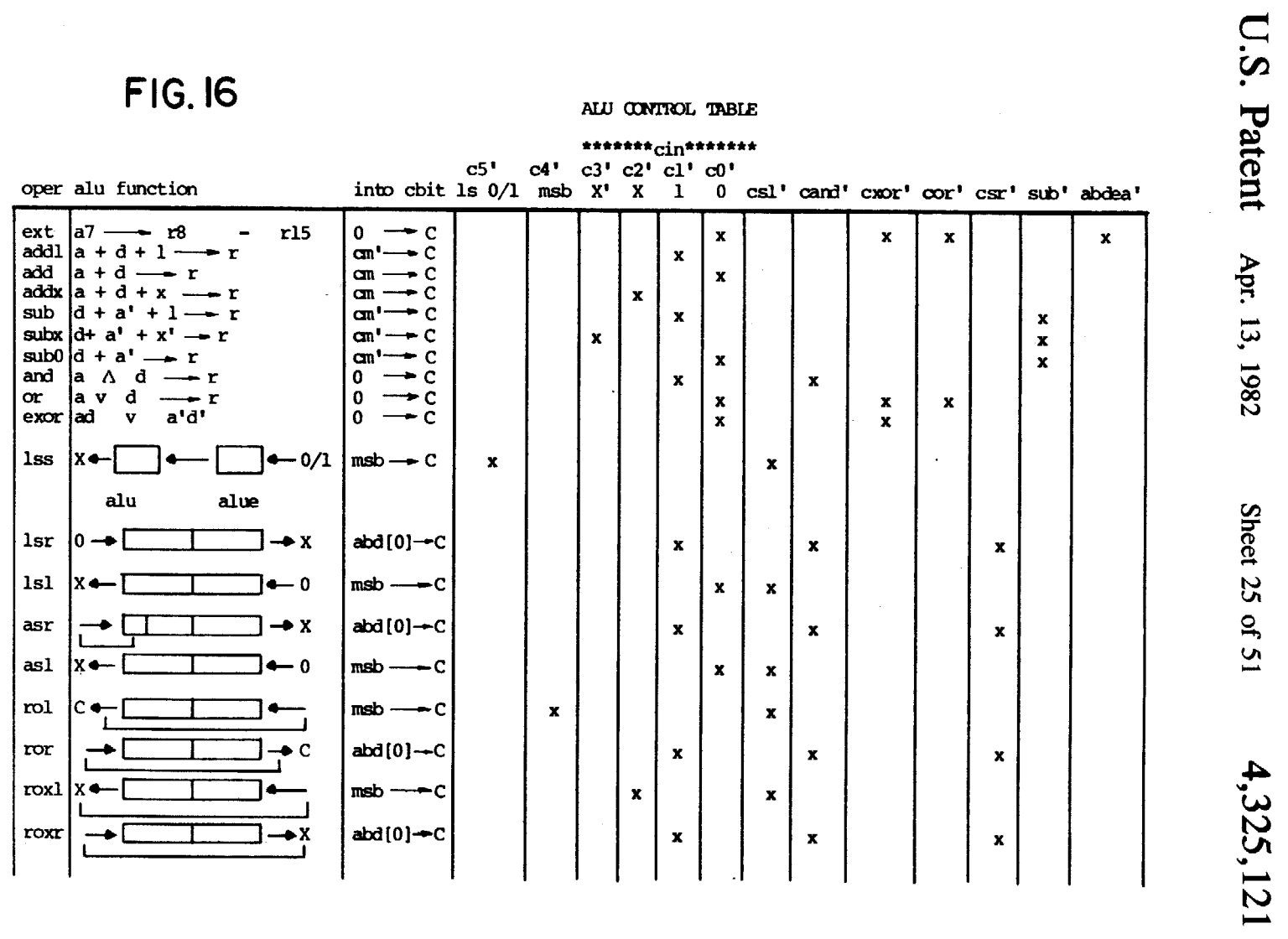

ALU CONTROL TABLE

| oper | alu function | into cbit | c5' 1s 0/1 | c4' msb | c3' X' | c2' X | c1' 1 | c0' 0 | csl' | cand' | cxor' | cor' | csr' | sub' | abdea' |
|---|---|---|---|---|---|---|---|---|---|---|---|---|---|---|---|
| | | | | | *******cin******* | | | | | | | | | | |
| ext | a7 → r8 - r15 | 0 → C | | | | | | x | | | x | x | | | x |
| addl | a + d + 1 → r | cm' → C | | | | | x | | | | | | | | |
| add | a + d → r | cm → C | | | | | | x | | | | | | | |
| addx | a + d + x → r | cm → C | | | | x | | | | | | | | | |
| sub | d + a' + 1 → r | cm' → C | | | | | x | | | | | | | x | |
| subx | d+ a' + x' → r | cm' → C | | | x | | | | | | | | | x | |
| sub0 | d + a' → r | cm' → C | | | | | | x | | | | | | x | |
| and | a Λ d → r | 0 → C | | | | | x | | | x | | | | | |
| or | a v d → r | 0 → C | | | | | | x | | | x | x | | | |
| exor | ad v a'd' | 0 → C | | | | | | x | | | x | | | | |
| lss | X ← [alu] ← [alue] ← 0/1 | msb → C | x | | | | | | x | | | | | | |
| lsr | 0 → [ ] → X | abd[0] → C | | | | | x | | | x | | | x | | |
| lsl | X ← [ ] ← 0 | msb → C | | | | | | x | x | | | | | | |
| asr | → [ ] → X | abd[0] → C | | | | | x | | | x | | | x | | |
| asl | X ← [ ] ← 0 | msb → C | | | | | | x | x | | | | | | |
| rol | C ← [ ] ← | msb → C | | x | | | | | x | | | | | | |
| ror | → [ ] → C | abd[0] → C | | | | | x | | | x | | | x | | |
| roxl | X ← [ ] ← | msb → C | | | | x | | | x | | | | | | |
| roxr | → [ ] → X | abd[0] → C | | | | | x | | | x | | | x | | |

ALU FUNCTION AND CONDITION CODE TABLE

| | 1 | 2 | 3 | 4 | 5 | INSTRUCTION(S) |
|---|---|---|---|---|---|---|
| 1 | AND KNZØØ | SUB KNZØ$\bar{C}$ | SUBX | $SLAA_X$ | EXT | DIVS, DIVU |
| 2 | AND KNZØØ 1 KNZKK | ADD CNZVC | ADDX CNZVC | ASR ANZØA | EXT | ADD, ADDI, ADDQ, DCNT, ASR, LDQ, MOVE |
| 3 | AND KNZØØ 1 KNZKK | ADDX CDDDD | ADD $C^*DZDC^*$ | ASL ANZV'A | EXT | ABCD, ASL |
| 4 | AND KNZØØ 1 KNZKK | AND KNZØØ | AND KNZØØ | LSL ANZØA | EXT | AND, ANDI, CLR, LSL |
| 5 | AND KNZØØ 1 KNZKK | SUB $\bar{C}$NZV$\bar{C}$ | SUBX $\bar{C}$NZV$\bar{C}$ | LSR ANZØA | EXT | SUB, SUBI, NEG, SUBQ, LSR, MOVB |
| 6 | AND KNZØØ | SUB KNZV$\bar{C}$ | SUBX KNZV$\bar{C}$ | | EXT | CMP, CMPM, CMPI, CHK |
| 7 | AND KNZØØ | SUB KNZV$\bar{C}$ | ADD KNZVC | ROXR KNZØA | EXT | MULS, MULU |
| 8 | AND KNZØØ 1 KNZKK | EXT KNZØØ | | ROXR ANZØA | EXT | ROXR, EXT |
| 9 | AND KNZØØ 1 KNZKK | SUBX $\bar{C}$NZV$\bar{C}$ | ADD1 $\bar{C}^*DZD\bar{C}^*$ | RDL KNZØA | EXT | ROL, SBCD, NBCD, SWAP |
| 10 | AND KNZØØ 1 KNZKK | SUBX $\bar{C}$NZV$\bar{C}$ | SUBX $\bar{C}$NZV$\bar{C}$ | RDR KNZØA | EXT | ROR, SUBX, NEG, X |
| 11 | AND KNZØØ 1 KNZKK | SUBØ KNZV$\bar{C}$ | SUBØ KNZV$\bar{C}$ | ROXL ANZØA | EXT | NOT, ROXL |
| 12 | AND | ADDX CNZVC | ADDX CNZVC | | EXT | ADDX |
| 13 | AND KKZKK | EOR KNZØØ | EDR KNZØØ | | EXT | EOR, EDRI, BCHG, BTST |
| 14 | AND KKZKK | OR KNZØØ | OR KNZØØ | EOR | EXT | OR, ORI, BCLR, BSET |
| 15 | AND KNZØØ | OR | | | | TAS, TST, SCC, MOVB |

K: NO CHANGE
D: DON'T CARE
A: SPECIAL CHARACTER
ORDER: XNZVC
$C^*$: $C_{PSW}$ V $C_{INF}$

FIG. 17

ALU FUNCTION CONTROL AND CONDITION CODE DECODER

| # | i | Instruction Decode | | | | | | | | | | | | Instruction | Row inhibits | | | | | | | | | | | | | | |
|---|---|---|---|---|---|---|---|---|---|---|---|---|---|---|---|---|---|---|---|---|---|---|---|---|---|---|---|---|---|
| 0 | | 15 | 14 | 13 | 12' | | | | | 7 | 6' | | | long shift | | | | | | | | | | | | | | | |
| 1 | | 15 | 14 | 13 | 12' | | | | | | 6 | | | word shift | | | | | | | | | | | | | | | |
| 2 | | 15 | 14 | 13 | 12' | | | | | 7' | 6' | | | byte shift | | | | | | | | | | | | | | | |
| 3 | | 15 | 14 | 13' | 12 | | | | | | | | | | 1 | | 3 | 4 | 5 | 6 | 7 | 8 | 9 | 10 | 11 | | 13 | 14 | 15 |
| 4 | | 15 | | 13' | 12 | | | | 8 | 7' | | 5' | 4' | addx,subx | | 2 | | | 5 | | | | | | | | | | |
| 5 | | 15 | | 13' | 12 | | | | 8 | | 6' | 5' | 4' | addx,subx | | 2 | | | 5 | | | | | | | | | | |
| 6 | | 15 | | 13' | 12 | | | | | | | | | add,sub | | | | | | | | | | 10 | | 12 | | | |
| (4) | i | 15 | | 13' | 12 | | | | 8 | 7' | | 5' | 4' | | | | | | | | | | | | | | | | |
| (5) | i | 15 | | 13' | 12 | | | | 8 | | 6' | 5' | 4' | | | | | | | | | | | | | | | | |
| 7 | | 15 | 14' | 13' | 12 | | | | | | | | | | 1 | 2 | 3 | 4 | | 6 | 7 | 8 | 9 | | 11 | 12 | 13 | 14 | 15 |
| 8 | | 15 | 14 | 13' | 12' | | | | | | | | | | 1 | 2 | | | 5 | 6 | | 8 | 9 | 10 | 11 | 12 | 13 | 14 | 15 |
| 9 | | 15 | | 13' | 12' | | | | | 7 | 6 | | | mul,div | | | 3 | 4 | | | | | 9 | | | | | 14 | |
| 10 | | 15 | | 13' | 12' | | | | 8 | 7' | 6' | 5' | 4' | abcd, sbcd | 1 | | | 4 | | | 7 | | | | | | | 14 | |
| 11 | | 15 | | 13' | 12' | | | | | | | | | and,or | 1 | | 3 | | | | 7 | | 9 | | | | | | |
| (9) | i | 15 | | 13' | 12' | | | | | 7 | 6 | | | | | | | | | | | | | | | | | | |
| (10) | i | 15 | | 13' | 12' | | | | 8 | 7' | 6' | 5' | 4' | | | | | | | | | | | | | | | | |
| 12 | | 15 | 14' | 13' | 12' | | | | | | | | | | | 2 | 3 | 4 | 5 | 6 | 7 | 8 | | 10 | 11 | 12 | 13 | | 15 |
| 13 | | 15' | | 13 | | | | | | | | | | ldq,dcnt,movw,movl,bcc | 1 | | 3 | 4 | 5 | 6 | 7 | 8 | 9 | 10 | 11 | 12 | 13 | 14 | 15 |
| 14 | | 15' | | 13' | 12 | | | | | 7 | 6 | | | scc,movb | 1 | 2 | 3 | 4 | 5 | 6 | 7 | 8 | 9 | 10 | 11 | 12 | 13 | 14 | |
| 15 | | 15' | | 13' | 12 | | | | 8 | | | | | subq,movb | 1 | 2 | 3 | 4 | | 6 | 7 | 8 | 9 | 10 | 11 | 12 | 13 | 14 | 15 |
| (14) | i | 15' | | 13' | 12 | | | | | 7 | 6 | | | | | | | | | | | | | | | | | | |
| 16 | | 15' | | 13' | 12 | | | | 8' | | | | | addq,movb | 1 | | 3 | 4 | 5 | 6 | 7 | 8 | 9 | 10 | 11 | 12 | 13 | 14 | 15 |
| (14) | i | 15' | | 13' | 12 | | | | | 7 | 6 | | | | | | | | | | | | | | | | | | |
| 17 | | 15' | 14' | 13' | 12' | | | | | | | | | | 1 | | 3 | | | | 7 | 8 | 9 | 10 | 11 | 12 | | | 15 |
| 18 | | 15' | 14' | 13' | 12' | | | | 8 | 7 | | | | bclr,bset | | 2 | | 4 | 5 | 6 | | | | | | | 13 | | |
| 19 | | 15' | 14' | 13' | 12' | | | | 8 | 7' | | | | bchg,btst | | 2 | | 4 | 5 | 6 | | | | | | | | 14 | |
| 20 | | 15' | 14' | 13' | 12 | 11 | 10 | 9' | 8' | | | | | cmpi | | 2 | | 4 | 5 | | | | | | | | 13 | 14 | |
| 21 | | 15' | | 13' | 12' | 11 | 10' | 9' | 8' | 7 | | | | bclr,bset,ext | | 2 | | 4 | 5 | 6 | | | 9 | 10 | 11 | | 13 | | 15 |
| 22 | | 15' | | 13' | 12' | 11 | 10' | 9 | 8' | | | | | ori,tas,tst | | 2 | | 4 | 5 | 6 | | 8 | 9 | 10 | 11 | | | 14 | |

FIG. 18

| | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|
| 23 | | 15' | | 13' | 12' | 11' | 10' | 9' | 8' | | | | | | eori,negx | | 2 | | 4 | 5 | 6 | | 8 | 9 | | 11 | | 13 | | 15 |
| 24 | | 15' | | 13' | 12' | 11' | 10 | 9 | 8' | | | | | | addi,not | | | | 4 | 5 | 6 | | 8 | 9 | 10 | | | 13 | 14 | 15 |
| 25 | | 15' | | 13' | 12' | 11' | 10 | 9' | 8' | | | | | | subi,neg | | 2 | | 4 | | 6 | | 8 | 9 | 10 | 11 | | 13 | 14 | 15 |
| 26 | | 15' | | 13' | 12' | 11 | 10' | 9' | 8' | 7' | | | | | bchg,btst,nbcd | | 2 | | 4 | 5 | 6 | | 8 | | 10 | 11 | | | 14 | 15 |
| 27 | | 15' | | 13' | 12' | 11' | 10' | 9 | 8' | | | | | | andi,clr | | 2 | | | 5 | 6 | | 8 | 9 | 10 | 11 | | 13 | 14 | 15 |
| 28 | | 15' | 14 | 13' | 12' | | | | 8' | 7 | 6' | | | | chk | | | | 4 | 5 | | | 8 | 9 | 10 | 11 | | | | 15 |
| 29 | | 15' | 14 | 13' | 12' | | | | | | | | | | | 1 | 2 | 3 | | | | 7 | | | | | 12 | 13 | 14 | |
| (30) | i | 15 | 14 | 13 | 12' | | | | | 7 | 6 | | | | inhibit only | | | | | | | | | | | | | | | |
| 31 | | 15 | 14 | 13 | 12' | | | | | | | | 4' | 3 | ls | | 2 | 3 | | | | | 8 | 9 | 10 | 11 | | | | |
| (30) | i | 15 | 14 | 13 | 12' | | | | | 7 | 6 | | | | | | | | | | | | | | | | | | | |
| 32 | | 15 | 14 | 13 | 12' | | 10' | 9 | | 7 | 6 | | | | ls | | 2 | 3 | | | | | 8 | 9 | 10 | 11 | | | | |
| 33 | | 15 | 14 | 13 | 12' | | | | | | | | 4 | 3 | ro | | 2 | 3 | 4 | 5 | | | 8 | | | 11 | | | | |
| (30) | i | 15 | 14 | 13 | 12' | | | | | 7 | 6 | | | | | | | | | | | | | | | | | | | |
| 34 | | 15 | 14 | 13 | 12' | | 10 | 9 | | 7 | 6 | | | | ro | | 2 | 3 | 4 | 5 | | | 8 | | | 11 | | | | |
| 35 | | 15 | 14 | 13 | 12' | | | | | | | | 4' | 3' | as | | | | 4 | 5 | | | 8 | 9 | 10 | 11 | | | | |
| (30) | i | 15 | 14 | 13 | 12' | | | | | 7 | 6 | | | | | | | | | | | | | | | | | | | |
| 36 | | 15 | 14 | 13 | 12' | | 10' | 9' | | 7 | 6 | | | | as | | | | 4 | 5 | | | 8 | 9 | 10 | 11 | | | | |
| 37 | | 15 | 14 | 13 | 12' | | | | | | | | 4 | 3' | rox | | 2 | 3 | 4 | 5 | | | | 9 | 10 | | | | | |
| (30) | i | 15 | 14 | 13 | 12' | | | | | 7 | 6 | | | | | | | | | | | | | | | | | | | |
| 38 | | 15 | 14 | 13 | 12' | | 10 | 9' | | 7 | 6 | | | | rox | | 2 | 3 | 4 | 5 | | | | 9 | 10 | | | | | |
| 39 | | 15 | 14 | 13 | 12 | | | | 8 | | | | | | left shift | 1 | 2 | | | 5 | 6 | 7 | 8 | | 10 | | 12 | 13 | 14 | 15 |
| 40 | | 15 | 14 | 13 | 12' | | | | 8' | | | | | | right shift | 1 | | 3 | 4 | | 6 | 7 | | 9 | | 11 | 12 | 13 | 14 | 15 |
| 41 | | 15 | 14' | 13 | 12 | | | | | | | 5' | 4' | 3 | cmpm | 1 | 2 | 3 | 4 | 5 | | 7 | 8 | 9 | 10 | 11 | 12 | 13 | 14 | 15 |
| 42 | | 15 | 14' | 13 | 12 | | | | 8 | 7 | 6 | | | | cmpa | 1 | 2 | 3 | 4 | 5 | | 7 | 8 | 9 | 10 | 11 | 12 | 13 | 14 | 15 |
| 43 | | 15 | 14' | 13 | 12 | | | | 8' | | | | | | cmpi | 1 | 2 | 3 | 4 | 5 | | 7 | 8 | 9 | 10 | 11 | 12 | 13 | 14 | 15 |
| 44 | | 15 | 14' | 13 | 12 | | | | | | | | | | eor | 1 | 2 | 3 | 4 | 5 | 6 | 7 | 8 | 9 | 10 | 11 | 12 | | 14 | 15 |
| (41) | i | 15 | 14' | 13 | 12 | | | | | | | 5' | 4' | 3 | | | | | | | | | | | | | | | | |
| (42) | i | 15 | 14' | 13 | 12 | | | | 8 | 7 | 6 | | | | | | | | | | | | | | | | | | | |
| (43) | i | 15 | 14' | 13 | 12 | | | | 8' | | | | | | | | | | | | | | | | | | | | | |

FIG. 18
CONTINUED

IMMEDIATE LINE: 0000 BTST, BCHG, BSET, BCLR, ORI, ANDI, SUBI, ADDI, EORI, CMPI

| | RYD | RYA | (RYA) | (RYA)+ | -(RYA) | (RYA) $+d_{16}$ | (RYA) +(X) $+d_8$ | ABSW | ABSL | (PC) $+d_{16}$ | (PC) +(X) $+d_8$ | # | UNUSED | IR[11:6] |
|---|---|---|---|---|---|---|---|---|---|---|---|---|---|---|
| A1<br>A2<br>A3 | BTSR1 | MPIW1 | ADRW1<br>BTSM1 | PINWL<br>BTSM1 | PDCW1<br>BTSM1 | ADSW1<br>BTSM1 | AIXWØ<br>BTSM1 | ABWW1<br>BTSM1 | ABLW1<br>BTSM1 | ADSW1<br>BTSM1 | AIXW1<br>BTSM1 | E#W1<br>BTSI1 | TRAP1 | XXX100<br>DYNAMIC BTST |
| A1<br>A2<br>A3 | BCSR1 | MPIL1 | ADRW1<br>BCSM1 | PINWL<br>BCSM1 | PDCW1<br>BCSM1 | ADSW1<br>BCSM1 | AIXWØ<br>BCSM1 | ABWW1<br>BCSM1 | ABLW1<br>BCSM1 | TRAP1 | TRAP1 | TRAP1 | TRAP1 | XXX101<br>DYNAMIC BCHG |
| A1<br>A2<br>A3 | BCSR1 | MPOL1 | ADRW1<br>BCSM1 | PINW1<br>BCSM1 | PDCW1<br>BCSM1 | ADSW1<br>BCSM1 | AIXWØ<br>BCSM1 | ABWW1<br>BCSM1 | ABLW1<br>BCSM1 | TRAP1 | TRAP1 | TRAP1 | TRAP1 | XXX111<br>DYNAMIC BSET |
| A1<br>A2<br>A3 | BCLR1 | MPOW1 | ADRW1<br>BCLM1 | PINW1<br>BCLM1 | PDCW1<br>BCLM1 | ADSW1<br>BCLM1 | AIXWØ<br>BCLM1 | ABWW1<br>BCLM1 | HBLW1<br>BCLM1 | TRAP1 | TRAP1 | TRAP1 | TRAP1 | XXX110<br>DYNAMIC BCLR |
| A1<br>A2<br>A3 | O#W1<br>BTSR1 | TRAP1 | O#W1<br>ADRW1<br>BTSM1 | O#W1<br>PINW1<br>BTSM1 | O#W1<br>PDCW1<br>BTSM1 | O#W1<br>ADSW1<br>BTSM1 | O#W1<br>AIXWØ<br>BTSM1 | O#W1<br>ABWW1<br>BTSM1 | O#W1<br>ABLW1<br>BTSM1 | O#W1<br>ADSW1<br>BTSM1 | O#W1<br>AIXWØ<br>BTSM1 | TRAP1 | TRAP1 | 100000<br>STATIC BTST |
| A1<br>A2<br>A3 | O#W1<br>BCSR1 | TRAP1 | O#W1<br>ADRW1<br>BCSM1 | O#W1<br>PINW1<br>BCSM1 | O#W1<br>PDCW1<br>BCSM1 | O#W1<br>ADSW1<br>BCSM1 | O#W1<br>AIXWØ<br>BCSM1 | O#W1<br>ABWW1<br>BCSM1 | O#W1<br>ABLW1<br>BCSM1 | TRAP1 | TRAP1 | TRAP1 | TRAP1 | 100001<br>STATIC BCHG |
| A1<br>A2<br>A3 | O#W1<br>BCSR1 | TRAP1 | O#W1<br>ADRW1<br>BCSM1 | O#W1<br>PINW1<br>BCSM1 | O#W1<br>PDCW1<br>BCSM1 | O#W1<br>ADSW1<br>BCSM1 | O#W1<br>AIXWØ<br>BCSM1 | O#W1<br>ABWW1<br>BCSM1 | O#W1<br>ABLW1<br>BCSM1 | TRAP1 | TRAP1 | TRAP1 | TRAP1 | 100011<br>STATIC BSET |
| A1<br>A2<br>A3 | O#W1<br>BCLR1 | TRAP1 | O#W1<br>ADRW1<br>BCLM1 | O#W1<br>PINW1<br>BCLM1 | O#W1<br>PDCW1<br>BCLM1 | O#W1<br>ADSW1<br>BCLM1 | O#W1<br>AIXWØ<br>BCLM1 | O#W1<br>ABWWL<br>BCLM1 | O#W1<br>ABLW1<br>BCLM1 | TRAP1 | TRAP1 | TRAP1 | TRAP1 | 100010<br>STATIC BCLR |
| IR[5:0] | 000XXX | 001XXX | 010XXX | 011XXX | 100XXX | 101XXX | 110XXX | 111000 | 111001 | 111010 | 111011 | 111100 | 111101<br>11111X | |

IMMEDIATE LINE 0000 BTST, BCHG, BSET, BCLR

FIG. 21B

IMMEDIATE LINE: 0000 BTST, BCHG, BSET, BCLR, ORI, ANDI, SUBI, ADDI, EORI, CMPI

| | RYD | RYA | (RYA) | (RYA)+ | -(RYA) | (RYA) +$d_{16}$ | (RYA) +(X) +$d_8$ | ABSW | ABSL | (PC) +$d_{16}$ | (PC) +(X) +$d_8$ | # | UNUSED | IR[11:6] |
|---|---|---|---|---|---|---|---|---|---|---|---|---|---|---|
| A1<br>A2<br>A3 | O#W1<br>RCAW1 | TRAP1 | O#W1<br>ADRW1<br>CPDW1 | O#W1<br>PINW1<br>CPDW1 | OW#1<br>PDCW1<br>CPDW1 | OW#1<br>ADSW1<br>CPDW1 | OW#1<br>A12WØ<br>CPDW1 | OW#1<br>ABWW1<br>CPDW1 | O#W1<br>ABLW1<br>CPDW1 | TRAP1 | TRAP1 | TRAP1 | TRAP1 | 110000 BYTE<br>CMPI |
| A1<br>A2<br>A3 | O#W1<br>RCAL1 | TRAP1 | O#W1<br>ADRW1<br>CPDW1 | O#W1<br>PINW1<br>CPDW1 | O#W1<br>PDCW1<br>CPDW1 | O#W1<br>ADSW1<br>CPDW1 | O#W1<br>AIXWØ<br>CPDW1 | O#W1<br>ABWW1<br>CPDW1 | O#W1<br>ABLW1<br>CPDW1 | TRAP1 | TRAP1 | TRAP1 | TRAP1 | 110001 WORD<br>CMPI |
| A1<br>A2<br>A3 | O#L1<br>RCAL1 | TRAP1 | O#L1<br>ADRL1<br>CPDL1 | O#L1<br>PINL1<br>CPDL1 | O#L1<br>PDCL1<br>CPDL1 | O#L1<br>ADSL1<br>CPDL1 | O#L1<br>AIXLØ<br>CPDL1 | O#L1<br>ABWL1<br>CPDL1 | O#L1<br>ABLL1<br>CPDL1 | TRAP1 | TRAP1 | TRAP1 | TRAP1 | 110010 LONG<br>CMPI |
| A1<br>A2<br>A3 | | | | | | | | | | | | | | |
| A1<br>A2<br>A3 | | | | | | | | | | | | | | |
| A1<br>A2<br>A3 | | | | | | | | | | | | | | |
| A1<br>A2<br>A3 | | | | | | | | | | | | | | |
| A1<br>A2<br>A3 | | | | | | | | | | | | | | |
| IR[5:0] | 000XXX | 001XXX | 010XXX | 011XXX | 100XXX | 101XXX | 110XXX | 111000 | 111001 | 111010 | 111011 | 111100 | 111101<br>11111X | |

IMMEDIATE LINE 0000 CMPI

FIG. 21C

MOVE BYTE

SOURCE

| IR[11:6] DESTINATION | RYD | RYA | (RYA) | (RYA)+ | -(RYA) | (RYA) +$d_{16}$ | (RYA) +(X) +$d_8$ | ABSW | ABSL | (PC) +$d_{16}$ | (PC) +(X) +$d_8$ | # | UNUSED |
|---|---|---|---|---|---|---|---|---|---|---|---|---|---|
| RXD XXX000 | A1 RRGW1 | A1 TRAP1 | A1 ADRW1<br>A3 MRGW1 | A1 PINW1<br>A3 MRGW1 | A1 PDCW1<br>A3 MRGW1 | A1 ADSW1<br>A3 MRGW1 | A1 AIXWØ<br>A3 MRGW1 | A1 ABWW1<br>A3 MRGW1 | A1 ABLW1<br>A3 MRGW1 | A1 ADSW1<br>A3 MRGW1 | A1 AIXWØ<br>A3 MRGW1 | A1 E#W1<br>A3 RRGW1 | A1 TRAP1 |
| RXA XXX001 | A1 TRAP1 | A1 TRAP1 | A1 TRAP1 | A1 TRAP1 | A1 TRAP1 | A1 TRAP1 | A1 TRAP1 | A1 TRAP1 | A1 TRAP1 | A1 TRAP1 | A1 TRAP1 | A1 TRAP1 | A1 TRAP1 |
| (RXA) XXX010 | A1 RMRW1 | A1 TRAP1 | A1 ADRW1<br>A3 MMRW1 | A1 PNWL<br>A3 MMRW1 | A1 PDCW1<br>A3 MMRW1 | A1 ADSW1<br>A3 MMRW1 | A1 AIXWØ<br>A3 MMRW1 | A1 ABWW1<br>A3 MMRW1 | A1 ABLW1<br>A3 MMRW1 | A1 ADSW1<br>A3 MMRW1 | A1 AIXWØ<br>A3 MMRW1 | A1 E#W1<br>A2 RMRW1 | A1 TRAP1 |
| (RXA)+ XXX100 | A1 RMIW1 | A1 TRAP1 | A1 ADRW1<br>A3 MMIW1 | A1 PINW1<br>A3 MMIW1 | A1 PDCW1<br>A3 MMIW1 | A1 ADSW1<br>A3 MMIW1 | A1 AIXWØ<br>A3 MMIW1 | A1 ABWW1<br>A3 MMIW1 | A1 ABLW1<br>A3 MMIW1 | A1 ADSW1<br>A3 MMIW1 | A1 IXWØ1<br>A3 MMIW1 | A1 E#W1<br>A2 RMIW1 | A1 TRAP1 |
| -(RXA) XXX100 | A1 RMMW1 | A1 TRAP1 | A1 ADRW1<br>A3 MMMW1 | A1 PINW1<br>A3 MMMW1 | A1 PDCW1<br>A3 MMMW1 | A1 ADSW1<br>A3 MMMW1 | A1 AIXWØ<br>A3 MMMW1 | A1 ABWW1<br>A3 MMMW1 | A1 ABLW1<br>A3 MMMW1 | A1 ADSW1<br>A3 MMMW1 | A1 AIXWØ<br>A3 MMMW1 | A1 E#W1<br>A2 RMMW1 | A1 TRAP1 |
| (RXA)+d16 XXX101 | A1 RMDW1 | A1 TRAP1 | A1 ADRW1<br>A3 MMDW1 | A1 PINW1<br>A3 MMDW1 | A1 PDCW1<br>A3 MMDW1 | A1 ADSW1<br>A3 MMDW1 | A1 AIXWØ<br>A3 MMDW1 | A1 ABWW1<br>A3 MMDW1 | A1 ABLW1<br>A3 MMDW1 | A1 ADSW1<br>A3 MMDW1 | A1 AIXWØ<br>A3 MMDW1 | A1 E#W1<br>A2 RMDW1 | A1 TRAP1 |
| (RXA)+(X)+d8 XXX110 | A1 RMXWØ | A1 TRAP1 | A1 ADRW1<br>A3 MMXWØ | A1 PINW1<br>A3 MMXWØ | A1 PDCW1<br>A3 MMXWØ | A1 ADSW1<br>A3 MMXWØ | A1 AIXWØ<br>A3 MMXWØ | A1 ABWW1<br>A3 MMXWØ | A1 ABLW1<br>A3 MMXWØ | A1 ADSW1<br>A3 MMXWØ | A1 AIXWØ<br>A3 MMXWØ | A1 E#W1<br>A2 RMXWØ | A1 TRAP1 |
| ABSW 000111 | A1 RAWW1 | A1 TRAP1 | A1 ADRW1<br>A3 MAWW1 | A1 PINW1<br>A3 MAWW1 | A1 PDCW1<br>A3 MAWW1 | A1 APSW1<br>A3 MAWW1 | A1 AIXWØ<br>A3 MAWW1 | A1 ABWW1<br>A3 MAWW1 | A1 ABLW1<br>A3 MAWW1 | A1 ADSW1<br>A3 MAWW1 | A1 AIXWØ<br>A3 MAWW1 | A1 E#W1<br>A2 RAWW1 | A1 TRAP1 |
| ABSL 001111 | A1 RALW1 | A1 TRAP1 | A1 ADRW1<br>A3 MALW1 | A1 PINW1<br>A3 MALW1 | A1 PDCW1<br>A3 MALW1 | A1 ADSW1<br>A3 MALW1 | A1 AIXWØ<br>A3 MALW1 | A1 ABWW1<br>A3 MALW1 | A1 ABLW1<br>A3 MALW1 | A1 ADSW1<br>A3 MALW1 | A1 AIXWØ<br>A3 MALW1 | A1 E#W1<br>A2 RALW1 | A1 TRAP1 |
| UNUSED X1X111 1XX111 | A1 TRAP1 | A1 TRAP1 | A1 TRAP1 | A1 TRAP1 | A1 TRAP1 | A1 TRAP1 | A1 TRAP1 | A1 TRAP1 | A1 TRAP1 | A1 TRAP1 | A1 TRAP1 | A1 TRAP1 | A1 TRAP1 |
| IR[5:0] | 000XXX | 001XXX | 010XXX | 011XXX | 100XXX | 101XXX | 110XXX | 111000 | 111001 | 111010 | 111011 | 111100 | 111101<br>11111X |

MOVE BYTE 0001

FIG. 2ID

MOVE DOUBLE — SOURCE — DESTINATION

| | RYD | RYA | (RYA) | (RYA)+ | -(RYA) | (RYA) +$d_{16}$ | (RYA) +(X) +$d_8$ | ABSW | ABSL | (PC) +$d_{16}$ | (PC) +(X) +$d_8$ | # | UNUSED | IR[11:6] |
|---|---|---|---|---|---|---|---|---|---|---|---|---|---|---|
| A1<br>A2<br>A3 | RRGL1 | RRGL1 | ADRL1<br>MRGL1 | PINL1<br>MRGL1 | PDCL1<br>MRGL1 | ADSL1<br>MRGL1 | AIXLØ<br>MRGL1 | ABWL1<br>MRGL1 | ABLL1<br>MRGL1 | ADSL1<br>MRGL1 | AIXLØ<br>MRGL1 | E#L1<br>RRGL1 | TRAP1 | RXD<br>XXX000 |
| A1<br>A2<br>A3 | RRGL1 | RRGL1 | ADRL1<br>MRGL1 | PINL1<br>MRGL1 | PDCL1<br>MRGL1 | ADSL1<br>MRGL1 | AIXLØ<br>MRGL1 | ABWL1<br>MRGL1 | ABLL1<br>MRGL1 | ADSL1<br>MRGL1 | AIXLØ<br>MRGL1 | E#L1<br>RRGL1 | TRAP1 | RXA<br>XXX001 |
| A1<br>A2<br>A3 | RMRL1 | RMRL1 | ADRL1<br>MMRL1 | PINL1<br>MMRL1 | PDCL1<br>MMRL1 | ADSL1<br>MMRL1 | AIXLØ<br>MMRL1 | ABWL1<br>MMRL1 | ABLL1<br>MMRL1 | ADSL1<br>MMRL1 | AIXLØ<br>MMRL1 | E#L1<br>RMRL1 | TRAP1 | (RXA)<br>XXX010 |
| A1<br>A2<br>A3 | RMIL1 | RMIL1 | ADRL1<br>MMIL1 | PINL1<br>MMIL1 | PDCL1<br>MMIL1 | ADSL1<br>MMIL1 | AIXLØ<br>MMIL1 | ABWL1<br>MMIL1 | ABLL1<br>MMIL1 | ADSL1<br>MMIL1 | AIXLØ<br>MMIL1 | E#L1<br>RMIL1 | TRAP1 | (RXA)+<br>XXX011 |
| A1<br>A2<br>A3 | RMML1 | RMML1 | ADRL1<br>MMML1 | PINL1<br>MMML1 | PDCL1<br>MMML1 | ADSL1<br>MMML1 | AIXLØ<br>MMML1 | ABWL1<br>MMML1 | ABLL1<br>MMML1 | ADSL1<br>MMML1 | AIXLØ<br>MMML1 | E#L1<br>RMML1 | TRAP1 | -(RXA)<br>XXX100 |
| A1<br>A2<br>A3 | RMDL1 | RMDL1 | ADRL1<br>MMDL1 | PINL1<br>MMDL1 | PDCL1<br>MMDL1 | ADSL1<br>MMDL1 | AIXLØ<br>MMDL1 | ABWL1<br>MMDL1 | ABLL1<br>MMDL1 | ADSL1<br>MMDL1 | AIXLØ<br>MMDL1 | E#L1<br>RMDL1 | TRAP1 | (RXA)+d16<br>XXX101 |
| A1<br>A2<br>A3 | RMXLØ | RMXLØ | ADRL1<br>MMXLØ | PINL1<br>MMXLØ | PDCL1<br>MMXLØ | ADSL1<br>MMXLØ | AIXLØ<br>MMXLØ | ABWL1<br>MMXLØ | ABLL1<br>MMXLØ | ADSL1<br>MMXLØ | AIXLØ<br>MMXLØ | E#L1<br>RMXLØ | TRAP1 | (RXA)+(X)+d8<br>XXX110 |
| A1<br>A2<br>A3 | RAWL1 | RAWL1 | ADRL1<br>MAWL1 | PINL1<br>MAWL1 | PDCL1<br>MAWL1 | APSL1<br>MAWL1 | AIXLØ<br>MAWL1 | ABWL1<br>MAWL1 | ABLL1<br>MAWL1 | ADSL1<br>MAWL1 | AIXLØ<br>MAWL1 | E#L1<br>RAWL1 | TRAP1 | ABSW<br>000111 |
| A1<br>A2<br>A3 | RALL1 | RALL1 | ADRL1<br>MALL1 | PINL1<br>MALL1 | PDCL1<br>MALL1 | ADSL1<br>MALL1 | AIXLØ<br>MALL1 | ABWL1<br>MALL1 | ABLL1<br>MALL1 | ADSL1<br>MALL1 | AIXLØ<br>MALL1 | E#L1<br>RALL1 | TRAP1 | ABSL<br>001111 |
| A1<br>A2<br>A3 | TRAP1 | TRAP1 | TRAP1 | TRAP1 | TRAP1 | TRAP1 | TRAP1 | TRAP1 | TRAP1 | TRAP1 | TRAP1 | TRAP1 | TRAP1 | UNUSED<br>X1X111<br>1XX111 |
| IR[5:0] | 000XXX | 001XXX | 010XXX | 011XXX | 100XXX | 101XXX | 110XXX | 111000 | 111001 | 111010 | 111011 | 111100 | 111101<br>11111X | |

MOVE DOUBLE 0010

FIG. 21E

MOVE WORD

SOURCE

DESTINATION

| IR[11:6] | RYD | RYA | (RYA) | (RYA)+ | -(RYA) | (RYA) +$d_{16}$ | (RYA) +(X) +$d_8$ | ABSW | ABSL | (PC) +$d_{16}$ | (PC) +(X) +$d_8$ | # | UNUSED |
|---|---|---|---|---|---|---|---|---|---|---|---|---|---|
| RXD XXX000 | RRGW1 | RRGW1 | ADRW1<br>MRGW1 | PINW1<br>MRGW1 | PDCW1<br>MRGW1 | ADSW1<br>MRGW1 | AIXWØ<br>MRGW1 | ABWW1<br>MRGW1 | ABLW1<br>MRGW1 | ADSW1<br>MRGW1 | AIXWØ<br>MRGW1 | E#W1<br>RRGW1 | TRAP1 |
| RXA XXX001 | RRGM1 | RRGM1 | ADRW1<br>MRGM1 | PINW1<br>MRGM1 | PDCW1<br>MRGM1 | ADSW1<br>MRGM1 | AIXWØ<br>MRGM1 | ABWW1<br>MRGM1 | ABLW1<br>MRGM1 | ADSW1<br>MRGM1 | AIXWØ<br>MRGM1 | E#W1<br>RRGM1 | TRAP1 |
| (RXA) XXX010 | RMRW1 | RMRW1 | ADRW1<br>MMRW1 | PINW1<br>MMRW1 | PDCW1<br>MMRW1 | ADSW1<br>MMRW1 | AIXWØ<br>MMRW1 | ABWW1<br>MMRW1 | ABLW1<br>MMRW1 | ADSW1<br>MMRW1 | AIXWØ<br>MMRW1 | E#W1<br>RMRW1 | TRAP1 |
| (RXA)+ XXX011 | RMIW1 | RMIW1 | ADRW1<br>MMMW1 | PINW1<br>MMMW1 | PDCW1<br>MMMW1 | ADSW1<br>MMMW1 | AIXWØ<br>MMMW1 | ABWW1<br>MMMW1 | ABLW1<br>MMMW1 | ADSW1<br>MMMW1 | AIXWØ<br>MMMW1 | E#W1<br>RMIW1 | TRAP1 |
| -(RXA) XXX100 | RMMW1 | RMMW1 | ADRW1<br>MMMW1 | PINW1<br>MMMW1 | PDCW1<br>MMMW1 | ADSW1<br>MMMW1 | AIXWØ<br>MMMW1 | ABWW1<br>MMMW1 | ABLW1<br>MMMW1 | ADSW1<br>MMMW1 | AIXWØ<br>MMMW1 | E#W1<br>RMMW1 | TRAP1 |
| (RXA)+d16 XXX101 | RMDW1 | RMDW1 | ADRW1<br>MMDW1 | PINW1<br>MMDW1 | PDCW1<br>MMDW1 | ADSW1<br>MMDW1 | AIXWØ<br>MMDW1 | ABWW1<br>MMDW1 | ABLW1<br>MMDW1 | ADSW1<br>MMDW1 | AIXWØ<br>MMDW1 | E#W1<br>RMDW1 | TRAP1 |
| (RXA)+(X)+d8 XXX110 | RMXWØ | RMXWØ | ADRW1<br>MMXWØ | PINW1<br>MMXWØ | PDCW1<br>MMXWØ | ADSW1<br>MMXWØ | AIXWØ<br>MMXWØ | ABWW1<br>MMXWØ | ABLW1<br>MMXWØ | ADSW1<br>MMXWØ | AIXWØ<br>MMXWØ | E#W1<br>RMXWØ | TRAP1 |
| ABSW 000111 | RAWW1 | RAWW1 | ADRW1<br>MAWW1 | PINW1<br>MAWW1 | PDCW1<br>MAWW1 | APSW1<br>MAWW1 | AIXWØ<br>MAWW1 | ABWW1<br>MAWW1 | ABLW1<br>MAWW1 | ADSW1<br>MAWW1 | AIXWØ<br>MAWW1 | E#W1<br>RAWW1 | TRAP1 |
| ABSL 001111 | RALW1 | RALW1 | ADRW1<br>MALW1 | PINW1<br>MALW1 | PDCW1<br>MALW1 | ADSW1<br>MALW1 | AIXWØ<br>MALW1 | ABWW1<br>MALW1 | ABLW1<br>MALW1 | ADSW1<br>MALW1 | AIXWØ<br>MALW1 | E#W1<br>RALW1 | TRAP1 |
| UNUSED X1X111 1XX111 | TRAP1 | TRAP1 | TRAP1 | TRAP1 | TRAP1 | TRAP1 | TRAP1 | TRAP1 | TRAP1 | TRAP1 | TRAP1 | TRAP1 | TRAP1 |
| IR[5:0] | 000XXX | 001XXX | 010XXX | 011XXX | 100XXX | 101XXX | 110XXX | 111000 | 111001 | 111010 | 111011 | 111100 | 111101<br>11111X |

Each cell row: A1 / A2 / A3

MOVE WORD 0011

FIG. 21F

MISCELLANEOUS LINE 0100

| | RYD | RYA | (RYA) | (RYA)+ | -(RYA) | (RYA) $+d_{16}$ | (RYA) +(X) $+d_8$ | ABSW | ABSL | (PC) $+d_{16}$ | (PC) +(X) $+d_8$ | # | UNUSED | IR[11:6] |
|---|---|---|---|---|---|---|---|---|---|---|---|---|---|---|
| A1 | NNRW1 | TRAP1 | ADRW1 | PINW1 | PDCW1 | ADSW1 | AIXWØ | ABWW1 | ABLW1 | TRAP1 | TRAP1 | TRAP1 | TRAP1 | 0XX000 BYTE |
| A2 | | | | | | | | | | | | | | CLR NEG |
| A3 | | | NNMW1 | NNMW1 | NNMW1 | NNMW1 | NNMW1 | NNMW1 | NNMW1 | | | | | NEGX NOT |
| A1 | NNRW1 | TRAP1 | ADRW1 | PINW1 | PDCW1 | ADSW1 | AIXWØ | ABWW1 | ABLW1 | TRAP1 | TRAP1 | TRAP1 | TRAP1 | 0XX001 WORD |
| A2 | | | | | | | | | | | | | | CLR NEG |
| A3 | | | NNMW1 | NNMW1 | NNMW1 | NNMW1 | NNMW1 | NNMW1 | NNMW1 | | | | | NEGX NOT |
| A1 | NNRL1 | TRAP1 | ADRL1 | PINL1 | PDCL1 | ADSL1 | AIXLØ | ABWL1 | ABLL1 | TRAP1 | TRAP1 | TRAP1 | TRAP1 | 0XX010 LONG |
| A2 | | | | | | | | | | | | | | CLR NEG |
| A3 | | | NNML1 | NNML1 | NNML1 | NNML1 | NNML1 | NNML1 | NNML1 | | | | | NEGX NOT |
| A1 | STRW1 | TRAP1 | ADRW1 | PINW1 | PDCW1 | ADSW1 | AIXWØ | ABWW1 | ABLW1 | TRAP1 | TRAP1 | TRAP1 | TRAP1 | |
| A2 | | | | | | | | | | | | | | 000011 |
| A3 | | | STMW1 | STMW1 | STMW1 | STMW1 | STMW1 | STMW1 | STMW1 | | | | | MFST |
| A1 | TRAP1 | TRAP1 | TRAP1 | TRAP1 | TRAP1 | TRAP1 | TRAP1 | TRAP1 | TRAP1 | TRAP1 | TRAP1 | TRAP1 | TRAP1 | 001011 |
| A2 | | | | | | | | | | | | | | 11X000 |
| A3 | | | | | | | | | | | | | | 11000X |
| A1 | RSTW1 | TRAP1 | ADRW1 | PINW1 | PDCW1 | ADSW1 | AIXWØ | ABWW1 | ABLW1 | ADSW1 | AIXWØ | E#W1 | TRAP1 | |
| A2 | | | | | | | | | | | | RSTW1 | | 010011 |
| A3 | | | MSTW1 | MSTW1 | MSTW1 | MSTW1 | MSTW1 | MSTW1 | MSTW1 | MSTW1 | MSTW1 | | | MTCC |
| A1 | RSTW1 | TRAP1 | ADRW1 | PINW1 | PDCW1 | ADSW1 | AIXWØ | ABWW1 | ABLW1 | ADSW1 | AIXWØ | E#W1 | TRAP1 | |
| A2 | | | | | | | | | | | | RSTW1 | | 011011 |
| A3 | | | MSTW1 | MSTW1 | MSTW1 | MSTW1 | MSTW1 | MSTW1 | MSTW1 | MSTW1 | MSTW1 | | | MTST |
| A1 | NBCR1 | TRAP1 | ADRW1 | PINW1 | PDCW1 | APSW1 | AIXWØ | ABWW1 | ABLW1 | TRAP1 | TRAP1 | TRAP1 | TRAP1 | |
| A2 | | | | | | | | | | | | | | 100 000 BYTE |
| A3 | | | NBCM1 | NBCM1 | NBCM1 | NBCM1 | NBCM1 | NBCM1 | NBCM1 | | | | | NBCD |
| IR[5:0] | 000XXX | 001XXX | 010XXX | 011XXX | 100XXX | 101XXX | 110XXX | 111000 | 111001 | 111010 | 111011 | 111100 | 111101 11111X | |

MISCELLANEOUS LINE 0100 CLR NEG NEGX NOT MFST MTCC MTST NBCD

FIG.21G

MISCELLANEOUS LINE 0100

| | RYD | RYA | (RYA) | (RYA)+ | -(RYA) | (RYA) $+d_{16}$ | (RYA) +(X) $+d_8$ | ABSW | ABSL | (PC) $+d_{16}$ | (PC) +(X) $+d_8$ | # | UNUSED | IR[11:6] |
|---|---|---|---|---|---|---|---|---|---|---|---|---|---|---|
| A1<br>A2<br>A3 | SWAP1 | TRAP1 | PEAA1 | TRAP1 | TRAP1 | PEAD1 | PEAXØ | PAAW1 | PAAL1 | PEAD1 | PEAXØ | TRAP1 | TRAP1 | 100 001<br>SWAP PEA |
| A1<br>A2<br>A3 | NNRW1 | TRAP1 | STMR1 | TRAP1 | PUSH1 | STMD1 | STMX1 | SMAW1 | SMAL1 | TRAP1 | TRAP1 | TRAP1 | TRAP1 | 100 010<br>EXTW STM16 |
| A1<br>A2<br>A3 | EXTR1 | TRAP1 | STMR1 | TRAP1 | PUSH1 | STMD1 | STMX1 | SMAW1 | SMAL1 | TRAP1 | TRAP1 | TRAP1 | TRAP1 | 100 011<br>EXTL<br>STM32 |
| A1<br>A2<br>A3 | TSRW1 | TRAP1 | ADRW1<br>TSMW1 | PINW1<br>TSMW1 | PDCW1<br>TSMW1 | ADSW1<br>TSMW1 | AIXWØ<br>TSMW1 | ABWW1<br>TSMW1 | ABLW1<br>TSMW1 | TRAP1 | TRAP1 | TRAP1 | TRAP1 | 101 000 BYTE<br>TST |
| A1<br>A2<br>A3 | TSRW1 | TRAP1 | ADRW1<br>TSML1 | PINW1<br>TSML1 | PDCW1<br>TSML1 | ADSW1<br>TSML1 | AIXWØ<br>TSML1 | ABWW1<br>TSML1 | ABLW1<br>TSML1 | TRAP1 | TRAP1 | TRAP1 | TRAP1 | 101 001 WORD<br>TST |
| A1<br>A2<br>A3 | TSRL1 | TRAP1 | ADRL1<br>TSML1 | PINL1<br>TSML1 | PDCL1<br>TSML1 | ADSL1<br>TSML1 | AIXLØ<br>TSML1 | ABWL1<br>TSML1 | ABLL1<br>TSML1 | TRAP1 | TRAP1 | TRAP1 | TRAP1 | 101 010 LONG<br>TST |
| A1<br>A2<br>A3 | TASR1 | TRAP1 | ADRW1<br>TASM1 | PINW1<br>TASM1 | PDCW1<br>TASM1 | ADSW1<br>TASM1 | AIXWØ<br>TASM1 | ABWW1<br>TASM1 | ABLW1<br>TASM1 | TRAP1 | TRAP1 | TRAP1 | TRAP1 | 101 011<br>TAS |
| A1<br>A2<br>A3 | TRAP1 | TRAP1 | LDMP1 | POPM1 | TRAP1 | LDMD1 | LDMXØ | LMAW1 | LMAL1 | LDMD1 | LDMXØ | TRAP1 | TRAP1 | 110 01X<br>LDM16 LDM32 |
| IR[5:0] | 000XXX | 001XXX | 010XXX | 011XXX | 100XXX | 101XXX | 110XXX | 111000 | 111001 | 111010 | 111011 | 111100 | 111101<br>11111X | |

MISCELLANEOUS LINE 0100 SWAP, PEA, EXT, STM, TST, TAS, LDM

MISCELLANEOUS LINE 0100

| | RYD | RYA | (RYA) | (RYA)+ | -(RYA) | (RYA) $+d_{16}$ | (RYA) +(X) $+d_8$ | ABSW | ABSL | (PC) $+d_{16}$ | (PC) +(X) $+d_8$ | # | UNUSED | IR[11:6] |
|---|---|---|---|---|---|---|---|---|---|---|---|---|---|---|
| A1<br>A2<br>A3 | TRAP1 | TRAP1 | TRAP1 | TRAP1 | TRAP1 | TRAP1 | TRAP1 | TRAP1 | TRAP1 | TRAP1 | TRAP1 | TRAP1 | TRAP1 | XXX 100 |
| A1<br>A2<br>A3 | TRAP1 | TRAP1 | TRAP1 | TRAP1 | TRAP1 | TRAP1 | TRAP1 | TRAP1 | TRAP1 | TRAP1 | TRAP1 | TRAP1 | TRAP1 | XXX 101 |
| A1<br>A2<br>A3 | CHKR1 | TRAP1 | ADRW1<br>CHKM1 | PINW1<br>CHKM1 | PDCW1<br>CHKM1 | ADSW1<br>CHKM1 | AIXWØ<br>CHKM1 | ABWW1<br>CHKM1 | ABLW1<br>CHKM1 | ADSW1<br>CHKM1 | AIXWØ<br>CHKM1 | E#W11<br>CHKR1 | TRAP1 | XXX 110<br>CHK |
| A1<br>A2<br>A3 | TRAP1 | TRAP1 | LEAA1 | TRAP1 | TRAP1 | LEAD1 | LEAXØ | LAAW1 | LAAL1 | LEAD1 | LEAXØ | TRAP1 | TRAP1 | XXX 111<br>LEA |
| A1<br>A2<br>A3 | TRAP1 | TRAP1 | JSRA1 | TRAP1 | TRAP1 | JSRD1 | JSRXØ | JSAWØ | JSAL1 | JSRD1 | JSRXØ | TRAP1 | TRAP1 | 111 010<br>JSR |
| A1<br>A2<br>A3 | TRAP1 | TRAP1 | JMPA1 | TRAP1 | TRAP1 | JMPD1 | JMPXØ | JMAW1 | JMAL1 | JMPD1 | JMPXØ | TRAP1 | TRAP1 | 111 011<br>JMP |
| A1<br>A2<br>A3 | TRAP1<br>(TRAP)<br>00XXXX | TRAP1<br>111XXX<br>110100 | LINK1 | UNLK1 | LUSP1 | SUSP1 | TRPV1<br>110110 | RSET1<br>110000 | B<br>(NOP)<br>110001 | STOP1<br>110010 | RTE<br>110011 | RTR<br>110111 | RTS<br>110101 | 111 001 RTS<br>TRAP LINKUNLK MUSP<br>TRPV RESET<br>NOP STOP RTE RTR |
| A1<br>A2<br>A3 | | | | | | | | | | | | | | |
| IR[5:0] | 000XXX | 001XXX | 010XXX | 011XXX | 100XXX | 101XXX | 110XXX | 111000 | 111001 | 111010 | 111011 | 111100 | 111101<br>11111X | |

MISCELLANEOUS LINE 0100 LINK, UNLK, CHK, LEA, JSR, JMP, RTS, TRAP, MUSP, TRPV, RESET, NOP, STOP, RTE, RTR

ADDQ LINE 0101 ADDQ, Scc, SUBQ

| IR[5:0] | RYD | RYA | (RYA) | (RYA)+ | -(RYA) | (RYA) $+d_{16}$ | (RYA) +(X) $+d_8$ | ABSW | ABSL | (PC) $+d_{16}$ | (PC) +(X) $+d_8$ | # | UNUSED | IR[11:9]=XXX IR[8:6] |
|---|---|---|---|---|---|---|---|---|---|---|---|---|---|---|
| A1 A2 A3 | RAQW1 | TRAP1 | ADRW1 / MAQW1 | PINW1 / MAQW1 | PDCW1 / MAQW1 | ADSW1 / MAQW1 | AIXWØ / MAQW1 | ABWW1 / MAQW1 | ABLW1 / MAQW1 | TRAP1 | TRAP1 | TRAP1 | TRAP1 | BYTE 000 (RXD)+(EA)→RXD |
| A1 A2 A3 | RAQW1 | RAQL1 | ADRW1 / MAQW1 | PINW1 / MAQW1 | PDCW1 / MAQW1 | ADSW1 / MAQW1 | AIXWØ / MAQW1 | ABWW1 / MAQW1 | ABLW1 / MAQW1 | TRAP1 | TRAP1 | TRAP1 | TRAP1 | WORD 001 (RXD)+(EA)→RXD |
| A1 A2 A3 | RAQL1 | RAQL1 | ADRL1 / MAQL1 | PINL1 / MAQL1 | PDCL1 / MAQL1 | ADSL1 / MAQL1 | AIXLØ / MAQL1 | ABWL1 / MAQL1 | ABLL1 / MAQL1 | TRAP1 | TRAP1 | TRAP1 | TRAP1 | LONG 010 (RXD)+(EA)→RXD |
| A1 A2 A3 | SCCR1 | TRAP1 | ADRW1 / SCCB1 | PINW1 / SCCB1 | PDCW1 / SCCB1 | ADSW1 / SCCB1 | AIXWØ / SCCB1 | ABWW1 / SCCB1 | ABLW1 / SCCB1 | TRAP1 | TRAP1 | TRAP1 | TRAP1 | BYTE 011 OP(EA)→EA |
| A1 A2 A3 | RAQW1 | TRAP1 | ADRW1 / MAQW1 | PINW1 / MAQW1 | PDCW1 / MAQW1 | ADSW1 / MAQW1 | AIXWØ / MAQW1 | ABWW1 / MAQW1 | ABLW1 / MAQW1 | TRAP1 | TRAP1 | TRAP1 | TRAP1 | BYTE 100 (EA)+(RXD)→EA |
| A1 A2 A3 | RAQW1 | RAQL1 | ADRW1 / MAQW1 | PINW1 / MAQW1 | PDCW1 / MAQW1 | ADSW1 / MAQW1 | AIXWØ / MAQW1 | ABWW1 / MAQW1 | ABLW1 / MAQW1 | TRAP1 | TRAP1 | TRAP1 | TRAP1 | WORD 101 (EA)+(RXD)→EA |
| A1 A2 A3 | RAQL1 | RAQL1 | ADRL1 / MAQL1 | ANL1 / MAQL1 | PDCL1 / MAQL1 | ADSL1 / MAQL1 | AIXLØ / MAQL1 | ABWL1 / MAQL1 | ABLL1 / MAQL1 | TRAP1 | TRAP1 | TRAP1 | TRAP1 | LONG 110 (EA)+(RXD)→EA |
| A1 A2 A3 | SCCR1 | TRAP1 | ADRW1 / SCCB1 | PINW1 / SCCB1 | PDCW1 / SCCB1 | ADSW1 / SCCB1 | AIXWØ / SCCB1 | ABWW1 / SCCB1 | ABLW1 / SCCB1 | TRAP1 | TRAP1 | TRAP1 | TRAP1 | BYTE 111 OP(EA)→EA |
| IR[5:0] | 000XXX | 001XXX | 010XXX | 011XXX | 100XXX | 101XXX | 110XXX | 111000 | 111001 | 111010 | 111011 | 111100 | 111101 11111X | |

ADDQ LINE 0101 ADDQ, Scc, SUBQ

FIG. 2IJ

Bcc LINE 0110 Bcc, BRA, BSR

| | RYD | RYA | (RYA) | (RYA)+ | -(RYA) | (RYA) $+d_{16}$ | (RYA) +(X) $+d_8$ | ABSW | ABSL | (PC) $+d_{16}$ | (PC) +(X) $+d_8$ | # | UNUSED | IR[11:6] |
|---|---|---|---|---|---|---|---|---|---|---|---|---|---|---|
| A1 A2 A3 | BBCW1 | BBCI1 | BBCI1 | BBCI1 | BBCI1 | BBCI1 | BBCI1 | BBCI1 | BBCI1 | BBCI1 | BBCI1 | BBCI1 | BBCI1 | XXX000 1XXX00 X1XX00 XX1X00 |
| A1 A2 A3 | BBCI1 | BBCI1 | BBCI1 | BBCI1 | BBCI1 | BBCI1 | BBCI1 | BBCI1 | BBCI1 | BBCI1 | BBCI1 | BBCI1 | BBCI1 | XXX01X XXX0X1 |
| A1 A2 A3 | BSRW1 | BSRI1 | BSRI1 | BSRI1 | BSRI1 | BSRI1 | BSRI1 | BSRI1 | BSRI1 | BSRI1 | BSRI1 | BSRI1 | BSRI1 | 000100 |
| A1 A2 A3 | BSRI1 | BSRI1 | BSRI1 | BSRI1 | BSRI1 | BSRI1 | BSRI1 | BSRI1 | BSRI1 | BSRI1 | BSRI1 | BSRI1 | BSRI1 | 00011X 0001X1 |
| A1 A2 A3 | | | | | | | | | | | | | | |
| A1 A2 A3 | | | | | | | | | | | | | | |
| A1 A2 A3 | | | | | | | | | | | | | | |
| A1 A2 A3 | | | | | | | | | | | | | | |
| IR[5:0] | 000000 | 001XXX 0001XX 000X1X 111XX1 | 010XXX | 011XXX | 100XXX | 101XXX | 110XXX | 111000 | 111001 | 111010 | 111011 | 111100 | 111101 11111X | |

Bcc LINE 0110 Bcc, BRA, BSR

LDQ LINE 0111 LDQ & DCNT

| | RYD | RYA | (RYA) | (RYA)+ | -(RYA) | (RYA) +$d_{16}$ | (RYA) +(X) +$d_8$ | ABSW | ABSL | (PC) +$d_{16}$ | (PC) +(X) +$d_8$ | # | UNUSED | IR[11:6] |
|---|---|---|---|---|---|---|---|---|---|---|---|---|---|---|
| A1 A2 A3 | RLQL1 | RLQL1 | RLQL1 | RLQL1 | RLQL1 | RLQL1 | RLQL1 | RLQL1 | RLQL1 | RLQL1 | RLQL1 | RLQL1 | RLQL1 | XXX0XX |
| A1 A2 A3 | DCNT1 | DCNT1 | DCNT1 | DCNT1 | DCNT1 | DCNT1 | DCNT1 | DCNT1 | DCNT1 | DCNT1 | DCNT1 | DCNT1 | DCNT1 | XXX1XX |
| A1 A2 A3 | | | | | | | | | | | | | | |
| A1 A2 A3 | | | | | | | | | | | | | | |
| A1 A2 A3 | | | | | | | | | | | | | | |
| A1 A2 A3 | | | | | | | | | | | | | | |
| A1 A2 A3 | | | | | | | | | | | | | | |
| A1 A2 A3 | | | | | | | | | | | | | | |
| IR[5:0] | 000XXX | 001XXX | 010XXX | 011XXX | 100XXX | 101XXX | 110XXX | 111000 | 111001 | 111010 | 111011 | 111100 | 111101 11111X | |

LDQ LINE 0111 LDQ & DCNT

OR LINE 1000 OR, DIVU, DIVS, SBCD

| | RYD | RYA | (RYA) | (RYA)+ | -(RYA) | (RYA) $+d_{16}$ | (RYA) +(X) $+d_8$ | ABSW | ABSL | (PC) $+d_{16}$ | (PC) +(X) $+d_8$ | # | UNUSED | IR[11:9]=XXX IR[8:6] |
|---|---|---|---|---|---|---|---|---|---|---|---|---|---|---|
| A1 | RORW1 | TRAP1 | ADRW1 | PINW1 | PDCW1 | ADSW1 | AIXWØ | ABWW1 | ABLW1 | ADSW1 | AIXWØ | E#W1 | TRAP1 | BYTE |
| A2 | | | | | | | | | | | | RORW1 | | 000 |
| A3 | | | ROMW1 | ROMW1 | ROMW1 | ROMW1 | ROMW1 | ROMW1 | ROMW1 | ROMW1 | ROMW1 | | | (RXD)+(EA) → RXD |
| A1 | RORW1 | TRAP1 | ADRW1 | PINW1 | PDCW1 | ADSW1 | AIXWØ | ABWW1 | ABLW1 | ADSW1 | AIXWØ | E#W1 | TRAP1 | WORD |
| A2 | | | | | | | | | | | | RORW1 | | 001 |
| A3 | | | ROMW1 | ROMW1 | ROMW1 | ROMW1 | ROMW1 | ROMW1 | ROMW1 | ROMW1 | ROMW1 | | | (RXD)+(EA) → RXD |
| A1 | RORL1 | TRAP1 | ADRL1 | PINL1 | PDCL1 | ADSL1 | AIXLØ | ABWL1 | ABLL1 | ADSL1 | AIXLØ | E#L1 | TRAP1 | LONG |
| A2 | | | | | | | | | | | | RORL1 | | 010 |
| A3 | | | ROML1 | ROML1 | ROML1 | ROML1 | ROML1 | ROML1 | ROML1 | ROML1 | ROML1 | | | (RXD)+(EA) → RXD |
| A1 | DVUR1 | TRAP1 | ADRW1 | PINW1 | PDCW1 | ADSW1 | AIXWØ | ABWW1 | ABLW1 | ADSW1 | AIXWØ | E#W1 | TRAP1 | |
| A2 | | | | | | | | | | | | DVUR1 | | 011 |
| A3 | | | DVUM1 | DVUM1 | DVUM1 | DVUM1 | DVUM1 | DVUM1 | DVUM1 | DVUM1 | DVUM1 | | | |
| A1 | RBRB1 | ASBB1 | ADRW1 | PINW1 | PDCW1 | ADSW1 | AIXWØ | ABWW1 | ABLW1 | TRAP1 | TRAP1 | TRAP1 | TRAP1 | BYTE |
| A2 | | | | | | | | | | | | | | 100 |
| A3 | | | MORW1 | MORW1 | MORW1 | MORW1 | MORW1 | MORW1 | MORW1 | | | | | (EA)+(RXD) → EA |
| A1 | TRAP1 | TRAP1 | ADRW1 | PINW1 | PDCW1 | ADSW1 | AIXWØ | ABWW1 | ABLW1 | TRAP1 | TRAP1 | TRAP1 | TRAP1 | WORD |
| A2 | | | | | | | | | | | | | | 101 |
| A3 | | | MORW1 | MORW1 | MORW1 | MORW1 | MORW1 | MORW1 | MORW1 | | | | | (EA)+(RXD) → EA |
| A1 | TRAP1 | TRAP1 | ADRL1 | PINL1 | PDCL1 | ADSL1 | AIXLØ | ABWL1 | ABLL1 | TRAP1 | TRAP1 | TRAP1 | TRAP1 | LONG |
| A2 | | | | | | | | | | | | | | 110 |
| A3 | | | MORL1 | MORL1 | MORL1 | MORL1 | MORL1 | MORL1 | MORL1 | | | | | (EA)+(RXD) → EA |
| A1 | DVSØ2 | TRAP1 | ADRW1 | PINW1 | PDCW1 | ADSW1 | AIXWØ | ABWW1 | ABLW1 | ADSW1 | AIXWØ | E#W1 | TRAP1 | |
| A2 | | | | | | | | | | | | DVSØ2 | | 111 |
| A3 | | | DVSØ1 | DVSØ1 | DVSØ1 | DVSØ1 | DVSØ1 | DVSØ1 | DVSØ1 | DVSØ1 | DVSØ1 | | | |
| IR[5:0] | 000XXX | 001XXX | 010XXX | 011XXX | 100XXX | 101XXX | 110XXX | 111000 | 111001 | 111010 | 111011 | 111100 | 111101 11111X | |

OR LINE 1000 OR, DIVU, DIVS, SBCD

FIG. 21 M

SUB LINE 1001 SUB & SUBX

| | RYD | RYA | (RYA) | (RYA)+ | -(RYA) | (RYA) +$d_{16}$ | (RYA) +(X) +$d_8$ | ABSW | ABSL | (PC) +$d_{16}$ | (PC) +(X) +$d_8$ | # | UNUSED | IR[11:9]=XXX IR[8:6] |
|---|---|---|---|---|---|---|---|---|---|---|---|---|---|---|
| A1 A2 A3 | RORW1 | TRAP1 | ADRW1<br>ROMW1 | PINW1<br>ROMW1 | PDCW1<br>ROMW1 | ADSW1<br>ROMW1 | AIXWØ<br>ROMW1 | ABWW1<br>ROMW1 | ABLW1<br>ROMW1 | ADSW1<br>ROMW1 | AIXWØ<br>ROMW1 | E#W1<br>RORW1 | TRAP1 | BYTE<br>000<br>(RXD)+(EA)→RXD |
| A1 A2 A3 | RORW1 | RORW1 | ADRW1<br>ROMW1 | PINW1<br>ROMW1 | PDCW1<br>ROMW1 | ADSW1<br>ROMW1 | AIXWØ<br>ROMW1 | ABWW1<br>ROMW1 | ABLW1<br>ROMW1 | ADSW1<br>ROMW1 | AIXWØ<br>ROMW1 | E#W1<br>RORW1 | TRAP1 | WORD<br>001<br>(RXD)+(EA)→RXD |
| A1 A2 A3 | RORL1 | RORL1 | ADRL1<br>ROML1 | PINL1<br>ROML1 | PDCL1<br>ROML1 | ADSL1<br>ROML1 | AIXLØ<br>ROML1 | ABWL1<br>ROML1 | ABLL1<br>ROML1 | ADSL1<br>ROML1 | AIXLØ<br>ROML1 | E#L1<br>RORL1 | TRAP1 | LONG<br>010<br>(RXD)+(EA)→RXD |
| A1 A2 A3 | RORM1 | RORM1 | ADRW1<br>ROMM1 | PINW1<br>ROMM1 | PDCW1<br>ROMM1 | ADSW1<br>ROMM1 | AIXWØ<br>ROMM1 | ABWW1<br>ROMM1 | ABLW1<br>ROMM1 | ADSW1<br>ROMM1 | AIXWØ<br>ROMM1 | E#W1<br>RORM1 | TRAP1 | WORD<br>011<br>(RXA)+(EA)→RXA |
| A1 A2 A3 | RORW1 | ASXW1 | ADRW1<br>MORW1 | PINW1<br>MORW1 | PDCW1<br>MORW1 | ADSW1<br>MORW1 | AIXWØ<br>MORW1 | ABWW1<br>MORW1 | ABLW1<br>MORW1 | TRAP1 | TRAP1 | TRAP1 | TRAP1 | BYTE<br>100<br>(EA)+(RXD)→EA |
| A1 A2 A3 | RORW1 | ASXW1 | ADRW1<br>MORW1 | PINW1<br>MORW1 | PDCW1<br>MORW1 | ADSW1<br>MORW1 | AIXWØ<br>MORW1 | ABWW1<br>MORW1 | ABLW1<br>MORW1 | TRAP1 | TRAP1 | TRAP1 | TRAP1 | WORD<br>101<br>(EA)+(RXD)→EA |
| A1 A2 A3 | RORL1 | ASXL1 | ADRL1<br>MORL1 | PINL1<br>MORL1 | PDCL1<br>MORL1 | ADSL1<br>MORL1 | AIXLØ<br>MORL1 | ABWL1<br>MORL1 | ABLL1<br>MORL1 | TRAP1 | TRAP1 | TRAP1 | TRAP1 | LONG<br>110<br>(EA)+(RXD)→EA |
| A1 A2 A3 | RORL1 | RORL1 | ADRL1<br>ROML1 | PINL1<br>ROML1 | PDCL1<br>ROML1 | ADSL1<br>ROML1 | AIXLØ<br>ROML1 | ABWL1<br>ROML1 | ABLL1<br>ROML1 | ADSL1<br>ROML1 | AIXLØ<br>ROML1 | E#L1<br>RORL1 | TRAP1 | LONG<br>111<br>(RXA)+(EA)→RXA |
| IR[5:0] | 000XXX | 001XXX | 010XXX | 011XXX | 100XXX | 101XXX | 110XXX | 111000 | 111001 | 111010 | 111011 | 111100 | 111101<br>11111X | |

SUB LINE 1001 SUB & SUBX

FIG. 2IN

RESERVED LINE 1010

| IR[5:0] \ IR[11:6] | RYD | RYA | (RYA) | (RYA)+ | -(RYA) | (RYA) +$d_{16}$ | (RYA) +(X) +$d_8$ | ABSW | ABSL | (PC) +$d_{16}$ | (PC) +(X) +$d_8$ | # | UNUSED |
|---|---|---|---|---|---|---|---|---|---|---|---|---|---|
| | 000XXX | 001XXX | 010XXX | 011XXX | 100XXX | 101XXX | 110XXX | 111000 | 111001 | 111010 | 111011 | 111100 | 111101<br>11111X |
| A1 A2 A3 | TRAP1 | TRAP1 | TRAP1 | TRAP1 | TRAP1 | TRAP1 | TRAP1 | TRAP1 | TRAP1 | TRAP1 | TRAP1 | TRAP1 | TRAP1 |
| A1 A2 A3 | | | | | | | | | | | | | |
| A1 A2 A3 | | | | | | | | | | | | | |
| A1 A2 A3 | | | | | | | | | | | | | |
| A1 A2 A3 | | | | | | | | | | | | | |
| A1 A2 A3 | | | | | | | | | | | | | |
| A1 A2 A3 | | | | | | | | | | | | | |
| A1 A2 A3 | | | | | | | | | | | | | |

RESERVED LINE 1010

FIG. 21P

CMP LINE 1011 CMP, EOR, CMPM, CMPA

| IR[11:9]=XXX IR[8:6] | | RYD | RYA | (RYA) | (RYA)+ | -(RYA) | (RYA) $+d_{16}$ | (RYA) +(X) $+d_8$ | ABSW | ABSL | (PC) $+d_{16}$ | (PC) +(X) $+d_8$ | # | UNUSED |
|---|---|---|---|---|---|---|---|---|---|---|---|---|---|---|
| BYTE<br>000<br>(RXD)+(EA)→RXD | A1<br>A2<br>A3 | CPRW1 | TRAP1 | ADRW1<br>CPMW1 | PINW1<br>CPMW1 | PDCW1<br>CPMW1 | ADSW1<br>CPMW1 | AIXWØ<br>CPMW1 | ABWW1<br>CPMW1 | ABLW1<br>CPMW1 | ADSW1<br>CPMW1 | AIXWØ<br>CPMW1 | E#W1<br>CPRW1 | TRAP1 |
| WORD<br>001<br>(RXD)+(EA)→RXD | A1<br>A2<br>A3 | CPRW1 | CPRW1 | ADRW1<br>CPMW1 | PINW1<br>CPMW1 | PDCW1<br>CPMW1 | ADSW1<br>CPMW1 | AIXWØ<br>CPMW1 | ABWW1<br>CPMW1 | ABLW1<br>CPMW1 | ADSW1<br>CPMW1 | AIXWØ<br>CPMW1 | E#W1<br>CPRW1 | TRAP1 |
| LONG<br>010<br>(RXD)+(EA)→RXD | A1<br>A2<br>A3 | CPRL1 | CPRL1 | ADRL1<br>CPML1 | PINL1<br>CPML1 | PDCL1<br>CPML1 | ADSL1<br>CPML1 | AIXLØ<br>CPML1 | ABWL1<br>CPML1 | ABLL1<br>CPML1 | ADSL1<br>CPML1 | AIXLØ<br>CPML1 | E#L1<br>CPRL1 | TRAP1 |
| WORD<br>011<br>(RXA)+(EA)→RXA | A1<br>A2<br>A3 | CPRM1 | CPRM1 | ADRW1<br>CPMM1 | PINW1<br>CPMM1 | PDCW1<br>CPMM1 | ADSW1<br>CPMM1 | AIXWØ<br>CPMM1 | ABWW1<br>CPMM1 | ABLW1<br>CPMM1 | ADSW1<br>CPMM1 | AIXWØ<br>CPMM1 | E#W1<br>CPRM1 | TRAP1 |
| BYTE<br>100<br>(EA)+(RXD)→EA | A1<br>A2<br>A3 | ROAW1 | CMMW1 | ADRW1<br>MORW1 | PINW1<br>MORW1 | PDCW1<br>MORW1 | ADSW1<br>MORW1 | AIXWØ<br>MORW1 | ABWW1<br>MORW1 | ABLW1<br>MORW1 | TRAP1 | TRAP1 | TRAP1 | TRAP1 |
| WORD<br>101<br>(EA)+(RXD)→EA | A1<br>A2<br>A3 | ROAW1 | CMMW1 | ADRW1<br>MORW1 | PINW1<br>MORW1 | PDCW1<br>MORW1 | ADSW1<br>MORW1 | AIXWØ<br>MORW1 | ABWW1<br>MORW1 | ABLW1<br>MORW1 | TRAP1 | TRAP1 | TRAP1 | TRAP1 |
| LONG<br>110<br>(EA)+(RXD)→EA | A1<br>A2<br>A3 | ROAL1 | CMML1 | ADRL1<br>MORL1 | PINL1<br>MORL1 | PDCL1<br>MORL1 | ADSL1<br>MORL1 | AIXLØ<br>MORL1 | ABWL1<br>MORL1 | ABLL1<br>MORL1 | TRAP1 | TRAP1 | TRAP1 | TRAP1 |
| LONG<br>111<br>(RXA)+(EA)→RXA | A1<br>A2<br>A3 | CPRL1 | CPRL1 | ADRL1<br>CPML1 | PINL1<br>CPML1 | PDCL1<br>CPML1 | ADSL1<br>CPML1 | AIXLØ<br>CPML1 | ABWL1<br>CPML1 | ABLL1<br>CPML1 | ADSL1<br>CPML1 | AIXLØ<br>CPML1 | E#L1<br>CPRL1 | TRAP1 |
| IR[5:0] | | 000XXX | 001XXX | 010XXX | 011XXX | 100XXX | 101XXX | 110XXX | 111000 | 111001 | 111010 | 111011 | 111100 | 111101<br>11111X |

CMP LINE 1011 CMP, EOR, CMPM, CMPA

FIG. 21Q

ADD LINE 1100 AND, MULU, ABCD, EXGD, EXGM, EXGA, MULS

| | RYD | RYA | (RYA) | (RYA)+ | -(RYA) | (RYA) $+d_{16}$ | (RYA) +(X) $+d_8$ | ABSW | ABSL | (PC) $+d_{16}$ | (PC) +(X) $+d_8$ | # | UNUSED | IR[11:9]=XXX IR[8:6] |
|---|---|---|---|---|---|---|---|---|---|---|---|---|---|---|
| A1<br>A2<br>A3 | RORW1 | TRAP1 | ADRW1<br><br>ROMW1 | PINW1<br><br>ROMW1 | PDCW1<br><br>ROMW1 | ADSW1<br><br>ROMW1 | AIXWØ<br><br>ROMW1 | ABWW1<br><br>ROMW1 | ABLW1<br><br>ROMW1 | ADSW1<br><br>ROMW1 | AIXWØ<br><br>ROMW1 | E#W1<br>RORW1 | TRAP1 | BYTE<br>000<br>(RXD)+(EA)→RXD |
| A1<br>A2<br>A3 | RORW1 | TRAP1 | ADRW1<br><br>ROMW1 | PINW1<br><br>ROMW1 | PDCW1<br><br>ROMW1 | ADSW1<br><br>ROMW1 | AIXWØ<br><br>ROMW1 | ABWW1<br><br>ROMW1 | ABLW1<br><br>ROMW1 | ADSW1<br><br>ROMW1 | AIXWØ<br><br>ROMW1 | E#W1<br>RORW1 | TRAP1 | WORD<br>001<br>(RXD)+(EA)→RXD |
| A1<br>A2<br>A3 | RORL1 | TRAP1 | ADRL1<br><br>ROML1 | PINL1<br><br>ROML1 | PDCL1<br><br>ROML1 | ADSL1<br><br>ROML1 | AIXLØ<br><br>ROML1 | ABWL1<br><br>ROML1 | ABLL1<br><br>ROML1 | ADSL1<br><br>ROML1 | AIXLØ<br><br>ROML1 | E#L1<br>RORL1 | TRAP1 | LONG<br>010<br>(RXD)+(EA)→RXD |
| A1<br>A2<br>A3 | MULR1 | TRAP1 | ADRW1<br><br>MULM1 | PINW1<br><br>MULM1 | PDCW1<br><br>MULM1 | ADSW1<br><br>MULM1 | AIXWØ<br><br>MULM1 | ABWW1<br><br>MULM1 | ABLW1<br><br>MULM1 | ADSW1<br><br>MULM1 | AIXWØ<br><br>MULM1 | E#W1<br>MULR1 | TRAP1 | 011 |
| A1<br>A2<br>A3 | RBRB1 | ASBB1 | ADRW1<br><br>MORW1 | PINW1<br><br>MORW1 | PDCW1<br><br>MORW1 | ADSW1<br><br>MORW1 | AIXWØ<br><br>MORW1 | ABWW1<br><br>MORW1 | ABLW1<br><br>MORW1 | TRAP1 | TRAP1 | TRAP1 | TRAP1 | BYTE<br>100<br>(EA)+(RXD)→EA |
| A1<br>A2<br>A3 | EXGE1 | EXGE1 | ADRW1<br><br>MORW1 | PINW1<br><br>MORW1 | PDCW1<br><br>MORW1 | ADSW1<br><br>MORW1 | AIXWØ<br><br>MORW1 | ABWW1<br><br>MORW1 | ABLW1<br><br>MORW1 | TRAP1 | TRAP1 | TRAP1 | TRAP1 | WORD<br>101<br>(EA)+(RXD)→EA |
| A1<br>A2<br>A3 | TRAP1 | EXGE1 | ADRL1<br><br>MORL1 | PINL1<br><br>MORL1 | PDCL1<br><br>MORL1 | ADSL1<br><br>MORL1 | AIXLØ<br><br>MORL1 | ABWL1<br><br>MORL1 | ABLL1<br><br>MORL1 | TRAP1 | TRAP1 | TRAP1 | TRAP1 | LONG<br>110<br>(EA)+(RXD)→EA |
| A1<br>A2<br>A3 | MULR1 | TRAP1 | ADRW1<br><br>MULM1 | PINW1<br><br>MULM1 | PDCW1<br><br>MULM1 | ADSW1<br><br>MULM1 | AIXWØ<br><br>MULM1 | ABWW1<br><br>MULM1 | ABLW1<br><br>MULM1 | ADSW1<br><br>MULM1 | AIXWØ<br><br>MULM1 | E#W1<br>MULR1 | TRAP1 | 111 |
| IR[5:0] | 000XXX | 001XXX | 010XXX | 011XXX | 100XXX | 101XXX | 110XXX | 111000 | 111001 | 111010 | 111011 | 111100 | 111101<br>11111X | |

AND LINE 1100 AND, MULU, ABCD, EXGD, EXGM, EXGA, MULS

FIG. 21R

ADD LINE 1101 ADD & ADDX

| | RYD | RYA | (RYA) | (RYA)+ | -(RYA) | (RYA) +$d_{16}$ | (RYA) +(X) +$d_8$ | ABSW | ABSL | (PC) +$d_{16}$ | (PC) +(X) +$d_8$ | # | UNUSED | IR[11:9]=XXX IR[8:6] |
|---|---|---|---|---|---|---|---|---|---|---|---|---|---|---|
| A1 | RORW1 | TRAP1 | ADRW1 | PINW1 | PDCW1 | ADSW1 | AIXWØ | ABWW1 | ABLW1 | ADSW1 | AIXWØ | E#W1 | TRAP1 | BYTE |
| A2 | | | | | | | | | | | | RORW1 | | 000 |
| A3 | | | ROMW1 | ROMW1 | ROMW1 | ROMW1 | ROMW1 | ROMW1 | ROMW1 | ROMW1 | ROMW1 | | | (RXD)+(EA)→RXD |
| A1 | RORW1 | RORW1 | ADRW1 | PINW1 | PDCW1 | ADSW1 | AIXWØ | ABWW1 | ABLW1 | ADSW1 | AIXWØ | E#W1 | TRAP1 | WORD |
| A2 | | | | | | | | | | | | RORW1 | | 001 |
| A3 | | | ROMW1 | ROMW1 | ROMW1 | ROMW1 | ROMW1 | ROMW1 | ROMW1 | ROMW1 | ROMW1 | | | (RXD)+(EA)→RXD |
| A1 | RORL1 | RORL1 | ADRL1 | PINL1 | PDCL1 | ADSL1 | AIXLØ | ABWL1 | ABLL1 | ADSL1 | AIXLØ | E#L1 | TRAP1 | LONG |
| A2 | | | | | | | | | | | | RORL1 | | 010 |
| A3 | | | ROML1 | ROML1 | ROML1 | ROML1 | ROML1 | ROML1 | ROML1 | ROML1 | ROML1 | | | (RXD)+(EA)→RXD |
| A1 | RORM1 | RORM1 | ADRW1 | PINW1 | PDCW1 | ADSW1 | AIXWØ | ABWW1 | ABLW1 | ADSW1 | AIXWØ | E#W1 | TRAP1 | WORD |
| A2 | | | | | | | | | | | | RORM1 | | 011 |
| A3 | | | ROMM1 | ROMM1 | ROMM1 | ROMM1 | ROMM1 | ROMM1 | ROMM1 | ROMM1 | ROMM1 | | | (RXA)+(EA)→RXA |
| A1 | RORW1 | ASXW1 | ADRW1 | PINW1 | PDCW1 | ADSW1 | AIXWØ | ABWW1 | ABLW1 | TRAP1 | TRAP1 | TRAP1 | TRAP1 | BYTE |
| A2 | | | | | | | | | | | | | | 100 |
| A3 | | | MORW1 | MORW1 | MORW1 | MORW1 | MORW1 | MORW1 | MORW1 | | | | | (EA)+(RXD)→EA |
| A1 | RORW1 | ASXW1 | ADRW1 | PINW1 | PDCW1 | ADSW1 | AIXWØ | ABWW1 | ABLW1 | TRAP1 | TRAP1 | TRAP1 | TRAP1 | WORD |
| A2 | | | | | | | | | | | | | | 101 |
| A3 | | | MORW1 | MORW1 | MORW1 | MORW1 | MORW1 | MORW1 | MORW1 | | | | | (EA)+(RXD)→EA |
| A1 | RORL1 | ASXL1 | ADRL1 | PINL1 | PDCL1 | ADSL1 | AIXLØ | ABWL1 | ABLL1 | TRAP1 | TRAP1 | TRAP1 | TRAP1 | LONG |
| A2 | | | | | | | | | | | | | | 110 |
| A3 | | | MORL1 | MORL1 | MORL1 | MORL1 | MORL1 | MORL1 | MORL1 | | | | | (EA)+(RXD)→EA |
| A1 | RORL1 | RORL1 | ADRL1 | PINL1 | PDCL1 | ADSL1 | AIXLØ | ABWL1 | ABLL1 | ADSL1 | AIXLØ | E#L1 | TRAP1 | LONG |
| A2 | | | | | | | | | | | | RORL1 | | 111 |
| A3 | | | ROML1 | ROML1 | ROML1 | ROML1 | ROML1 | ROML1 | ROML1 | ROML1 | ROML1 | | | (RXA)+(EA)→RXA |
| IR[5:0] | 000XXX | 001XXX | 010XXX | 011XXX | 100XXX | 101XXX | 110XXX | 111000 | 111001 | 111010 | 111011 | 111100 | 111101 11111X | |

ADD LINE 1101 ADD & ADDX

FIG. 21S

SHIFT LINE 1110 ASL, ASR, LSL, LSR, ROL, ROR, ROXL, ROXR, REGISTER & MEMORY SHIFTS.

| | RYD | RYA | (RYA) | (RYA)+ | -(RYA) | (RYA) $+d_{16}$ | (RYA) +(X) $+d_8$ | ABSW | ABSL | (PC) $+d_{16}$ | (PC) +(X) $+d_8$ | # | UNUSED | IR[11:6] |
|---|---|---|---|---|---|---|---|---|---|---|---|---|---|---|
| A1 | TRAP1 | TRAP1 | ADRW1 | PINW1 | PDCW1 | ADSW1 | AIXWØ | ABWW1 | ABLW1 | TRAP1 | TRAP1 | TRAP1 | TRAP1 | 0XXX11 WORD MEMORY SHIFTS |
| A2 | | | | | | | | | | | | | | |
| A3 | | | SFTM1 | SFTM1 | SFTM1 | SFTM1 | SFTM1 | SFTM1 | SFTM1 | | | | | |
| A1 | SRIW1 | SRIW1 | SRIW1 | SRIW1 | SRRW1 | SRRW1 | SRRW1 | SRRW1 | SRRW1 | SRRW1 | SRRW1 | SRRW1 | SRRW1 | XXXX00 BYTE REGISTER-SHIFTS |
| A2 | | | | | | | | | | | | | | |
| A3 | | | | | | | | | | | | | | |
| A1 | SRIW1 | SRIW1 | SRIW1 | SRIW1 | SRRW1 | SRRW1 | SRRW1 | SRRW1 | SRRW1 | SRRW1 | SRRW1 | SRRW1 | SRRW1 | XXXX01 WORD REGISTER-SHIFTS |
| A2 | | | | | | | | | | | | | | |
| A3 | | | | | | | | | | | | | | |
| A1 | SRIL1 | SRIL1 | SRIL1 | SRIL1 | SRRL1 | SRRL1 | SRRL1 | SRRL1 | SRRL1 | SRRL1 | SRRL1 | SRRL1 | SRRL1 | XXXX10 LONG REGISTER-SHIFTS |
| A2 | | | | | | | | | | | | | | |
| A3 | | | | | | | | | | | | | | |
| A1 | TRAP1 | TRAP1 | TRAP1 | TRAP1 | TRAP1 | TRAP1 | TRAP1 | TRAP1 | TRAP1 | TRAP1 | TRAP1 | TRAP1 | TRAP1 | 1XXX11 |
| A2 | | | | | | | | | | | | | | |
| A3 | | | | | | | | | | | | | | |
| A1 | | | | | | | | | | | | | | |
| A2 | | | | | | | | | | | | | | |
| A3 | | | | | | | | | | | | | | |
| A1 | | | | | | | | | | | | | | |
| A2 | | | | | | | | | | | | | | |
| A3 | | | | | | | | | | | | | | |
| A1 | | | | | | | | | | | | | | |
| A2 | | | | | | | | | | | | | | |
| A3 | | | | | | | | | | | | | | |
| IR[5:0] | 000XXX | 001XXX | 010XXX | 011XXX | 100XXX | 101XXX | 110XXX | 111000 | 111001 | 111010 | 111011 | 111100 | 111101 11111X | |

SHIFT LINE 1110 ASx, LSx, ROx, ROXx

FIG. 21T

RESERVED LINE 1111

| IR[11:6] | RYD | RYA | (RYA) | (RYA)+ | -(RYA) | (RYA) $+d_{16}$ | (RYA) +(X) $+d_8$ | ABSW | ABSL | (PC) $+d_{16}$ | (PC) +(X) $+d_8$ | # | UNUSED |
|---|---|---|---|---|---|---|---|---|---|---|---|---|---|
| XXXXXX A1 A2 A3 | TRAP1 | TRAP1 | TRAP1 | TRAP1 | TRAP1 | TRAP1 | TRAP1 | TRAP1 | TRAP1 | TRAP1 | TRAP1 | TRAP1 | TRAP1 |
| A1 A2 A3 | | | | | | | | | | | | | |
| A1 A2 A3 | | | | | | | | | | | | | |
| A1 A2 A3 | | | | | | | | | | | | | |
| A1 A2 A3 | | | | | | | | | | | | | |
| A1 A2 A3 | | | | | | | | | | | | | |
| A1 A2 A3 | | | | | | | | | | | | | |
| A1 A2 A3 | | | | | | | | | | | | | |
| IR[5:0] | 000XXX | 001XXX | 010XXX | 011XXX | 100XXX | 101XXX | 110XXX | 111000 | 111001 | 111010 | 111011 | 111100 | 111101 11111X |

RESERVED LINE 1111

FIG. 2IU

TWO-LEVEL CONTROL STORE FOR MICROPROGRAMMED DATA PROCESSOR

CROSS-REFERENCE TO RELATED APPLICATIONS

The present application is a continuation-in-part of prior copending application "Microprogrammed Control Apparatus Having A Two-Level Control Store For Data Processor", invented by the inventors of the present invention, bearing Ser. No. 961,796, filed Nov. 17, 1978, and assigned to the assignee of the present invention.

TABLE OF CONTENTS

| Subject | |
|---|---|
| Cross Reference to Related Applications | |
| Technical Field | |
| Background Art | |
| Brief Summary of the Invention | |
| Brief Description of the Drawings | |
| Detailed Description of a Preferred Embodiment | |
| Structural Overview of Preferred Embodiment | |
| Instruction Register Sequence Decoder | |
| Two-level Microprogrammed Control Unit | |
| Conditional Branch Logic | |
| ALU and Condition Code Control Unit | |
| List of Microwords | Appendix A |
| Abbreviations | Appendix B |
| Conditional Branch Choices | Appendix C |
| Abbreviations | Appendix D |
| Abbreviations | Appendix E |
| Instructions | Appendix F |
| Word Formats | Appendix G |
| Microword Sequences | Appendix H. |

Other related co-pending applications include:

1. "Execution Unit For Data Processor Using Segmented Bus Structure" invented by Gunter et al, bearing Ser. No. 961,798, filed Nov. 17, 1978, and assigned to the assignee of the present invention.
2. "Instruction Register Sequence Decoder For Microprogrammed Data Processor And Method" invented by Tredennick et al, bearing Ser. No. 041,202, filed concurrently herewith and assigned to the assignee of the present invention.
3. "Conditional Branch Unit For Microprogrammed Data Processor" invented by Tredennick et al, bearing Ser. No. 041,203, filed concurrently herewith and assigned to the assignee of the present invention.
4. "ALU And Condition Code Control Unit For Data Processor" invented by Gunter et al, bearing Ser. No. 041,201, filed concurrently herewith and assigned to the assignee of the present invention.

TECHNICAL FIELD

This invention relates generally to data processors and more particularly to a data processor having a microprogrammed control store for implementing macroinstructions received by the data processor.

BACKGROUND ART

The field of single-chip, large scale integration (LSI) microprocessors is advancing at an incredible rate. Progress in the underlying semiconductor technology, MOS, is driving the advance. Every two years, circuit densities are improving by a factor of two, circuit speeds are increasing by a factor of two, and at the same time speed-power products are decreasing by a factor of four. Finally, yield enhancement techniques are driving down production costs and hence product prices, thereby increasing demand and opening up new applications and markets.

One effect of this progress in semiconductor technology is advancement in LSI microprocessors. The latest generation, currently being introduced by several companies is an order of magnitude more powerful than the previous generation, the 8-bit microprocessors of three or four years ago. The new microprocessors have 16-bit data paths and arithmetic capability, and they directly address multiple-megabyte memories. In terms of functional capability and speed, they will outperform all but the high end models of current 16-bit minicomputers.

LSI microprocessor design is now at the stage where better implementation techniques are required in order to control complexity and meet tight design schedules. One technique for achieving these goals is to use microprogramming for controlling the processor. Most of the traditionally claimed benefits of microprogramming, for example, regularity (to decrease complexity), flexibility (to ease design changes), and reduced design costs, apply to the implementation problems for current LSI microprocessor design. Among the constraints which LSI technology imposes on processor implementation are circuit size, circuit speed, interconnection complexity, and package pin count.

There is a fairly constant limit on the size of LSI integrated circuit chips which can be economically produced. Although circuit densities tend to improve over time, the number of gates which can be put on a chip is limited at any given time. Thus a major constraint is to design a data processor which may be implemented within the fixed maximum number of gates.

Another constraint in the implementation of LSI data processors is circuit speed, which is limited primarily by the powder dissipation limits of the semiconductor package in which the LSI circuit is mounted. The large speed gap between emitter-coupled (ECL) and core memory associated with large computer systems is not applicable to microprocessor applications, where often the processor technology and the main memory technology are the same.

With regard to interconnection complexity, internal interconnections on an LSI circuit often require as much chip area as do the logic gates which they connect. Furthermore, LSI circuit layout considerations often restrict the ability to route a signal generated in one section of the chip to another section of the chip. In some instances, it is more practical to duplicate functions on various sections of the chip rather than to provide connection to a single centralized function. Another consideration with regard to LSI circuit technology is that regular structures, such as ROM arrays, can be packed much more tightly than random logic.

Semiconductor packaging technology is also a constraint in that it places limits on the number of pin connections which an LSI chip may have to interface to the outside world. The pin-out limitations can be overcome by time multiplexing pin use, but the resulting slowdown in circuit performance is usually not acceptable.

Finally, customer demand and intense competition among semiconductor manufacturers often dictate that LSI data processors be designed according to tight time schedules. A control structure which reduces the design time for LSI data processors will be greatly appreciated by those skilled in the art. Furthermore, LSI data processors are often designed initially to be enhanced with new instructions in future versions of the data processor. Alternatively, some LSI data processors may be designed with enough flexibility so as to allow particular users to specify a set of instructions adapted to their needs. It will be appreciated by those skilled in the art that a control structure which simplifies modifications of and additions to a basic instruction set for a data processor is a significant improvement over the prior art.

The size of a microprogram control store is related to the number of control words and the number of bits in each control word. Control words having a large number of bits can control actions in the data processor fairly directly. However, a reduction in the overall size of the control store allows for a reduction in the size of the semiconductor chip which implements the data processor. Savings in chip area result in lower semiconductor chip costs since a greater number of such semiconductor chips can be formed from a processed semiconductor wafer. Thus, a data processor adapted to utilize a control store which need not duplicate unique control words containing a large number of bits is likely to reduce the overall size of the control store and lower chip costs.

BRIEF SUMMARY OF THE INVENTION

It is an object of the present invention to reduce the time required to design an LSI data processor.

It is also an object of the present invention to reduce the circuit complexity and simplify the layout of an LSI data processor.

It is a further object of the present invention to provide an LSI data processor which provides an instruction set which may be easily modified or expanded.

It is also an object of the present invention to provide a microprogrammed data processor adapted to execute a wide variety of macroinstructions while minimizing the size of the microprogram control store.

These and other objects of the present invention are accomplished by providing a data processor having an execution unit and which includes a control means having a first and a second control store. The control means has an input for receiving a control store address. In response to the received control store address, the first control store provides sequencing information at a first output for selecting the next control store address. Also in response to the received control store address, the second control store supplies control information at a second output for controlling the execution unit. The data processor also includes means for receiving a macroinstruction and selection means responsive to the macroinstruction and to the sequencing information for generating the control store address. In the preferred embodiment, the control store address is received by both the input of the first control store and the input of the second control store. Each control word in the first control store has a unique control store address. However, a control word in the second control store may be selected by many different control store addresses.

BRIEF DESCRIPTION OF THE DRAWINGS

FIGS. 10A-10D illustrate the locations of the various microwords within the micro control store.

FIGS. 11A-11F illustrate the control store addresses to which each of the nanowords in the nano control store is responsive.

FIG. 16 is an ALU control table which illustrates the operations which can be performed by the ALU within the execution unit.

FIG. 17 illustrates an ALU Function And Condition Code table having 15 rows and 5 columns which specify the ALU function and the manner in which the condition codes are to be controlled for various macroinstructions.

FIG. 18 is an ALU Function Control And Condition Code Decoder table which illustrates the relationship between the opcodes for various macroinstructions and the rows in the table shown in FIG. 18.

FIGS. 21A-21N and 21P-21U are tables which illustrate the $A_1$, $A_2$, and $A_3$ starting addresses generated by the instruction register sequence decoder for each of the macroinstructions.

DETAILED DESCRIPTION OF A PREFERRED EMBODIMENT

Figure 1:
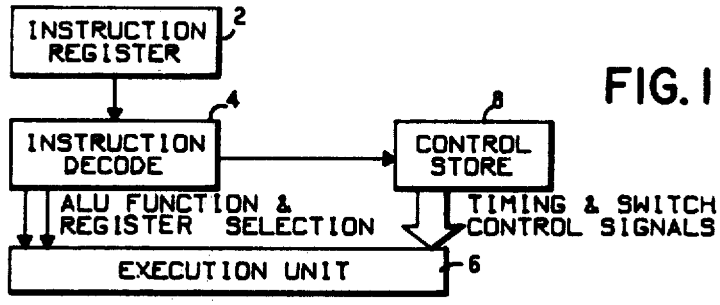
FIG. 1 is a simplified block diagram of a data processor employing a microprogrammed control store.

In FIG. 1, a simplified block diagram of a data processor is shown which employs a microprogrammed control structure to effect execution of macroinstructions received by the data processor. Instruction register 2 stores a macroinstruction received from a program memory. The stored macroinstruction is output by instruction register 2 to instruction decode block 4. Instruction decode block 4 derives information from the instruction such as a function to be performed by an arithmetic-logic unit (ALU) within execution unit block 6, as well as the registers which will provide data to the ALU and the registers which will store the results formed by the ALU. Instruction decode block 4 is also coupled to a control store block 8 which provides timing and control signals to execution unit 6.

The execution of a particular macroinstruction may require several execution unit time periods, or microcycles, such that various transfers and functions are performed by execution unit 6 during each of the execution unit time periods. The timing and control signals provided by control store block 8 insure that the proper transfers and operations occur during each of the execution unit time periods.

Structural Overview of Preferred Embodiment

Figure 2:
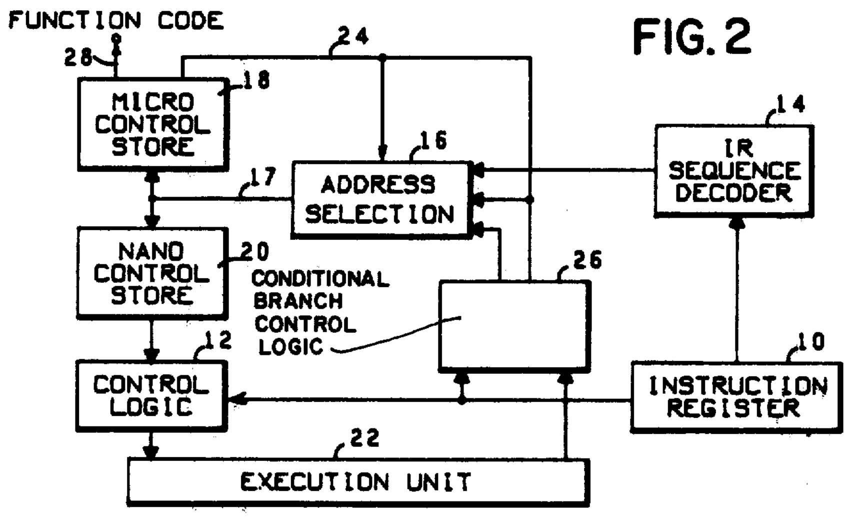
FIG. 2 is a more detailed block diagram of a data processor of the type shown in FIG. 1 according to a preferred embodiment of the invention.

In FIG. 2, a more detailed block diagram is shown while illustrates a preferred embodiment of the present invention. Instruction register 10 receives a macroinstruction from a program memory and stores this instruction. Instruction register 10 is coupled to control logic block 12 which extracts from the stored macroinstruction information which is static over the time period during which the stored macroinstruction is executed. Examples of macroinstruction static information are source and destination registers, ALU operation (addition, subtraction, multiplication, exclusive-OR), and immediate values contained within the instruction word such as address displacements and data constants.

Instruction register 10 is also coupled to instruction register sequence decoder block 14. In response to the macroinstruction stored by instruction register 10, instruction register sequence decoder 14 generates one or more starting addresses. Instruction register sequence decoder 14 is coupled to address selection block 16 for providing the one or more starting addresses. Line 17 couples the output of address selection block 16 to a control store which includes micro control store 18 and nano control store 20. In response to the address selected onto the line 17, nano control store 20 selects a nanoword which contains field-encoded control words for directing action in the execution unit. Nano control store 20 is coupled to control logic 12 which decodes the various fields in the nano control word in combination with the macroinstruction static information received directly from instruction register 10. The output of control logic 12 is coupled to execution unit 22 for controlling the various operations and data transfers which may be performed within execution unit 22.

Micro control store 18 is responsive to the selected address on line 17 for selecting a microword. Line 24 couples an output of micro control store 18 to address selection block 16 and to conditional branch control logic block 26. The selected microword contains information which generally determines the source of the next micro instruction address to be selected. The selected microword may also provide the address of the next micro instruction.

Execution unit 22 stores various condition code flags which are set or reset depending upon the status of ALU operations such as positive/negative result, zero result, overflow, and carry-out. In the event that the selection of the next micro instruction address is dependent upon one or more of these condition code flags, the microword provide by micro control store 18 also includes information provided to conditional branch control logic 26 for specifying which of the condition code flags will be used to determine the selection of the next micro instruction. In some cases, the macroinstruction itself specifies the condition code flags which are to be used to select the next micro instruction (for example, a conditional branch macroinstruction such as branch on zero). For this reason, instruction register 10 is also coupled to conditional branch control logic 26. Execution unit 22 is coupled to conditional branch control logic 26 for providing the various condition code flags. Conditional branch control logic 26 is coupled to address selection block 16 for specifying a portion of the next micro instruction address.

Micro control store 18 has a second output which is coupled to line 28. The selected microword includes a function code field which specifies the function of the current micro instruction. Line 28 provides the function code field to peripheral devices external to the data processor for communicating information about the current micro instruction.

In general, instruction register sequence decoder 14 provides a starting address for micro control store 18 which then produces a sequence of addresses for the nano control store 20. The associated nanowords are decoded by the control logic 12 and mixed with timing information. The resulting signals generated by control logic 12 are used to drive control points in execution unit 22.

Figure 3:
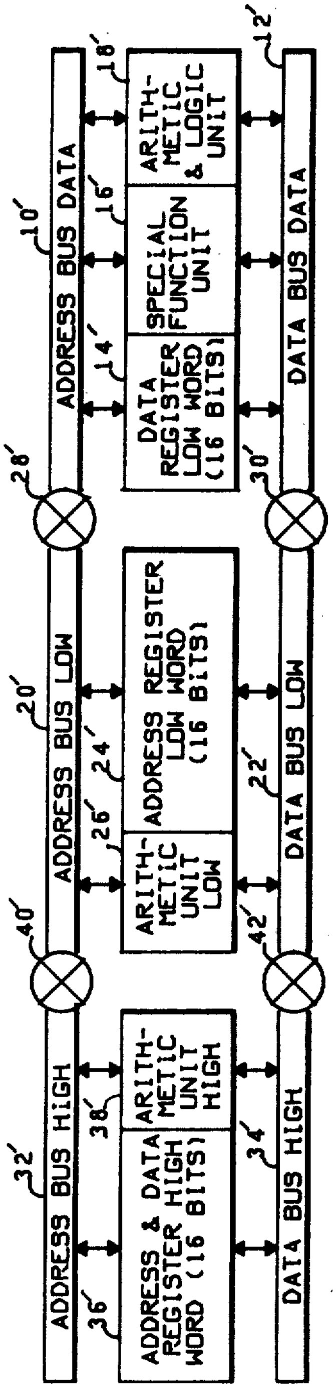
FIG. 3 is a simplified block diagram of the execution unit used within the data processor for executing macroinstructions.

In FIG. 3, a simplified block diagram of execution unit 22 (in FIG. 2) is shown. The execution unit is a segmented two-bus structure divided into three sections by bidirectional bus couplers. The left-most segment contains the high order word for the address and data registers and a simple 16-bit arithmetic unit. The middle segment contains the low order word for the address registers and a simple 16-bit arithmetic unit. The right-most segment contains the low order word for the data registers and an arithmetic and logic unit. The execution unit also contains an address temporary register and a data temporary register, each of which is 32 bits wide. In addition there are also several other temporary registers and special function units which are not visible to a programmer.

With reference to FIG. 3, a first digital bus 10' and a second digital bus 12' have been labeled ADDRESS BUS DATA and DATA BUS DATA, respectively. A group of 16-bit data registers, illustrated by block 14', is coupled to digital buses 10' and 12' such that block 14' can provide a 16-bit data word to either digital bus 10' or digital bus 12'. Similarly block 14' may receive from either bus 10' or bus 12' a 16-bit data word which is to be stored in one of the registers. It is to be understood that each of the digital buses 10' and 12' is adapted for transmitting 16 bits of digital information. The 16-bit registers contained by block 14' comprise the least significant 16 bits of a corresponding plurality of 32-bit data registers.

Blocks 16' and 18' are also coupled to digital buses 10' and 12'. Block 16' contains special function units not directly available to the programmer. Among the special function units are a priority encoder, used to load and store multiple registers, and a decoder, used to perform bit manipulation. Block 18' contains an arithmetic and logic unit which receives a first 16-bit input from bus 10' and a second 16-bit input from bus 12' and generates a 16-bit result. The 16-bit result may then be transferred onto either bus 10' or bus 12'.

Also shown in FIG. 3 is a third digital bus 20' and a fourth digital bus 22'. Bus 20' and bus 22' have been labeled ADDRESS BUS LOW and DATA BUS LOW, respectively. Block 24' is coupled to both bus 20' and bus 22' and contains a plurality of 16-bit address registers. These registers comprise the least significant 16 bits of a corresponding plurality of 32-bit address registers. Block 24' can provide a 16-bit address word to either bus 20' or 22'. Similarly block 24' can receive a 16-bit address word from either bus 20' or bus 22' for storage in one of the 16-bit address registers.

Block 26' is also coupled to bus 20' and bus 22' and contains an arithmetic unit for performing computations. Block 26' can receive a first 16-bit input from bus 20' and a second 16-bit input from bus 22' and generates a 16-bit result. The 16-bit result produced by ARITHMETIC UNIT LOW 26' may be transferred onto bus 20' or onto bus 22'. ARITHMETIC UNIT LOW 26' also produced a carry-out signal (not shown) which may be used in computations involving the most significant 16 bits of a 32-bit address word. Although not shown in FIG. 3, a field translate unit (ftu) is also coupled to bus 20' and bus 22' and may be used to transfer digital information between the execution unit and other sections of the data processor. First and second bidirectional bus switches 28' and 30' are shown coupled between bus 10' and bus 20' and between bus 12' and bus 22', respectively.

Also shown in FIG. 3 is a fifth digital bus 32' and a sixth digital bus 34'. Bus 32' and bus 34' have been labeled ADDRESS BUS HIGH and DATA BUS HIGH, respectively. Block 36' is coupled to both bus 32' and bus 34' and contains a plurality of 16-bit address registers and another plurality of 16-bit data registers. The address registers within block 36' comprise the most significant 16 bits of the 32-bit address registers formed in conjunction with the registers contained by block 24'. The 16-bit data registers within block 36' comprise the most significant 16 bits of a plurality of 32-bit data registers formed in conjunction with the data registers contained by block 14'.

Block 38' is also coupled to bus 32' and bus 34' and contains an arithmetic unit for performing computations upon the most significant 16 bits of either address or data words. Block 38' receives a first 16-bit input from bus 32' and a second 16-bit input from bus 34' and generates a 16-bit result. The 16-bit result produced by ARITHMETIC UNIT HIGH 38' may be transferred onto bus 32' or bus 34'. As previously mentioned, ARITHMETIC UNIT HIGH 38' can be responsive to a carry out produced by block 26' such that a carry out from the least significant 16 bits is considered a carry in to the most significant 16 bits. Third and fourth bidirectional bus switches 40' and 42' are shown coupled between bus 32' and bus 20' and between bus 34' and bus 22', respectively.

Thus it may be seen that the register file for the data processor is divided into three sections. Two general buses (ADDRESS BUS, DATA BUS) connect all of the words in the register file. The register file sections (HIGH, LOW, DATA) are either isolated or concatenated using the bidirectional bus switches. This permits general register transfer operations across register sections. A limited arithmetic unit is located in the HIGH and LOW sections, and a general capability arithmetic and logical unit is located in the DATA section. This allows address and data calculations to occur simultaneously. For example, it is possible to do a register-to-register word addition concurrently with a program counter increment (the program counter is located adjacent to the address register words, and carry out from the ARITHMETIC UNIT LOW 26' is provided as carry in to ARITHMETIC UNIT HIGH 38'). Further details of the execution unit are set forth in co-pending application "Execution Unit For Data Processor Using Segmented Bus Structure" bearing Ser. No. 961,798, filed Nov. 17, 1978, invented by Gunter et al and assigned to the assignee of the present invention, which is hereby incorporated by reference.

Figure 4:
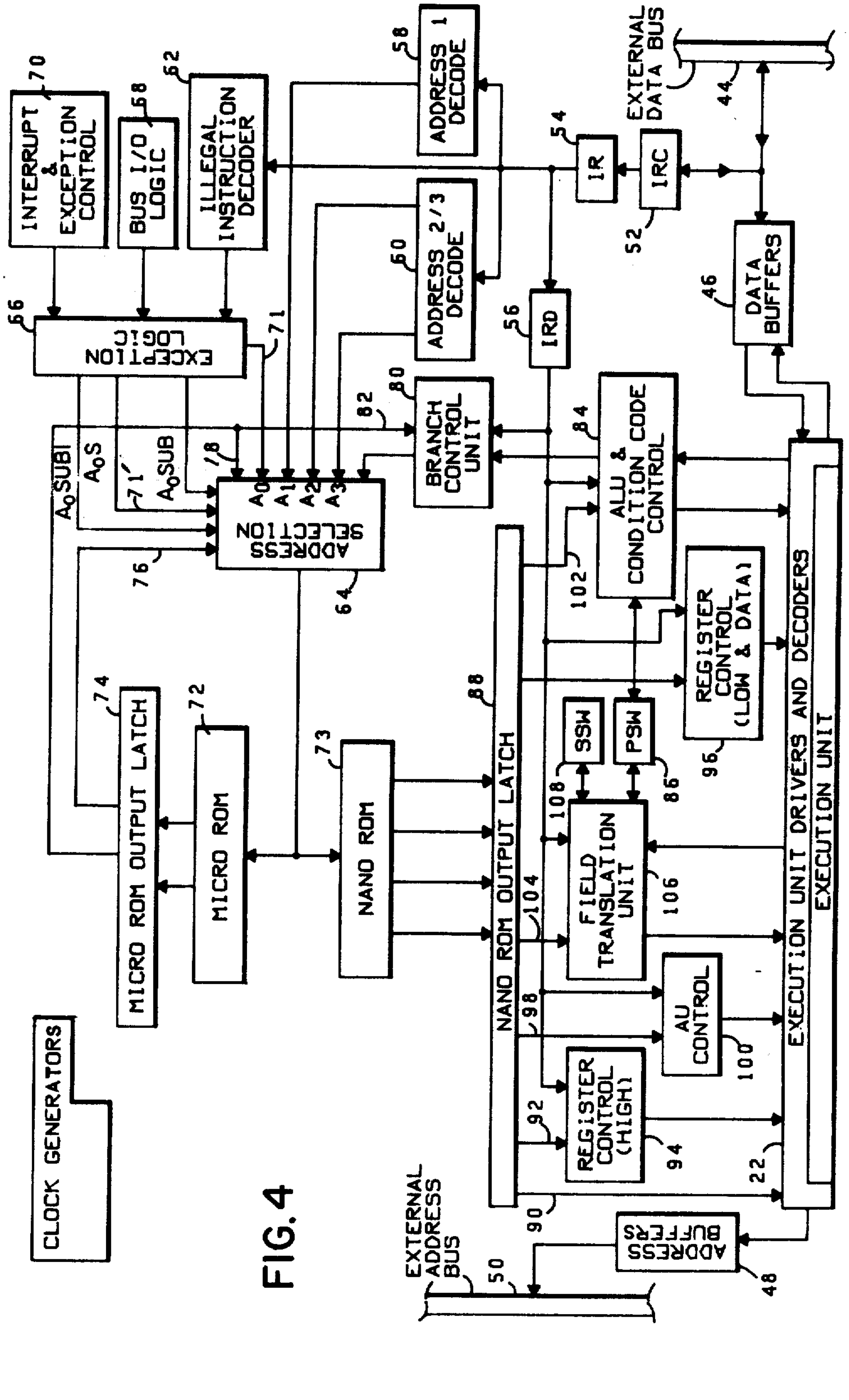
FIG. 4 is a block diagram which illustrates the data processor shown in FIG. 2 in further detail.

In FIG. 4, a detailed block diagram is shown of the data processor generally illustrated in FIG. 2. A bidirectional external data bus 44 is a 16-bit bus to which the data processor is coupled for transmitting data to and receiving data from peripheral devices. The data processor includes data buffers 46 coupled between external data bus 44 and execution unit 22 for transferring data between the execution unit and the external data bus. Execution unit 22 includes drivers and decoders which are shown generally along the periphery of execution unit 22. Execution unit 22 is also coupled to address buffers 48 which are in turn coupled to external address bus 50. An address provided by execution unit 22 to external address bus 50 typically specifies the location from which the data on bus 44 was read or the location to which the data on bus 46 is to be written. In the preferred embodiment, external address bus 50 is 24-bits wide such that a memory addressing range of more than 16 mega-bytes is provided.

External data bus 44 is also coupled to the input of 16-bit IRC register 52. The output of IRC register 52 is coupled to the input of 16-bit IR register 54. The output of IR register 54 is coupled to the input of 16-bit IRD register 56. Also coupled to the output of IR register 54 are the inputs to block 58 (ADDRESS 1 DECODER) and block 60 (ADDRESS ⅔ DECODER) as well as the input to block 62 (ILLEGAL INSTRUCTION DECODER). The use of IRC register 52, IR register 54, and IRD register 56 allows the data processor to operate in a pipelined manner; IRC register 52 stores the next macroinstruction, and IR register 54 stores the macroinstruction currently being decoded, while IRD register 56 stores the macroinstruction currently being executed. The output of block 58 is coupled to the $A_1$ input of address selector 64. A first output of block 60 is coupled to the $A_2$ input of address selector 64 and a second output of block 60 is coupled to the $A_3$ input of address selector 64. The output signals provided by block 58 and block 60 are microroutine starting addresses associated with a macroinstruction stored by IR register 54 as will be later explained in further detail.

The output of Illegal Instruction Decoder 62 is coupled to exception logic block 66. Also coupled to block 66 are block 68 (BUS I/O LOGIC) and block 70, (INTERRUPT AND EXCEPTION CONTROL). A first output of exception logic block 66 is coupled by line 71 to the $A_0$ input of address selector 64 for providing a special microroutine starting address. A second output of exception block 66 is coupled by line 71' ($A_0S$) to another input of address selector 64 for providing a second special microroutine starting address. Two additional outputs of exception logic block 66, $A_0SUB$ and $A_0SUBI$, respectively, are also coupled to address selector 64.

The output of address selector 64 is coupled to the input of micro ROM 72 and the input of nano ROM 73 for providing a selected address. The output of micro ROM 72 is coupled to micro ROM output latch 74 which stores the microword selected by micro ROM 72 in response to the address selected by address selector 64. The output of micro ROM output latch 74 is coupled to address selector 64 by lines 76 and 78 and to branch control unit 80 by line 82. Line 76 can provide a direct branch address as an input to address selector 64 while line 78 can specify to address selector 64 the source of the next address to be selected. In the event of a conditional branch, line 82 specifies the manner in which branch control unit 80 is to operate. Branch control unit 80 is also coupled to address selector 64 in order to modify the selection of the next micro/nano store address in order to accomplish conditional branching in a microroutine, as will be further explained hereinafter.

IRD register 56 has an output coupled to branch control unit 80 for supplying branch control information directly from a macroinstruction word. Branch control unit 80 is also coupled to an output of ALU AND CONDITION CODE CONTROL block 84 for receiving various condition code flags. PSW register 86 is coupled to block 84 and stores several of the condition code flags. Execution unit 22 is also coupled to block 84 for supplying other condition code flags.

Still referring to FIG. 4, nano ROM 73 is coupled to nano ROM output latch 88 for supplying a nanoword associated with the address selected by address selector 64. Various bit fields of the nanoword stored by latch 88 are used to control various portions of execution unit 22. Line 90 is coupled directly from latch 88 to execution unit 22 for controlling such functions as transferring data and addresses between the execution unit 22 and external buses 44 and 50. Line 92 is coupled from latch 88 to register control block 94. IRD register 56 is also coupled to register control block 94. Bit fields within IRD register 56 specify one or more registers (source, destination) which are to be used in order to implement the current macroinstruction. On the other hand, bit fields derived from latch 88 and supplied by line 92 specify the proper micro cycle during which source and destination registers are to be enabled. The output of block 94 is coupled to execution unit 22 for controlling the registers located in the HIGH section of the execution unit (block 36' in FIG. 3). In a similar manner, register control block 96 also has inputs coupled to latch 88 and IRD register 56 and is coupled to execution unit 22 for controlling the registers located in the LOW and DATA sections of the execution unit.

Line 98 couples latch 88 to AU control block 100 for supplying a bit field extracted from the nano word. Block 100 is also coupled to IRD register 56. Bit fields in the macroinstruction stored by IRD register 56 specify an operation to be performed by the ARITHMETIC UNIT HIGH and ARITHMETIC UNIT LOW in execution unit 22 (block 38' in FIG. 3). Information supplied by line 98 specifies the proper micro cycle during which the inputs and outputs of the ARITHMETIC UNIT HIGH and ARITHMETIC UNIT LOW are enabled. The output of AU control block 100 is coupled to execution unit 22 for controlling the arithmetic units in the HIGH and LOW sections.

Line 102 couples latch 88 to ALU AND CONDITION CODE CONTROL block 84. IRD register 56 is also coupled to block 84. Bit fields derived from the macroinstruction stored in IRD register 56 indicate the type of operation to be performed by the ALU in execution unit 22. Bit fields derived from the nanoword stored in latch 88 specify the proper micro cycles during which the input and outputs of the ALU are to be enabled. An output of block 84 is coupled to execution unit 22 for controlling the ALU. Block 84 also provides an output to PSW register 86 for controlling the condition code flags stored therein.

Line 104 couples latch 88 to FIELD TRANSLATION UNIT 106. IRD register 56 is also coupled to FIELD TRANSLATION UNIT 106. Also coupled to FIELD TRANSLATION UNIT 106 are PSW register 86 and special status word (SSW) register 108. PSW register 86 stores information such as the current priority level of the data processor for determining which interrupts will be acknowledged. PSW register 86 also specifies whether or not the processor is in the TRACE mode of operation and whether the processor is currently in a supervisor or user mode. SSW register 108 is used to monitor the status of the data processor and is useful for recovering from error conditions. FIELD TRANSLATION UNIT 106 can extract a bit field from the macroinstruction stored in IRD register 56 for use by the execution unit such as supplying an offset which is to be combined with an index register. FTU 106 can also supply bit fields extracted from PSW register 86 and SSW register 108 to the execution unit 22. FTU 106 can also be used to transfer a result from execution unit 22 into PSW register 86.

INSTRUCTION REGISTER SEQUENCE DECODER

Figure 5:
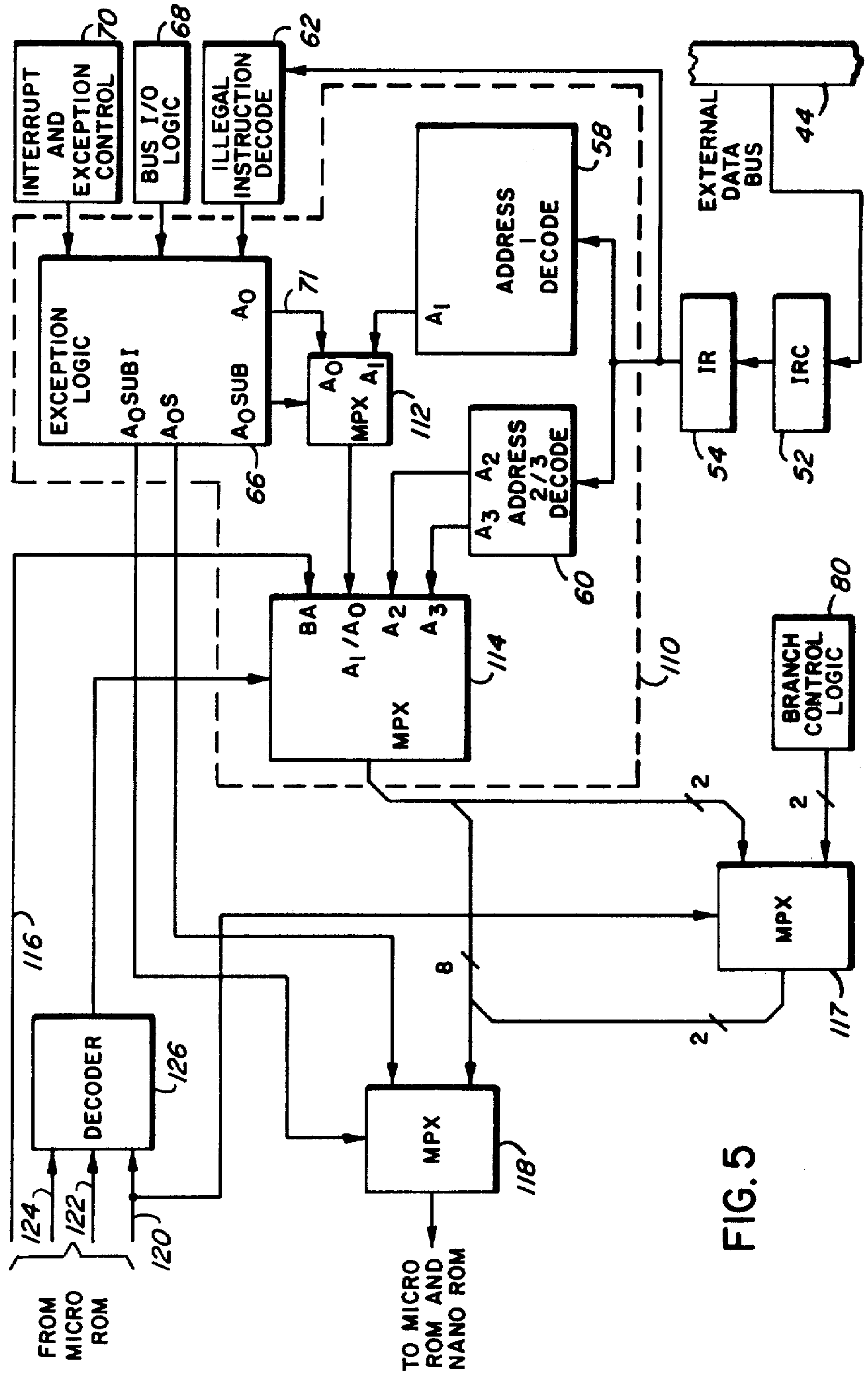
FIG. 5 is an expansion of a portion of the block diagram shown in FIG. 4 and illustrates an instruction register sequence decoder within the data processor.

In FIG. 5, a portion of FIG. 4 which includes an Instruction Register Sequence Decoder has been expanded in greater detail. Blocks in FIG. 5 which correspond to those already shown in FIG. 4 have been identified with identical reference numerals. Blocks 58, 60, and 66 are included within dashed block 110 which forms the Instruction Register Sequence Decoder. Instruction Register 54 (IR) receives a macroinstruction from a program memory via bus 44 and IRC register 52 and stores this instruction. The output of IR register 54 is coupled to illegal instruction decoder 62 which detects invalid macroinstruction formats. The output of IR register 54 is also coupled to an ADDRESS 1 DECODER 58 and ADDRESS ½ DECODER 60. Decoders 58 and 60 are programmed logic array (PLA) structures in the preferred embodiment. PLA structures are well known by those skilled in the art. For example, see "PLAs Enhance Digital Processor Speed and Cut Component Count," by George Reyling, Electronics, August 8, 1974, p. 109. In response to the macro instruction stored by register 54, decoder 58 provides a first starting address at an output $A_I$ which is coupled to multiplexer 112.

Exception logic block 66 is coupled to the output of illegal instruction decoder 62, the output of BUS I/O logic block 68 and the output of interrupt and exception block 70. BUS I/O logic block 68 is used to detect bus and address errors. A bus error may indicate to the data processor that a peripheral device (e.g., a memory) addressed by the data processor has not responded within an allowable period of time. An address error may indicate that an illegal address has been placed on the external address bus.

Interrupt and exception block 70 indicates such things as the occurrence of interrupts, the occurrence of a reset condition, and a trace mode of operation. An interrupt condition may occur when a peripheral device indicates that it is ready to transmit data to the data processor. The reset condition may indicate that the power supply to the data processor has just been activated such that internal registers must be reset or that a reset button has been depressed in order to recover from a system failure. A trace mode of operation may indicate that a tracing routine is to be performed after the execution of each macroinstruction in order to facilitate instruction-by-instruction tracing of a program being debugged.

Illegal instruction decode block 62 indicates illegal macroinstruction formats as well as privilege violations. An illegal instruction format is one to which the data processor is not designed to respond. The privilege violation condition refers to a feature of the data processor which allows operation in supervisor and user modes. Certain instructions may be executed only when the data processor is in a supervisor mode, and the privilege violation condition arises upon the attempted execution of one of these special instructions while in the user mode of operation.

All of the above mentioned special conditions require that the data processor temporarily stop executing macroinstructions in order to execute special microinstruction routines for dealing with the occurrence of the particular special condition. If some of the special conditions (e.g., interrupt, trace) arise, the data processor proceeds normally until it reaches the next instruction boundary, i.e., the processor completes the execution of the current macroinstruction prior to branching to the special microinstruction routine. However, when other special conditions (e.g., address error, bus error, reset) arise, the data processor immediately branches to one of the special microinstruction routines without completing the current macroinstruction, since the occurrence of the special condition may prevent successful execution of the current macroinstruction.

Still referring to FIG. 5, exception logic block 66 includes an output $A_0$ which is coupled over line 71 to multiplexer 112 for supplying a special microroutine starting address. Exception logic block 66 also includes output $A_0$SUB which is coupled to multiplexer 112 for determining whether starting address $A_0$ or starting address $A_1$ is to be selected as the output of multiplexer 112. Starting address $A_0$ is selected upon the occurrence of special conditions of the type which await the completion of the execution of the current macroinstruction before causing control to be transferred to the special microinstruction routine.

The output of multiplexer 112 is coupled to the $A_1/A_0$ input of multiplexer 114. Decoder 60, in response to the macroinstruction stored by register 54, provides second and third starting addresses at output $A_2$ and $A_3$ which are coupled to the $A_2$ and $A_3$ inputs of multiplexer 114, respectively. Multiplexer 114 also includes a BA input which is coupled to line 116 for receiving a branch address from the micro ROM. Each of the addresses received by multiplexer 114 is 10-bits wide.

The output of multiplexer 114 provides a selected address having 10-bits and is coupled to a first input of multiplexer 117 for supplying two of the ten output bits. The output of multiplexer 114 is also coupled to a first input of multiplexer 118 for supplying the other eight bits of the selected address directly to multiplexer 118. Branch control logic 80 is coupled to a second input of multiplexer 117 for supplying two branch bits. The output of multiplexer 117 is coupled to multiplexer 118 for supplying two selected bits to be used in conjunction with the eight bits supplied directly from multiplexer 114, thereby allowing for a four-way branch.

Exception logic 66 includes an output $A_0$S which is coupled to a second input of multiplexer 118 for supplying a second special microroutine starting address. Exception logic 66 also includes an output $A_0$SUBI which is coupled to the control input of multiplexer 118 and which causes special address $A_0$S to be selected at the output of multiplexer 118 in the event that an address error, bus error, or reset condition has been detected. In the absence of such a condition, multiplexer 118 provides at its output the address selected by multiplexer 114 in combination with multiplexer 117. The output of multiplexer 118 is coupled to the address input ports of the micro ROM and nano ROM (72, 73 in FIG. 4).

FIG. 5 also includes three conductors 120, 122, and 124 which are coupled to the output of the micro ROM latch (latch 74 in FIG. 4), each of the conductors receiving a bit in the selected micro word. Conductor 120 is coupled to a control input of multiplexer 117 for indicating a conditional branch point in the micro instruction routine. Conductors 120, 122, and 124 are coupled to decoder 126, and the output of decoder 126 is coupled to a control input of multiplexer 114 for causing the proper address to be selected at the output of multiplexer 114. The relationship between the microword bits conducted by conductors 120, 122, and 124 and the address selected by multiplexers 114 and 117 will be described in further detail hereinafter. It will be sufficient to realize at this point that the signals conducted by conductors 120, 122, and 124, and the address conducted by line 116 are all derived from the microword addressed during the previous micro cycle.

Figure 6:
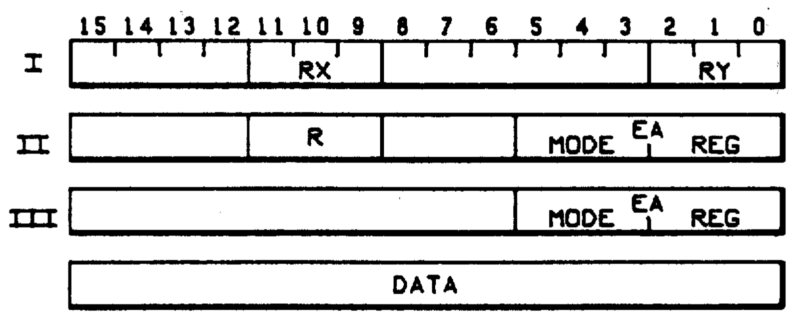
FIG. 6 illustrates several formats for macroinstructions which are processed by the data processor.

In order to understand the advantages provided by the instruction register sequence decoder, it will be helpful to describe the various types of macroinstructions which can be executed by the data processor illustrated in FIG. 2. In FIG. 6, three different types of macroinstruction formats are illustrated (I, II, III). Instruction I is a register-to-register type instruction in which bits 0, 1, and 2 specify a source register ($R_Y$) and bits 9, 10, and 11 specify a destination register ($R_X$). The remainder of the bits in the 16-bit instruction word identify the type of operation to be performed (add, subtract, etc.) and identify this instruction as one which uses register-to-register type addressing.

In instruction format II, bits 0 through 5 are an effective address field or simply an effective address (EA). The EA is composed of two 3-bit subfields which are the mode specification field and the register specification field. In general, the register specification field selects a particular register; the mode specification field determines whether the selected register is an address register or a data register and also specifies the manner in which the address of the desired operand is to be computed based upon the specified register. For a typical type II instruction, the EA field specifies the source operand, while bits 9, 10, and 11 specify one of the internal registers as the destination operand. The remainder of the bits in the 16-bit instruction specify the type of operation to be performed and indicate that this instruction is a type II instruction.

In type III instructions, the instruction may be composed of two or more 16-bit words wherein bits 0 through 5 of the first 16-bit word specify the effective address of a destination operand as previously described for type II instructions. However, the remainder of the bits in the first word of type III instructions indicate that the instruction includes a second 16-bit word which contains the data to be used in conjunction with the destination operand in order to perform the operation. Type III instructions use effective addressing to obtain the destination operand and so-called "immediate addressing" to obtain a second operand which is stored in a memory location immediately following the memory location from which the first word of the instruction was obtained.

In order to execute type I instructions, the data processor can immediately begin performing a microinstruction routine specifically designed to execute the type of operation indicated by the instruction word, since the operands are already contained by internal registers of the data processor. For type II instructions, however, a generalized effective address microinstruction routine must be performed in order to access the operand referenced by the EA field prior to executing a specific microinstruction routine used to perform the operation indicated by the macroinstruction. For immediate-type instructions, a pre-fetch operation results in the immediate operand being stored in both IRC register 52 and in a data bus input latch located within DATA BUFFERS block 46 (see FIG. 4). Thus, in type III instructions, a first generalized microinstruction routine must be performed in order to transfer the immediate operand from the data bus input latch to a temporary register in the execution unit and in order to repeat the pre-fetch operation such that the next macroinstruction is loaded into IRC register 52. Then, the generalized routine described with regard to type II instructions must be performed in order to obtain the operand referenced by the EA field. Finally, after the EA microinstruction routine has been completed, a specific microinstruction routine must be executed in order to perform the operation indicated by the first word of the instruction. The effective address microinstruction routines can be generalized because all type II and type III instructions use the same EA format. Similarly, the immediate addressing microinstruction routine can be generalized because all type III instructions access immediate operands in the same manner.

With reference to FIG. 5, the operation of decoder 58 and 60 and exception logic 66 within the instruction register sequence decoder 110 will be described by referring to FIGS. 7A, 7B, 7C and 7D. In normal operation, multiplexer 114 chooses starting address $A_1/A_0$ to point to the first microinstruction routine required to execute the macroinstruction presently stored in IR register 54. Starting address $A_1/A_0$ is selected at instruction boundaries because the very last microinstruction performed during the execution of the previous macroinstruction indicates, by way of decoder 126, that $A_1$ should be selected as the next starting address.

In the event that a special condition arises during the execution of a macroinstruction, exception logic 66 enables the $A_0$SUB output such that the multiplexer 112 will substitute starting address $A_0$ in place of starting address $A_1$ when execution of the current macroinstruction is completed. Some of the special conditions require initiation of a special microinstruction routine without waiting for the execution of the previous macroinstruction to be completed. In this case, exception logic 66 enables the $A_0$SUBI output which immediately causes starting address $A_0$S on line 71' to be selected by multiplexer 118 as the next address for the micro control store in order to cause a branch to a special microroutine.

Figure 7D:
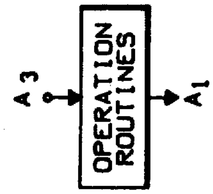
FIGS. 7A-7D illustrate the concept of functional branching within the micro control store implemented through the use of the instruction register sequence decoder.
Figure 7C:
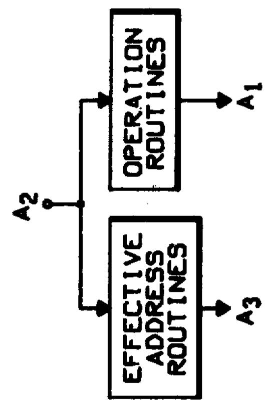
Figure 7A:
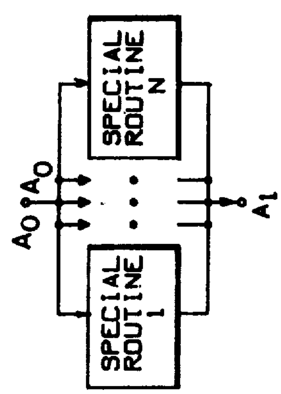

As shown in FIG. 7A, starting addresses $A_0$ and $A_0$S reference one of several special microinstruction routines in order to deal with the specific special condition that has arisen. A common feature of each of the special microroutines is that the last microword in each routine causes the signals conducted by conductors 120, 122, and 124 in FIG. 5 to specify to multiplexer 114 that starting address $A_1$ is the next address to be input to the micro control store.

Figure 7B:
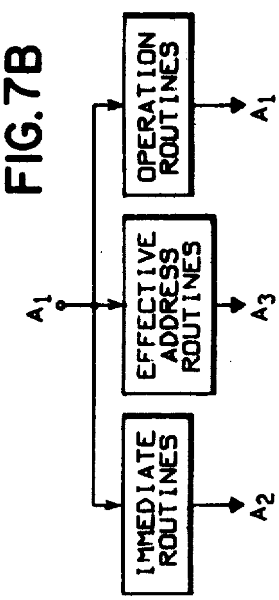

As is shown in FIG. 7B, starting address $A_1$ may reference a generalized immediate routine, a generalized effective address routine, or a specific operation routine depending upon the type of instruction presently stored in the instruction register. Each of these routines accomplishes a separate function, and the transfer of control from one routine to another may be referred to as functional branching. For example, starting address $A_1$ will reference a specific operation routine if the instruction register has stored a type I instruction (see FIG. 6). In this event, the $A_2$ and $A_3$ addresses output by $A_2/A_3$ decoder 60 in FIG. 5 are "don't care" conditions, which simplifies the PLA structure used to implement the decoder. Starting address $A_1$ will reference an effective address routine or an immediate routine if the instruction stored by the instruction register is a type II instruction or a type III instruction, respectively. In addition to performing the desired operation, each of the specific operation routines is effective to transfer a prefetched macroinstruction word from IRC register 52 to IR register 54 and to fetch a subsequent macroinstruction word and store it in IRC register 52. The macroinstruction word is prefetched far enough in advance to ensure that the starting addresses output from $A_1$ and $A_2/A_3$ decoders 58 and 60 are valid at the appropriate time. In addition, the last microword in each of the specific operation routines specifies that starting address $A_1$ is to be selected as the next address input to the micro control store. Each of the effective address routines concludes with a microword which specifies that starting address $A_3$ is to be selected as the next address. Starting address $A_3$ always points to a specific operation routine, as is shown in FIG. 7D. The last microword in all immediate routines causes starting address $A_2$ to be selected as the next address.

As is shown in FIG. 7C, starting address $A_2$ may reference either an effective address routine or a specific operation routine. A type III instruction (see FIG. 6) would result in starting address $A_2$ causing a branch to an effective address routine. Although not shown in FIG. 6, another type of instruction may require immediate addressing without also including an effective address field. For this type of instruction, starting address $A_2$ would reference a specific operation routine.

Thus, in order to execute a type III instruction, starting address $A_1$ is selected first which initiates a generalized microinstruction routine for processing an immediate operand. The last microword in the immediate microroutine selects $A_2$ as the next starting address which causes a direct branch to an effective address microroutine for acquiring a second operand. At the completion of the effective address routine, starting address $A_3$ is selected which causes a direct branch to a microinstruction routine for performing the desired operation and for transferring the next macroinstruction into the instruction register. At the completion of the specific operation routine, starting address $A_1$ is selected in order to begin execution of the next macroinstruction.

In Appendix F, all of the macroinstructions which are performed by the preferred embodiment of the data processor are described. In Appendix G, a breakdown of the op-codes is listed for all of the macroinstructions listed in Appendix F. FIGS. 22A–22N and 22P–22U tabulate the starting addresses A1, A2, and A3 for each macroinstruction op-code. The starting addresses tabulated in FIGS. 22A–22N and 22P–22U are given in terms of the label of the microword addressed. The microword labels are tabulated in Appendix A. In FIGS. 22A–22N and 22P–22U, the 4-bit code in the upper left corner corresponds to bits 15–12 of the macroinstruction. The 6-bit code to the right of each row corresponds to bits 11-6 of the macroinstruction. The 6-bit code at the bottom of each column corresponds to bits 5-0 of the macroinstruction. The columns generally correspond to the various addressing modes for each macroinstruction. RYD and RYA indicate that the operand is the contents of the designated address or data register. (RYA) indicates that the address of the operand is in the designated address register. (RYA)+ and −(RYA) indicate a post-increment and pre-decrement mode wherein the designated address register is either incremented after or decremented before the operand address is used. $(RYA)+d_{16}$ and $(RYA)+(X)+d_8$ refer to adding a 16-bit displacement to the designated address register in order to specify the operand address or adding an index register and an 8-bit displacement to the designated address register in order to satisfy the operand address. ABSW and ABSL indicate that the operand address is either the 16-bit word or 32-bit double-word which follows the first word of the macroinstruction in the program memory. $(PC)+d_{16}$ and $(PC)+(X)+d_8$ indicate that the operand address is either the contents of the program counter plus a 16-bit displacement or the contents of the program counter plus an index register plus an 8-bit displacement. The column labeled "#" specifies that the operand is an immediate value which may be a 16-bit word or a 32-bit double-word which follows the first word of the macroinstruction in the program memory.

TWO-LEVEL MICROPROGRAMMED CONTROL UNIT

Figure 8:
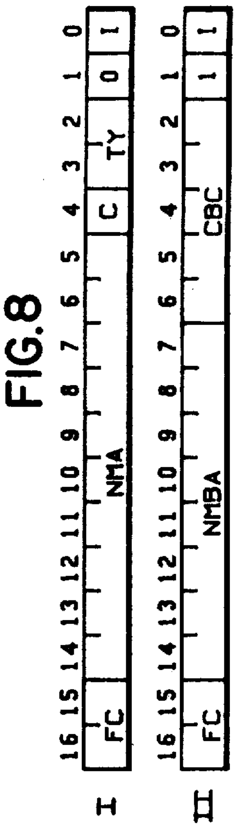
FIG. 8 illustrates first and second formats for microwords contained by the micro control store, the first format corresponding to direct branch type micro words and the second format corresponding to conditional branch type microwords.

In FIG. 4, a two-level microprogrammed control unit is illustrated which includes micro ROM 72 and nano ROM 73. The micro ROM is used to direct sequencing in the control unit. Micro ROM 72 in FIG. 4 contains 544 microwords each having 17 bits. The micro ROM is addressed by the 10-bit output of address selection block 64 such that up to 1024 microwords could be addressed. However, the preferred embodiment of the data processor requires only 544 microwords. The microwords are arranged in either of two formats which are illustrated in FIG. 8. Format I in FIG. 8 is the format for all types of microwords other than those which allow conditional branching, while format II is the format for microwords which provide conditional branching. In format I, bit 1 is a "0", while in format II, bit 1 is a "1" such that bit 1 distinguishes the two possible formats. For conditional branch type microwords (format II), bits 2 thru 6 comprise a conditional branch choice field (CBC) and specify one of 32 possible branch conditions. Also in conditional branch type microwords, bits 7 thru 14 comprise a next micro ROM base address (NMBA) for the micro and nano control stores. As will be explained hereinafter, the 8-bit NMBA field is augmented by 2 additional bits supplied by branch control logic in order to specify the next address for the control stores.

For microwords having format I, bits 2 and 3 comprise a type field (TY) which specifies the source of the next address for the control stores. The address is selected either from one of the 3 possible addresses provided by the instruction register sequence decoder or from a direct branch address provided by bits 5 thru 14 of the microword which comprise a 10-bit next micro ROM address field (NMA). Referring briefly to FIG. 5, the NMA and NMBA bit fields are supplied by line 116 to the BA input of multiplexer 114. Conductors 120, 122 and 124 couple bits 1, 2, and 3, respectively, to decoder 126 such that the proper source is selected by multiplexer 114 as the next address. The selection of the source of the next address is determined by the TY field according to the table shown below.

| TY (type) | bit 3 | bit 2 | abbrev | source |
|---|---|---|---|---|
| | 0 | 0 | db | NMA |
| | 0 | 1 | al | Address 1 |
| | 1 | 0 | a2 | Address 2 |
| | 1 | 1 | a3 | Address 3 |

Fields common to both microword formats are the function code field (FC), comprised by bits 15 and 16, and the load instruction field (I), corresponding to bit 0. The FC field specifies the function of the current microinstruction for peripheral devices external to the data processor. The significance of the FC field is indicated in the table below.

| FC (function code) | bit 16 | bit 15 | abbrev | operation |
|---|---|---|---|---|
| | 0 | 0 | n | No Access |
| | 0 | 0 | u | Unknown Access Type |
| | 0 | 1 | d | Data Access |
| | 1 | 0 | i | Instruction Access |
| | 1 | 1 | a | Interrupt Acknowledge |

The I field (bit 0) is used to specify the micro cycle during which the instruction register is to be updated. When bit 0 is a "1", then the output of IRC register 52 is enabled into IR register 54 (see FIG. 4). Generally, this transfer is not made until the execution of the macroinstruction has proceeded into an operation type microroutine (FIGS. *7a–7d*) such that the instruction register sequence decoder can begin to generate starting addresses for the next macroinstruction to be executed.

For microwords of the type having format II, bit 4 is included in the CBC field for selecting the appropriate branch condition. However, for microwords of the type having format I, bit 4 is not included in any of the previously described bit fields. In the preferred embodiment of the data processor, bit 4 is used in conjunction with bit 0 to control not only the loading of the instruction register but also the updating of a trap vector number (TVN) encoder. Referring briefly to FIG. 5, exception logic block 66 includes a series of latches for storing the status of the various special conditions such as interrupt pending, trace pending, address error, etc. The outputs of these latches are coupled to a decoder which generates the $A_0$ and $A_0S$ starting addresses. Two different latch enable signals are provided for independently latching two groups of these latches. The first group of latches monitors the special conditions which do not await an instruction boundary before diverting control in the micro ROM. The second group of latches monitors the remainder of the special conditions. To update the TVN encoder, both groups of latches are clocked such that the output of each of these latches corresponds to the signals presented to the inputs of these latches. To partially update the TVN encoder, only one of the two clock enable signals is pulsed such that only those latches coupled to this clock enable signal are allowed to take note of signals currently presented to their inputs. For microwords of the type having format I, the loading of the instruction register and the updating of the TVN encoder are specified according to the table shown below.

| C,I | bit 4 | bit 0 | abrev | result |
|---|---|---|---|---|
| | 0 | 0 | db | update neither IR nor TVN |
| | 0 | 1 | dbi | IRC to IR, update TVN |
| | 1 | 0 | dbc | IRC to IR, don't update TVN |
| | 1 | 1 | dbl | IRC to IR, partially update TVN |

The 544 microwords stored in the micro ROM are tabulated in appendix A which follows the detailed description of the invention. The table in appendix A lists for each micro word a LABEL, the corresponding function code (FC), the associated next micro control store address (NMA) for direct branch type microwords, a TYPE for selecting the source of the next address, and a conditional branch choice (CBC) for conditional branch type microwords. Also indicated in this table under the column entitled ORIGIN are instances where a microword is associated with the same nanoword in the nano control store as is a previously listed microword. The table further includes a column entitled ROW which indicates those microwords which are destinations of conditional branch type microwords. The placement of these microwords, which serve as destinations for conditional branches, is restricted since the branch address is comprised of an 8-bit base address plus a 2-bit branch field generated by branch control logic. Thus, two microwords which serve as alternate destinations for a particular conditional branch type microword must be placed in the same logical row of the micro ROM. The table also includes a column entitled DESTINATIONS which lists the microwords which are potential destinations for each of the conditional branch type microwords.

As is shown in FIG. 4, the nano control store, or nano ROM, is addressed by the same address which is used to address the micro control store, or micro ROM. Access in the nano control store is either to a single word or a logical row of words (with subsequent conditional selection of a single word in that row). Access to the nano control store is concurrent with access to the micro control store. However, while there is a one-to-one mapping in the micro control store between addresses and unique microwords, there is a many-to-one mapping of control store addresses to unique nanowords. It is possible therefore for several unique microwords to share the same nanoword.

A nanoword consists of fields of functionally encoded control signals which are decoded by the control logic (block 12 in FIG. 2) to drive the control points in the execution unit for operation of bus switches, source and destination registers, temporary locations, special function units, and input/output devices. In the data processor constructed according to the preferred embodiment of the invention, each nanoword is 68 bits wide and is decoded to drive approximately 180 control points within the execution unit. The number of unique nanowords in the nano control store is 336, while the number of unique microwords in the micro control store is 544.

Since each nanoword is uniquely specified by its address, it would be possible to directly decode addresses to the nano control store in order to generate control words. This would eliminate the need for the nano control store but would greatly increase the amount of decoding logic in control block 12 of FIG. 2. At the other extreme, each control point could have an associated bit in the nanoword and no decoding of the nanoword would be necessary at all. In practice, some chip area between the control store and the execution unit must be allocated to combine timing information and to align control word outputs with associated control points within the execution unit. It is possible to provide about three gate levels of decoding in this chip area at very little cost. The control word in the preferred embodiment of the data processor is field-encoded in a manner which permits functional definition of fields and relatively simple decoding.

Minimization of the number of unique control words, or nano words, is facilitated by moving operands and addresses into temporary locations early in the instruction routine. This tends to make later cycles in different instructions look more alike. Instruction set design and programming of the control unit also influence the number of nanowords. Additionally, there is a trade-off between execution efficiency and the number of unique nanowords required. The more time allowed for execution, the better the chance of making various instructions look alike.

Figure 9:
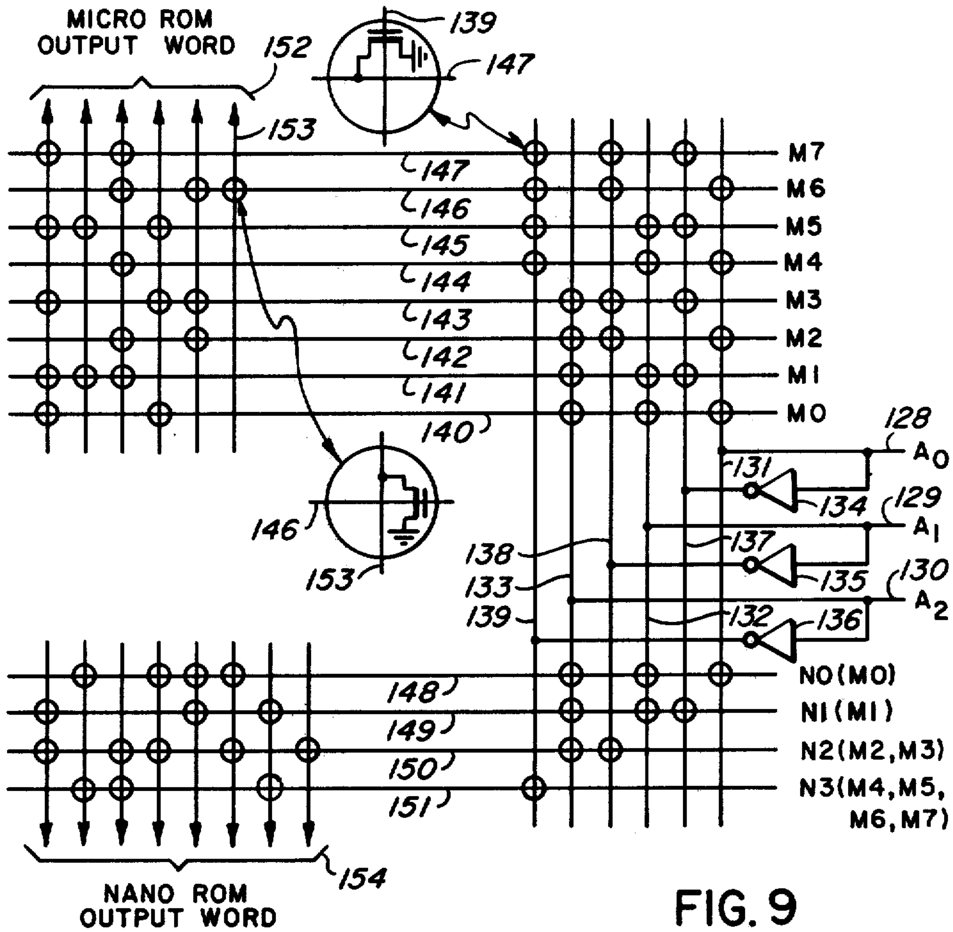
FIG. 9 illustrates a simplified programmed logic array (PLA) structure which can be used to implement the micro control store and nano control store for the data processor.

In FIG. 9, circuitry is illustrated for constructing a control store having a micro ROM and a nano ROM which are addressed simultaneously by the same address. For the purpose of simplifying the illustration, the control store in FIG. 9 receives a 3-bit address which accesses a 6-bit microword in the micro ROM and an 8-bit nanoword in the nano ROM. Three address bits ($A_0$, $A_1$, $A_2$) are received by conductors 128, 129, and 130 which are coupled to address conductors 131, 132, and 133, respectively. Conductors 128, 129, and 130 are also coupled to the inputs of inverters 134, 135, and 136, respectively. The output of inverter 134, the output of inverter 135, and the output of inverter 136 is each coupled to address conductor 137, 138, and 139, respectively. The micro ROM includes eight word lines (140-147) which are labeled M0 through M7 in FIG. 9. Similarly, the nano ROM includes 4 word lines (148-151) which are labeled N0 thru N3. A micro ROM word line decoder is formed at the intersection of address conductors 131-133 and 137-139 and micro ROM word lines 140-147. At particular intersections of an address conductor and a word line, a bubble is illustrated such as that shown at the intersection of address conductor 139 and word line 147. The expanded drawing of the bubble at this intersection shown in FIG. 9 illustrates that a MOSFET is coupled between the word line and ground such that the word line is grounded when the address conductor is enabled. A plurality of microword columns designated generally at 152, and including column 153, intersects the micro ROM word lines 140–147 for generating a micro ROM output word. At particular intersections of the microword columns and word lines, a bubble is indicated such as that shown at the intersection of word line 146 and column 153. The expanded drawing of the bubble corresponding to this intersection illustrated in FIG. 9 indicates that a MOSFET is coupled between column 153 and ground for causing the column to be grounded when the word line is selected.

Similarly, in the nano ROM, the intersection of address conductors 131–133 and 137–139 with nano ROM word lines 148–151 forms a nano ROM word line decoder. A plurality of columns designated generally 154 intersects the nano ROM word lines for generating a nano ROM output word.

The micro ROM and nano ROM word line decoders in FIG. 9 are constructed such that the selection of word line 140 (M0) in the micro ROM also causes the selection of word line 148 ($N_0$) in the nano ROM. Similarly, the selection of word line 141 (M1) causes the selection of word line 149 (N1). However, the selection of either word line 142 or word line 143 (M2, M3) in the micro ROM will cause word line 150 (N2) to be selected in the nano ROM. Also, the selection of any of word lines 144, 145, 146, and 147 (M4–M7) in the micro ROM will cause word line 151 (N3) to be selected in the nano ROM.

To summarize the operation of the circuitry in FIG. 9, the same address is presented to the decoders of both the micro ROM and the nano ROM. For any input address, there will be no more than one word line in each ROM which remains high. The line which remains high will cause the appropriate output value to be generated as the micro ROM output word and the nano ROM output word according to the coding at the intersection of the selected word line and the output columns. Each word line in the micro ROM is represented by only one input address. Each word line in the nano ROM however may represent one, two, or four possible different input addresses. In the preferred embodiment of the data processor, a word line in the nano ROM may represent as many as eight different input addresses. Each of the word lines in the micro ROM has a corresponding word line in the nano ROM. However, the number of bits in the microword generated by the micro ROM is completely independent from the number bits in the nanoword generated by the nano ROM. It is this feature which results in an overall reduction in the size of the control store.

In FIGS. 10A–10D, the location of each microword within the micro ROM is illustrated. Each of the microword labels listed in Appendix A is shown at a particular address within FIGS. 10A–10D. Slightly fewer than half of the locations are blank since only 544 of the possible 1,024 locations are used in the preferred embodiment.

In FIGS. 11A–11F, the location of each of the nanowords within the nano ROM is illustrated. The label used for each of the nanowords is the same as the label associated with a microword at a corresponding address within the micro ROM. As an example, assume that the current micro control store address (A9–A0) is the 10-bit code 01 11 10 00 10. This address references the location labeled ablw1 in the micro ROM as is shown in FIG. 10B. This same address references the location labeled ablw1 in the nano ROM as shown in FIG. 11D. As is indicated in the column labeled ORIGIN in Appendix A, other microwords which refer to the same nanoword location include abll1, ralw1, rall1, jsal1, jmal1, paal1, and unlk2.

Figure 12:
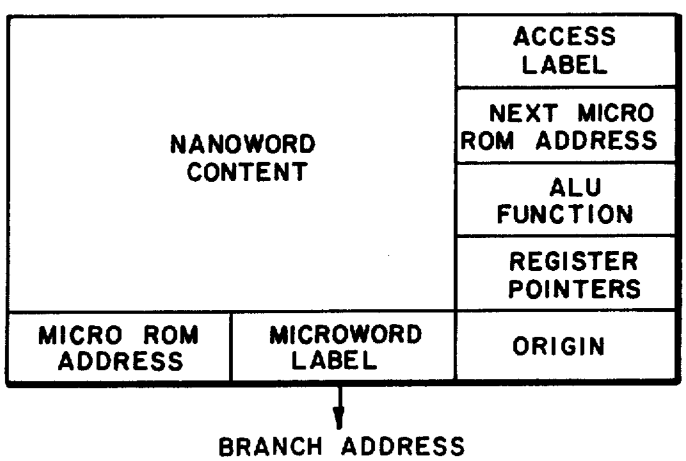
FIG. 12 is a key block which explains the microword blocks illustrated in FIGS. 13A-13CN.
Figure 13:
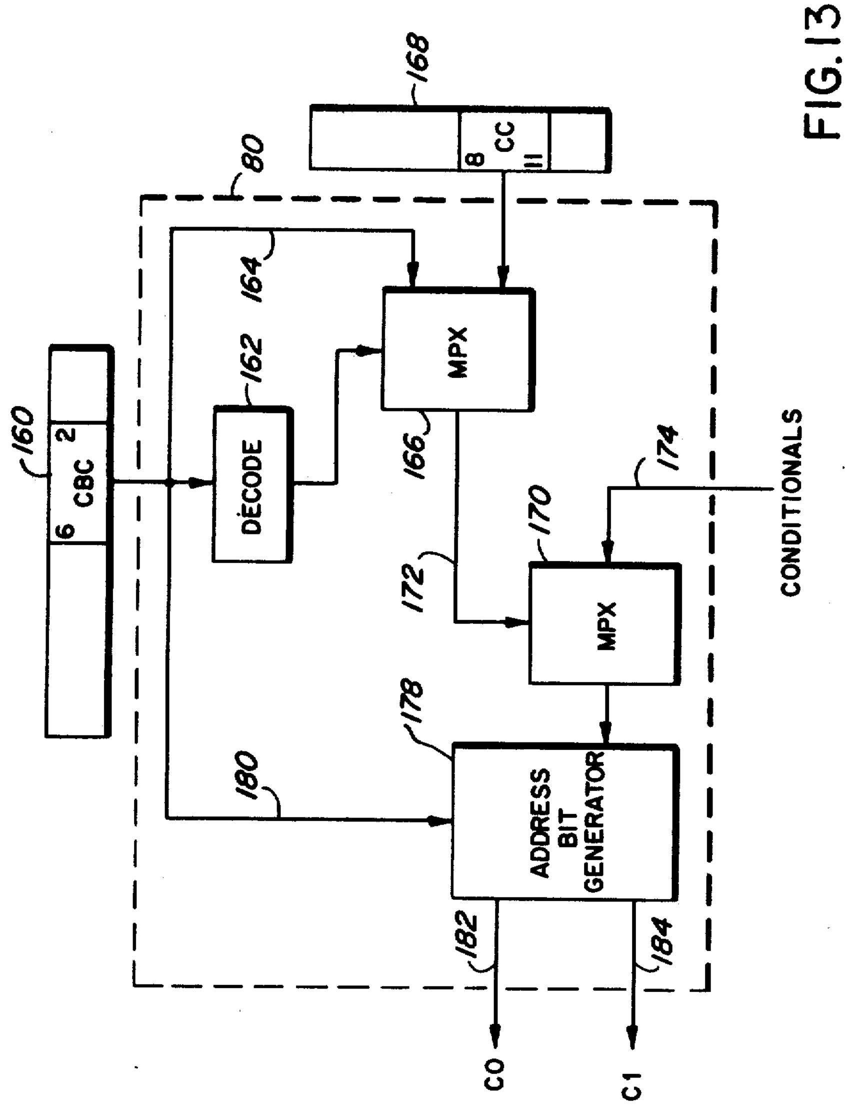
FIG. 13 is a block diagram which illustrates the conditional branch logic unit used within the data processor for controlling conditional branches within the control store.
Figure 13A:
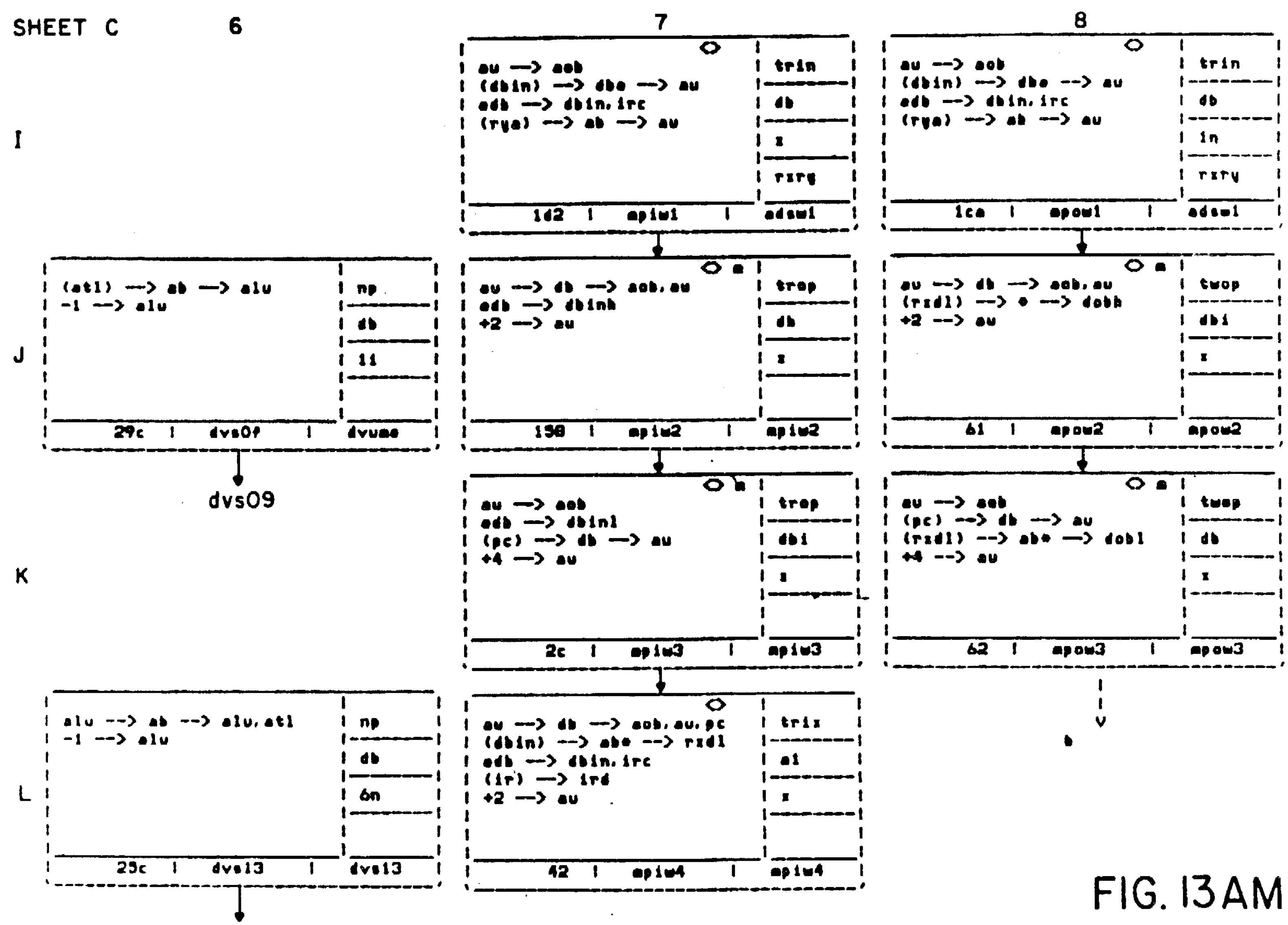

In FIG. 12, a block is illustrated which may serve as a key for interpreting the microword blocks illustrated in FIGS. 13A–13CN. The portion of the key block labeled MICROROM ADDRESS in FIG. 12 is a hexadecimal number corresponding to the 10-bit address in the micro ROM where the particular microword is located. The portions of the key block labeled MICRO WORD LABEL and ORIGIN correspond to the identification of each microword used in Appendix A. The portion of the key block labeled NEXT MICROROM ADDRESS specifies how the next micro control store address is to be selected, whether a branch will be direct or conditional, and whether the instruction register and trap vector number (TVN) encoder will be updated. The key to the coding used in this portion of the key block is given below.

NEXT MICROROM ADDRESS

| Key | Meaning |
|---|---|
| a1 | starting address $A_1$ |
| a2 | starting address $A_2$ |
| a3 | starting address $A_3$ |
| bc | conditional branch |
| bci | conditional branch, (IRC) IR |
| db | direct branch |
| dbc | direct branch, (IRC)→IR, update TVN |
| dbi | direct branch, (IRC)→IR |
| dbl | direct branch, (IRC)→IR, partially update TVN |

The portion of the key block labeled ACCESS LABEL is used to convey information about the access class, access mode, and access type for each microword block. The first character in the access label can be one of four types as explained in the table below.

ACCESS CLASS

| character | meaning |
|---|---|
| i | initiate |
| f | finish |
| n | no access |
| t | total |

Initiate indicates that the data processor has begun an external access operation during the current microcycle but that the data processor need not wait for the external access operation to be completed before proceeding to the next microword block. Finish indicates that an access was initiated on a previous microcycle and that the external access operation must be completed during the current microcycle. No access indicates that an access operation is not pending during the current microcycle. Total indicates that the data processor must both initiate and finish an access to an external device during the current microcycle. The data processor includes circuitry (not shown) for interfacing the data processor to external devices. This circuitry is designed to transmit and receive handshake signals which allow the data processor to recognize the completion of an access operation. This circuitry inhibits the data processor from proceeding to the next microcycle for the finish and total access classes until the access operation has been successfully completed.

The second character in the access label can be one of three characters shown below.

| ACCESS MODE | |
|---|---|
| character | meaning |
| p | process only |
| r | read |
| w | write |

Process only indicates that no access is pending during the current microcycle. Read and write indicate whether the data processor is to receive or transmit information during the external access operation.

The remaining two characters of the access label correspond to the access type according to the table below.

| ACCESS TYPE | |
|---|---|
| characters | meaning |
| ak | interrupt acknowledge |
| im | immediate |
| in | instruction |
| ix | immediate or instruction |
| op | operand |
| uk | unknown |

Interrupt acknowledge indicates that the current external access operation is to obtain a vector number from an external peripheral device which has interrupted the data processor. Immediate and instruction indicate that the external access operation pending during the current microcycle is to obtain an immediate word or instruction word, respectively. The "ix" designation indicates that the word being accessed during the current microcycle is either an immediate word or an instruction word since the particular microword block may be encountered in either of these circumstances. Operand indicates that the pending external access operation involves data being read by or written from the data processor. The designation unknown indicates that it can not be determined whether the pending external access operation involves an immediate word, an instruction word, or an operand word. It should be realized by those skilled in the art that from the information contained within the access label, the function code (FC) field, shown as bits 15 and 16 in FIG. 8, is determined.

The portion of the key block in FIG. 12 labeled REGISTER POINTERS is a 4-character key which specifies the destination and source registers in the execution unit which are enabled during the current microcycle. The first two characters are one of the six possibilities listed below.

| DESTINATION REGISTER DECODE | |
|---|---|
| characters | meaning |
| dt | data temporary register |
| dx | don't care |
| rx | $r_x$ field in macroinstruction |
| sp | user or supervisor stack pointer |
| uk | unknown |
| us | user stck pointer |

Similarly, the third and fourth characters in the REGISTER POINTERS key designate the source register which can be one of the six possibilities listed below.

| SOURCE REGISTER DECODE | |
|---|---|
| characters | meaning |
| dt | data temporary register |
| dy | don't care |
| pc | program counter |
| ry | Ry field in macroinstruction |
| py | program counter or Ry field |
| uk | unknown |

The significance of the portion of the key block in FIG. 12 labeled ALU FUNCTION will be explained hereinafter. The largest portion of the key block is labeled NANOWORD CONTENT which indicates the transfers of information which are enabled within the execution unit during each microcycle. For those microword blocks in which the microword label is not the same as the origin, the execution unit transfers enabled by the nanoword will be the same as those listed for the microword block which is deemed to be the origin. The abbreviations used within the nanoword content portion of each microword block are explained in Appendix B which follows the detailed description.

Appendix H illustrates the operations performed by each of the microwords. Each of the microword blocks is interpreted according to the key block shown in FIG. 12.

Use of temporary storage and routine sharing are the two basic techniques used to facilitate microroutine minimization. Temporary storage can be used to advantage if operands and addresses are moved into temporary locations early in the instruction microroutine. This makes later control words in the routine more homogenous and often permits routines to join, which can save considerable space in the control store. Routine sharing is facilitated by the following:

1. Incomplete translation of macroinstruction words by the control store allows extracted fields in the macroinstruction words to specify ALU functions and register selection. Instructions for various functions which require similar computational operations share the same microroutine.
2. During execution of immediate type macroinstructions, the immediate value is fetched and placed in a data temporary register, thereby allowing macroinstructions involving immediate values to share the register-to-memory and register-to-register microroutines already available.
3. The functional branching concept already described allows the various addressing modes to be shared by most single and dual operand macroinstructions which require an operand not already contained within the data processor.

The general micro and nano control store concept allows different microroutine sequences (made up of relatively short control words) to share many of the same nano control words (which are much wider). Each macroinstruction received by the instruction register is emulated by a sequence of microwords. Only one copy of each unique nanoword need be stored in the nano control store, no matter how many times it is referred to by various microroutines.

CONDITIONAL BRANCH LOGIC

Two distinct types of conditional branches are implemented in the control unit of the data processor. One type of conditional branch is that which is implicit in an instruction and which must be specified uniquely by a microword. Examples of this first type of conditional branch are iterative routines such as multiply and divide operations which require several different conditional branches during execution of the macroinstruction although the macroinstruction does not specify these branches directly. The second type of conditional branch is that which is explicit to the macroinstruction. Set conditionally ($S_{CC}$) and branch on condition ($B_{CC}$) are examples of the second type of macroinstruction.

In FIG. 13, a block diagram is shown which illustrates the overall function of a conditional branch control network. Block 160, which corresponds to the micro ROM output latch 74 in FIG. 4, stores a microword which includes a 5-bit CBC field (bits 6–2) for controlling a conditional branch operation, as was explained with regard to FIG. 8, format II. The portion of block 160 which contains the CBC field is coupled to a decoder 162 which determines whether the branch condition is implicit in the macroinstruction or is explicit in the macroinstruction. The portion of block 160 which contains the CBC field is also coupled by line 164 to a first input of multiplexer 166. The second input of multiplexer 166 is coupled to block 168, which corresponds to IRD register 56 in FIG. 4. The 4-bit CC field (bits 11–8) in block 168 correspond to the macroinstruction bit field which specifies the conditions to be tested when executing the set conditionally $S_{CC}$ and branch on condition $B_{CC}$ macroinstructions. The output of decoder 162 is coupled to a selection input of multiplexer 166 for selecting either the CBC field in the microword or the CC field in the macroinstruction as the output of multiplexer 166. By allowing the CBC field to defer the selection of conditions to the macroinstruction word itself, a single routine in the macro control store can be used to execute all of the explicit conditional branch type macroinstructions.

The output of multiplexer 166 is coupled to a selection input of multiplexer 170 by line 172. Multiplexer 170 is also coupled to line 174 for receiving conditional signals from various portions of the data processor. Multiplexer 170 selects the appropriate conditional signals for transmission to address bit generator 178. The portion of block 160 which contains the CBC field is also coupled to a control input of address bit generator 178 by line 180. Address bit generator 178 provides a 2-bit output (C0, C1) on lines 182 and 184. Output lines 182 and 184 are coupled from branch control logic 80 to multiplexer 116, as shown in FIG. 5. In response to the signal coupled to the control input by line 180, the address bit generator selects one of two possible output combinations for C0 and C1 associated with the conditional signals selected by multiplexer 170.

Conditional branches present a problem because the accesses to the micro and nano control store for the next control word are overlapped with execution of the current control word. To compensate for the time delay, a cycle is allowed in programming the microroutines. In addition, the microroutines are programmed to make the most likely path the most efficient. For example, decrement and branch if not zero instruction is assumed to heavily favor the branch situation, so the microroutine computes the destination address and initiates a fetch during the execution of the decrement, test, and replace computation.

Conditional branch delays are further reduced by providing a base address in the microword (NMBA in FIG. 8, format II) which can be used to initiate access to a logical row of control words. Subsequent selection of the appropriate word within the row is specified by the C0 and C1 bits output from conditional branch logic 80 in FIG. 13. In the preferred embodiment, a logical row includes four control words, one of which is selected by C0 and C1. This allows single level implementation of four-way branches. In the preferred implementation of the data processor, no macroinstruction requires more than a four-way branch at any point in the microroutine. Since a logical row is accessed for conditional branches, all of the destination control words must be on the same logical row, which somewhat restricts the location of words within the micro and nano control stores.

An illustration of a four-way conditional branch is associated with the microword labeled mulm4 in Appendix A. For the microword labeled mulm4, the column entitled DESTINATIONS includes mulm6, mulm4, mulm3, and mulm5 as potential branch destinations. Referring briefly to FIG. 10A, it will be seen that each of the four potential destinations has an address which corresponds to 00×10 10 01 (A9-A0). The address for each of the destinations is the same except for bit 7 and bit 6. Thus, these four microwords are located within one logical row of the micro control store and one microword within the row is selected by bits 6 and 7 of the control store address. Similarly, in the nano control store, the nanowords corresponding to the four potential destinations comprise one logical row within the nano control store. Thus, the C0 and C1 bits provided by address bit generator 178 in FIG. 13 ultimately become bit 7 and bit 6 of the micro control store address.

In Appendix C which follows the detailed description, a table lists the various conditional branch choices used by the microwords in the preferred embodiment of the data processor. The column labeled CBC contains the hexadecimal code for the CBC bit field (bits 6-2 of the microword). The column entitled VARIABLE specifies the conditional signal or signals upon which the branch is dependent. The column entitled SOURCE specifies the physical location from which the conditional signal or signals are derived. In Appendix D, the abbreviations used in the VARIABLE and SOURCE columns are further explained. The column entitled VALUES shows the possible logical states of the variables upon which the branch is conditioned. The columns entitled C1 and C0 show the logical values output on conductors 184 and 182 (see FIG. 13) for each of the values or combination of values. In the column entitled REMARKS, information is given for those variables which are comprised of more than one basic conditional signal. In these instances, the order in which the basic conditional signals are listed in the REMARKS column corresponds to the order in which the bits are arranged in the VALUES column. For example, the variable nz1 is a combination of the basic conditional signals n and z such that C1 equals "0" and C0 equals "1" when n equals "1" and z equals "0".

In Appendix E a table of variables is listed which corresponds to the various branch tests which can be specified by bits 11-8 of the conditional branch ($B_{CC}$) and set conditionally ($S_{CC}$) macroinstructions. The cc column gives the hexadecimal equivalent of the four-bit field in the microinstruction. The "abbreviation" and "meaning" columns specify the desired branch condition while the column entitled CONDITION indicates the logical combination of basic condition code signals required to implement the desired branch condition.

Figure 14A:
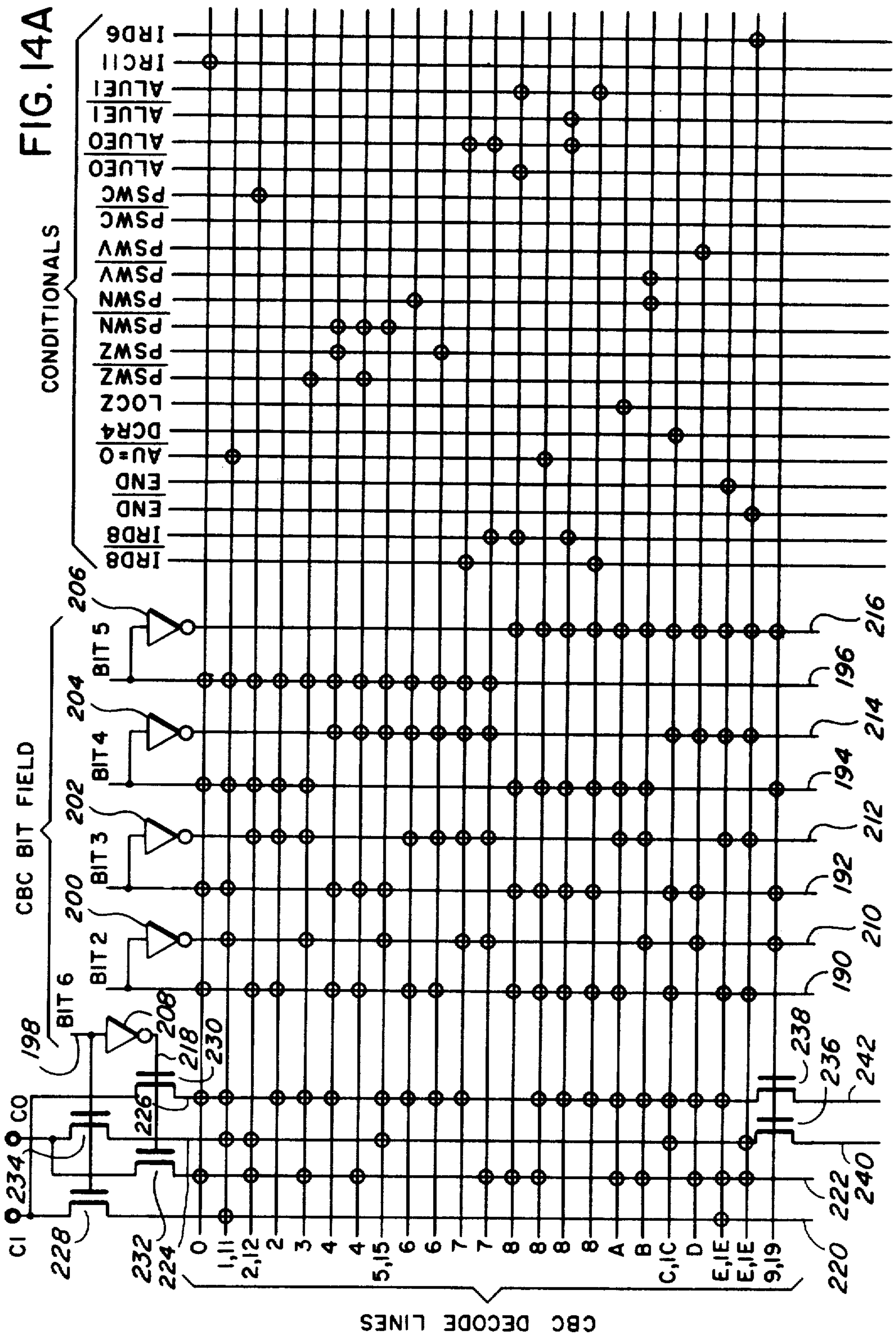
FIGS. 14A-14B illustrate circuitry for implementing the conditional branch logic unit shown in FIG. 14.
Figure 14B:
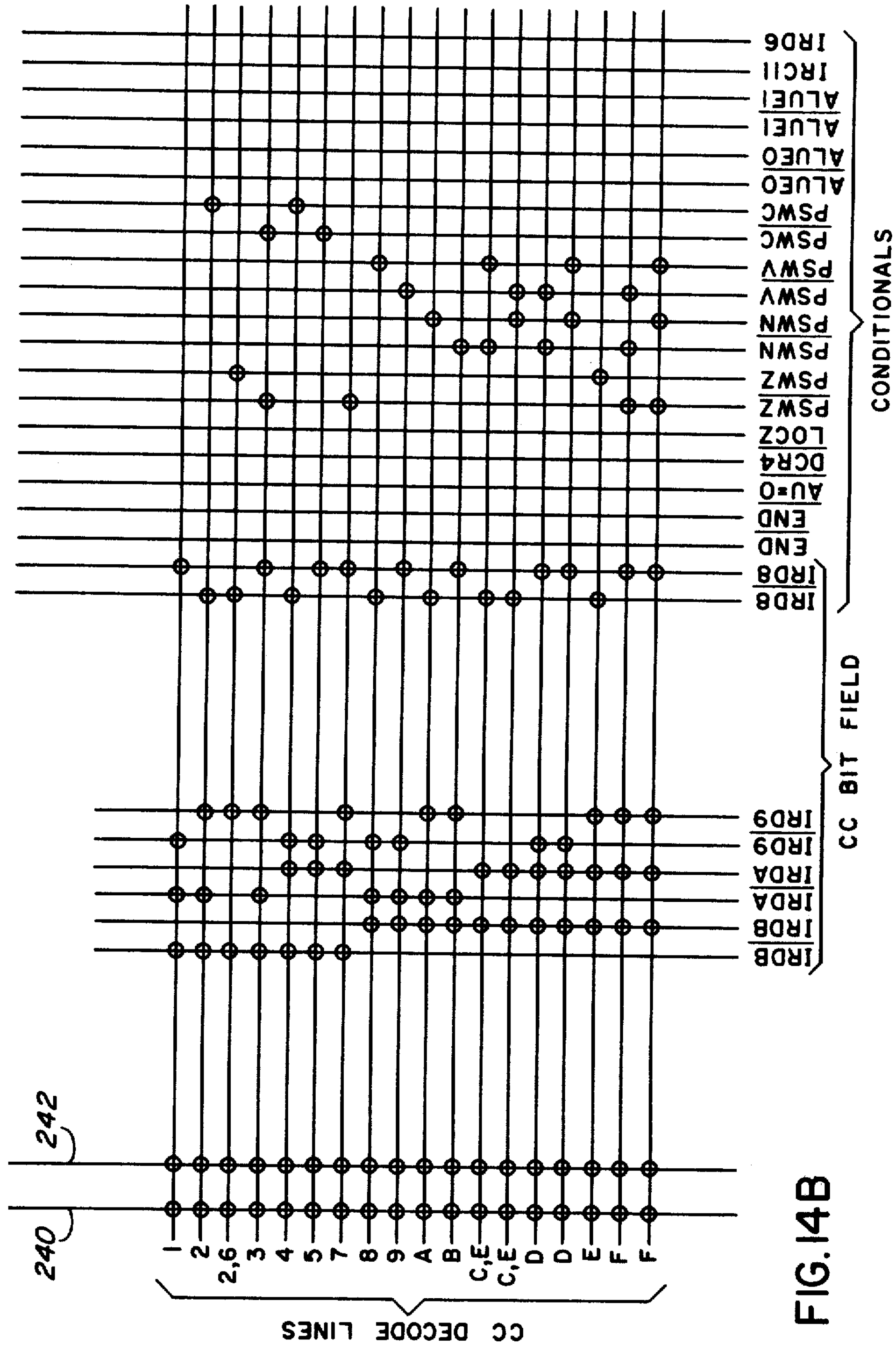

In FIGS. 14A–14B, a circuit drawing is shown which implements the branch control logic within dashed block 80 of FIG. 13. Bits 2–6 of the microword (CBC FIELD) are received by conductors 190, 192, 194, 196 and 198. Conductors 190, 192, 194, 196 and 198 are coupled to inverters 200, 204, 206 and 208 for providing the complement of each of the bits in the CBC field on conductors 210, 212, 214, 216 and 218. Conductors 190, 192, 194 and 196 and complement conductors 210, 212, 214 and 216, corresponding to the four lesser significant bits of the CBC field, are decoded in a PLA structure similar to the one described in FIG. 9. These conductors are intersected by conductors which have been generally designated CBC decode lines which are labeled at the left-most portion of FIG. 14. The label associated with each CBC decode line is the hexadecimal equilavent of the CBC bit field which enables that particular decode line. Some of the decode lines are labeled with two numbers such as "1, 11" indicating that the decode line is enabled regardless of the logic state of bit 6 in the CBC field. In other instances, two or more of the decode lines may have the same label, indicating that all such decode lines may be enabled simultaneously.

Also intersecting the CBC decode lines are a plurality of conductors designated generally CONDITIONALS, including IRD8, $\overline{\textbf{IRD8}}$ and END through IRD6. The conditional signals conducted by these lines are provided by various portions of the data processor as explained in Appendix D. The intersection of the conditionals conductors with the CBC decode lines allows the logic state of the one or more decode lines selected by CBC bits 2–5 to be determined by the conditional signals.

Also intersecting the CBC decode line are conductors 220, 222, 224 and 226. Each of these conductors will be pulled to ground level if any of the CBC decode lines with which it intersects (where an intersection is designated by a bubble) is at a high level. Conductor 220 is coupled to output terminal C1 by MOSFET 228 which is enabled when CBC bit 6 is a logic "1". Similarly, conductor 226 is coupled to output terminal C1 by MOSFET 230 which has its gate coupled to the output of inverter 208 and is enabled when CBC bit 6 is a logic "0". Conductors 222 and 224 are coupled to output terminal C0 by MOSFETS 232 and 234, respectively, which have their gate terminals coupled to conductors 218 and 198, respectively. MOSFET 232 is enabled when CBC bit 6 is a logic "0", and MOSFET 234 is enabled when CBC bit 6 is a logic "1". The logic values output on terminals C1 and C0 correspond to those listed in Appendix C.

The CBC decode line labeled "9, 19" in FIG. 14A corresponds to the rows labeled 9 and 19 in Appendix C where the conditional branch is determined by the cc field of the macroinstruction. CBC decode line "9, 19" is coupled to the gate terminals of MOSFETS 236 and 238 which are enabled whenever CBC decode line "9, 19" is enabled. MOSFETS 236 and 238 couple conductors 224 and 226 to conductors 240 and 242, respectively. Conductors 240 and 242 are intersected by conductors designated generally cc decode lines in FIG. 14B. The cc decode lines are intersected by a group of lines designated generally CC BIT FIELD which conduct signals provided by bit 11 through bit 8 of the IRD register and signals which are the complement of these bits. These bits of the IRD register correspond to the cc field in $B_{CC}$ and $S_{CC}$ macroinstructions. The lines designated CC BIT FIELD and the lines previously designated CONDITIONALS overlap in that the IRD8 and $\overline{\textbf{IRD8}}$ lines serve as conditional signals for the CBC decode lines. The cc decode lines are intersected by a subset (PSWZ, PSWN, PSWV, PSWC and their complements) of the conditionals conductors which intersected the CBC decode lines. Each of the cc decode lines is labeled at the left-most portion of FIG. 14B such that the labels are the hexadecimal equivalent of the 4-bit cc field which selects that particular cc decode line. A cc decode line is at a high level only if it is selected by the cc bit field and the logic expression in Appendix E for the associated cc field is true. When a cc decode line is at a high level, conductors 240 and 242 are pulled to ground such that conductors 224 and 226 are also grounded provided that CBC decode line 9,19 is enabled.

Thus the conditional branch choice specified by output terminals C1 and C0 may be determined by the CBC field in the microword or directly by the cc field in the macroinstruction. Also, by deferring the final selection of the C1 and C0 output signals to CBC bit 6, the structure allows two different conditional branch microinstructions to share a single common destination. An example of this latter feature is illustrated by the microword blocks labeled bbci1 and bbcw1 in Appendix H, page BH. The branch destination for both of these microword blocks is microword block bbci3 if the condition specified by the cc field is TRUE. However, the branch destination from bbci1 is bbci2 if the condition is FALSE while the branch destination from bbcw1 is bbcw3 if the condition is FALSE. In the example, the CBC field of one of the microwords bbci1 and bbcw1 would be 9 (hex) while the CBC field of the other microword would be 19 (hex). Thus, bits 2 through 5 of the CBC field select a condition to be tested while bit 6 of the CBC field selects one of a set of possible output states associated with the selected condition for transmission to the C1 and C0 output terminals.

ALU AND CONDITION CODE CONTROL UNIT

Figure 15:
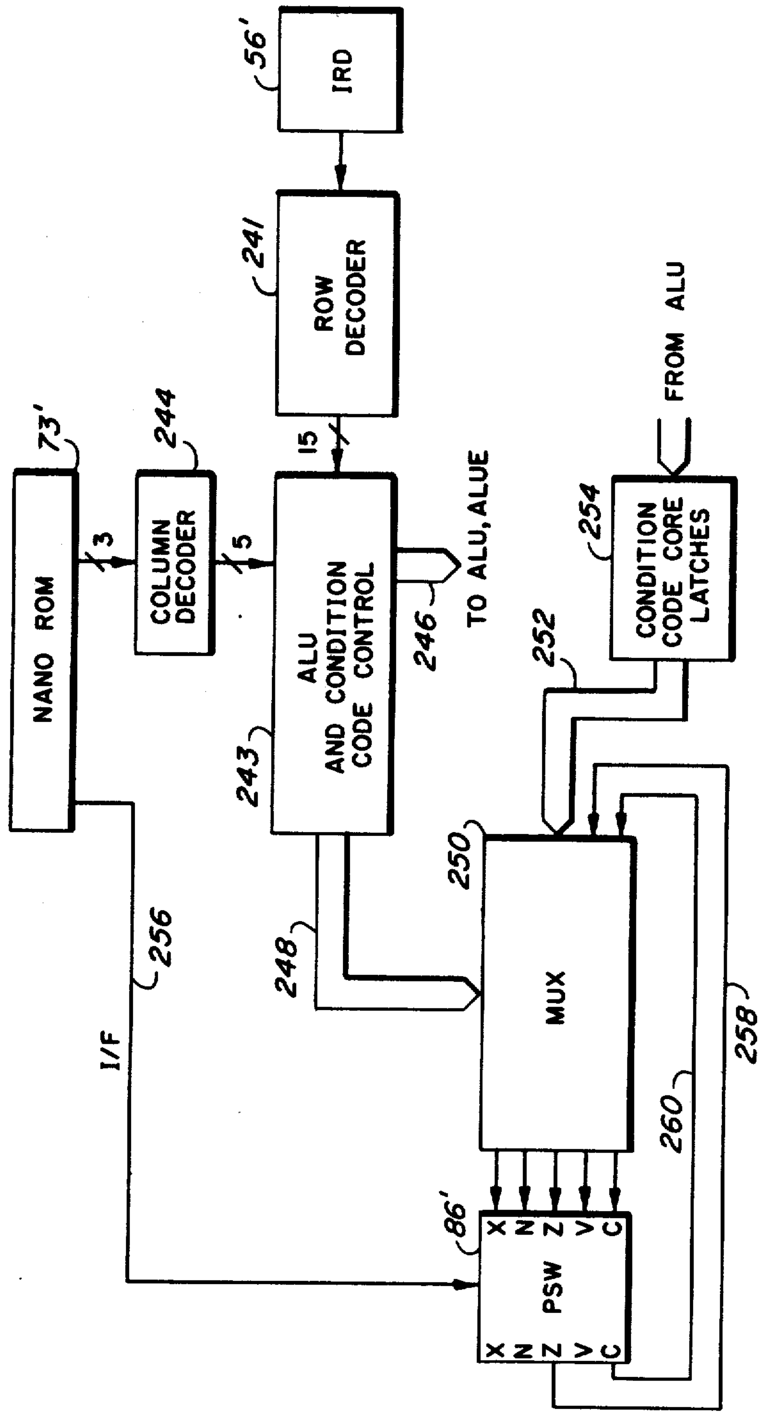
FIG. 15 is a block diagram illustrating the function of an ALU and Condition Code Control unit employed by the data processor for controlling the function of the ALU and controlling the setting of the condition codes.

FIG. 15 is a block diagram of an ALU and condition code control unit which may be used with a microprogrammed data processor. IRD register 56' corresponds to IRD register 56 in FIG. 4 and stores a macroinstruction. Row decoder 241 is coupled to the output of the IRD register 56', and the output of row decoder 241 is coupled to ALU and condition code control block 243 by 15 row selection lines. Row decoder 241 is responsive to the macroinstruction stored by IRD register 56' in order to enable one of the 15 row selection lines. ALU and condition code control block 243 is arranged as a matrix of 15 rows and 5 columns, and row decoder 241 selects one of the 15 rows within block 243.

Nano ROM 73' corresponds to nano ROM 73 shown in FIG. 4. Three bits of the output of nano ROM 73' are coupled to column decoder 244. The output of column decoder 244 is coupled to ALU and condition control blocks 243 by five column selection lines which select one of the five columns within the row selected by row decoder 241.

Generally, macroinstructions are executed by performing a sequence of operations in the execution unit. The particular set of operations required to perform a macroinstruction is macroinstruction-static, that is, it remains fixed during the execution of the macroinstruction, and is specified by decoding the instruction type from the IRD register 56'. The set of operations to be performed by the ALU for any particular macroinstruction is stored within one of the 15 rows within block 243. Each operation in the row defines both the ALU activity and the loading of the condition codes. Nano Rom 73' provides state information for the proper sequencing of the operations within the selected row. During each microcycle, column decoder 244 selects the column within the selected row which contains the operation next to be performed in the sequence of operations. Thus ALU and condition code control block 243 combines the state information of the nano control store with the function information extracted from the instruction register in order to execute each macroinstruction. Block 243 provides timing and control to the ALU, ALU extender (ALUE) and to the condition code registers within the program status word (PSW). If the sets of operations for the various macroinstructions are properly ordered in the array contained by block 243, then the execution of most classes of macroinstruction can utilize the same nano control store sequences. For the same effective address and data types, the ADD, SUBTRACT, AND, OR, and EXCLUSIVE OR macroinstructions share the identical control store sequences.

Still referring to FIG. 15, ALU and condition code control block 243 has a first set of output lines designated 246 which are coupled to the ALU and ALUE within the execution unit (not shown). Control block 243 also provides a second group of output lines designated 248 which are coupled to a multiplexer 250. Multiplexer 250 includes a first group of inputs which are coupled by lines 252 to the output of condition code core latches 254. The input to the condition code core latches 254 is coupled to logic within the ALU (not shown) which derives status information about the operation most recently performed by the ALU. The status information latched by the condition core latches 254 is selectively coupled to program status word register 86' by multiplexer 250 under the control of the signals provided by lines 248. PSW register 86' corresponds to PSW register 86 in FIG. 4. PSW register 86' also has an input coupled to I/F line 256 which is coupled to nano ROM 73' for determining when PSW register 86' is updated. Multiplexer 250 also includes second and third inputs which are coupled by lines 258 and 260 to the Z and C outputs of PSW register 86'. Briefly described, the purpose for conductor 258 is to allow the data processor to test for a zero result in a 32-bit (double word) operation by combining the zero result for the first 16 bits with the zero result of the second 16 bits. The purpose for conductor 260 is to allow the data processor to provide a carry during decimal arithmetic.

FIG. 16 is a table of all the operations which can be performed by the ALU in conjunction with the ALU extender (ALUE). The column entitled "ALU Function" lists the function performed by each operation and, in the case of shift operations, the pattern in which the bits are shifted. In the "ALU Function" column, the symbols "a" and "d" refer to the input ports of the ALU coupled to the address bus and data bus respectively, within the data section of the execution unit. The symbol "r" refers to the ALU result. The symbol "x" refers to an arithmetic carry (PSWX) rather than the standard carry (PSWC). A symbol which has a primed notation indicates that the complement of the indicated symbol is selected. The column entitled "Into C Bit" indicates the source of the carry output signal. The symbol "cm" refers to the carry generated from the most significant position of the ALU. The symbol "msb" refers to the most significant bit of the result. For shift right and rotate right functions, the source of the carry output signal is bit 0 of the address bus in the DATA section since this bit is coupled to the least significant input of the shift network for such function. The remainder of the columns in FIG. 16 correspond to logic signals which are generated by the ALU and condition code control unit in order to control the ALU to perform the desired function.

In FIG. 17, an ALU function and condition code table is illustrated which corresponds to the array of 15 rows and 5 columns already described with regard to ALU and condition code control block 243 in FIG. 15. In the right most column of this table, all of the macroinstructions which require an ALU function or which affect the state of the condition codes are listed adjacent to the row which contains the set of operations required by the particular macroinstruction. Within each of the five columns in the table, the left most entry specifies one of the operations found in the table in FIG. 16. The right most entry contains selection signals for controlling the condition codes stored by the PSW register. The condition code control information is a five character code corresponding to the X, N, Z, V, and C condition code bits in the PSW register. The significance of these condition codes is explained below.

| Abbrev. | Meaning |
|---|---|
| X | Extend bit used for multiprecision arithmetic |
| N | Positive/negative: most significant bit of result |
| Z | Zero result |
| V | Overflow |
| C | Carry |

The key for understanding the meaning of the condition code control information listed in the table is shown below:

| Abbreviation | Meaning |
|---|---|
| K | Condition code not changed |
| D | Don't care |
| O | Condition code always reset |
| N | Update PSWN with latest N status |
| Z | Update PSWZ with latest Z status |
| V | Update PSWV with latest V status |
| C | Update PSWC with latest C status |
| $\overline{C}$ | Update PSWC with complement of latest C status |
| C* | Update PSWC with PSWC "OR"ed with carry generated during decimal correction. |
| $\overline{C}$* | Update PSWC with complement of the above. |
| A | Update PSWX, PSWC with arithmetic shift carry status |
| V' | Update PSWV with latest status of N exclusive-OR C; used for arithmetic shift left. |

If the condition code control field is left blank in the table, then the condition codes are not affected. In column 1, the condition code control information for rows 2-5 and 8-11 include two entries. The reason for having two entries is that the first entry is selected by the nano ROM in some cases while the second entry is selected by the nano ROM in other cases. The nano control word output from the nano ROM includes a 2-bit field (NCC0, NCC1) corresponding to an initiate bit and a finish bit. For columns 2-4, the same condition code control information is used if either of the initiate or finish bits is set. For column 1 of the table the first entry is selected when only the initiate bit is set. However, where only the finish bit is set, then the second entry for the condition code control information is used.

Referring briefly to FIG. 12, the description of the portion of the key block labeled "ALU FUNCTION" has been deferred until now. One, two, or three characters may appear in the ALU function portion of the microword block in Appendix H. For each of the microword blocks, the first character indicates the column of the table shown in FIG. 18 which is to be selected in order to perform the desired operation. The symbols 1—5 correspond to columns 1 through 5 in this table. The symbol "x" indicates a don't care condition. In addition, the symbol 6, which occurs in microword blocks used to perform a divide algorithm, indicates that column 4 is enabled but that the "lss" ALU function will shift a logic "1" into the least significant bit of the ALUE instead of a logic "0" as is the case when a "4" appears.

If two or more characters appear in the "ALU function" portion of the microword block, then the second character refers to the finish and initiate identification for condition code control. The symbol "f" corresponds to finish and would therefore cause the second entry in column 1 of the table shown in FIG. 17 to be used in order to control the setting of the condition code bits in the PSW register. The symbol "i" specifies initiate and would select the first entry in column 1 of the table shown in FIG. 18 for controlling the setting of the condition code bits in the PSW register. The symbol "n" indicates that the condition codes are not affected for the particular operation. Finally, for those microword blocks which contain a three character code for the "ALU FUNCTION" portion, the third character is the symbol "f" which indicates to the execution unit that a byte (8 bits) transfer is involved. An example is the microword block labeled mrgwl shown in Appendix H, page H. In these instances, only the low order 8 bits of the address bus in the DATA section of the execution unit are driven by the selected source such that only the low order 8 bits of the selected destination are changed while the upper 8 bits of the selected destination are not disturbed. Otherwise, word operation and byte operation type macroinstructions share the same basic microinstruction routines.

Referring again to FIG. 17, it should be noted that in the "addx" operation in row 3, column 2, the arithmetic carry added to the operands is the core latch copy of X rather than PSWX such that the most recent X status is used. Also in row 1, column 4, the operation performed is an "lss" operation wherein the logic state of the bit shifted into the ALUE is determined by whether column 4 or column 6 is selected by the nano control store, though column 6 does not appear as a separate column in the table. Also, in row 7, column 4, the input to the most significant bit of the ALU is PSWC, or PSWN exclusive-or PSWV, depending on whether the multiplication is unsigned or signed, respectively.

In FIG. 18, a table illustrates the decoding of the macroinstruction stored by the IRD register in order to select one of the fifteen rows in the matrix contained by the ALU and condition code control block. The macroinstructions have been grouped into 45 combinations (0-44) as determined by the bit pattern shown in the section of the table entitled Instruction Decode. In the portion of the table entitled "Row Inhibits", the numbers which appear in a given row of the table correspond to the rows in the ALU and condition code control matrix which are to be disabled whenever a macroinstruction is encountered which has the bit pattern shown in the corresponding row of the instruction decode portion of the table.

Figure 19A:
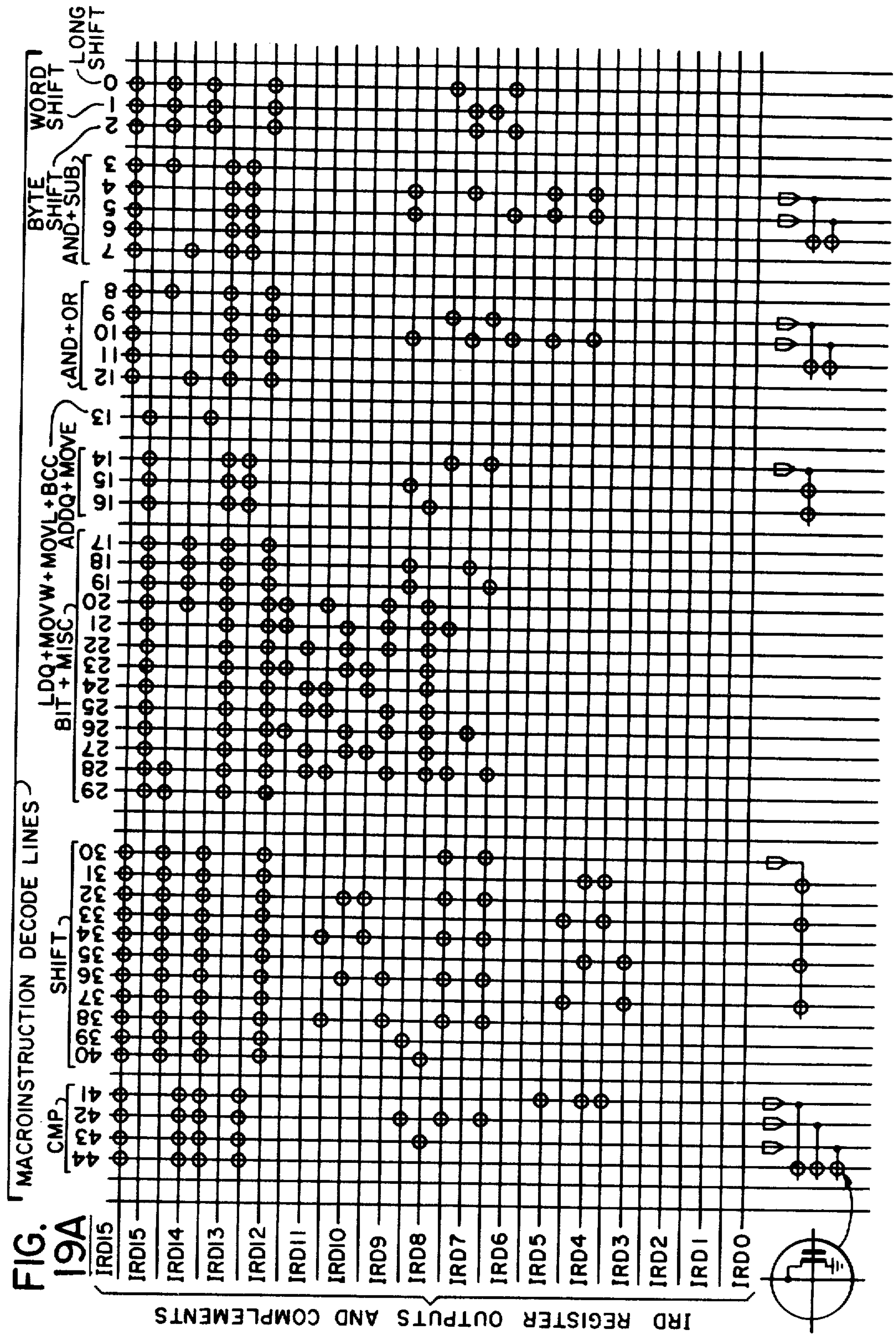
FIGS. 19A-19B illustrate PLA decoding structures responsive to the macroinstruction opcode bit fields for generating row selection lines in accordance with the table shown in FIG. 19.
Figure 19B:
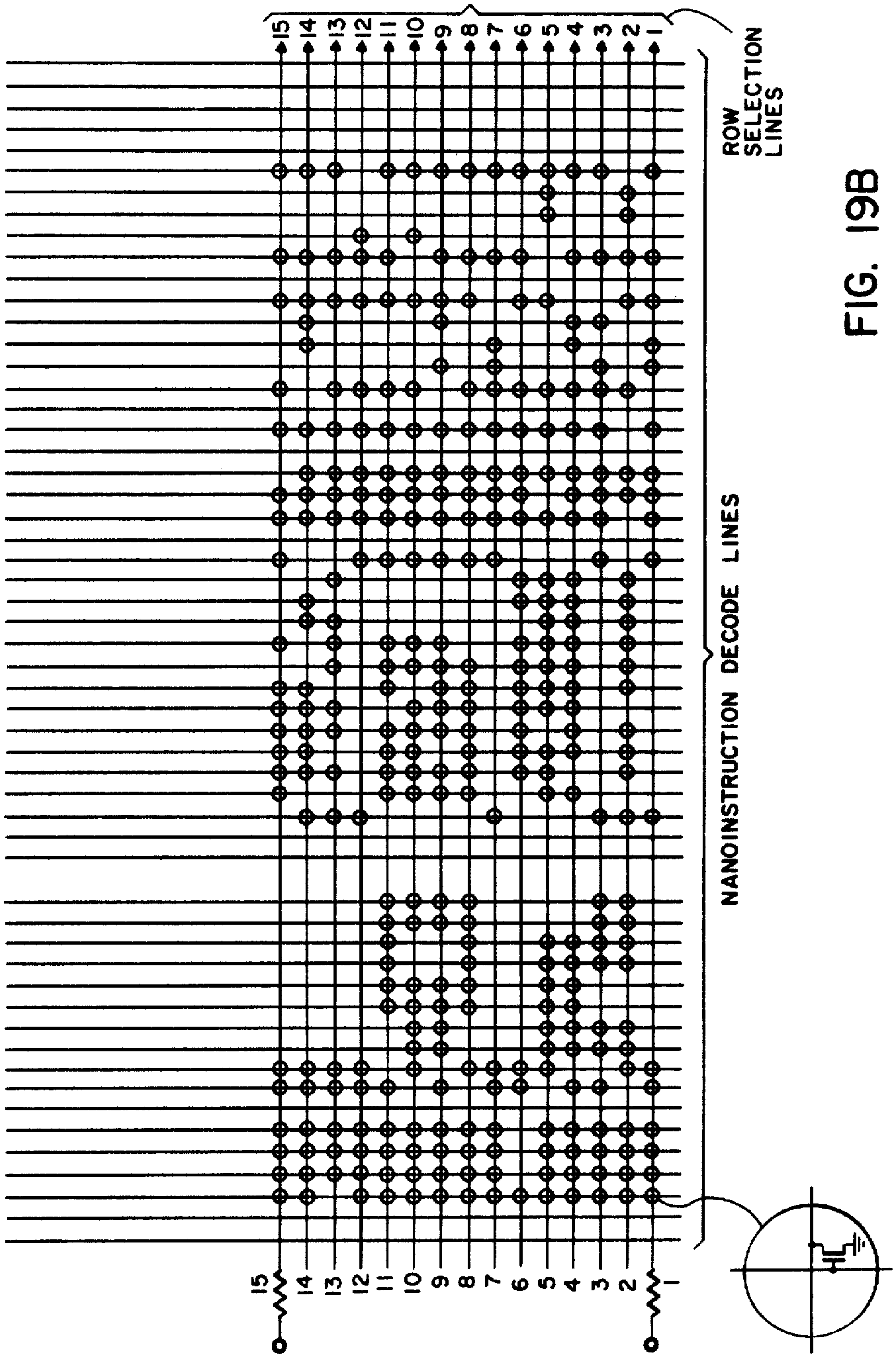

In FIGS. 19A-19B, a programmed logic array structure is illustrated for performing the decoding function described in the table of FIG. 19. In FIG. 19A, a group of lines designated IRD REGISTER OUTPUTS AND COMPLEMENTS is illustrated. Each of these lines conducts the true or complement signal of a macroinstruction bit stored in the IRD register. Intersecting this first group of lines is a second group of lines designated generally MACROINSTRUCTION DECODE LINES which continue from FIG. 19A onto FIG. 19B. The macroinstruction decode lines are labeled with a reference numeral which corresponds to a row in the table of FIG. 18. At the intersection of a line in the first group with a line in the second group (the intersection being represented by a bubble), a MOSFET device pulls the line in the second group to ground whenever a line in the first group is a logic "1". In some cases, one of the macroinstruction decode lines intersects another of the macroinstruction decode lines. For example, macroinstruction decode line 43 is shown intersecting with macroinstruction decode line 44. At this intersection, a MOSFET device operates to pull macroinstruction decode line 44 to ground whenever macroinstruction decode line 43 is a logic "1". Similarly, macroinstruction decode lines 41 and 42 also intersect macroinstruction decode line 44. Referring briefly to the table in FIG. 18, the row numbered 44 is followed by rows set off in parenthesis and labeled 41, 42 and 43. This notation is used to indicate that rows 41, 42 and 43 further decode row 44.

In FIG. 19B, the macroinstruction decode lines are intersected by a third group of lines designated generally ROW SELECTION LINES and labeled 1 through 15. The row selection lines correspond to the 15 lines coupled to the output of row decoder 241 in FIG. 15. The decoding function performed by the PLA structure shown in FIG. 19B is effective to select one of the 15 rows in the ALU and condition code control matrix based on the information supplied by the macroinstruction decode lines.

Figure 20A:
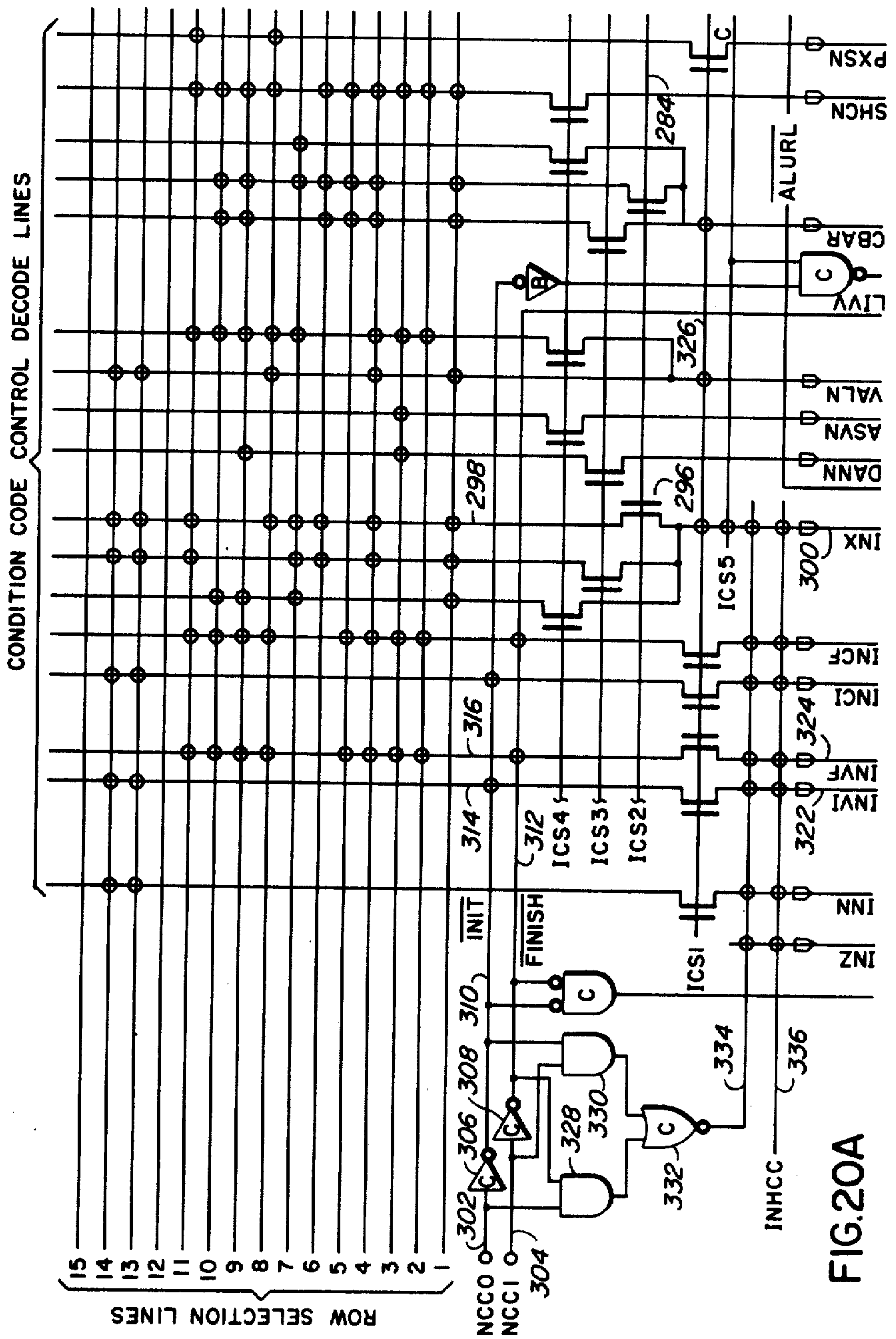
FIGS. 20A-20B illustrate circuitry for implementing the 15-row by 5-column table shown in FIG. 18 for generating the control signals used to specify the ALU function and to control setting of the condition codes.
Figure 20B:
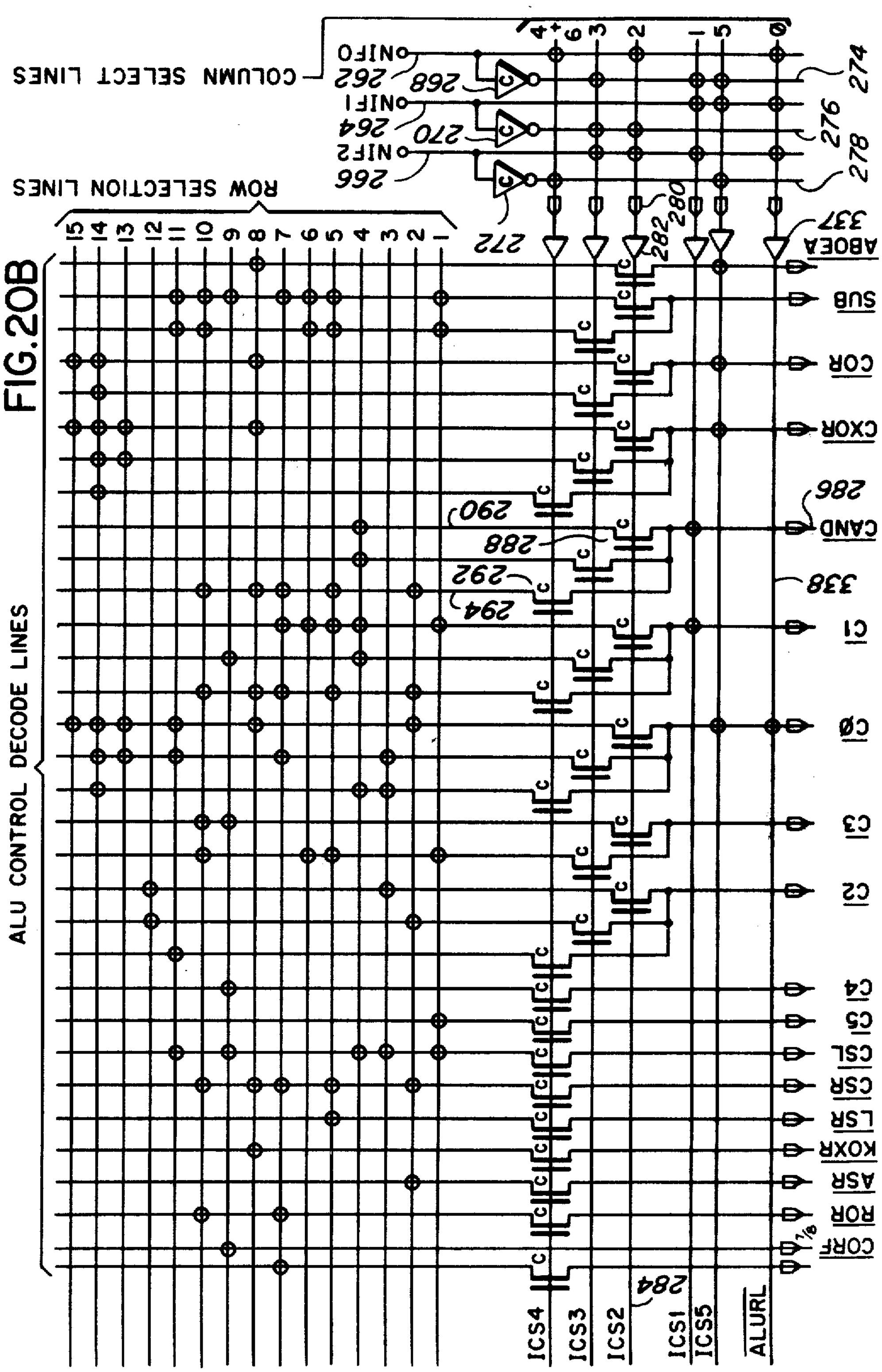

FIGS. 20A and 20B illustrate the circuit implementation of ALU and condition code control block 243 in FIG. 15. A first group of lines designated ROW SELECTION LINES is illustrated in the upper portion of FIG. 20A and FIG. 20B. This group of row selection lines corresponds to the 15 row selection lines output by the PLA structure shown in FIG. 19B. The row selection lines are intersected by a first group of lines designated ALU CONTROL DECODE LINES in FIG. 20B in order to control the signals which select the ALU function. Shown in FIG. 20B are conductors 262, 264, and 266 which receive a 3-bit field provided by the output of the nano ROM. Inverters 268, 270, and 272 are coupled to conductors 262, 264, and 266, respectively, for providing the complement signals on lines 274, 276, and 278. Lines 262, 264, 266, 274, 276 and 278 are intersected by lines designated COLUMN SELECT LINES and labeled 1,2,3,4+6,5 in order to decode the 3-bit field supplied from the nano ROM. The five lines designated column select lines correspond to the five lines coupled to the output of column decoder 244 in FIG. 16. Column selection line 2 is coupled to a load device 280 for holding column selection line 2 at a high level whenever column selection line 2 is enabled. Column selection line 2 is also coupled to a buffer device 282, and the output of buffer 282 is coupled to line 284 labeled ICS2. The other column selection lines are similarly buffered in order to drive lines ICS1, ICS2, ICS4, and ICS5.

Line 286 in FIG. 20 provides ALU control signal CAND. Referring briefly to FIG. 16, one of the columns in the table is labeled cand' and the table illustrates those operations for which the signal is active. Signal CAND is active low and the intersection of line 286 with line ICS1 causes CAND to be active whenever column 1 is selected. In FIG. 17, it will be noted that column 1 always calls for an "and" function to be performed by the ALU, and from the table in FIG. 16 it will be seen that the "and" function is one of those operations for which signal cand' is to be active. If column 2 is selected rather than column 1, then line 284 is at a high level and MOSFET 288 is enabled such that line 286 is coupled to decode line 290. In this case, line 290 is grounded such that signal CAND is active only when the row 4 selection line is enabled. Referring briefly to FIG. 17, it will be seen that within column 2 of the table, row 4 contains the only operation ("and") which requires cand' to be active. On the other hand, if column 4+6 is selected, the MOSFET 292 is enabled such that line 286 is shorted to decode line 294. Line 294 is grounded for making signal CAND active whenever row selection lines 2,5,7,8 or 10 are selected. Again referring to FIG. 18, it will be noted that the corresponding rows in column 4 of the table call for operations for which signal cand' is to be active. The remainder of the control signals which control the ALU are generated in a similar manner.

The row selection lines are also intersected by a second group of lines designated CONDITION CODE CONTROL DECODE LINES in FIG. 20A in order to generate the control signals which determine the setting of the condition code bits. The buffered column selection line ICS1-ICS5 in FIG. 20A determine which of the condition code control decode lines is coupled to the various control signals. For example, when line 284 (ICS2) is at a high level, MOSFET 296 couples decode line 298 to INX control line 300 for controlling the setting of the X bit in the program status word register (PSWX). In this example, INX control line 300 will be disabled whenever row selection lines 1,4,6,7,8,11,13, or 14 are selected. Referring briefly to the table in FIG. 17 for column 2, it will be noted that for the rows mentioned above, the symbol "k" appears for the X bit position indicating that the PSWX bit should not be changed.

Also shown in FIG. 20A are conductors 302 and 304 which receive control signals NCC0 and NCC1 which are 2 bits provided by the output of the nano control store and correspond to the initiate and finish signals previously referred to in the description of the table in FIG. 17. Conductors 302 and 304 are coupled to the input of inverters 306 and 308, respectively, for generating the signals INIT and FINISH on lines 310 and 312, respectively. Line 310 intersects decode line 314 and line 312 intersects decode line 316 such that decode line 314 is enabled when INIT is a logic "0" and decode line 316 is enabled when FINISH is a logic "0". MOSFET devices 318 and 320 couple decode lines 314 and 316 to control lines 322 and 324, respectively, and are enabled when line 326 (ICS1) is at a high level indicating that column 1 has been selected. Control lines 322 (INVI) and 324 (INVF) are gated by circuitry (not shown) in order to control the setting of the overflow bit in the program status word register (PSWV). Decode line 314 is grounded whenever rows 13 or 14 are selected while decode line 316 is grounded whenever rows 2-5 or 8-11 are selected. Referring briefly to the table in FIG. 18 in column 1, it will be noted that for an initiate type operation, the V bit in the program status word register is unchanged only in rows 13 and 14 while for the finish type operation, the V bit in the program status word register is unchanged in rows 2-5 and 8-11.

Lines 302, 304, 310, 312 are also coupled to a gating network which includes AND gates 328 and 330 and NOR gate 332 for generating a gated signal on line 334. If the signals received by conductors 302 and 304 are both logic "0", then line 334 is enabled and causes the condition code control signals to be disabled such that the condition codes in the program status word register are unchanged. This case corresponds to those microword blocks in Appendix H for which the ALU function portion indicates that the condition codes are not affected. Conductor 336 (INHCC) also intersects the condition code control lines such that these control lines are disabled when line 336 is a logic "1". Line 336 is coupled to a decoder (not shown) which detects those macroinstructions which do not affect the condition codes. In the case of these macroinstructions, line 336 is enabled in order to inhibit the condition codes in the PSW register from being affected.

Referring again briefly to FIG. 20B, a sixth column select line appears which is labeled 0 and which is coupled to the input of buffer 337 for driving conductor 338 (ALURL). The significance of this signal will now be explained. Whenever at least one of the nano control store output bits (NIF0–NIF2) received by conductors 262, 264 and 266 is a logic "1" then one of the column select lines 1-5 is enabled indicating that the ALU is to perform an operation. In this event, a temporary storage register or latch within the ALU is updated. However, during certain microcycles, no ALU function is to be performed and the latch within the ALU should not be updated. For these microcycles, conductors 262, 264 and 266 receive logic "0" signals such that column select line 0 is enabled. The ALURL signal conducted by line 338 signifies this case and inhibits activity within the ALU latch.

APPENDIX A

LIST OF MICROWORDS

| ROUTINE | LABEL | FC | NMA | TYPE | CBC | ORIGIN | ROW | DESTINATIONS | |
|---|---|---|---|---|---|---|---|---|---|
| o#w1 | o#w1 | i | | a2 | | | | | |
| ablw1 | ablw1 | i | ablw2 | db | | | | | |
| | ablw2 | i | ablw3 | db | | | | | |
| | ablw3 | d | | a3 | | | | | |
| abww1 | abww1 | i | ablw3 | db | | | | | |
| adrw1 | adrw1 | d | adrw2 | db | | | | | |
| | adrw2 | u | | a3 | | | | | |
| adsw1 | adsw1 | i | adsw2 | db | | | | | |
| | adsw2 | u | adrw2 | db | | | | | |
| e#w1 | e#w1 | i | | a2 | | | | | |
| aixw0 | aixw0 | n | aixw1 | db | | | | | |
| | aixw1 | i | | bc | i11 | | | aixw2 | aixw4 |
| | aixw2 | i | adsw2 | db | | | aiai1 | | |
| | aixw4 | i | adsw2 | db | | | aiai1 | | |
| pinw1 | pinw1 | d | pinw2 | db | | | | | |
| | pinw2 | d | | a3 | | | | | |
| pdcw1 | pdcw1 | n | pdcw2 | db | | | | | |
| | pdcw2 | d | | a3 | | | | | |
| o#l1 | o#l1 | i | o#w1 | db | | | | | |
| abll1 | abll1 | i | abll2 | db | | ablw1 | | | |
| | abll2 | i | abll3 | db | | ablw2 | | | |
| | abll3 | d | adrl2 | db | | | | | |
| abwl1 | abwl1 | i | abll3 | db | | abww1 | | | |
| adrl1 | adrl1 | d | adrl2 | db | | | | | |
| | adrl2 | d | | a3 | | | | | |
| adsl1 | adsl1 | i | adsl2 | db | | adsw1 | | | |
| | adsl2 | u | adsl3 | db | | abll3 | | | |
| | adsl3 | u | | a3 | | | | | |
| e#l1 | e#l1 | i | e#w1 | db | | | | | |
| aixl0 | aixl0 | n | aixl1 | db | | aixw0 | | | |
| | aixl1 | i | | bc | i11 | aixw1 | | aixl2 | aixl5 |
| | aixl2 | i | adsl2 | db | | aixw2 | aiai2 | | |
| | aixl5 | i | adsl2 | db | | aixw4 | aiai2 | | |
| pinl1 | pinl1 | d | pinl2 | db | | adrl1 | | | |
| | pinl2 | d | pinl3 | db | | | | | |
| | pinl3 | d | | a3 | | | | | |
| pdcl1 | pdcl1 | n | pdcl2 | db | | | | | |
| | pdcl2 | d | adrl2 | db | | | | | |
| mrgw1 | mrgw1 | i | mmrw3 | dbi | | | | | |
| mrgm1 | mrgm1 | i | mmrw3 | dbi | | | | | |
| malw1 | malw1 | i | malw2 | db | | | | | |
| | malw2 | d | malw3 | dbi | | | | | |
| | malw3 | i | b | db | | | mabb1 | | |
| maww1 | maww1 | i | maww2 | db | | | | | |
| | maww2 | d | b | db | | | | | |
| mmrw1 | mmrw1 | d | mmrw2 | db | | | | | |
| | mmrw2 | i | mmrw3 | dbi | | | mmst1 | | |
| | mmaw2 | i | mmrw3 | dbi | | | mmst1 | | |
| | mmrw3 | i | | a1 | | | | | |
| mmdw1 | mmdw1 | i | maww2 | db | | | | | |
| mmxw0 | mmxw0 | n | mmxw1 | db | | | | | |
| | mmxw1 | i | | bc | i11 | | | mmxw2 | mmxw3 |
| | mmxw2 | i | maww2 | db | | | mmmm1 | | |
| | mmxw3 | i | maww2 | db | | | mmmm1 | | |
| mmiw1 | mmiw1 | d | mmiw2 | dbi | | mmrw1 | | | |
| | mmiw2 | i | | a1 | | | | | |
| mmmw1 | mmmw1 | i | mmmw2 | dbi | | | | | |
| | mmmw2 | d | | a1 | | | | | |
| asxw1 | asxw1 | n | asxw2 | db | | pdcw1 | | | |
| | asxw2 | d | asxw3 | db | | | | | |
| | asxw3 | d | asxw4 | db | | | | | |
| | asxw4 | d | asxw5 | dbi | | | | | |
| | asxw5 | i | morw2 | db | | | | | |
| asxl1 | asxl1 | n | asxl2 | db | | pdcw1 | | | |
| | asxl2 | d | asxl3 | db | | | | | |
| | asxl3 | d | asxl4 | db | | asxw2 | | | |
| | asxl4 | d | asxl5 | db | | asxw3 | | | |
| | asxl5 | d | asxl6 | db | | asxl2 | | | |

| ROUTINE | LABEL | FC | NMA | TYPE | CBC | ORIGIN | ROW | DESTINATIONS | |
|---|---|---|---|---|---|---|---|---|---|
| | asx16 | d | asx17 | db | | | | | |
| | asx17 | d | asx18 | dbi | | | | | |
| | asx18 | i | morw2 | db | | | | | |
| mrgl1 | mrgl1 | i | mrgl2 | dbi | | mrgw1 | | | |
| | mrgl2 | i | | al | | | | | |
| mall1 | mall1 | i | mall2 | db | | | | | |
| | | | | | A-2 | | | | |
| | mall2 | d | mall3 | db | | | | | |
| | mall3 | d | malw3 | dbi | | | | | |
| mawl1 | mawl1 | i | mawl2 | db | | maww1 | | | |
| | mawl2 | d | mawl3 | db | | | | | |
| | mawl3 | d | b | db | | | | | |
| mmrl1 | mmrl1 | d | mmrl2 | db | | | | | |
| | mmrl2 | d | mmrw2 | dbi | | | | | |
| mmdl1 | mmdl1 | i | mawl2 | db | | mmdw1 | | | |
| mmxl0 | mmxl0 | n | mmxl1 | db | | mmxw0 | | | |
| | mmxl1 | i | | bc | il1 | mmxw1 | | mmxl2 | mmxl3 |
| | mmxl2 | i | mawl2 | db | | mmxw2 | mmmm2 | | |
| | mmxl3 | i | mawl2 | db | | mmxw3 | mmmm2 | | |
| mmil1 | mmil1 | d | mmil2 | db | | mmrl1 | | | |
| | mmil2 | d | mmiw2 | dbi | | mmrl2 | | | |
| mmml1 | mmml1 | i | mmml2 | dbi | | mmmw1 | | | |
| | mmml2 | d | mmmw2 | db | | | | | |
| rrgw1 | rrgw1 | i | rrgw2 | dbi | | | | | |
| | rrgw2 | i | | al | | | | | |
| rrgm1 | rrgm1 | i | rrgl2 | dbi | | | | | |
| ralw1 | ralw1 | i | ralw2 | db | | ablw1 | | | |
| | ralw2 | i | maww2 | db | | | | | |
| raww1 | raww1 | i | maww2 | db | | | | | |
| rmrw1 | rmrw1 | d | mmrw2 | dbi | | | | | |
| rmdw1 | rmdw1 | i | rmdw2 | db | | | | | |
| | rmdw2 | d | b | dbi | | | | | |
| rmxw0 | rmxw0 | n | rmxw1 | db | | aixw0 | | | |
| | rmxw1 | i | | bc | il1 | mmxw1 | | rmxw2 | rmxw3 |
| | rmxw2 | i | rmdw2 | db | | aixw2 | rmrm1 | | |
| | rmxw3 | i | rmdw2 | db | | aixw4 | rmrm1 | | |
| rmiw1 | rmiw1 | d | mmiw2 | dbi | | rmrw1 | | | |
| rmmw1 | rmmw1 | i | mmmw2 | dbi | | | | | |
| rrgl1 | rrgl1 | i | rrgl2 | dbi | | rrgw1 | | | |
| | rrgl2 | i | | al | | | | | |
| rall1 | rall1 | i | rall2 | db | | ablw1 | | | |
| | rall2 | i | rall3 | db | | ralw2 | | | |
| | rall3 | d | mawl3 | db | | | | | |
| rawl1 | rawl1 | i | rall3 | db | | raww1 | | | |
| rmrl1 | rmrl1 | d | rmrl2 | db | | | | | |
| | rmrl2 | d | rmrl3 | dbi | | | | | |
| | rmrl3 | i | | al | | | | | |
| rmdl1 | rmdl1 | i | rmdl2 | db | | rmdw1 | | | |
| | rmdl2 | d | rmdl3 | db | | rall3 | | | |
| | rmdl3 | d | rmrl3 | dbi | | rmdw2 | | | |
| rmxl0 | rmxl0 | n | rmxl1 | db | | aixw0 | | | |
| | rmxl1 | i | | bc | il1 | mmxw1 | | rmxl2 | rmxl3 |
| | rmxl2 | i | rmdl2 | db | | aixw2 | rmrm2 | | |
| | rmxl3 | i | rmdl2 | db | | aixw4 | rmrm2 | | |
| rmil1 | rmil1 | d | rmil2 | db | | rmrl1 | | | |
| | rmil2 | d | rmil3 | dbi | | | | | |
| | rmil3 | i | | al | | | | | |
| rmml1 | rmml1 | i | rmml2 | dbi | | rmmw1 | | | |
| | rmml2 | d | mmmw2 | db | | | | | |
| morw1 | morw1 | i | morw2 | dbi | | | | | |
| | morw2 | d | | al | | maww2 | | | |
| morl1 | morl1 | i | morl2 | dbi | | morw1 | | | |
| | morl2 | d | morw2 | db | | | | | |
| romw1 | romw1 | i | rrgw2 | dbi | | | | | |
| romm1 | romm1 | i | rorm2 | dbi | | romw1 | | | |
| roml1 | roml1 | i | roml2 | dbi | | romw1 | | | |
| | roml2 | i | roml3 | db | | | | | |
| | roml3 | d | | al | | | | | |
| rorw1 | rorw1 | i | rrgw2 | dbi | | | | | |

A-3

| ROUTINE | LABEL | FC | NMA | TYPE | CBC | ORIGIN | ROW | DESTINATIONS | | | |
|---|---|---|---|---|---|---|---|---|---|---|---|
| rorl1 | rorl1 | i | rorl2 | dbi | | rorw1 | | | | | |
| | rorl2 | i | rorl3 | db | | | | | | | |
| | rorl3 | n | roml3 | db | | | | | | | |
| roaw1 | roaw1 | i | roaw2 | dbi | | | | | | | |
| | roaw2 | i | | a1 | | | rosc1 | | | | |
| roal1 | roal1 | i | roal2 | dbi | | roaw1 | | | | | |
| | roal2 | i | roal3 | db | | | | | | | |
| | roal3 | n | roal4 | db | | | | | | | |
| | roal4 | n | | a1 | | | | | | | |
| rorm1 | rorm1 | i | rorm2 | dbi | | rorw1 | | | | | |
| | rorm2 | i | rorm3 | db | | rorl2 | | | | | |
| | rorm3 | n | roml3 | db | | | | | | | |
| dvur1 | dvur1 | n | dvum2 | db | | | | | | | |
| | dvur2 | n | dvur3 | db | | | | | | | |
| | dvur3 | n | trap3 | db | | | | | | | |
| dvum1 | dvum1 | n | dvum2 | db | | | | | | | |
| | dvum2 | n | | bc | z | | | dvum3 | dvur2 | | |
| | dvum3 | n | | bc | c | | trdv1 | dvum4 | dvum5 | | |
| | dvum4 | i | dvuma | dbi | | | dvdv1 | | | | |
| | dvumz | i | dvuma | dbi | | | dvdv1 | | | | |
| | dvuma | i | | a1 | | | dvdv1 | | | | |
| | dvum5 | n | | bc | n | | dvdv1 | dvum8 | dvum7 | | |
| | dvum6 | n | | bc | n | | dvdv2 | dvum8 | dvum7 | | |
| | dvum7 | n | | bc | auz | | dvdv3 | dvum6 | dvum9 | | |
| | dvum8 | n | | bc | auz | dvum7 | dvdv3 | dvumb | dvumc | | |
| | dvum9 | n | dvumd | db | | | dvdv2 | | | | |
| | dvumd | i | dvum0 | dbi | | | dvdv5 | | | | |
| | dvumb | n | | bc | c | | dvdv4 | dvum6 | dvume | | |
| | dvumc | n | | bc | c | dvum9 | dvdv4 | dvumd | dvumf | | |
| | dvume | n | dvum5 | db | | | dvdv2 | | | | |
| | dvumf | i | dvum0 | dbi | | | dvdv5 | | | | |
| | dvum0 | i | | a1 | | | | | | | |
| dvs01 | dvs01 | n | dvs03 | db | | dvur1 | | | | | |
| dvs02 | dvs02 | n | dvs03 | db | | dvum1 | | | | | |
| | dvs03 | n | | bc | nz1 | | | dvs04 | dvs05 | dvur2 | dvur2 |
| | dvs04 | n | dvs06 | db | | dvum3 | trdv1 | | | | |
| | dvs05 | n | dvs06 | db | | | trdv1 | | | | |
| | dvs06 | n | | bc | n | | | dvs07 | dvs10 | | |
| | dvs07 | n | dvs08 | db | | | dvdv6 | | | | |
| | dvs08 | n | | bc | c | dvume | | dvumz | dvs09 | | |
| | dvs09 | n | dvs0c | db | | dvum5 | | | | | |
| | dvs10 | n | dvs11 | db | | | dvdv6 | | | | |
| | dvs11 | n | dvs08 | db | | | | | | | |
| | dvs0a | n | dvs0c | db | | dvum6 | | | | | |
| | dvs0c | n | | bc | auz | dvum7 | dvdv7 | dvs0d | dvs0e | | |
| | dvs0d | n | | bc | c | dvumb | dvdv9 | dvs0a | dvs0f | | |
| | dvs0e | n | | bc | c | dvumb | dvdv9 | dvs13 | dvs12 | | |
| | dvs0f | n | dvs09 | db | | dvume | dvdv8 | | | | |
| | dvs12 | n | dvs14 | db | | dvum5 | dvdve | | | | |
| | dvs13 | n | dvs14 | db | | | dvdve | | | | |
| | dvs14 | n | dvs15 | db | | | | | | | |
| | dvs15 | n | | bc | n | | | dvs16 | dvs1d | | |
| | dvs16 | n | | bc | n | | dvdva | dvs17 | dvs1a | | |
| | dvs17 | i | | bci | n | | dvdvb | leaa2 | dvuma | | |
| | dvs1a | n | dvs1b | db | | dvs03 | dvdvb | | | | |
| | dvs1b | n | | bc | nz2 | | | dvum4 | dvs1c | dvs1c | dvs1c |
| | dvs1c | i | leaa2 | dbi | | | dvdv1 | | | | |
| | dvs1d | n | | bc | n | dvs16 | dvdva | dvs1f | dvs1e | | |
| | dvs1e | n | | bc | n | dvs1b | dvdvd | dvs1c | dvum4 | | |
| | dvs1f | n | dvs20 | dbi | | dvs03 | dvdvd | | | | |
| | dvs20 | i | | bc | nz2 | dvs17 | | dvuma | leaa2 | leaa2 | leaa2 |
| trap1 | trap1 | n | trap2 | db | | trac1 | trch1 | | | | |
| | trap2 | n | trap3 | db | | | | | | | |
| | trap3 | d | trap4 | db | | | | | | | |
| | trap4 | d | trap5 | db | | | | | | | |
| | trap5 | d | trap6 | db | | itlx4 | | | | | |
| | trap6 | i | jmal1 | db | | ldmd4 | | | | | |
| bser1 | bser1 | n | bser2 | dbc | | | | | | | |
| | bser2 | n | bser3 | db | | trac2 | | | | | |
| | bser3 | d | bser4 | db | | trap3 | | | | | |
| | bser4 | d | bser5 | db | | | | | | | |
| | bser5 | d | bser6 | db | | trap3 | | | | | |
| | bser6 | d | trap3 | db | | | | | | | |

| ROUTINE | LABEL | FC | NMA | TYPE | CBC | ORIGIN | RUN TIME | DESTINATIONS |
|---|---|---|---|---|---|---|---|---|
| itlx1 | itlx1 | n | itlx2 | db | | trac1 | | |
| | itlx2 | n | itlx3 | db | | | | |
| | itlx3 | n | itlx4 | db | | | | |
| | itlx4 | d | itlx5 | db | | | | |
| | itlx5 | a | itlx6 | db | | | | |
| | itlx6 | n | itlx7 | db1 | | dvumb | | |
| | itlx7 | n | trap4 | db | | | | |
| trac1 | trac1 | n | trac2 | db | | | | |
| | trac2 | n | trap3 | db | | | | |
| mpow1 | mpow1 | i | mpow2 | db | | adsw1 | | |
| | mpow2 | d | mpow3 | dbi | | | | |
| | mpow3 | d | b | db | | | | |
| mpol1 | mpol1 | i | mpol2 | db | | adsw1 | | |
| | mpol2 | d | mpol3 | dbi | | | | |
| | mpol3 | d | mpow2 | db | | | | |
| mpiw1 | mpiw1 | i | mpiw2 | db | | adsw1 | | |
| | mpiw2 | d | mpiw3 | db | | | | |
| | mpiw3 | d | mpiw4 | dbi | | | | |
| | mpiw4 | i | | a1 | | | | |
| mpil1 | mpil1 | i | mpil2 | db | | adsw1 | | |
| | mpil2 | d | mpil3 | db | | mpiw2 | | |
| | mpil3 | d | mpil4 | db | | | | |
| | mpil4 | d | mpiw3 | db | | | | |
| cmmw1 | cmmw1 | d | cmmw2 | db | | | | |
| | cmmw2 | d | cmmw3 | db | | | | |
| | cmmw3 | d | cmmw4 | dbi | | | | |
| | cmmw4 | i | | a1 | | | | |
| cmml1 | cmml1 | d | cmml2 | db | | cmmw1 | | |
| | cmml2 | d | cmml3 | db | | cmmw2 | | |
| | cmml3 | d | cmml4 | db | | | | |
| | cmml4 | d | cmml5 | dbi | | cmmw3 | | |
| | cmml5 | d | cmml6 | db | | | | |
| | cmml6 | i | cmml7 | db | | | | |
| | cmml7 | i | | a1 | | | | |
| exge1 | exge1 | i | exge2 | dbi | | | | |
| | exge2 | i | rcal3 | db | | | | |
| asbb1 | asbb1 | n | asbb2 | db | | pdcw1 | | |
| | asbb2 | d | asbb3 | db | | asxw2 | | |
| | asbb3 | d | asbb4 | db | | asxw3 | | |
| | asbb4 | d | asbb5 | dbi | | asxw4 | | |
| | asbb5 | i | asbb6 | db | | | | |
| | asbb6 | i | morw2 | db | | | | |
| rbrb1 | rbrb1 | i | rbrb2 | dbi | | rorw1 | | |
| | rbrb2 | i | rbrb3 | db | | asbb6 | | |
| | rbrb3 | n | | a1 | | | | |
| b | b | i | mmrw3 | dbi | | | | |
| maqw1 | maqw1 | i | morw2 | dbi | | | | |
| maql1 | maql1 | i | morl2 | dbi | | maqw1 | | |
| raqw1 | raqw1 | i | roaw2 | dbi | | | | |
| raql1 | raql1 | i | roal2 | dbi | | raqw1 | | |
| rlql1 | rlql1 | i | mmrw3 | dbi | | A-5 | | |
| halt1 | halt1 | d | halt1 | db | | dvumb | | |
| stop1 | stop1 | n | | a1 | | | | |
| cpmm1 | cpmm1 | i | cprm2 | dbi | | romw1 | | |
| cpdw1 | cpdw1 | i | mmrw3 | dbi | | | | |
| cpdl1 | cpdl1 | i | cpdl2 | dbi | | cpdw1 | | |
| | cpdl2 | i | | a1 | | | | |
| rcaw1 | rcaw1 | i | rcaw2 | dbi | | roaw1 | | |
| | rcaw2 | i | | a1 | | | | |
| rcal1 | rcal1 | i | rcal2 | dbi | | roaw1 | | |
| | rcal2 | i | rcal3 | db | | | | |
| | rcal3 | n | | a1 | | | | |
| cpmw1 | cpmw1 | i | rcaw2 | dbi | | romw1 | | |
| cpml1 | cpml1 | i | cpml2 | dbi | | romw1 | | |
| | cpml2 | i | rcal3 | db | | | | |
| cprw1 | cprw1 | i | rcaw2 | dbi | | rorw1 | | |
| cprl1 | cprl1 | i | cprl2 | dbi | | rorw1 | | |
| | cprl2 | i | rcal3 | db | | | | |
| cprm1 | cprm1 | i | cprm2 | dbi | | rorw1 | | |
| | cprm2 | i | rcal3 | db | | | | |
| stiw1 | stiw1 | n | stiw2 | db | | trac1 | | |
| | stiw2 | n | stiw3 | db | | | | |
| | stiw3 | n | stiw4 | db | | | | |
| | stiw4 | n | malw3 | db | | | | |

| ROUTINE | LABEL | FC | NMA | TYPE | CBC | ORIGIN | ROW | DESTINATIONS | | | |
|---|---|---|---|---|---|---|---|---|---|---|---|
| rstw1 | rstw1 | n | stiw4 | db | | | | | | | |
| mstw1 | mstw1 | n | stiw4 | db | | | | | | | |
| stmw1 | stmw1 | i | stmw2 | dbi | | | | | | | |
| | stmw2 | i | morw2 | db | | | | | | | |
| strw1 | strw1 | i | strw2 | dbi | | trac1 | | | | | |
| | strw2 | i | rcal3 | db | | | | | | | |
| tsmw1 | tsmw1 | i | mmrw3 | dbi | | | | | | | |
| tsrw1 | tsrw1 | i | mmrw3 | dbi | | rrgw1 | | | | | |
| tsml1 | tsml1 | i | tsml2 | dbi | | tsmw1 | | | | | |
| | tsml2 | i | | a1 | | | | | | | |
| tsrl1 | tsrl1 | i | tsrl2 | dbi | | rrgw1 | | | | | |
| | tsrl2 | i | | a1 | | | | | | | |
| susp1 | susp1 | i | extr2 | dbi | | exga1 | | | | | |
| lusp1 | lusp1 | i | leaa2 | dbi | | leaa1 | | | | | |
| swap1 | swap1 | i | swap2 | dbi | | | | | | | |
| | swap2 | i | | a1 | | | | | | | |
| rset1 | rset1 | n | rset2 | db | | stop1 | | | | | |
| | rset2 | n | rset3 | dbi | | | | | | | |
| | rset3 | a | rset4 | db | | | rsrs1 | | | | |
| | rset4 | a | | bc | auz | dvumb | | rset3 | rset5 | | |
| | rset5 | i | | a1 | | | rsrs1 | | | | |
| rstp1 | rstp1 | n | rstp2 | dbc | | | | | | | |
| | rstp2 | n | rstp3 | db | | | | | | | |
| | rstp3 | i | rstp4 | db | | | | | | | |
| | rstp4 | i | rstp5 | db | | rstp3 | | | | | |
| | rstp5 | i | jmal1 | db | | | | | | | |
| mulr1 | mulr1 | i | mulm2 | dbi | | | | | | | |
| mulm1 | mulm1 | i | mulm2 | dbi | | | | | | | |
| | mulm2 | i | | bc | ms0 | rorl2 | | mulm4 | mulm3 | mulm4 | mulm5 |
| | mulm3 | n | mulm4 | db | | | mumu1 | | | | |
| | mulm4 | n | | bc | m01 | | mumu1 | mulm6 | mulm4 | mulm3 | mulm5 |
| | mulm5 | n | mulm4 | db | | | mumu1 | | | | |
| | mulm6 | n | | a1 | | | mumu1 | | | | |
| nnmw1 | nnmw1 | i | morw2 | dbi | | | | | | | |
| nnrw1 | nnrw1 | i | roaw2 | dbi | | | | | | | |
| nnml1 | nnml1 | i | nnml2 | dbi | | nnmw1 | | | | | |
| | nnml2 | i | morw2 | db | | | | | | | |
| nnrl1 | nnrl1 | i | nnrl2 | dbi | | nnrw1 | | | | | |
| | nnrl2 | i | roal4 | db | | | | | | | |
| | | | | | | A-6 | | | | | |
| nbcr1 | nbcr1 | i | nbcr2 | dbi | | nnrw1 | | | | | |
| | nbcr2 | i | nbcr3 | db | | asbb6 | | | | | |
| | nbcr3 | n | | a1 | | | nbsr1 | | | | |
| nbcm1 | nbcm1 | i | asbb6 | dbi | | | | | | | |
| extr1 | extr1 | i | extr2 | dbi | | | | | | | |
| | extr2 | i | | a1 | | | | | | | |
| jsal1 | jsal1 | i | jsal2 | db | | ablw1 | | | | | |
| | jsal2 | i | jsaw2 | db | | | | | | | |
| jsrd1 | jsrd1 | n | jsrd2 | db | | | | | | | |
| | jsrd2 | i | jsrd3 | db | | | | | | | |
| | jsrd3 | i | jsaw2 | db | | | | | | | |
| jsaw0 | jsaw0 | n | jsaw1 | db | | | | | | | |
| | jsaw1 | i | jsaw2 | db | | | | | | | |
| | jsaw2 | d | jsaw3 | db | | | | | | | |
| | jsaw3 | d | b | dbi | | | | | | | |
| jsra1 | jsra1 | i | jsaw2 | db | | | | | | | |
| jsrx0 | jsrx0 | n | jsrx1 | db | | aixw0 | | | | | |
| | jsrx1 | n | | bc | i11 | | | jsrx2 | jsrx3 | | |
| | jsrx2 | n | jsrd2 | db | | | jsjs1 | | | | |
| | jsrx3 | n | jsrd2 | db | | | jsjs1 | | | | |
| jmaw1 | jmaw1 | n | jmal2 | db | | jsaw0 | | | | | |
| jmpa1 | jmpa1 | i | b | db | | | | | | | |
| jmal1 | jmal1 | i | jmal2 | db | | ablw1 | | | | | |
| | jmal2 | i | b | db | | | | | | | |
| jmpd1 | jmpd1 | n | bbci3 | db | | jsrd1 | | | | | |
| jmpx0 | jmpx0 | n | jmpx1 | db | | aixw0 | | | | | |
| | jmpx1 | n | | bc | i11 | jsrx1 | | jmpx2 | jmpx3 | | |
| | jmpx2 | n | bbci3 | db | | jsrx2 | jmjm1 | | | | |
| | jmpx3 | n | bbci3 | db | | jsrx3 | jmjm1 | | | | |
| dcnt1 | dcnt1 | n | dcnt2 | db | | | | | | | |
| | dcnt2 | i | | bci | ze | | | dcnt4 | dcnt3 | | |
| | dcnt3 | i | dcnt5 | db | | rcaw2 | dcdc1 | | | | |
| | dcnt4 | i | b | db | | rorl2 | dcdc1 | | | | |
| | dcnt5 | i | mmrw3 | db | | b | | | | | |

| ROUTINE | LABEL | FC | NMA | TYPE | CBC | ORIGIN | ROW | DESTINATIONS | |
|---|---|---|---|---|---|---|---|---|---|
| bbci1 | bbci1 | n | | bc | cc | dcnt1 | mabb1 | bbci2 | bbci3 |
| | bbci2 | n | b | db | | rcal3 | | | |
| | bbci3 | i | b | db | | | | | |
| bbcw1 | bbcw1 | n | | bc | cc | | | bbcw3 | bbci3 |
| | bbcw3 | n | malw3 | db | | rcal3 | mabb1 | | |
| laal1 | laal1 | i | laal2 | db | | o#l1 | | | |
| | laal2 | i | b | db | | o#w1 | | | |
| laaw1 | laaw1 | i | b | db | | | | | |
| leaa1 | leaa1 | i | leaa2 | dbi | | | | | |
| | leaa2 | i | | al | | | dvdv1 | | |
| lead1 | lead1 | i | lead2 | db | | | | | |
| | lead2 | i | b | db | | | | | |
| leax0 | leax0 | n | leax1 | db | | aixw0 | | | |
| | leax1 | i | | bc | i11 | aixw1 | | leax2 | leax3 |
| | leax2 | i | leax4 | db | | | lelx1 | | |
| | leax3 | i | leax4 | db | | | lelx1 | | |
| | leax4 | n | b | db | | | | | |
| peax0 | peax0 | n | peax1 | db | | aixw0 | | | |
| | peax1 | i | | bc | i11 | aixw1 | | peax2 | peax3 |
| | peax2 | i | peax4 | db | | aixw2 | pepx1 | | |
| | peax3 | i | peax4 | db | | aixw4 | pepx1 | | |
| | peax4 | n | peax5 | db | | | | | |
| | peax5 | i | peax6 | db | | | | | |
| | peax6 | d | morw2 | db | | bsri2 | | | |
| paal1 | paal1 | i | paal2 | db | | ablw1 | | | |
| | paal2 | i | paaw2 | db | | | | | |
| paaw1 | paaw1 | i | paaw2 | db | | | | | |
| | paaw2 | d | mawl3 | db | | bsri2 | | | |

A-7

| ROUTINE | LABEL | FC | NMA | TYPE | CBC | ORIGIN | ROW | DESTINATIONS | |
|---|---|---|---|---|---|---|---|---|---|
| peaa1 | peaa1 | i | peax6 | ~~bi~~ dbi | | | | | |
| pead1 | pead1 | i | pead2 | ~~b~~ db | | | | | |
| | pead2 | i | pead3 | dbi | | | | | |
| | pead3 | i | peax6 | db | | | | | |
| bsri1 | bsri1 | n | bsri2 | db | | | | | |
| | bsri2 | d | bsri3 | db | | | | | |
| | bsri3 | d | malw3 | db | | | | | |
| bsrw1 | bsrw1 | n | bsrw2 | db | | | | | |
| | bsrw2 | d | bsrw3 | db | | bsri2 | | | |
| | bsrw3 | d | malw3 | db | | | | | |
| unlk1 | unlk1 | d | unlk2 | db | | ldmr2 | | | |
| | unlk2 | d | unlk3 | dbi | | ablw1 | | | |
| | unlk3 | i | unlk4 | db | | | | | |
| | unlk4 | i | | al | | | | | |
| link1 | link1 | i | link2 | db | | | | | |
| | link2 | i | link3 | db | | jsrd3 | | | |
| | link3 | d | link4 | dbi | | | | | |
| | link4 | d | mmiw2 | db | | | | | |
| chkr1 | chkr1 | i | chkr2 | dbi | | | | | |
| | chkr2 | i | | bc | nv | | | trap1 | trap1 chkr3 trap1 |
| | chkr3 | n | | bc | n | dvumb | trch1 | chkr4 | trap1 |
| | chkr4 | n | | al | | | trch1 | | |
| chkm1 | chkm1 | i | chkr2 | dbi | | | | | |
| rtr1 | rtr1 | d | rtr2 | db | | cmmw3 | | | |
| | rtr2 | d | rtr3 | db | | malw3 | | | |
| | rtr3 | d | rtr4 | db | | smaw2 | | | |
| | rtr4 | d | jmal2 | db | | | | | |
| rts1 | rts1 | d | rts2 | db | | cmmw3 | | | |
| | rts2 | d | rts3 | db | | ablw1 | | | |
| | rts3 | i | b | db | | | | | |
| bcsm1 | bcsm1 | i | bcsm2 | dbi | | | | | |
| | bcsm2 | d | | al | | | | | |
| bcsr1 | bcsr1 | i | bcsr2 | dbi | | exge1 | | | |
| | bcsr2 | i | | bc | d4 | | | bcsr4 | bcsr3 |
| | bcsr3 | n | bcsr5 | db | | | bcbc1 | | |
| | bcsr4 | n | | al | | | bcbc1 | | |
| | bcsr5 | n | | al | | | | | |
| bclm1 | bclm1 | i | bclm2 | dbi | | | | | |
| | bclm2 | i | bcsm2 | db | | | | | |
| bclr1 | bclr1 | i | bclr2 | dbi | | exge1 | | | |
| | bclr2 | i | | bc | d4 | bcsr2 | | bclr4 | bclr3 |
| | bclr3 | n | bclr5 | db | | bcsr3 | bcbc2 | | |
| | bclr4 | n | bcsr4 | db | | | bcbc2 | | |
| | bclr5 | n | bcsr5 | db | | bclr4 | | | |

| ROUTINE | LABEL | FC | NMA | TYPE | CBC | ORIGIN | ROW | DESTINATIONS | | | |
|---|---|---|---|---|---|---|---|---|---|---|---|
| btsm1 | btsm1 | i | mmrw3 | dbi | | | | | | | |
| btsr1 | btsr1 | i | btsr2 | dbi | | exge1 | | | | | |
| | btsi1 | i | btsr2 | dbi | | | | | | | |
| | btsr2 | i | | bc | d4 | | | bcsr4 | btsr3 | | |
| | btsr3 | n | | a1 | | | bcbc1 | | | | |
| tasr1 | tasr1 | i | tasr2 | dbi | | | | | | | |
| | tasr2 | i | | a1 | | | | | | | |
| tasm1 | tasm1 | n | tasm2 | db | | | | | | | |
| | tasm2 | d | b | db | | | | | | | |
| smal1 | smal1 | i | smal2 | db | | malw3 | | | | | |
| | smal2 | i | smal3 | db | | ablw1 | | | | | |
| | smal3 | i | smaw3 | db | | | | | | | |
| stmx1 | stmx1 | i | stmx2 | db | | | | | | | |
| | stmx2 | n | stmx3 | db | | aixw1 | | | | | |
| | stmx3 | i | | bc | il1 | | | stmx4 | stmx5 | | |
| | stmx4 | i | | bc | en1 | aixw2 | stst1 | stmr5 | mmrw2 | stmr4 | mmr |
| | stmx5 | i | | bc | en1 | aixw4 | stst1 | stmr5 | mmrw2 | stmr4 | mmr |
| smaw1 | smaw1 | i | smaw2 | db | | malw3 | A-8 | | | | |
| mbc | smaw2 | i | smaw3 | db | | | | | | | |
| mbc | smaw3 | i | | bc | en1 | | | stmr5 | mmrw2 | stmr4 | mmrw |
| stmd1 | stmd1 | i | stmd2 | db | | malw3 | | | | | |
| | stmd2 | i | stmd3 | db | | smaw2 | | | | | |
| | stmd3 | i | | bc | en1 | | | stmr5 | mmrw2 | stmr4 | mmrw |
| stmr1 | stmr1 | i | stmr2 | db | | rtr2 | | | | | |
| | stmr2 | i | | bc | en1 | | | stmr5 | mmrw2 | stmr4 | mmrw |
| | stmr4 | d | stmr6 | db | | | mmst1 | | | | |
| | stmr5 | d | | bc | en1 | stmr6 | mmst1 | stmr5 | mmrw2 | stmr4 | mmrw |
| | stmr6 | d | | bc | en1 | | | stmr5 | mmrw2 | stmr4 | mmr |
| ldmx0 | ldmx0 | i | ldmx1 | db | | malw3 | | | | | |
| | ldmx1 | n | ldmx2 | db | | aixw0 | | | | | |
| | ldmx2 | i | | bc | il1 | aixw1 | | ldmx3 | ldmx4 | | |
| | ldmx3 | i | ldmx5 | db | | | ldld1 | | | | |
| | ldmx4 | i | ldmx5 | db | | | ldld1 | | | | |
| | ldmx5 | u | ldmx6 | db | | adsw2 | | | | | |
| | ldmx6 | u | | bc | en1 | | | ldmr4 | mmaw2 | ldmr3 | mma |
| lmaw1 | lmaw1 | i | lmaw2 | db | | malw3 | | | | | |
| | lmaw2 | i | ldmr2 | db | | | | | | | |
| ldmd1 | ldmd1 | i | ldmd2 | db | | malw3 | | | | | |
| | ldmd2 | i | ldmd3 | db | | lead1 | | | | | |
| | ldmd3 | i | ldmd4 | db | | | | | | | |
| | ldmd4 | u | | bc | en1 | | | ldmr4 | mmaw2 | ldmr3 | mmau |
| lmal1 | lmal1 | i | lmal2 | db | | malw3 | | | | | |
| | lmal2 | i | lmal3 | db | | e#l1 | | | | | |
| | lmal3 | i | ldmr2 | db | | e#w1 | | | | | |
| ldmr1 | ldmr1 | i | ldmr2 | db | | malw3 | | | | | |
| | ldmr2 | d | | bc | en1 | | | ldmr4 | mmaw2 | ldmr3 | mma |
| | ldmr3 | u | ldmr5 | db | | o#l1 | mmst1 | | | | |
| | ldmr4 | u | | bc | en1 | | mmst1 | ldmr4 | mmaw2 | ldmr3 | mma |
| | ldmr5 | u | | bc | en1 | | | ldmr4 | mmaw2 | ldmr3 | mm |
| sccr1 | sccr1 | i | | bci | cc | sccb1 | | roaw2 | sccr2 | | |
| | sccr2 | i | nbcr3 | db | | sccb2 | rosc1 | | | | |
| sccb1 | sccb1 | i | | bci | cc | | | sccb3 | sccb2 | | |
| | sccb2 | i | morw2 | db | | | scsc1 | | | | |
| | sccb3 | i | morw2 | db | | smaw3 | scsc1 | | | | |
| trpv1 | trpv1 | i | | bci | v | bclm1 | | trpv2 | trpv3 | | |
| | trpv2 | i | | a1 | | | tvtv1 | | | | |
| | trpv3 | i | trap3 | db | | | tvtv1 | | | | |
| popm1 | popm1 | i | popm2 | db | | malw3 | | | | | |
| | popm2 | d | | bci | en1 | ldmr2 | | popm4 | popm6 | popm3 | popm6 |
| | popm3 | d | popm5 | db | | o#l1 | popo1 | | | | |
| | popm4 | d | | bc | en1 | ldmr4 | popo1 | popm4 | popm6 | popm3 | popm6 |
| | popm5 | d | | bc | en1 | ldmr5 | | popm4 | popm6 | popm3 | popm |
| | popm6 | i | mmrw3 | db | | | popo1 | | | | |
| push1 | push1 | i | push2 | db | | rtr2 | | | | | |
| | push2 | i | | bc | en1 | | | push5 | push3 | push4 | push3 |
| | push3 | i | mmrw3 | dbi | | popm6 | puph1 | | | | |
| | push4 | d | push6 | db | | | puph1 | | | | |
| | push5 | d | | bc | en1 | | puph1 | push5 | push3 | push4 | push |
| | push6 | d | | bc | en1 | | | push5 | push3 | push4 | push |
| srrw1 | srrw1 | i | srrw2 | dbi | | | | | | | |
| | srrw2 | i | | bc | auz | | | srrw3 | nbcr3 | | |
| | srrw3 | n | | bc | auz | | nbsr1 | srrw3 | nbcr3 | | |
| sril1 | sril1 | i | srr12 | dbi | | sriw1 | | | | | |
| sriw1 | sriw1 | i | srrw2 | dbi | | | | | | | |

| :OUTINE | LABEL | FC | NMA | TYPE | CBC | ORIGIN | ROW | DESTINATIONS | |
|---|---|---|---|---|---|---|---|---|---|
| srrl1 | srrl1 | i | srrl2 | dbi | | srrw1 | | | |
| | srrl2 | i | | bc | auz | srrw2 | | srrl3 | srrl4 |
| | srrl3 | n | | bc | auz | srrw3 | srsr1 | srrl3 | srrl4 |
| | srrl4 | n | srrl5 | db | | | srsr1 | | |
| | srrl5 | n | | a1 | | | | | |
| sftm1 | sftm1 | i | sftm2 | dbi | | tsmw1 | | | |
| | sftm2 | i | morw2 | db | | | | | |
| | zzz00 | n | halt1 | db | | | | | |
| | zzz01 | n | halt1 | db | | | | | |
| | zzz02 | n | halt1 | db | | | | | |
| | zzz03 | n | halt1 | db | | | | | |
| | zzz04 | n | halt1 | db | | | | | |
| | zzz05 | n | halt1 | db | | | | | |
| | zzz06 | n | halt1 | db | | | | | |
| | zzz07 | n | halt1 | db | | | | | |
| | zzz08 | n | halt1 | db | | | | | |
| | zzz09 | n | halt1 | db | | | | | |
| | zzz0a | n | halt1 | db | | | | | |
| | zzz0b | n | halt1 | db | | | | | |
| | zzz0c | n | halt1 | db | | | | | |
| | zzz0d | n | halt1 | db | | | | | |
| | zzz0e | n | halt1 | db | | | | | |
| | zzz0f | n | halt1 | db | | | | | |
| | zzz10 | n | halt1 | db | | | | | |
| | zzz11 | n | halt1 | db | | | | | |
| | zzz12 | n | halt1 | db | | | | | |
| | zzz14 | n | halt1 | db | | | | | |
| | zzz15 | n | halt1 | db | | | | | |
| | zzz17 | n | halt1 | db | | | | | |
| | zzz18 | n | halt1 | db | | | | | |
| | zzz19 | n | halt1 | db | | | | | |
| | zzz1a | n | halt1 | db | | | | | |
| | zzz1b | n | halt1 | db | | | | | |
| | zzz1c | n | halt1 | db | | | | | |
| | zzz1d | n | halt1 | db | | | | | |
| | zzz1e | n | halt1 | db | | | | | |
| | zzz1f | n | halt1 | db | | | | | |
| | zzz20 | n | halt1 | db | | | | | |
| | zzz21 | n | halt1 | db | | | | | |
| | zzz22 | n | halt1 | db | | | | | |
| | zzz23 | n | halt1 | db | | | | | |
| | zzz24 | n | halt1 | db | | | | | |

A-9

APPENDIX B

| abbrev | meaning |
|---|---|
| rx | register (data or address) designated by $R_X$ field in macroinstruction |
| rxa | address register designated by $R_X$ field in macroinstruction |
| rxd | data register designated by $R_X$ field in macroinstruction |
| rxh | upper half (16 most significant bits) of register (data or address) designated by $R_X$ field in macroinstruction |
| rxl | lower half (16 least significant bits) of register (data or address) designated by $R_X$ field in macroinstruction |
| rxdl | lower half (16 least significant bits) of data register designated by $R_X$ field in macroinstruction |
| ry | register (data or address) designated by $R_Y$ field in macroinstruction |
| rya | address register designated by $R_Y$ field in macroinstruction |
| ryd | data register designated by $R_Y$ field in macroinstruction |
| ryh | upper half (16 most significant bits) of register (data or address) designated by $R_Y$ field in macroinstruction |
| ryl | lower half (16 least significant bits) of register (data or address) designated by $R_Y$ field in macroinstruction |
| rydl | lower half (16 least significant bits) of data register designated by $R_Y$ field in macroinstruction |
| rz | register (data or address) designated by 4-bit field of second word of macro-instructions using indexed addressing for specifying register to be used as the index |
| rzl | lower half (16 least significant bits) of register described immediately above |
| db | DATA BUS (including high, low, and data sections) |
| dbh | DATA BUS (high section only) |
| dbl | DATA BUS (low section only) |
| dbd | DATA BUS (data section only) |
| db* | DATA BUS (at least data section) |
| dbe | sign extend sign bit onto high section of DATA BUS |
| edb | external data bus |
| dbin | data bus input buffer (including a latch) coupled to external data bus |
| dbinh | upper byte (8 most significant bits) of data bus input buffer |
| dbinl | lower byte (8 least significant bits) of data bus input buffer |
| dob | data bus output buffer coupled to external data bus |
| dobh | upper byte (8 most significant bits) of data bus output buffer |
| dobl | lower byte (8 least significant bits) of data bus output buffer |
| ab | ADDRESS BUS (including high, low, and data sections) |
| abh | ADDRESS BUS (high section only) |
| abl | ADDRESS BUS (low section only) |
| abd | ADDRESS BUS (data section only) |

-continued

APPENDIX B

| abbrev | meaning |
|---|---|
| ab* | ADDRESS BUS (at least data section) |
| abe | sign extend sign bit onto high section of ADDRESS BUS |
| aob | address output buffer coupled to external address bus |
| * | ADDRESS BUS (high, low, and data sections) or alternatively DATA BUS (high, low, and data sections) |
| *e | sign extend sign bit onto high section of ADDRESS BUS or alternatively onto high section of DATA BUS |
| psw | program status word which stores condition codes, interrupt level, trace mode bit, supervisor mode bit |
| psws | supervisor mode bit in the program status word |
| ssw | special word which monitors status of current microinstruction; accessed in event of address error or bus error to aid processor in recovery from error |
| at | temporary address register |
| ath | upper half (16 most significant bits) of temporary address register |
| atl | lower half (16 least significant bits) of temporary address register |
| sp | user or supervisor stack pointer |
| sph | upper half (16 most significant bits) of user or supervisor stack pointer |
| spl | lower half (16 least significant bits) of user or supervisor stack pointer |
| pc | program counter register |
| pch | upper half (16 most significant bits) of program counter register |
| pcl | lower half (16 least significant bits) of program counter register |
| dcr | decoder in data section of execution unit which is used for bit manipulation |
| reset pren | used during instruction which specifies access to multiple registers in order to advance encoder to the address of the next register to be accessed |
| ftu | field translation unit |
| idle wait | no transfers occur during this microcycle |
| tpend | a one-bit latch which indicates whether the current macroinstruction should implement a trace upon completion of the macroinstruction |
| inl | latch which stores the interrupt level of the interrupting device upon recognition of an interrupt for subsequent transfer into program status word |
| trap | stores vector which can be supplied to field translate unit for addressing a trap routine in event of trap condition (e.g. divide-by-zero) |
| corf | correction factor for decimal arithmetic which can be provided to ALU |
| 'sr c-alu-alue' | shift right used in multiply operation; carry bit coupled to msb of ALU; lsb of ALU coupled to msb of ALUE |

APPENDIX C

CBC Conditional Branch Choice

| CBC | VARIABLE | SOURCE | VALUES | C1 | CO | REMARKS |
|---|---|---|---|---|---|---|
| 0 | i11 | irc | 0 | 0 | 0 | |
| | | | 1 | 1 | 1 | |
| 1 | auz | eu | 0 | 1 | 1 | |
| | | | 1 | 0 | 1 | |
| 11 | auz | eu | 0 | 1 | 1 | |
| | | | 1 | 0 | 0 | |
| 2 | c | psw | 0 | 0 | 1 | |
| | | | 1 | 0 | 0 | |
| 12 | c | psw | 0 | 1 | 1 | |
| | | | 1 | 1 | 0 | |
| 3 | z | psw | 0 | 0 | 0 | |
| | | | 1 | 1 | 1 | |
| 4 | nz1 | psw | 00 | 1 | 0 | n^z |
| | | | 10 | 0 | 1 | |
| | | | x1 | 1 | 1 | |
| 5 | n | psw | 0 | 0 | 1 | |
| | | | 1 | 1 | 1 | |
| 15 | n | psw | 0 | 1 | 0 | |
| | | | 1 | 1 | 1 | |
| 6 | nz2 | psw | 00 | 1 | 1 | n^z |
| | | | 1x, x1 | 0 | 1 | |
| 7 | ms0 | eu, ird | x0 | 1 | 1 | ir[8]^alue[0] |
| | | | 01 | 0 | 1 | |
| | | | 11 | 1 | 0 | |
| 8 | m01 | eu, ird | 1xxx | 0 | 0 | auz^ir[8]^alue[1:0] |
| | | | 000x | 1 | 1 | |
| | | | 001x | 0 | 1 | |
| | | | 0100 | 1 | 1 | |
| | | | 0101 | 0 | 1 | |
| | | | 0110 | 1 | 0 | |
| | | | 0111 | 1 | 1 | |
| a | ze | eu | 0 | 1 | 1 | |
| | | | 1 | 0 | 0 | |
| b | nv | psw | x1, 0x | 1 | 1 | n^v |
| | | | 10 | 0 | 0 | |
| c | d4 | dcr | 0 | 1 | 1 | |
| | | | 1 | 0 | 1 | |
| 1c | d4 | dcr | 0 | 1 | 1 | |
| | | | 1 | 1 | 0 | |
| d | v | psw | 0 | 1 | 1 | |
| | | | 1 | 0 | 0 | |
| e | enl | eu, ird | 00 | 1 | 0 | end^ir[6] |
| | | | 10 | 1 | 1 | |
| | | | x1 | 0 | 0 | |
| 1e | enl | eu, ird | 00 | 1 | 0 | |
| | | | 10 | 1 | 1 | |
| | | | x1 | 0 | 1 | |
| 9 | cc | psw | 0 F | 0 | 1 | |
| | | | 1 T | 1 | 1 | |
| 19 | cc | psw | 0 F | 1 | 0 | |
| | | | 1 T | 1 | 1 | |

APPENDIX D

| abbrev | meaning |
|---|---|
| ill | bit 11 in IRC register (IRC11); signifies whether or not to sign extend for indexed addressing |
| auz | arithmetic unit result equals zero (AU=0) |
| c | ALU carry bit stored in program status word (PSWC) |
| z | ALU result equals zero bit stored in program status word (PSWZ) |
| nzl | logical combination of n and z condition codes (PSWN, PSWZ); used in signed-division algorithm |
| n | ALU result negative bit stored in program status word (PSWN) |
| nz2 | logical combination of n and z condition codes (PSWN, PSWZ); used in signed-division algorithm |
| mso | logical combination of bit 8 in IRD register (IRD8) and bit 0 in ALUE shift register (ALUE 0); used in multiply algorithm |
| m01 | logical combination of auz (AU=0); bit 8 in IRD register (IRD8), and bits 1 and 0 in ALUE shift register (ALUE1, ALUE0); used in multiply algorithm |
| ze | local copy of ALU result equal to zero (LOCZ); local copy required apart from z bit in program status word for operations which must test ALU=0 without changing program status word, such as "Decrement Counter and Branch if Non-Zero" (DCNT) macroinstruction |
| nv | logical combination of n and v condition codes (PSWN, PSWV); used in "Check Register Against Bounds" (CHK) macroinstruction |
| d4 | bit 4 of the decoder in the data section of the execution unit used for bit manipulation (DCR4); bit 4 specifies whether upper half or lower half of 32-bit register is required for bit manipulation |
| v | ALU result overflow bit stored in program status word (PSWV) |

-continued

APPENDIX D

| abbrev | meaning |
|---|---|
| enl | logical combination of bit 6 in IRD register (IRD6) and signal generated by the multiple register access encoder in execution unit which indicates that all registers specified have been accessed (END) |
| cc | 4-bit field of macroninstruction stored in IRD register (IRDB-IRD8) which specifies conditions to be tested for "Branched Conditionally" (Bcc) and "Set According to Condition" (Scc) macroinstructions |
| irc | IRC register 52 in FIG. 4 |
| eu | execution unit |
| psw | program status word register 86 in FIG. 4 |
| ird | IRD register 56 in FIG. 4 |
| dcr | bit manipulation decoder in data section of execution unit |

APPENDIX E

| cc | abbrev | meaning | condition |
|---|---|---|---|
| 0 | — | branch always, set always | |
| 1 | — | never branch, reset always | |
| 2 | HI | high | $\bar{z} . \bar{c}$ |
| 3 | LS | low or same | $z + c$ |
| 4 | CC | carry clear | $\bar{c}$ |
| 5 | CS | carry set | $c$ |
| 6 | NE | not equal | $\bar{z}$ |
| 7 | EQ | equal | $z$ |
| 8 | VC | no overflow | $\bar{v}$ |
| 9 | VS | overflow | $v$ |
| A | PL | plus | $\bar{n}$ |
| B | MI | minus | $n$ |
| C | GE | greater or equal | $n . v + \bar{n} . \bar{v}$ |
| D | LT | less | $\bar{n} . v + n . \bar{v}$ |
| E | GT | greater | $\bar{z} . n . v + \bar{z} . \bar{n} . \bar{v}$ |
| F | LE | less or equal | $z + \bar{n} . v + n . \bar{v}$ |

APPENDIX F

| Mnemonic | Description | Operand |
| --- | --- | --- |
| ABCD | Add Decimal with Extend | 8 |
| ADD | Add Binary | 8, 16, 32 |
| ADDA | Add Address | 16, 32 |
| ADDI* | Add Immediate | 8, 16, 32 |
| ADDQ* | Add Quick | 8, 16, 32 |
| ADDX | Add Extended | 8, 16, 32 |
| AND | Logical AND | 8, 16, 32 |
| ANDI* | Logical AND Immediate | 8, 16, 32 |
| ASL, ASR | Arithmetic Shift | 8, 16, 32 |
| Bcc | Conditional Branch | 8, 16 |
| BCHG | Test a Bit and Change | 16, 32 |
| BCLR | Test a Bit and Clear | 16, 32 |
| BRA | Unconditional Branch | 8, 16 |
| BSET | Test a Bit and Set | 16, 32 |
| BSR | Subroutine Branch | 8, 16 |
| BTST | Test a Bit | 16, 32 |
| CHK | Check register against bounds | 16 |
| CLR | Clear an operand | 8, 16, 32 |
| CMP | Compare | 8, 16, 32 |
| CMPA | Compare Address | 16, 32 |
| CMPI* | Compare Immediate | 8, 16, 32 |
| CMPM | Compare Memory | 8, 16, 32 |
| DCNT | Decrement Counter and Branch if Non-zero | — |
| DIVS | Signed Divide | 32/16 → 32 |
| DIVU | Unsigned Divide | 32/16 → 32 |
| EOR | Exclusive OR | 8, 16, 32 |
| EORI* | Exclusive OR Immediate | 8, 16, 32 |
| EXG | Exchange Registers | 32 |
| EXT | Sign Extend | 8, 16 → 16, 32 |
| JMP | Unconditional Jump | — |
| JSR | Subroutine Jump | — |
| LEA | Load Effective Address | 32 |
| LINK | Link and Allocate | — |
| LSL, LSR | Logical Shift | 8, 16, 32 |
| MOVE | Move | 8, 16, 32 |
| MOVE CC | Move Condition Code | 16 |
| MOVE Status | Move Status Register | 16 |
| MOVE USP | Move User Stack Pointer | 32 |
| MOVEM | Move Multiple Registers | 16, 32 |
| MOVEP | Move Peripheral | 16, 32 |
| MOVEQ* | Load Register Quick | 32 |
| MULS | Signed Multiply | 16*16 → 32 |
| MULU | Unsigned Multiply | 16*16 → 32 |
| NBCD | Negate Decimal with Extend | 8 |
| NEG | Negate Binary | 8, 16, 32 |
| NEGX | Negate Binary with Extend | 8, 16, 32 |
| NOP | No operation | — |
| NOT | Logical Complement | 8, 16, 32 |
| OR | Inclusive OR | 8, 16, 32 |
| ORI* | Inclusive OR Immediate | 8, 16, 32 |
| PEA | Push Effective Address | 32 |
| RESET | Reset External Devices | — |
| ROL, ROR | Rotate without Extend | 8, 16, 32 |
| ROXL, ROXR | Rotate with Extend | 8, 16, 32 |
| RTE | Return from Exception | — |
| RTR | Return and Restore Condition Codes | — |
| RTS | Return from Subroutine | — |
| SBCD | Subtract Decimal with Extend | 8 |
| Scc | Set Conditionally | 8 |
| STOP | Stop | — |
| SUBA | Subtract Address | 16, 32 |
| SUBI* | Subtract Immediate | 8, 16, 32 |
| SUBQ* | Subtract Quick | 8, 16, 32 |
| SUBX | Subtract Extended | 8, 16, 32 |
| SWAP | Swap Register Halves | 16 → 16 |
| TAS | Test Operand, then Set | 8 |
| TRAP | Trap | — |
| TRAPV | Trap on Overflow | — |
| TST | Test Operand | 8, 16, 32 |
| TST | Test Operand | 8, 16, 32 |
| UNLK | Unlink | — |

APPENDIX G

Line Number = Bits [15:12]

| |
|---|
| 0000 — Bit Manipulation/MOVEP/Immediate |
| 0001 — Move Byte |
| 0010 — Move Long |
| 0011 — Move Word |
| 0100 — Miscellaneous |
| 0101 — ADDQ/SUBQ/Scc |
| 0110 — Bcc |
| 0111 — MOVEQ/DCNT |
| 1000 — OR/DIV/SBCD |
| 1001 — SUB/SUBX |
| 1010 — (Unassigned, reserved) |
| 1011 — CMP/EOR |
| 1100 — AND/MUL/ABCD/EXG |
| 1101 — ADD/ADDX |
| 1110 — Shift/Rotate |
| 1111 — (Unassigned, reserved) |

Dynamic Bit

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| 0 | 0 | 0 | 0 | Register | | | 1 | Type | | Effective Address | | | | | |

Static Bit

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| 0 | 0 | 0 | 0 | 1 | 0 | 0 | 0 | Type | | Effective Address | | | | | |

Bit Type Codes: TST = 00, CHG = 01, SET = 10, CLR = 11

MOVEP

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| 0 | 0 | 0 | 0 | Register | | | Op-Mode | | | 0 | 0 | 1 | Register | | |

OR Immediate

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| 0 | 0 | 0 | 0 | 0 | 0 | 0 | 0 | Size | | Effective Address | | | | | |

AND Immediate

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| 0 | 0 | 0 | 0 | 0 | 0 | 1 | 0 | Size | | Effective Address | | | | | |

SUB Immediate

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| 0 | 0 | 0 | 0 | 0 | 1 | 0 | 0 | Size | | Effective Address | | | | | |

ADD Immediate

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| 0 | 0 | 0 | 0 | 0 | 1 | 1 | 0 | Size | | Effective Address | | | | | |

EOR Immediate

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| 0 | 0 | 0 | 0 | 1 | 0 | 1 | 0 | Size | | Effective Address | | | | | |

CMP Immediage

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| 0 | 0 | 0 | 0 | 1 | 1 | 0 | 0 | Size | | Effective Address | | | | | |

MOVE Byte

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| 0 | 0 | 0 | 1 | | Destination Register | | | Destination Mode | | Source Mode | | | Source Register | | |

MOVE Long

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| 0 | 0 | 1 | 0 | | Destination Register | | | Destination Mode | | Source Mode | | | Source Register | | |

MOVE Word

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| 0 | 0 | 1 | 1 | | Destination Register | | | Destination Mode | | Source Mode | | | Source Register | | |

NEGX

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| 0 | 1 | 0 | 0 | 0 | 0 | 0 | 0 | Size | | Effective Address | | | | | |

MOVE from SR

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| 0 | 1 | 0 | 0 | 0 | 0 | 0 | 0 | 1 | | Effective Address | | | | | |

CLR

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| 0 | 1 | 0 | 0 | 0 | 0 | 1 | 0 | Size | | Effective Address | | | | | |

NEG

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| 0 | 1 | 0 | 0 | 0 | 1 | 0 | 0 | Size | | Effective Address | | | | | |

MOVE to CC

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| 0 | 1 | 0 | 0 | 0 | 1 | 0 | 0 | 1 | 1 | Effective Address | | | | | |

NOT

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| 0 | 1 | 0 | 0 | 0 | 1 | 1 | 0 | Size | | Effective Address | | | | | |

MOVE to SR

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| 0 | 1 | 0 | 0 | 0 | 1 | 1 | 0 | 1 | 1 | Effective Address | | | | | |

NBCD

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| 0 | 1 | 0 | 0 | 1 | 0 | 0 | 0 | 0 | 0 | Effective Address | | | | | |

PEA

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| 0 | 1 | 0 | 0 | 1 | 0 | 0 | 0 | 0 | 1 | Effective Address | | | | | |

SWAP

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| 0 | 1 | 0 | 0 | 1 | 0 | 0 | 0 | 0 | 1 | 0 | 0 | 0 | Register | | |

MOVEM Registers to EA

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| 0 | 1 | 0 | 0 | 1 | 0 | 0 | 0 | 1 | Sz | Effective Address | | | | | |

EXT

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| 0 | 1 | 0 | 0 | 1 | 0 | 0 | 0 | 1 | Sz | 0 | 0 | 0 | Register | | |

TST

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| 0 | 1 | 0 | 0 | 1 | 0 | 1 | 0 | Size | | Effective Address | | | | | |

TAS

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| 0 | 1 | 0 | 0 | 1 | 0 | 1 | 0 | 1 | 1 | Effective Address | | | | | |

MOVEM EA to Registers

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| 0 | 1 | 0 | 0 | 1 | 1 | 0 | 0 | 1 | Sz | Effective Address | | | | | |

TRAP

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| 0 | 1 | 0 | 0 | 1 | 1 | 1 | 0 | 0 | 1 | 0 | 0 | Vector | | | |

LINK

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| 0 | 1 | 0 | 0 | 1 | 1 | 1 | 0 | 0 | 1 | 0 | 1 | 0 | Register | | |

UNLK

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| 0 | 1 | 0 | 0 | 1 | 1 | 1 | 0 | 0 | 1 | 0 | 1 | 1 | Register | | |

MOVE USP

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| 0 | 1 | 0 | 0 | 1 | 1 | 1 | 0 | 0 | 1 | 1 | 0 | dr | Register | | |

dr (direction): 0 — to USP, 1 — from USP

RESET

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| 0 | 1 | 0 | 0 | 1 | 1 | 1 | 0 | 0 | 1 | 1 | 1 | 0 | 0 | 0 | 0 |

NOP

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| 0 | 1 | 0 | 0 | 1 | 1 | 1 | 0 | 0 | 1 | 1 | 1 | 0 | 0 | 0 | 1 |

STOP

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| 0 | 1 | 0 | 0 | 1 | 1 | 1 | 0 | 0 | 1 | 1 | 1 | 0 | 0 | 1 | 0 |

RTE

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| 0 | 1 | 0 | 0 | 1 | 1 | 1 | 0 | 0 | 1 | 1 | 1 | 0 | 0 | 1 | 1 |

RTS

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| 0 | 1 | 0 | 0 | 1 | 1 | 1 | 0 | 0 | 1 | 1 | 1 | 0 | 1 | 0 | 1 |

TRAPV

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| 0 | 1 | 0 | 0 | 1 | 1 | 1 | 0 | 0 | 1 | 1 | 1 | 0 | 1 | 1 | 0 |

RTR

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| 0 | 1 | 0 | 0 | 1 | 1 | 1 | 0 | 0 | 1 | 1 | 1 | 0 | 1 | 1 | 1 |

JSR

| 15 | 14 | 13 | 12 | 11 | 10 | 9 | 8 | 7 | 6 | 5–0 |
|---|---|---|---|---|---|---|---|---|---|---|
| 0 | 1 | 0 | 0 | 1 | 1 | 1 | 0 | 1 | 0 | Effective Address |

JMP

| 15 | 14 | 13 | 12 | 11 | 10 | 9 | 8 | 7 | 6 | 5–0 |
|---|---|---|---|---|---|---|---|---|---|---|
| 0 | 1 | 0 | 0 | 1 | 1 | 1 | 0 | 1 | 1 | Effective Address |

MOVEP

| 15 | 14 | 13 | 12 | 11–9 | 8–6 | 5 | 4 | 3 | 2–0 |
|---|---|---|---|---|---|---|---|---|---|
| 0 | 1 | 0 | 0 | Data Register | Op-Mode | 0 | 0 | 1 | Addr Register |

CHK

| 15 | 14 | 13 | 12 | 11–9 | 8 | 7 | 6 | 5–0 |
|---|---|---|---|---|---|---|---|---|
| 0 | 1 | 0 | 0 | Register | 1 | 1 | 0 | Effective Address |

LEA

| 15 | 14 | 13 | 12 | 11–9 | 8 | 7 | 6 | 5–0 |
|---|---|---|---|---|---|---|---|---|
| 0 | 1 | 0 | 0 | Register | 1 | 1 | 1 | Effective Address |

ADDQ

| 15 | 14 | 13 | 12 | 11–9 | 8 | 7–6 | 5–0 |
|---|---|---|---|---|---|---|---|
| 0 | 1 | 0 | 1 | Data | 0 | Size | Effective Address |

SUBQ

| 15 | 14 | 13 | 12 | 11–9 | 8 | 7–6 | 5–0 |
|---|---|---|---|---|---|---|---|
| 0 | 1 | 0 | 1 | Data | 1 | Size | Effective Address |

Scc

| 15 | 14 | 13 | 12 | 11–8 | 7 | 6 | 5–0 |
|---|---|---|---|---|---|---|---|
| 0 | 1 | 0 | 1 | Condition | 1 | 1 | Effective Address |

Bcc

| 15 | 14 | 13 | 12 | 11–8 | 7–0 |
|---|---|---|---|---|---|
| 0 | 1 | 1 | 0 | Condition | 8-bit Displacement |

MOVEQ

| 15 | 14 | 13 | 12 | 11–9 | 8 | 7–0 |
|---|---|---|---|---|---|---|
| 0 | 1 | 1 | 1 | Register | 0 | Data |

DCNT (Displacement is always negative)

| 15 | 14 | 13 | 12 | 11–9 | 8–0 |
|---|---|---|---|---|---|
| 0 | 1 | 1 | 1 | Register | 1 ← Displacement |

OR

| 15 | 14 | 13 | 12 | 11–9 | 8–6 | 5–0 |
|---|---|---|---|---|---|---|
| 1 | 0 | 0 | 0 | Register | Op-Mode | Effective Address |

DIVU

| 15 | 14 | 13 | 12 | 11–9 | 8 | 7 | 6 | 5–0 |
|---|---|---|---|---|---|---|---|---|
| 1 | 0 | 0 | 0 | Register | 0 | 1 | 1 | Effective Address |

DIVS

| 15 | 14 | 13 | 12 | 11–9 | 8 | 7 | 6 | 5–0 |
|---|---|---|---|---|---|---|---|---|
| 1 | 0 | 0 | 0 | Register | 1 | 1 | 1 | Effective Address |

SBCD

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| 1 | 0 | 0 | 0 | Dest'n Register | | | 1 | 0 | 0 | 0 | 0 | R/M | Source Register | | |

R/M (register/memory): register - register = 0, memory - memory = 1

SUB
SUBA

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| 1 | 0 | 0 | 1 | Register | | | Op-Mode | | | Effective Address | | | | | |

SUBX

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| 1 | 0 | 0 | 1 | Dest'n Register | | | 1 | Size | | 0 | 0 | R/M | Source Register | | |

R/M (register/memory): register - register = 0, memory - memory = 1

CMP
CMPA

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| 1 | 0 | 1 | 1 | Register | | | Op-Mode | | | Effective Address | | | | | |

EOR

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| 1 | 0 | 1 | 1 | Register | | | 1 | Size | | Effective Address | | | | | |

CMPM

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| 1 | 0 | 1 | 1 | Register | | | 1 | Size | | 0 | 0 | 1 | Register | | |

AND

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| 1 | 1 | 0 | 0 | Register | | | Op-Mode | | | Effective Address | | | | | |

MULU

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| 1 | 1 | 0 | 0 | Register | | | 0 | 1 | 1 | Effective Address | | | | | |

MULS

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| 1 | 1 | 0 | 0 | Register | | | 1 | 1 | 1 | Effective Address | | | | | |

ABCD

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| 1 | 1 | 0 | 0 | Dest'n Register | | | 1 | 0 | 0 | 0 | 0 | R/M | Source Register | | |

R/M (register/memory): register - register = 0, memory - memory = 1

EXGD

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| 1 | 1 | 0 | 0 | Data Register | | | 1 | 0 | 1 | 0 | 0 | 0 | Data Register | | |

EXGM

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| 1 | 1 | 0 | 0 | Data Register | | | 1 | 0 | 1 | 0 | 0 | 1 | Address Register | | |

EXGA

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| 1 | 1 | 0 | 0 | Address Register | | | 1 | 1 | 0 | 0 | 0 | 1 | Address | | |

ADD
ADDA

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| 1 | 1 | 0 | 1 | Register | | | Op-Mode | | | Effective Address | | | | | |

ADDX

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| 1 | 1 | 0 | 1 | Dest'n Register | | | 1 | Size | | 0 | 0 | R/M | Source Register | | |

R/M (register/memory): register - register = 0, memory - memory = 1

Data Register Shifts
| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| 1 | 1 | 1 | 0 | Count/Register | | | d | Size | | i/r | Type | | Register | | |
Memory Shifts
| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| 1 | 1 | 1 | 0 | 0 | Type | | d | 1 | 1 | Effective Address | | | | | |
Shift Type Codes: AS = 00, LS = 01, ROX = 10, RO = 11
d (direction): Right = 0, Left = 1
i/r (count source): Immediate Count = 0, Register Count = 1
APPENDIX H
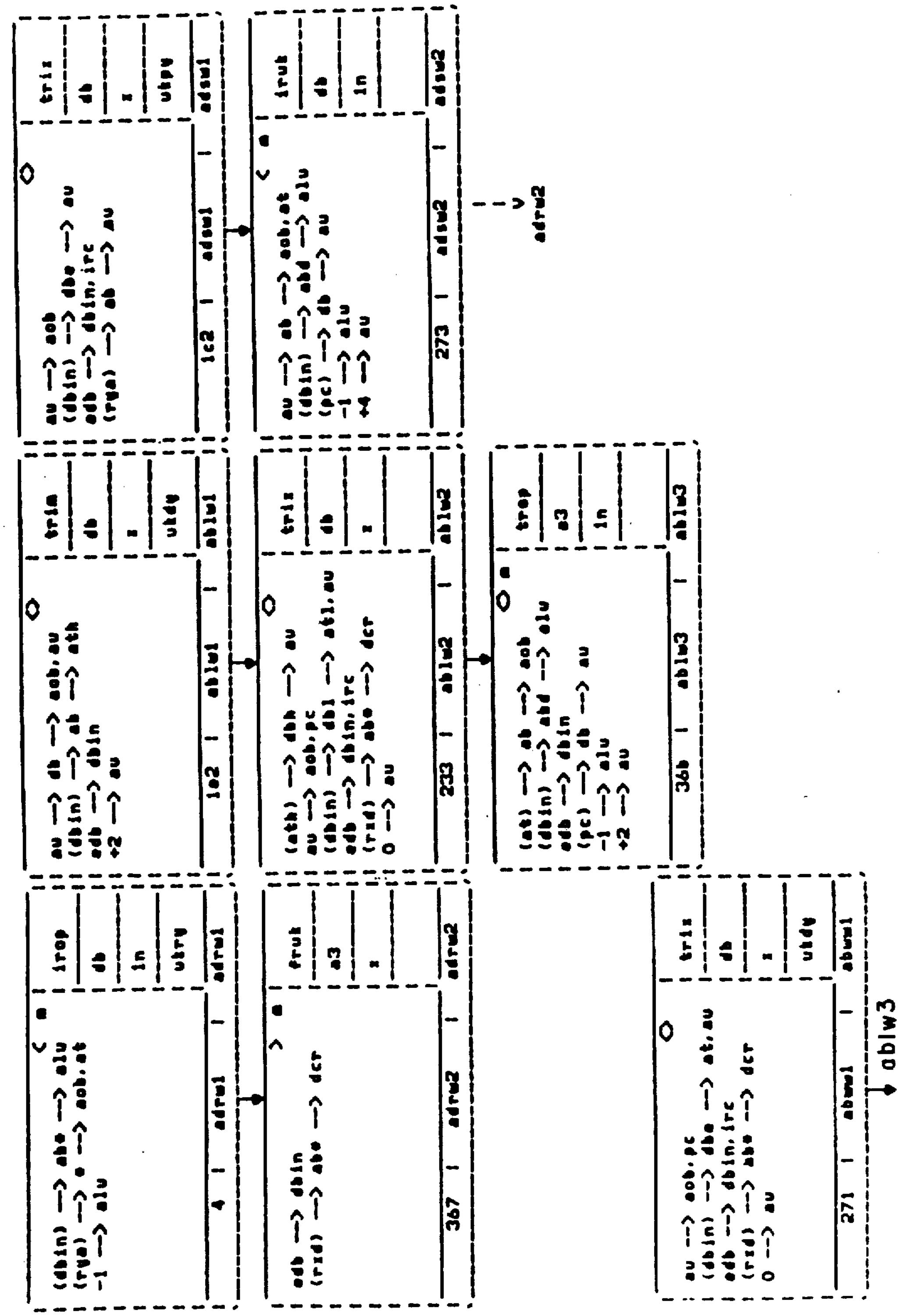

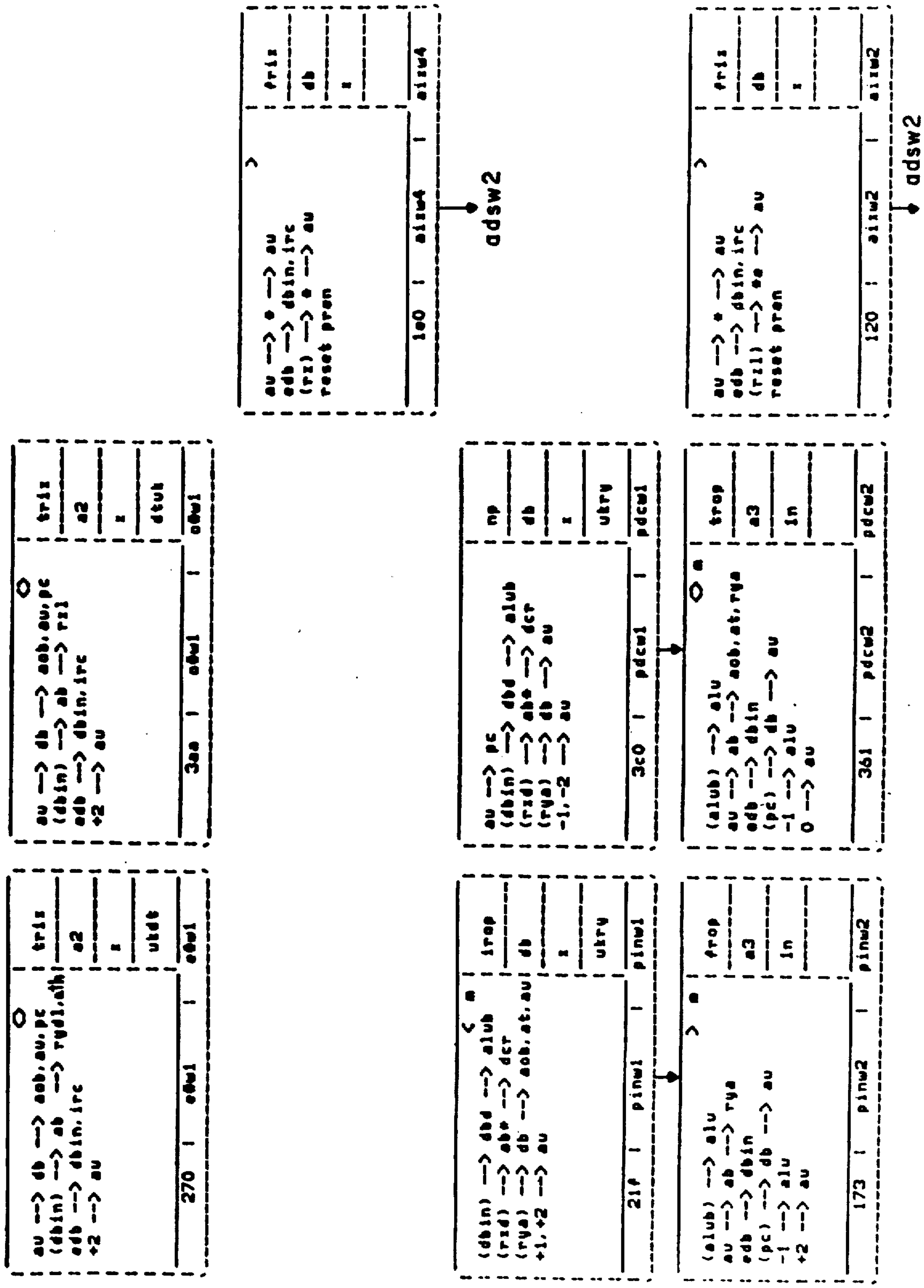

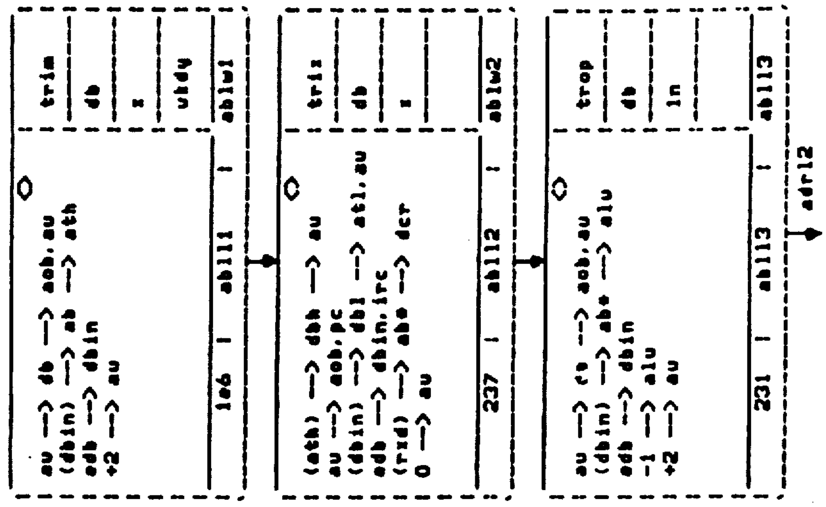
au ---> db ---> aob.au
(dbin) ---> ab ---> ath
adb ---> dbin
+2 ---> au
trim
db
z
ukdy
1e6
abll1
ablw1
(ath) ---> dbh ---> au
au ---> aob.pc
(dbin) ---> dbl ---> atl.au
adb ---> dbin.irc
(rxd) ---> abe ---> dcr
0 ---> au
trix
db
z
237
abll2
ablw2
au ---> ce ---> aob.au
(dbin) ---> abe ---> alu
adb ---> dbin
-1 ---> alu
+2 ---> au
trap
db
ln
231
abll3
abll3
adrl2
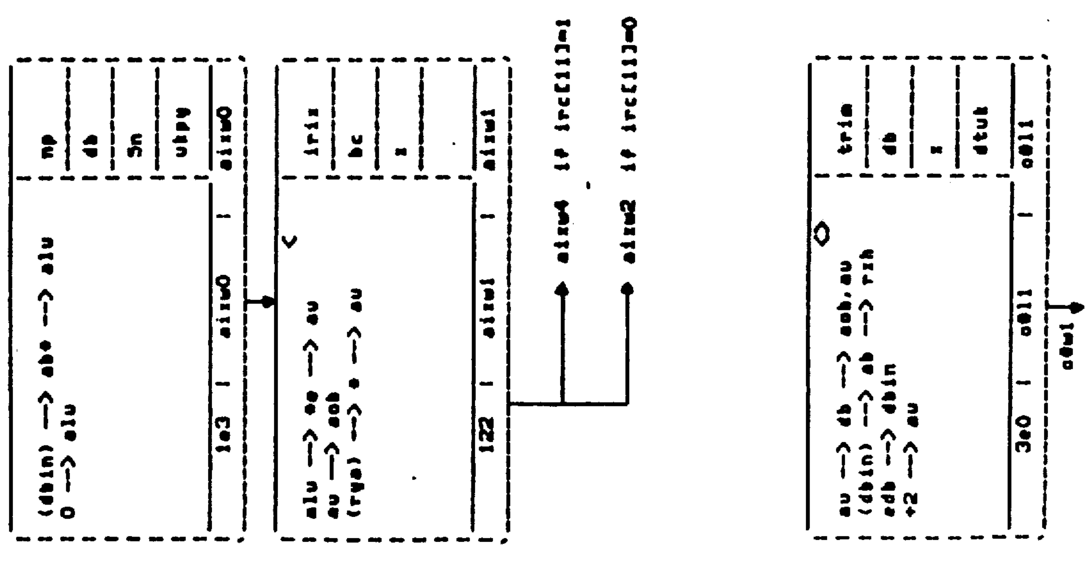
(dbin) ---> abe ---> alu
0 ---> alu
np
db
5n
ukpy
1e3
aizw0
aizw0
alu ---> ee ---> au
au ---> aob
(rya) ---> e ---> au
irix
bc
z
122
aizw1
aizw1
aizw4 if irc[11]=1
aizw2 if irc[11]=0
au ---> db ---> aob.au
(dbin) ---> ab ---> rxh
adb ---> dbin
+2 ---> au
trim
db
z
dtuk
3e0
o0l1
o0l1
o0w1

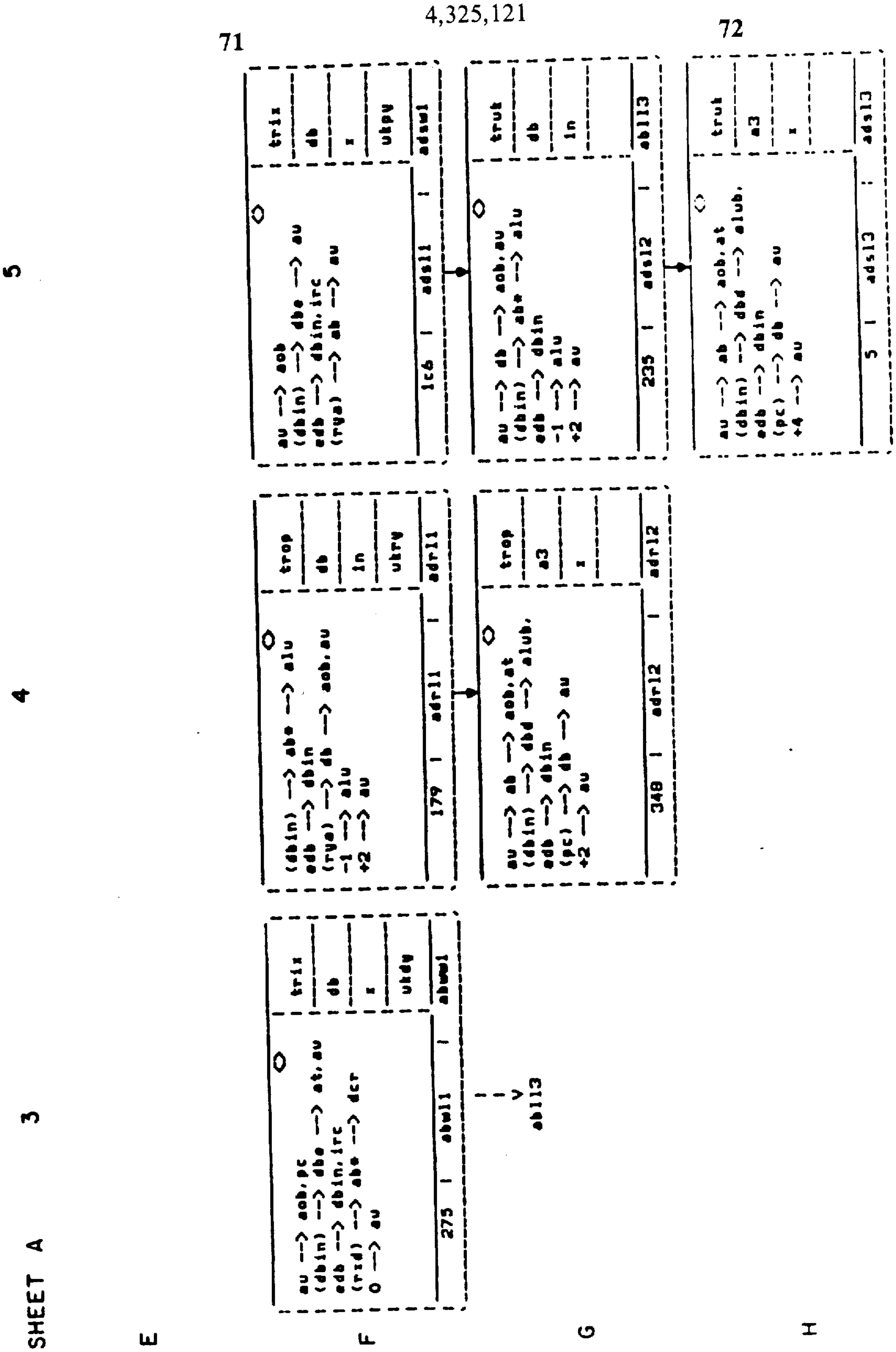
71
72
5
4
3
SHEET A
E
F
G
H
au --> aob
(dbin) --> dbe --> au
adb --> dbin,irc
(rya) --> ab --> au
trix
db
x
ukpy
1c6 | adsl1 | adsw1
au --> db --> aob,au
(dbin) --> abe --> alu
adb --> dbin
-1 --> alu
+2 --> au
truk
db
in
235 | adsl2 | abll3
au --> ab --> aob,at
(dbin) --> dbd --> alub,
adb --> dbin
(pc) --> db --> au
+4 --> au
truk
a3
x
5 | adsl3 | adsl3
(dbin) --> abe --> alu
adb --> dbin
(rya) --> db --> aob,au
-1 --> alu
+2 --> au
trop
db
in
ukry
179 | adrl1 | adrl1
au --> ab --> aob,at
(dbin) --> dbd --> alub,
adb --> dbin
(pc) --> db --> au
+2 --> au
trop
a3
x
348 | adrl2 | adrl2
au --> aob,pc
(dbin) --> dbe --> at,au
adb --> dbin,irc
(rxd) --> abe --> dcr
0 --> au
trix
db
x
ukdy
275 | abwl1 | abwm1
V
abll3

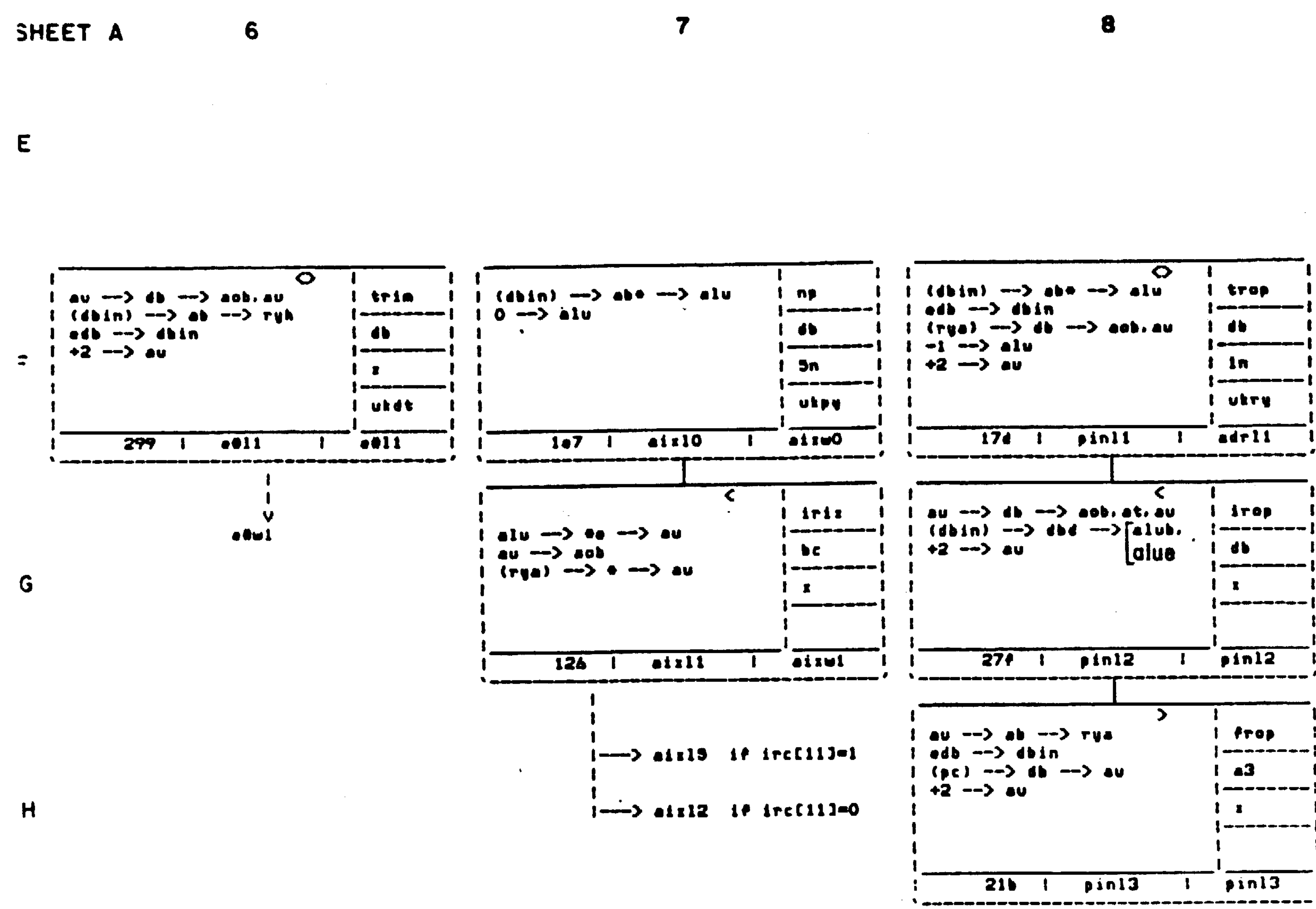
SHEET A
6
7
8
E
F
G
H
au --> db --> aob.au
(dbin) --> ab --> ryh
adb --> dbin
+2 --> au
trim
db
x
ukdt
299
e011
e011
e0wi
(dbin) --> abe --> alu
0 --> alu
np
db
5n
ukpy
1e7
aixl0
aixw0
alu --> ae --> au
au --> aob
(rya) --> e --> au
iriz
bc
x
126
aixl1
aixw1
--> aixl5 if irc[11]=1
--> aixl2 if irc[11]=0
(dbin) --> abe --> alu
adb --> dbin
(rya) --> db --> aob.au
-1 --> alu
+2 --> au
trop
db
ln
ukry
17d
pinl1
adrl1
au --> db --> aob.at.au
(dbin) --> dbd --> alub.
alue
+2 --> au
irop
db
x
27f
pinl2
pinl2
au --> ab --> rya
adb --> dbin
(pc) --> db --> au
+2 --> au
frop
a3
x
21b
pinl3
pinl3

SHEET A 9

E

F

```
(dbin) --> abe --> alu        | np
(rya) --> db --> au           | db
-1 --> alu                    | in
-4 --> au                     | ukry
       ee | pdcl1 |           | pdcl1
```

G

```
                          O
au --> db --> aob,au,rya      | trop
edb --> dbin                  | db
+2 --> au                     | x
                              |
       ef | pdcl2 |           | pdcl2
              |
              v
            adr12
```

H

SHEET A 6 7 8
I
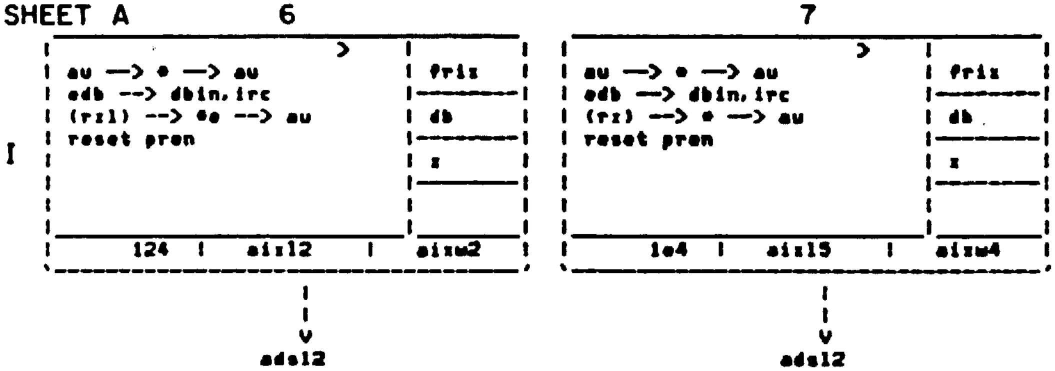
J
K
L

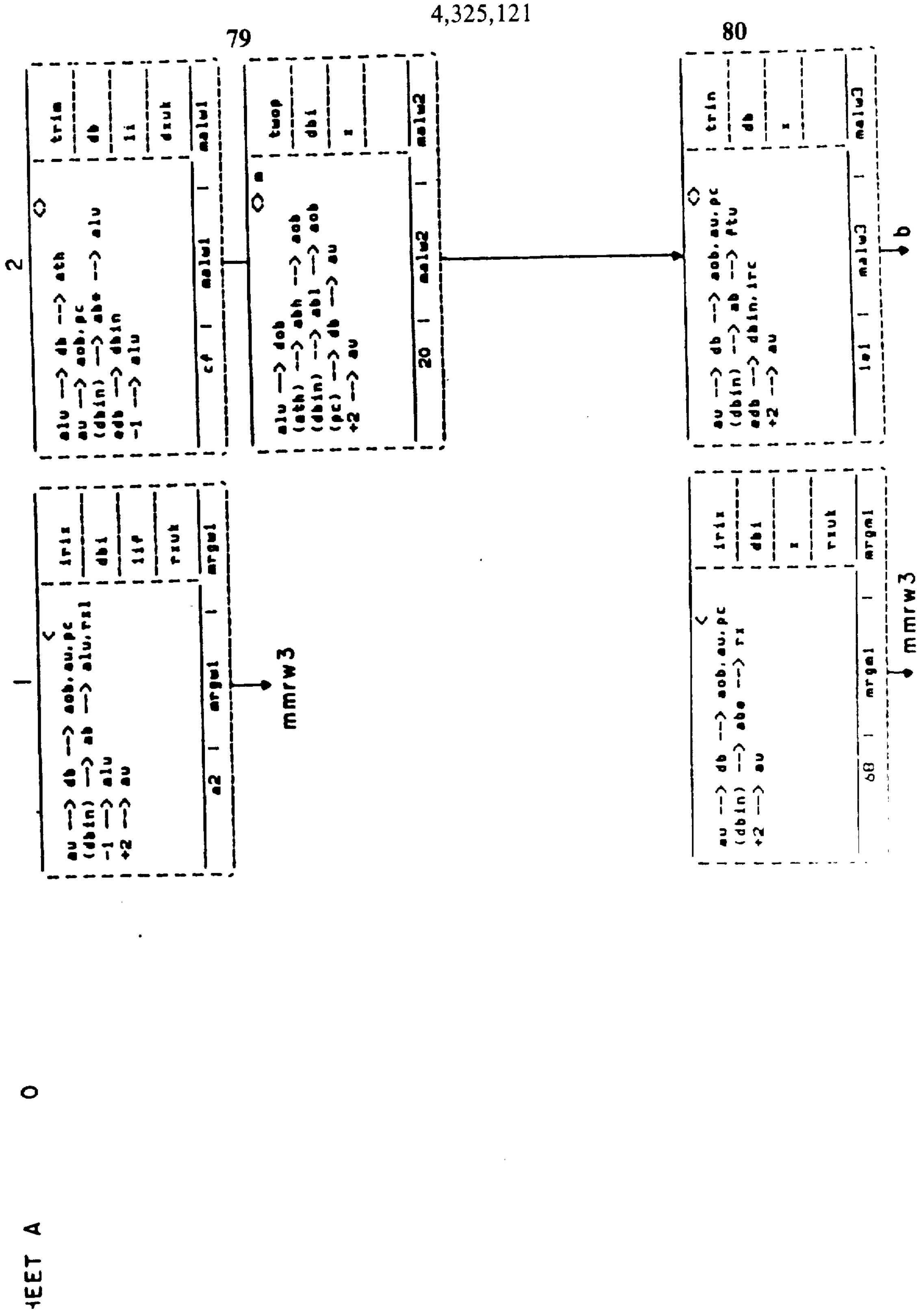
79
80
2
mmrw3
b
mmrw3

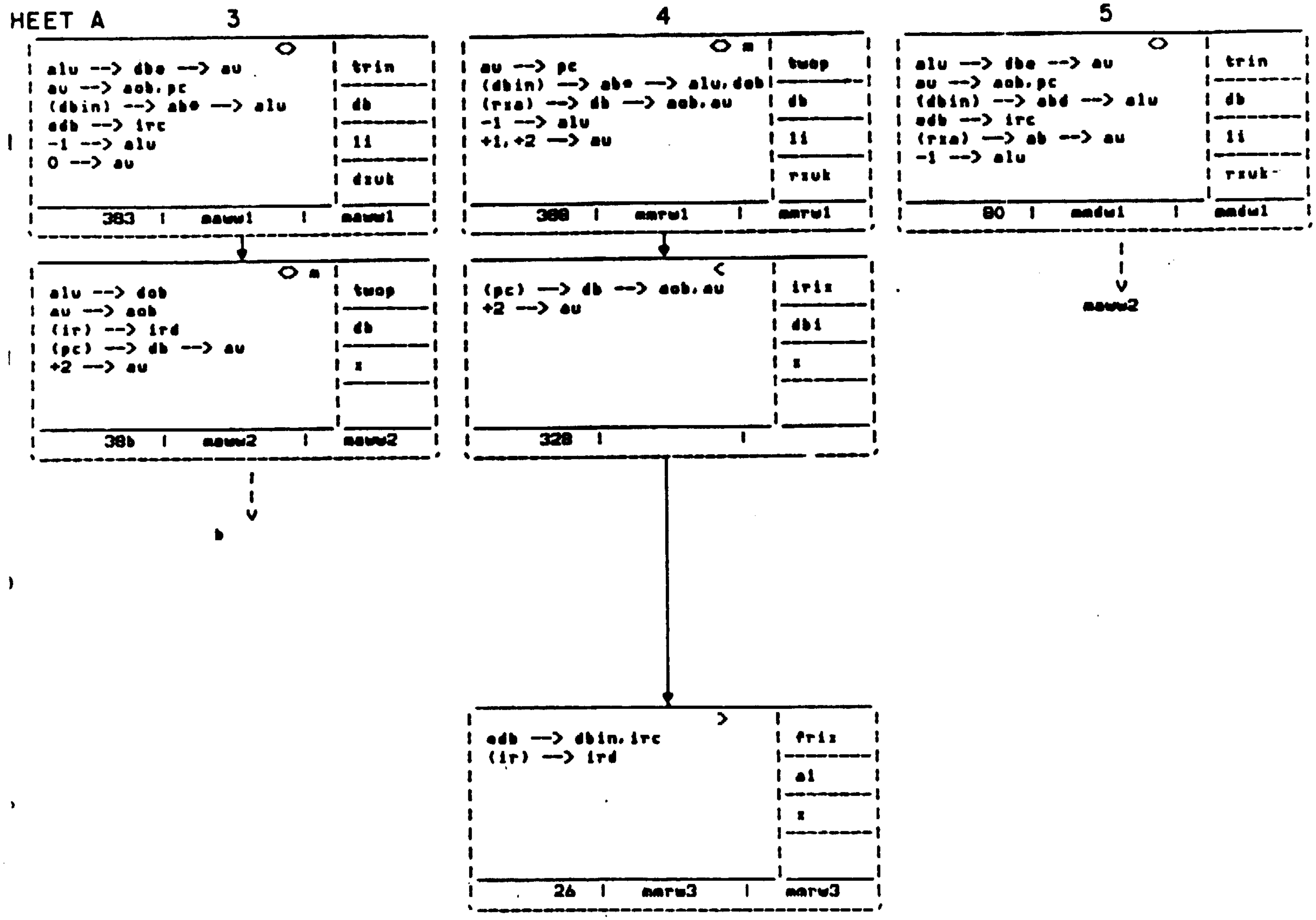
HEET A
3
4
5
alu --> dbe --> au
au --> aob, pc
(dbin) --> abe --> alu
adb --> irc
-1 --> alu
0 --> au
trin
db
li
dzuk
383 | mawwl | mawwl
alu --> dob
au --> aob
(ir) --> ird
(pc) --> db --> au
+2 --> au
twop
db
x
38b | maww2 | maww2
b
au --> pc
(dbin) --> abe --> alu, dob
(rxa) --> db --> aob, au
-1 --> alu
+1, +2 --> au
twop
db
li
rxuk
388 | mmrwl | mmrwl
(pc) --> db --> aob, au
+2 --> au
irix
dbi
x
328
adb --> dbin, irc
(ir) --> ird
frix
al
x
26 | mmrw3 | mmrw3
alu --> dbe --> au
au --> aob, pc
(dbin) --> abd --> alu
adb --> irc
(rxa) --> ab --> au
-1 --> alu
trin
db
li
rxuk
80 | mmdwl | mmdwl
maww2

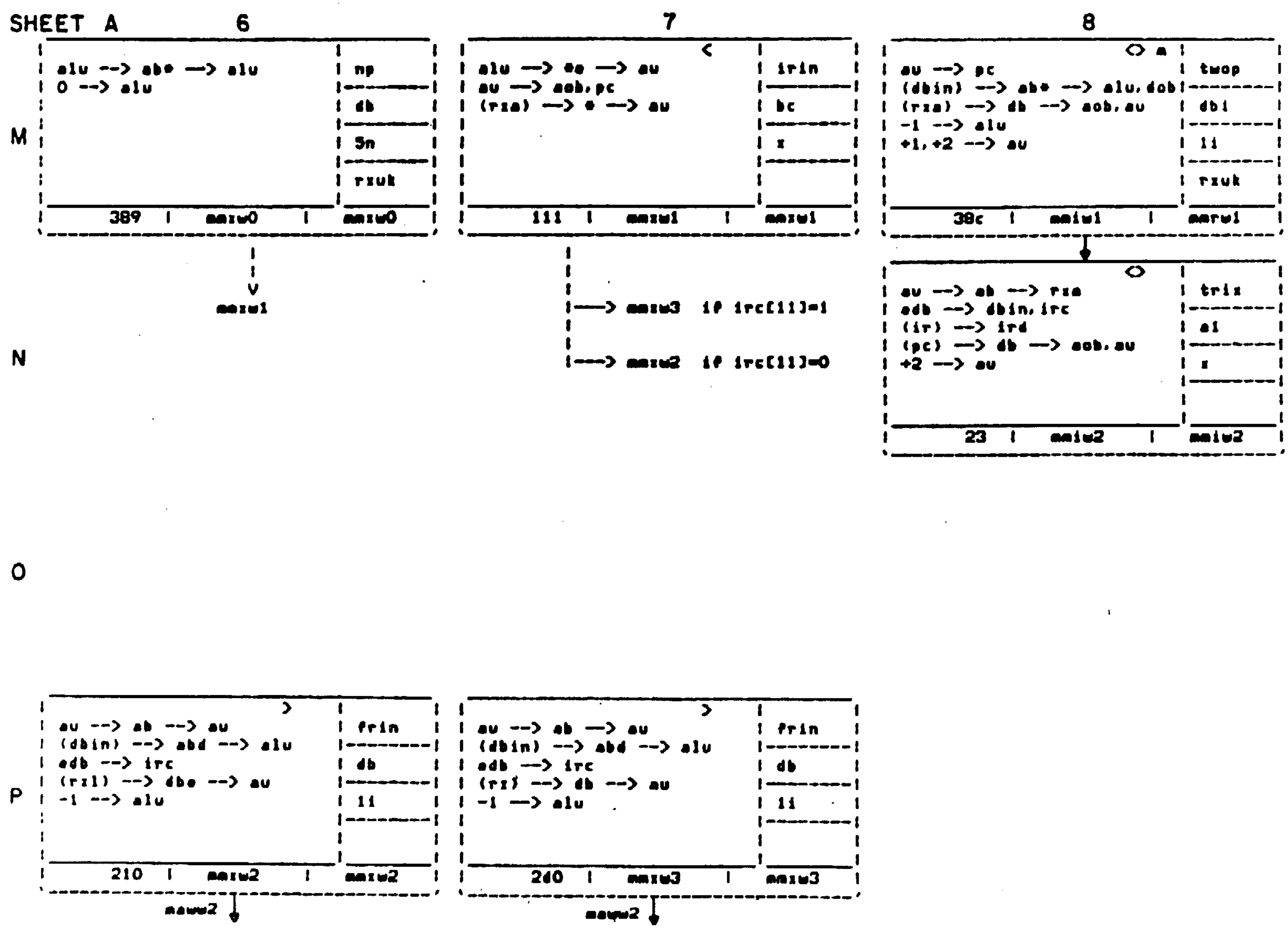
SHEET A
6
7
8
M
N
O
P
alu --> abe --> alu
0 --> alu
np
db
5n
rxuk
389
mmxw0
mmxw0
mmxw1
alu --> ae --> au
au --> aob,pc
irin
bc
x
111
mmxw1
mmxw1
mmxw3 if irc[11]=1
mmxw2 if irc[11]=0
au --> pc
(dbin) --> abe --> alu,dob
-1 --> alu
+1,+2 --> au
twop
dbi
11
rxuk
38c
mmiw1
mmrw1
au --> ab --> rxa
adb --> dbin,irc
(ir) --> ird
(pc) --> db --> aob,au
+2 --> au
trix
a1
x
23
mmiw2
mmiw2
au --> ab --> au
(dbin) --> abd --> alu
adb --> irc
(rx1) --> dbe --> au
-1 --> alu
frin
db
11
210
mmxw2
mmxw2
maww2
(dbin) --> abd --> alu
-1 --> alu
frin
db
11
2d0
mmxw3
mmxw3
mawq2

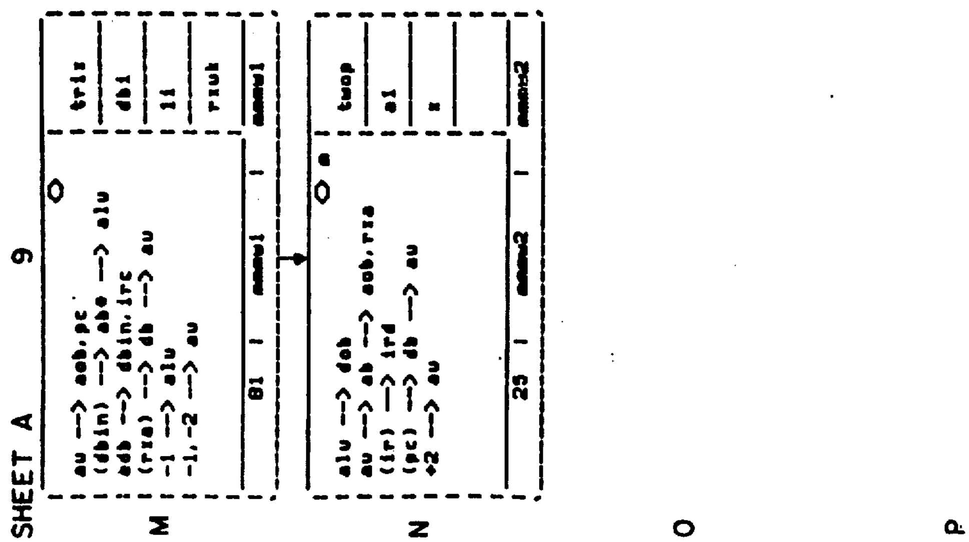
SHEET A
9
M
au —> aob,pc
(dbin) —> abe —> alu
adb —> dbin,irc
(rxa) —> db —> au
-1 —> alu
-1,-2 —> au
trix
dbi
ii
rxuk
81
N
alu —> dob
au —> ab —> aob,rxa
(ir) —> ird
(pc) —> db —> au
+2 —> au
twop
ai
x
25
O
P

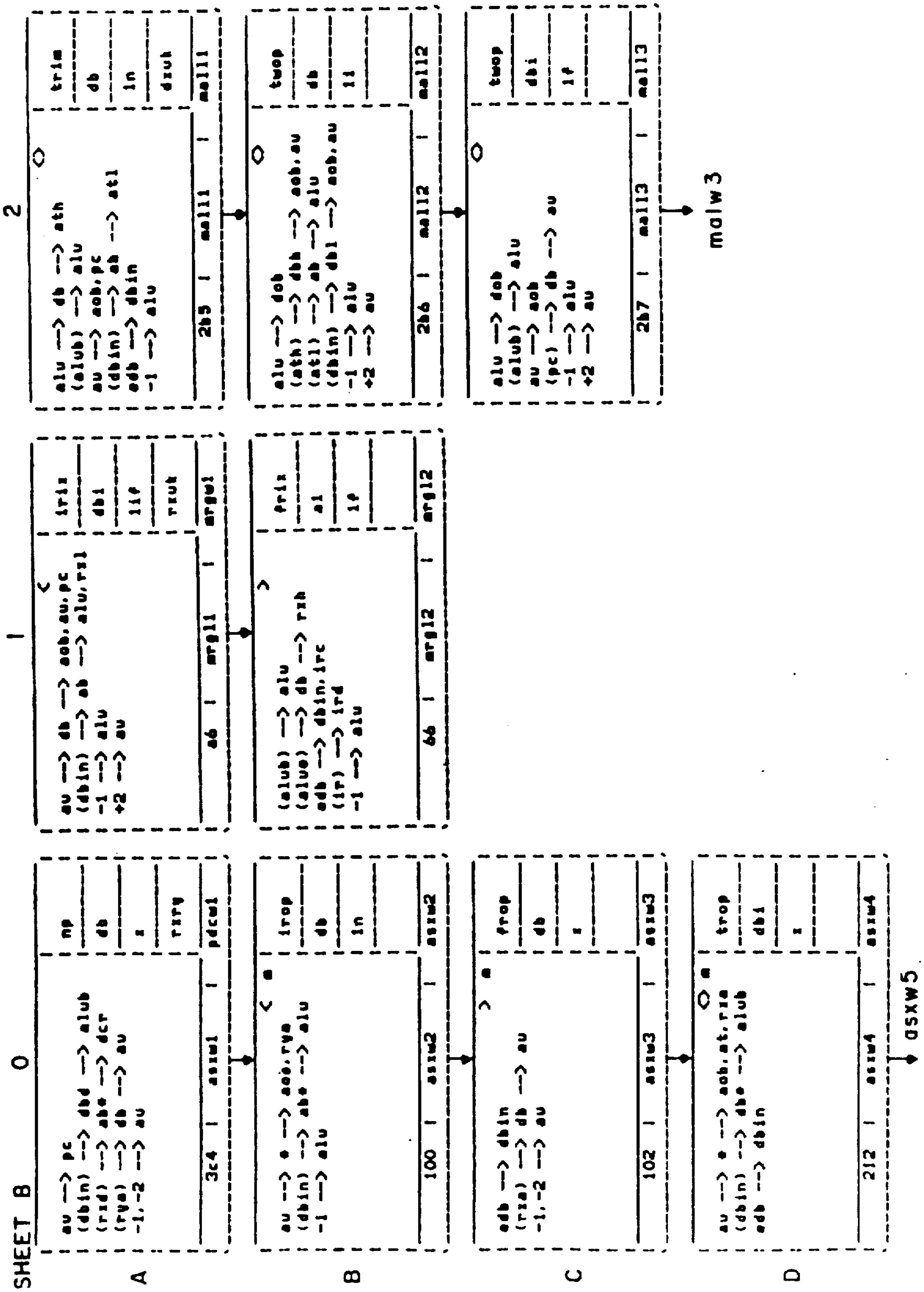

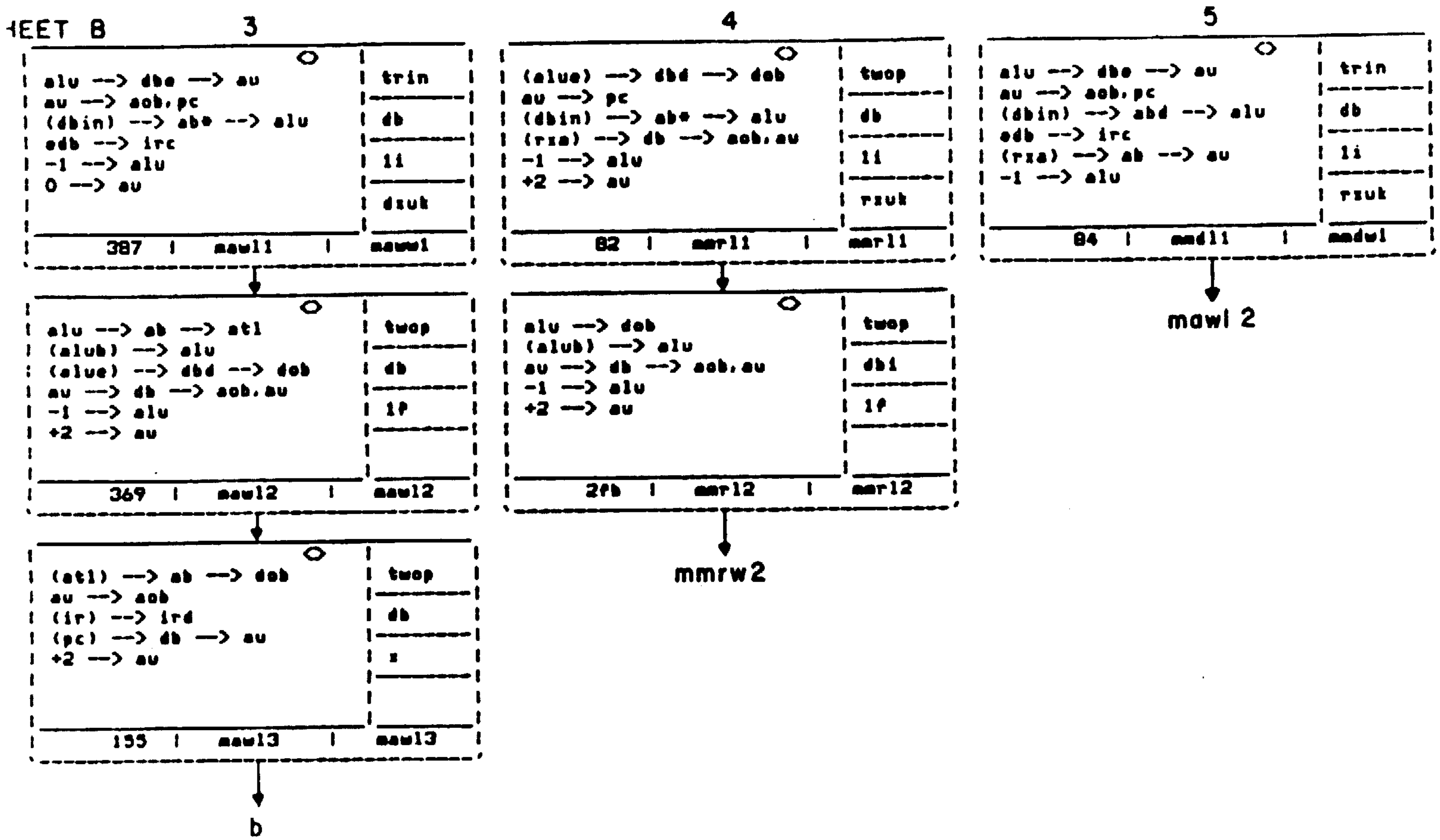
HEET B
3
alu --> dbe --> au
au --> aob,pc
(dbin) --> abe --> alu
edb --> irc
-1 --> alu
0 --> au
trin
db
li
dzuk
387 | mawl1 | mawwl
alu --> ab --> atl
(alub) --> alu
(alue) --> dbd --> dob
au --> db --> aob,au
-1 --> alu
+2 --> au
twop
db
lf
369 | mawl2 | mawl2
(atl) --> ab --> dob
au --> aob
(ir) --> ird
(pc) --> db --> au
+2 --> au
twop
db
z
155 | mawl3 | mawl3
b
4
(alue) --> dbd --> dob
au --> pc
(dbin) --> abe --> alu
(rxa) --> db --> aob,au
-1 --> alu
+2 --> au
twop
db
li
rzuk
82 | mmrl1 | mmrl1
alu --> dob
(alub) --> alu
au --> db --> aob,au
-1 --> alu
+2 --> au
twop
dbi
lf
2fb | mmrl2 | mmrl2
mmrw2
5
alu --> dbe --> au
au --> aob,pc
(dbin) --> abd --> alu
edb --> irc
(rxa) --> ab --> au
-1 --> alu
trin
db
li
rzuk
84 | mmdl1 | mmdwl
mawl 2

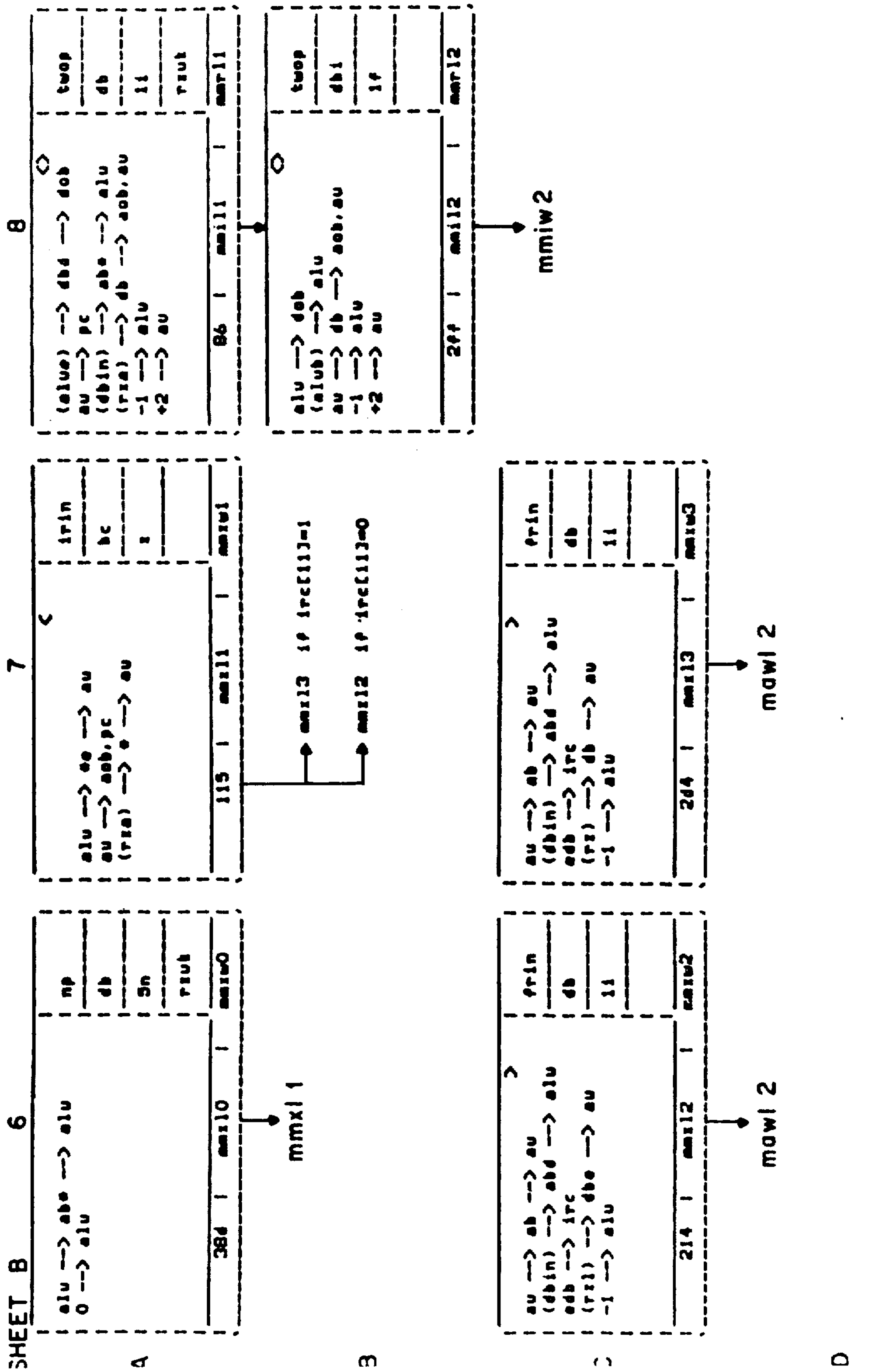
SHEET B
6
7
8
A
B
C
D
mmxl1
mmxl3 if irc[11]=1
mmxl2 if irc[11]=0
mmiw2
mawl 2
mawl 2

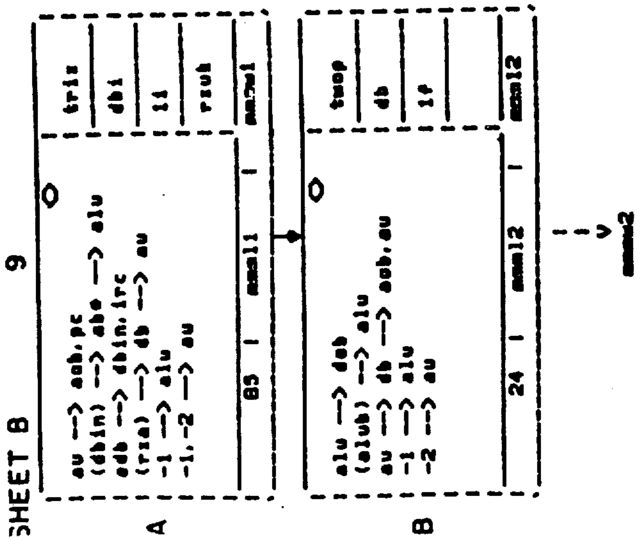
SHEET B
9
au ---> aab,pc
(dbin) ---> abe ---> alu
adb ---> dbin,irc
(rsa) ---> db ---> au
-1 ---> alu
-1,-2 ---> au
85
mmml1
alu ---> dab
(alub) ---> alu
au ---> db ---> aab,au
-1 ---> alu
-2 ---> au
24
mmml2
A
B
C
D

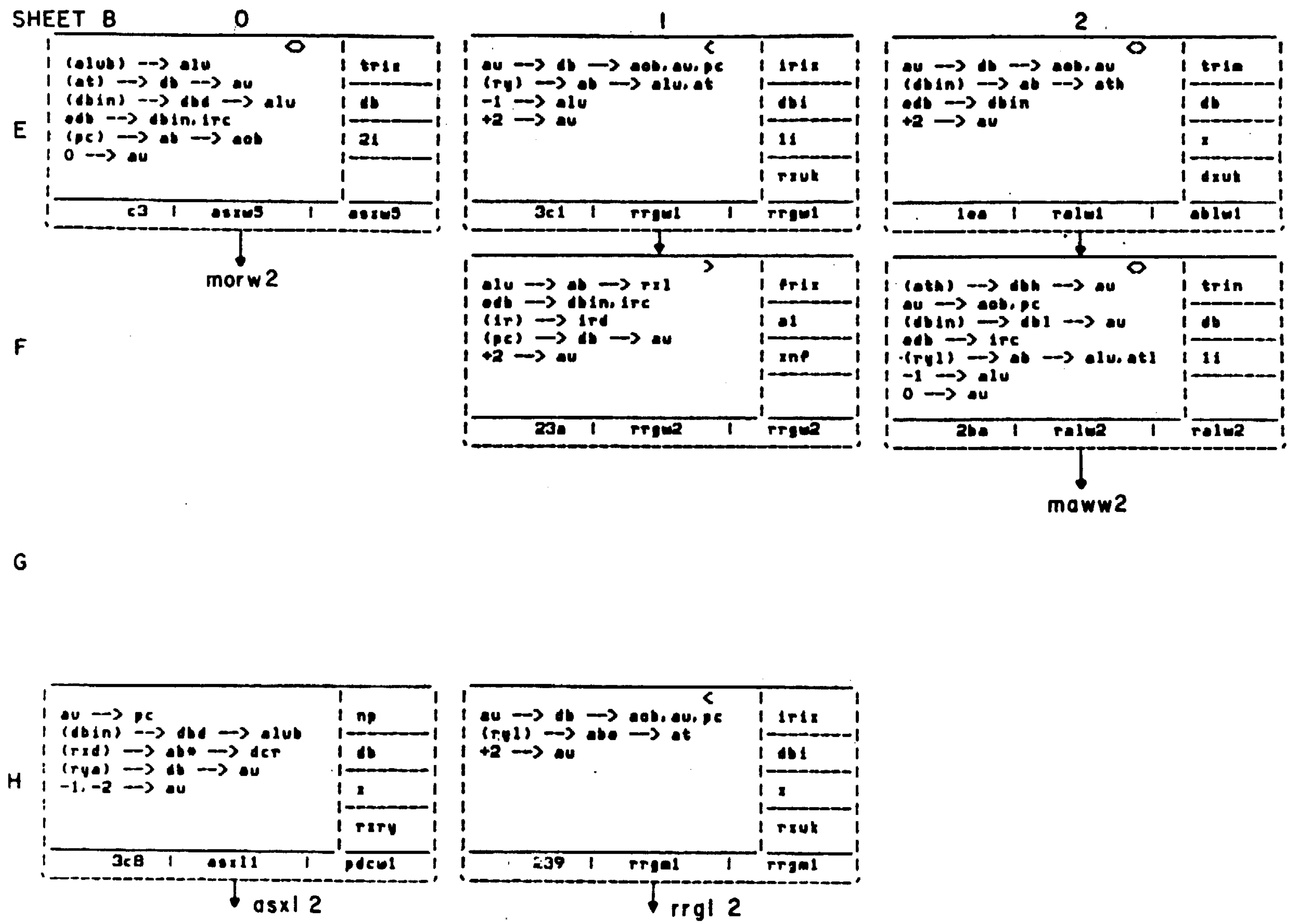
SHEET B
0
1
2
E
F
G
H
(alub) --> alu
(at) --> db --> au
(dbin) --> dbd --> alu
edb --> dbin, irc
(pc) --> ab --> aob
0 --> au
trix
db
21
c3
asxw5
asxw5
morw2
au --> db --> aob, au, pc
(ry) --> ab --> alu, at
-1 --> alu
+2 --> au
irix
dbi
ii
rxuk
3c1
rrgw1
rrgw1
au --> db --> aob, au
(dbin) --> ab --> ath
edb --> dbin
+2 --> au
trim
db
x
dxuk
1ea
ralw1
ablw1
alu --> ab --> rxl
edb --> dbin, irc
(ir) --> ird
(pc) --> db --> au
+2 --> au
frix
ai
xnf
23a
rrgw2
rrgw2
(ath) --> dbh --> au
au --> aob, pc
(dbin) --> dbl --> au
edb --> irc
(ryl) --> ab --> alu, atl
-1 --> alu
0 --> au
trin
db
ii
2ba
ralw2
ralw2
maww2
au --> pc
(dbin) --> dbd --> alub
(rxd) --> abe --> dcr
(rya) --> db --> au
-1, -2 --> au
np
db
x
rxry
3c8
asxl1
pdcw1
asxl 2
au --> db --> aob, au, pc
(ryl) --> abe --> at
+2 --> au
irix
dbi
x
rxuk
239
rrgml
rrgml
rrgl 2

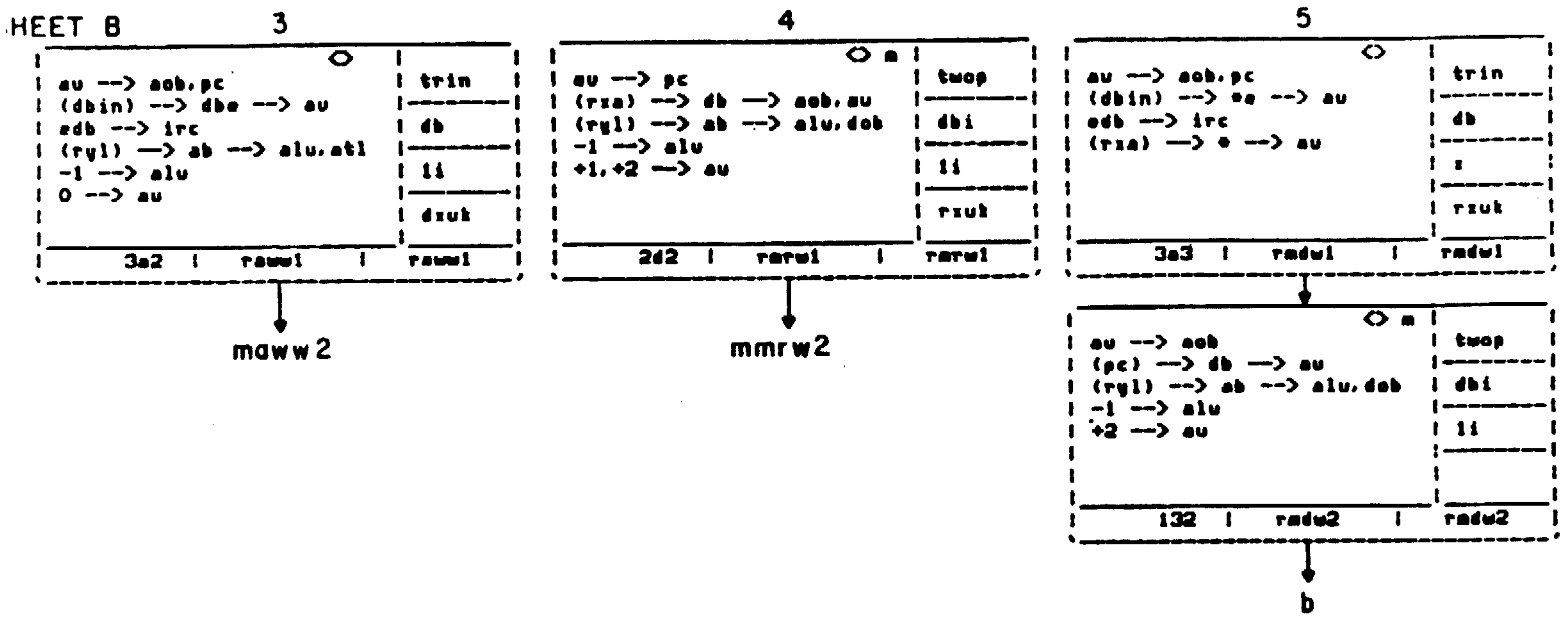
HEET B
3
au --> aob,pc
(dbin) --> dbe --> au
edb --> irc
(ryl) --> ab --> alu,atl
-1 --> alu
0 --> au
trin
db
ii
dzuk
3a2
rawwl
rawwl
maww2
4
au --> pc
(rxa) --> db --> aob,au
(ryl) --> ab --> alu,dob
-1 --> alu
+1,+2 --> au
twop
dbi
ii
rxuk
2d2
rmrwl
rmrwl
mmrw2
5
au --> aob,pc
(dbin) --> *e --> au
edb --> irc
(rxa) --> e --> au
trin
db
rxuk
3a3
rmdwl
rmdwl
au --> aob
(pc) --> db --> au
(ryl) --> ab --> alu,dob
-1 --> alu
+2 --> au
twop
dbi
ii
132
rmdw2
rmdw2
b

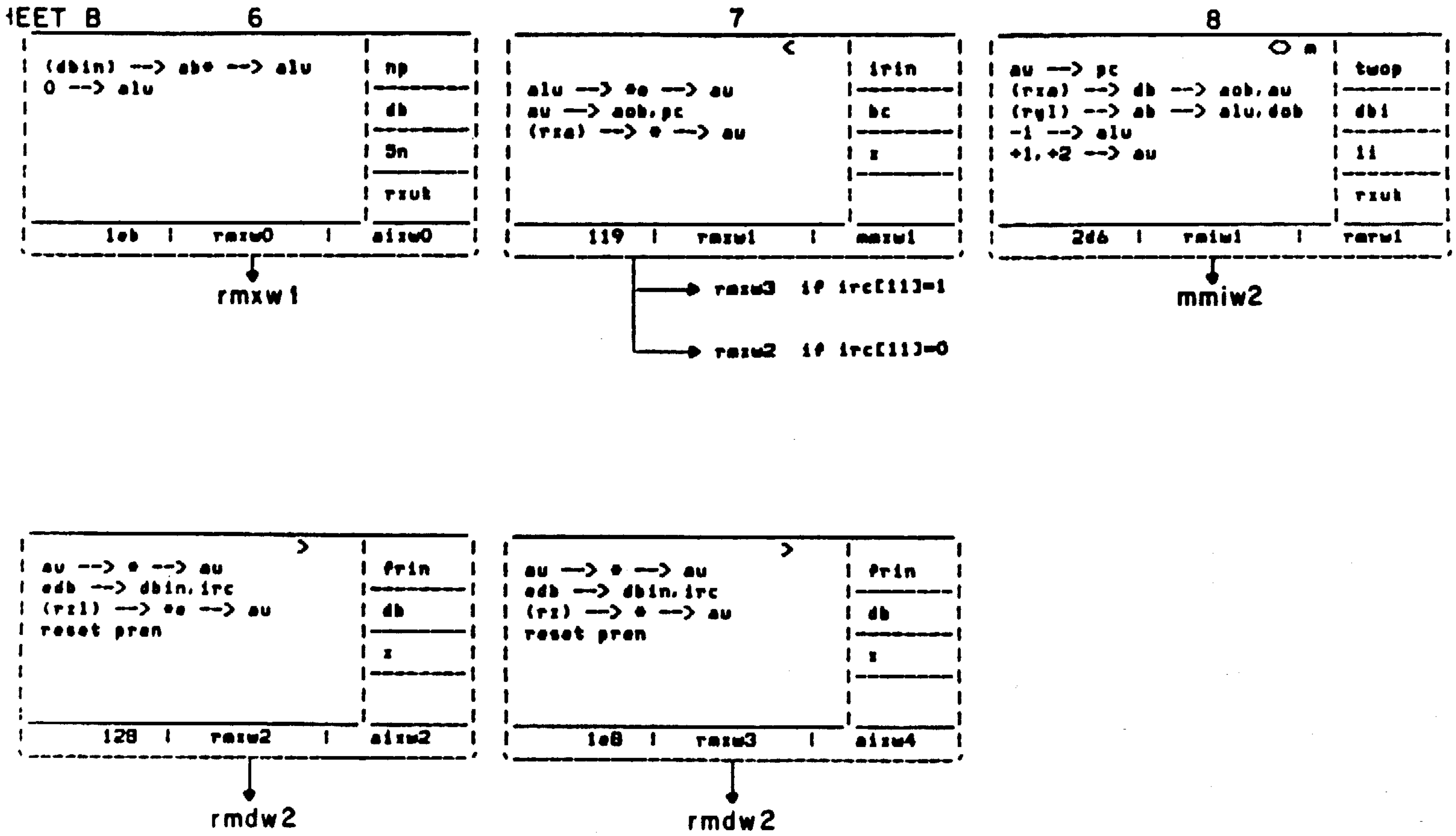
HEET B
6
(dbin) --> abe --> alu
0 --> alu
np
db
5n
rxuk
1eb
rmxw0
aixw0
rmxw1
7
<
alu --> ae --> au
au --> aob,pc
(rxa) --> a --> au
irin
bc
x
119
rmxw1
mmxw1
rmxw3 if irc[11]=1
rmxw2 if irc[11]=0
8
m
au --> pc
(rxa) --> db --> aob,au
(ryl) --> ab --> alu,dob
-1 --> alu
+1,+2 --> au
twop
dbi
ii
rxuk
2d6
rmiw1
rmrw1
mmiw2
>
au --> a --> au
edb --> dbin,irc
(rxl) --> ae --> au
reset pren
frin
db
x
128
rmxw2
aixw2
rmdw2
>
au --> a --> au
edb --> dbin,irc
(rx) --> a --> au
reset pren
frin
db
x
1e8
rmxw3
aixw4
rmdw2

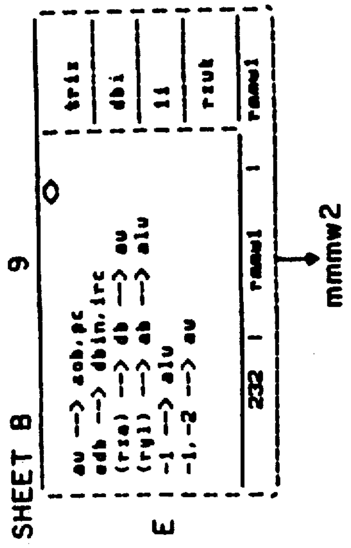
F G H

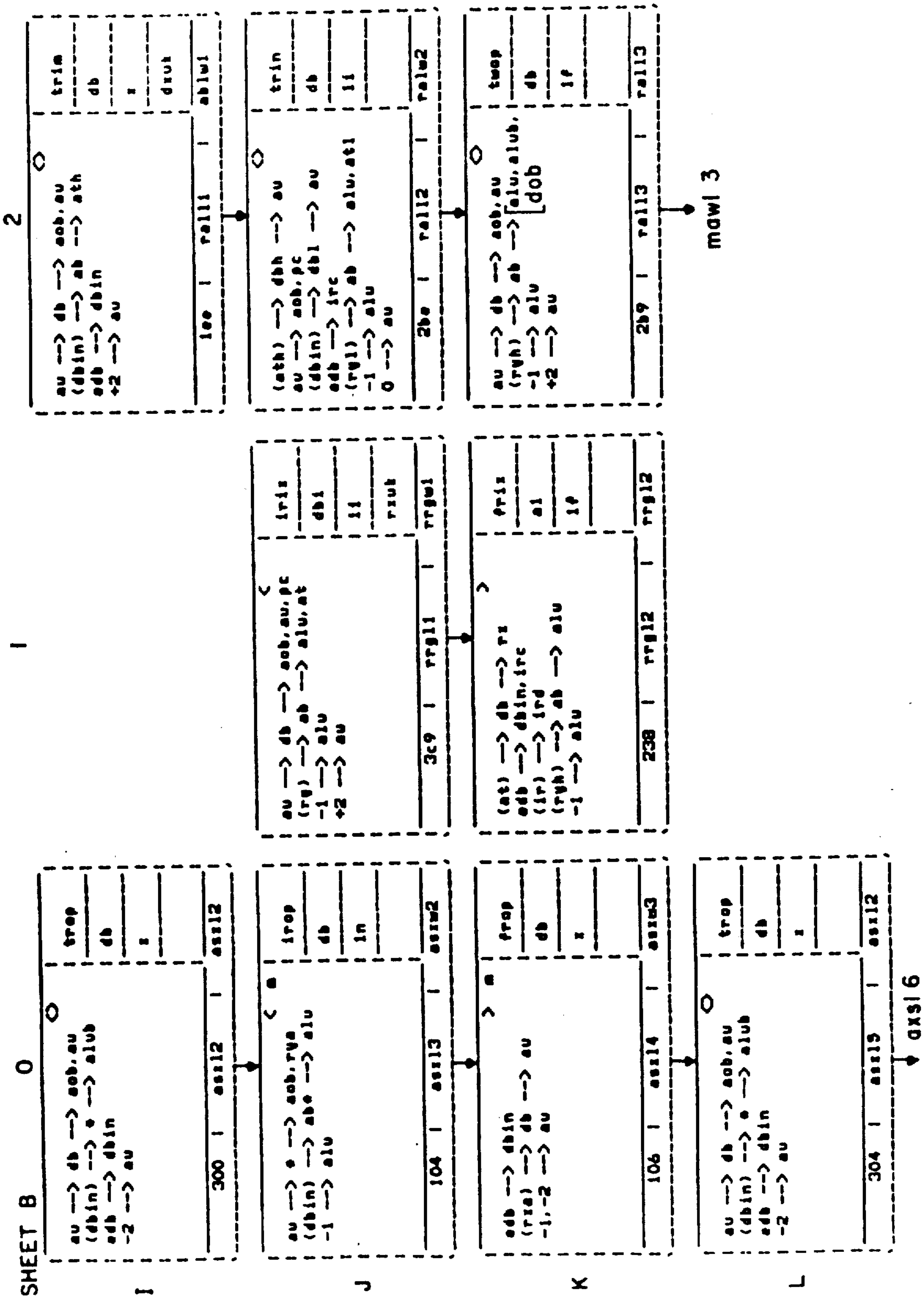
SHEET B
I
J
K
L
0
1
2
mawl 3
axsl 6

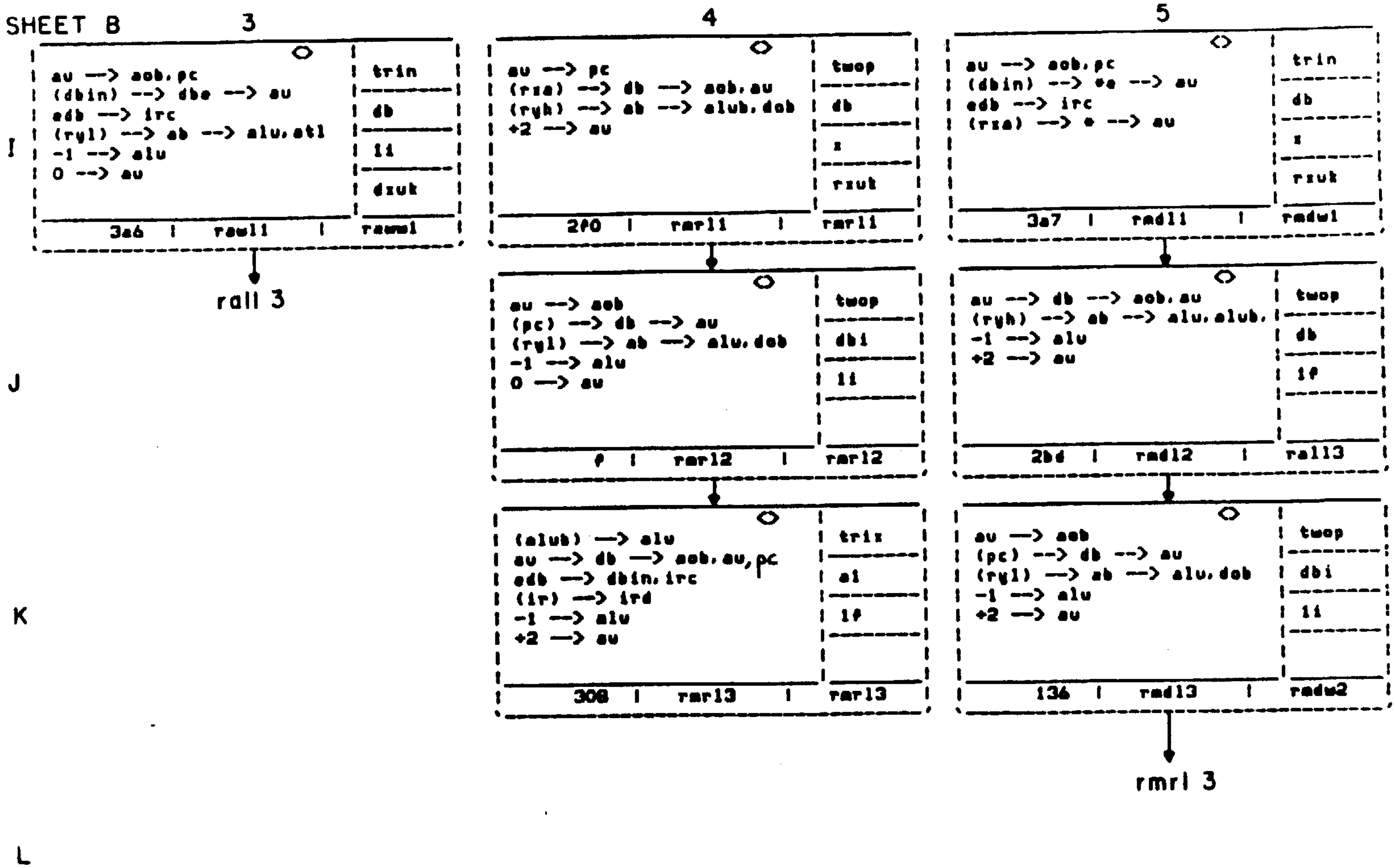
SHEET B
3
4
5
I
J
K
L
au --> aob, pc
(dbin) --> dbe --> au
edb --> irc
(ryl) --> ab --> alu, atl
-1 --> alu
0 --> au
trin
db
ii
dzuk
3a6 | rawl1 | rawm1
rall 3
au --> pc
(rxa) --> db --> aob, au
(ryh) --> ab --> alub, dob
+2 --> au
twop
db
x
rxuk
2f0 | rmrl1 | rmrl1
au --> aob, pc
(dbin) --> *e --> au
edb --> irc
(rxa) --> e --> au
trin
db
x
rxuk
3a7 | rmdl1 | rmdw1
au --> aob
(pc) --> db --> au
(ryl) --> ab --> alu, dob
-1 --> alu
0 --> au
twop
dbi
ii
f | rmrl2 | rmrl2
au --> db --> aob, au
(ryh) --> ab --> alu, alub,
-1 --> alu
+2 --> au
twop
db
if
2bd | rmdl2 | rall3
(alub) --> alu
au --> db --> aob, au, pc
edb --> dbin, irc
(ir) --> ird
-1 --> alu
+2 --> au
trix
ai
if
308 | rmrl3 | rmrl3
au --> aob
(pc) --> db --> au
(ryl) --> ab --> alu, dob
-1 --> alu
+2 --> au
twop
dbi
ii
136 | rmdl3 | rmdw2
rmrl 3

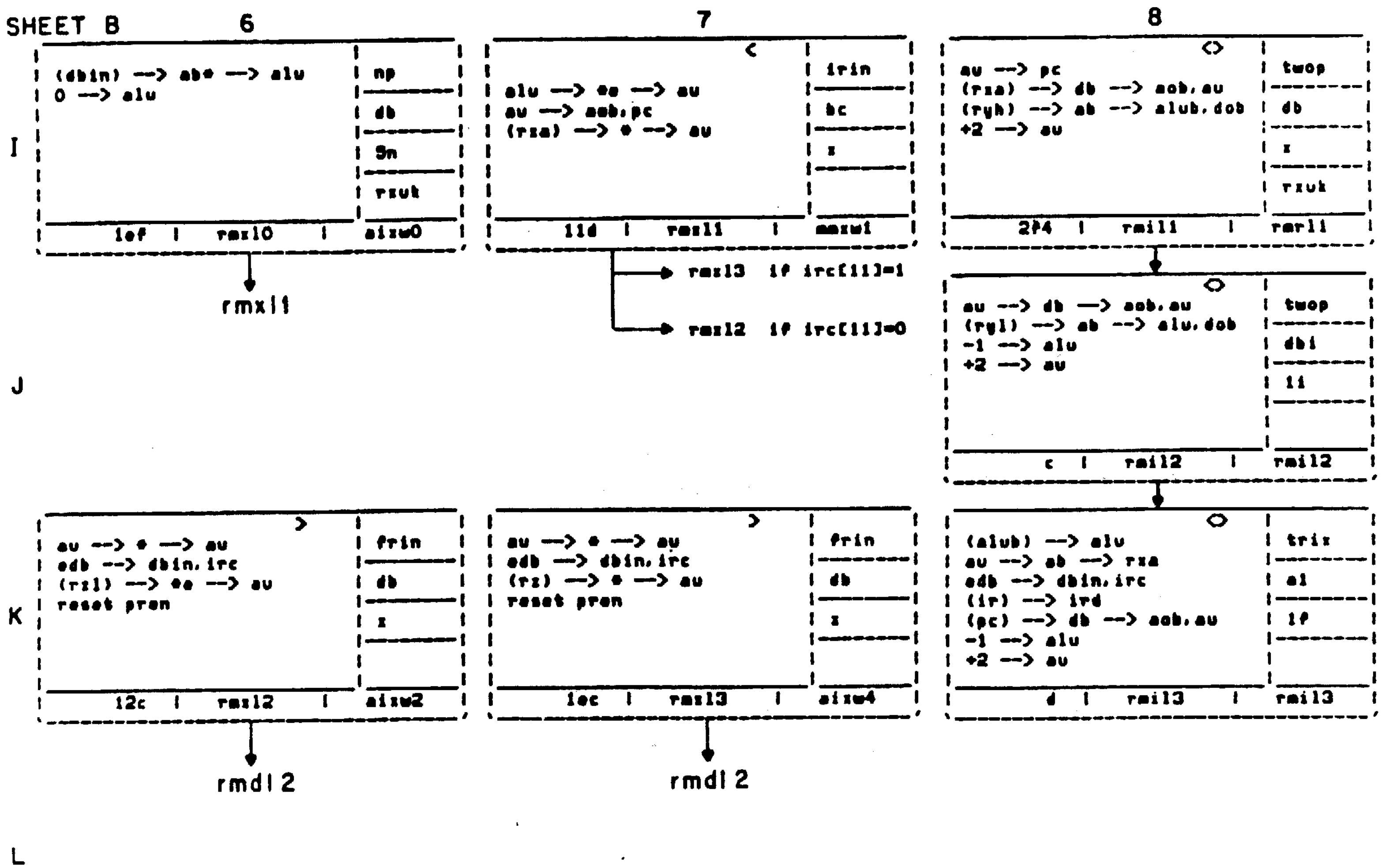
SHEET B
6
7
8
I
J
K
L
(dbin) —> abe —> alu
0 —> alu
np
db
5n
rxuk
lef
rmxl0
aixw0
rmxl1
alu —> ma —> au
au —> aob, pc
(rxa) —> a —> au
irin
bc
x
11d
rmxl1
mmxwl
rmxl3 if irc[11]=1
rmxl2 if irc[11]=0
au —> pc
(rxa) —> db —> aob, au
(ryh) —> ab —> alub, dob
+2 —> au
twop
db
x
rxuk
2f4
rmil1
rmrl1
au —> db —> aob, au
(ryl) —> ab —> alu, dob
-1 —> alu
+2 —> au
twop
dbi
1i
c
rmil2
rmil2
au —> a —> au
adb —> dbin, irc
(rzl) —> ma —> au
reset pren
frin
db
x
12c
rmxl2
aixw2
rmdl2
au —> a —> au
adb —> dbin, irc
(rz) —> a —> au
reset pren
frin
db
x
1ec
rmxl3
aixw4
rmdl2
(alub) —> alu
au —> ab —> rxa
adb —> dbin, irc
(ir) —> ird
(pc) —> db —> aob, au
-1 —> alu
+2 —> au
trix
ai
1f
d
rmil3
rmil3

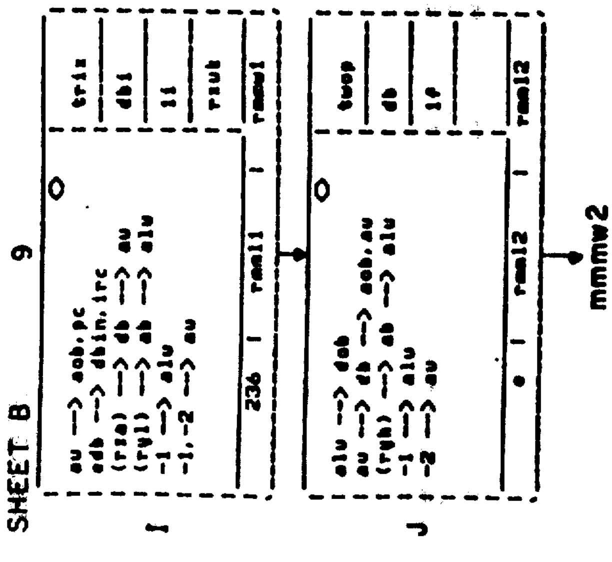
SHEET B
9
I
au --> aob,pc
adb --> dbin,irc
(rza) --> db --> au
(ryl) --> ab --> alu
-1 --> alu
-1,-2 --> au
trix
dbi
ii
rsub
236
rmml1
rmmu1
J
alu --> dab
au --> db --> aob,au
(ryh) --> ab --> alu
-1 --> alu
-2 --> au
twop
db
if
rmml2
rmml2
mmmw2
K
L

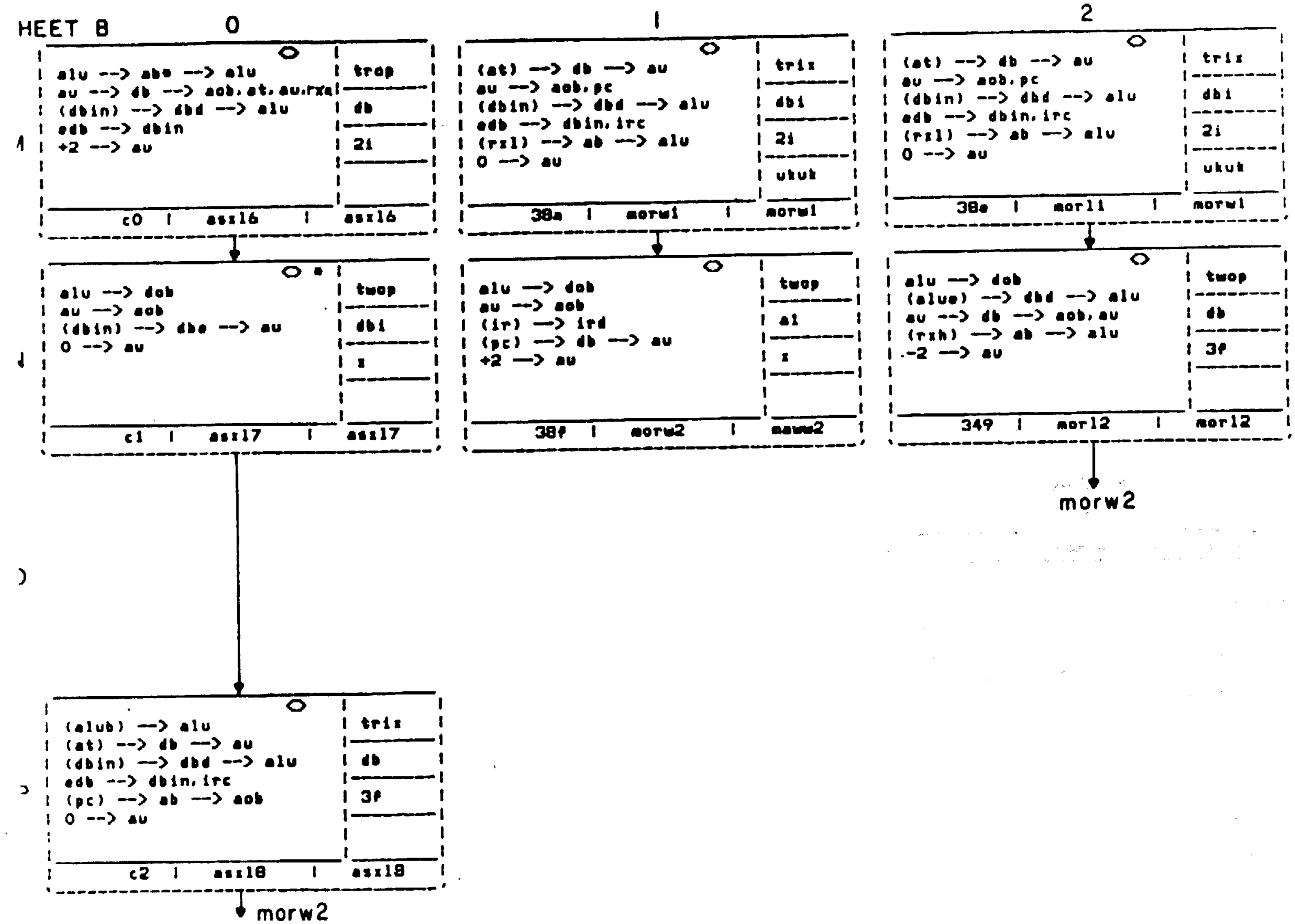
HEET B
0
1
2
alu --> abe --> alu
au --> db --> aob,at,au,rxa
(dbin) --> dbd --> alu
edb --> dbin
+2 --> au
trap
db
2i
c0
asx16
asx16
alu --> dob
au --> aob
(dbin) --> dbe --> au
0 --> au
twop
dbi
x
c1
asx17
asx17
(alub) --> alu
(at) --> db --> au
(dbin) --> dbd --> alu
edb --> dbin,irc
(pc) --> ab --> aob
0 --> au
trix
db
3f
c2
asx18
asx18
morw2
(at) --> db --> au
au --> aob,pc
(dbin) --> dbd --> alu
edb --> dbin,irc
(rxl) --> ab --> alu
0 --> au
trix
dbi
2i
ukuk
38a
morw1
morw1
alu --> dob
au --> aob
(ir) --> ird
(pc) --> db --> au
+2 --> au
twop
a1
x
38f
morw2
mawm2
(at) --> db --> au
au --> aob,pc
(dbin) --> dbd --> alu
edb --> dbin,irc
(rxl) --> ab --> alu
0 --> au
trix
dbi
2i
ukuk
38e
morl1
morw1
alu --> dob
(alue) --> dbd --> alu
au --> db --> aob,au
(rxh) --> ab --> alu
-2 --> au
twop
db
3f
349
morl2
morl2
morw2

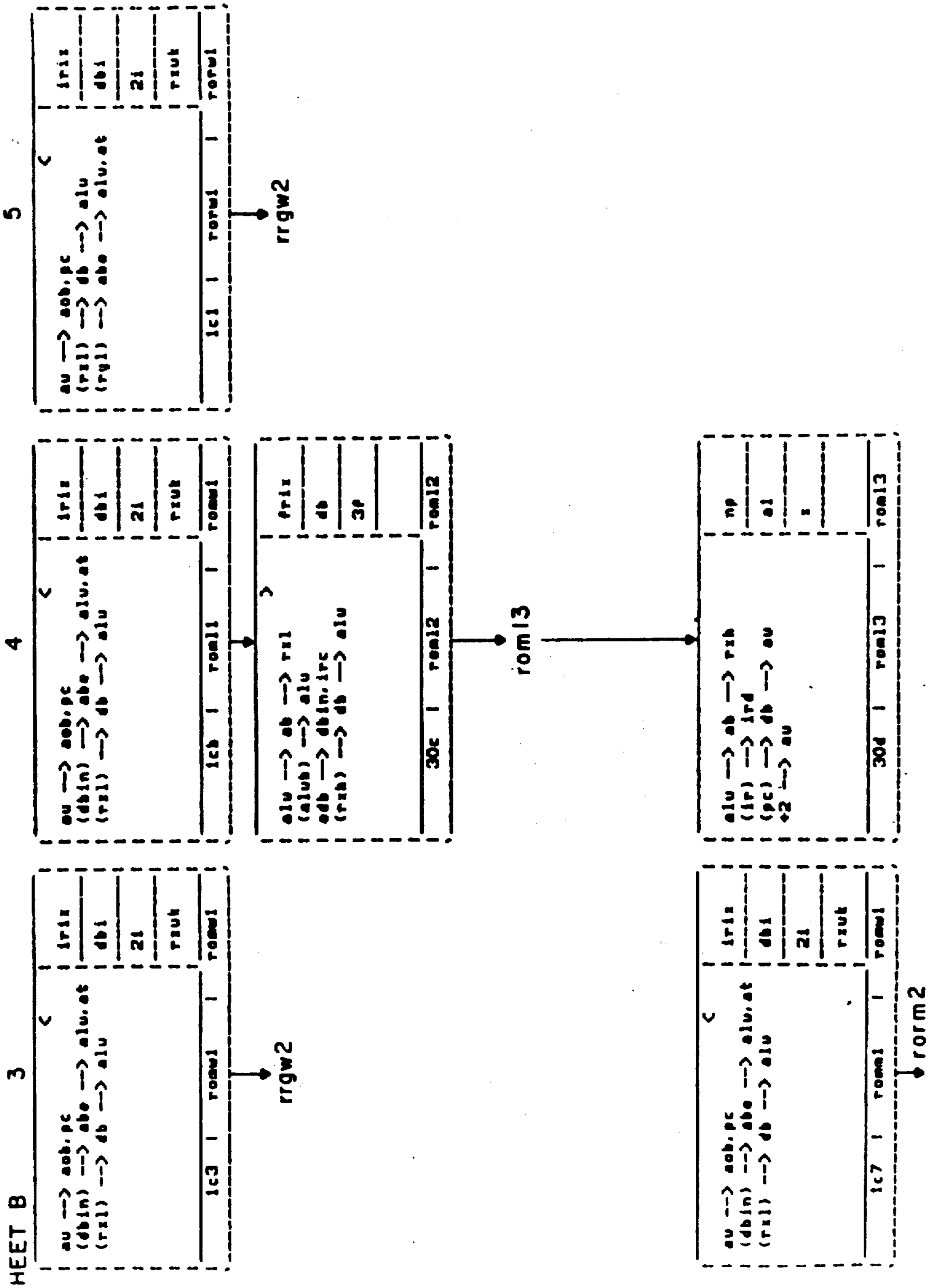
HEET B
3
4
5
rrgw2
roml3
rrgw2
rorm2

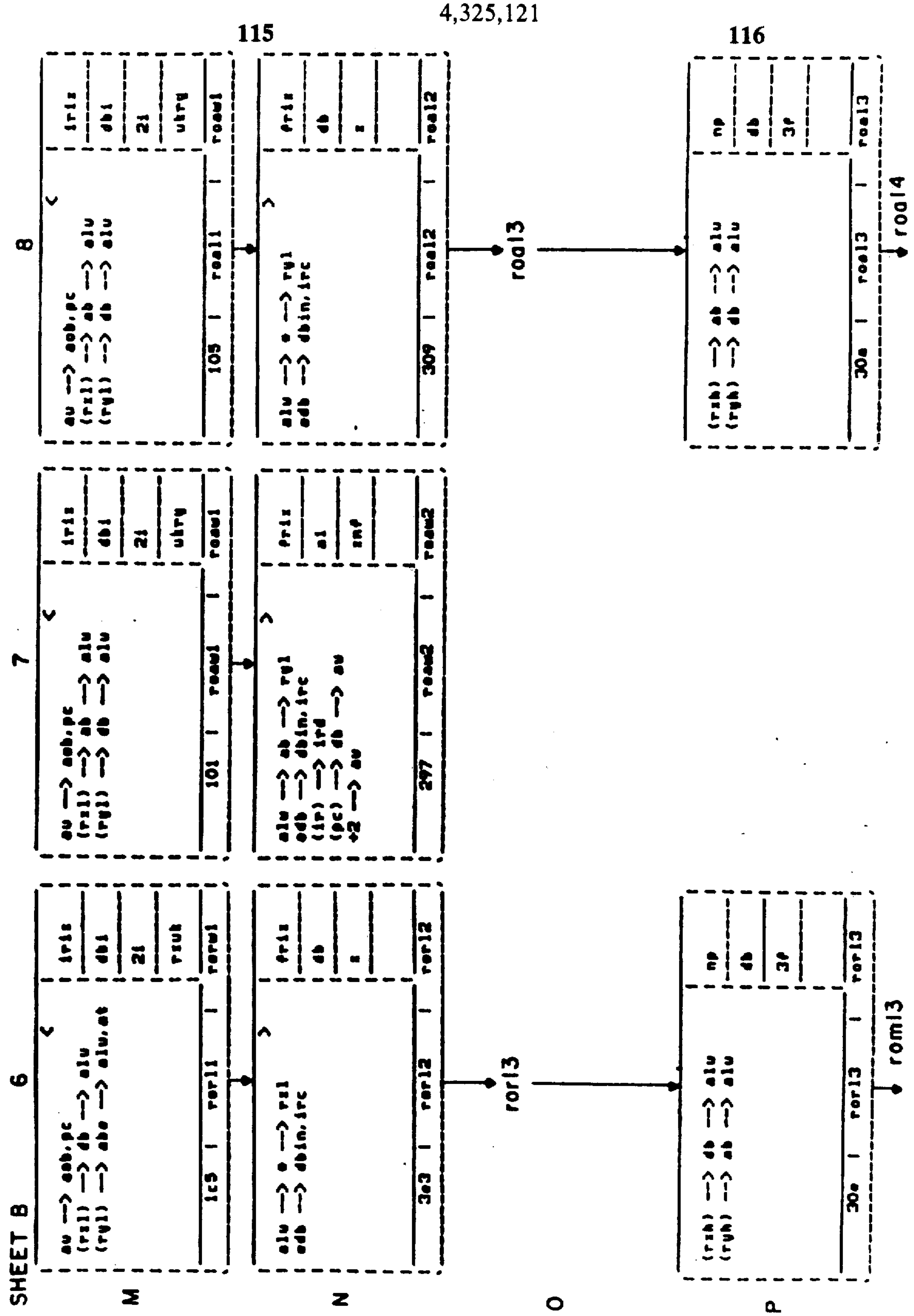
115
116
8
7
6
SHEET B
M
N
O
P
roal3
roal4
rorl3
roml3

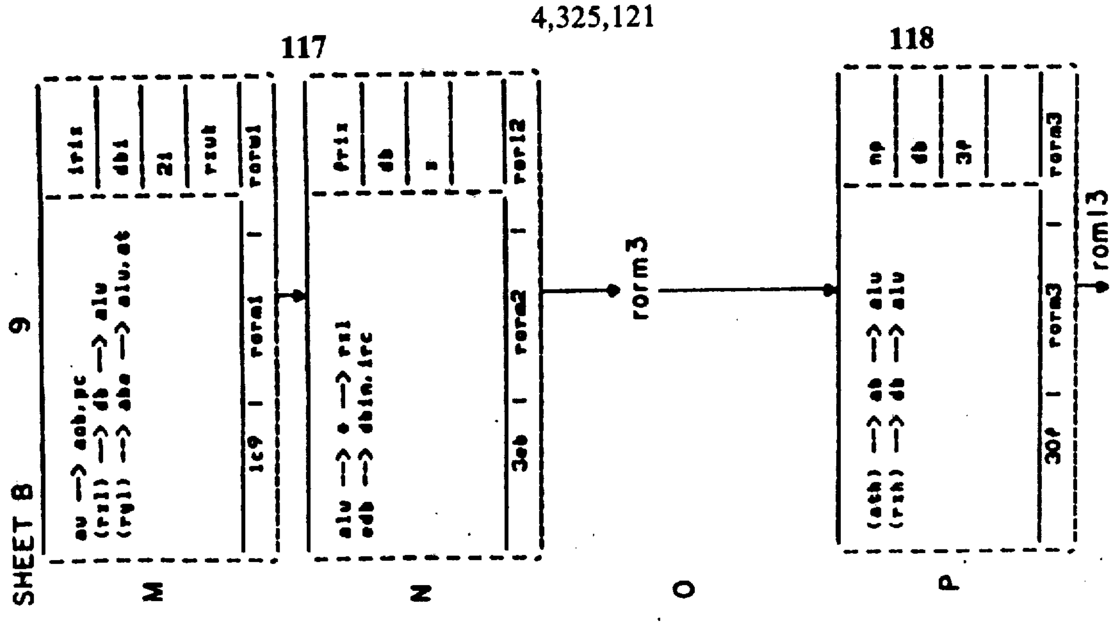
SHEET B
9
117
118
M
N
O
P
rorm3
roml3

SHEET B 6 7 8

```
alu --> ab --> ryh        | np
(ir) --> ird              | al
(pc) --> db --> au        | x
+2 --> au                 |
30b | roal4 |              roal4
```

Q

R

S

T

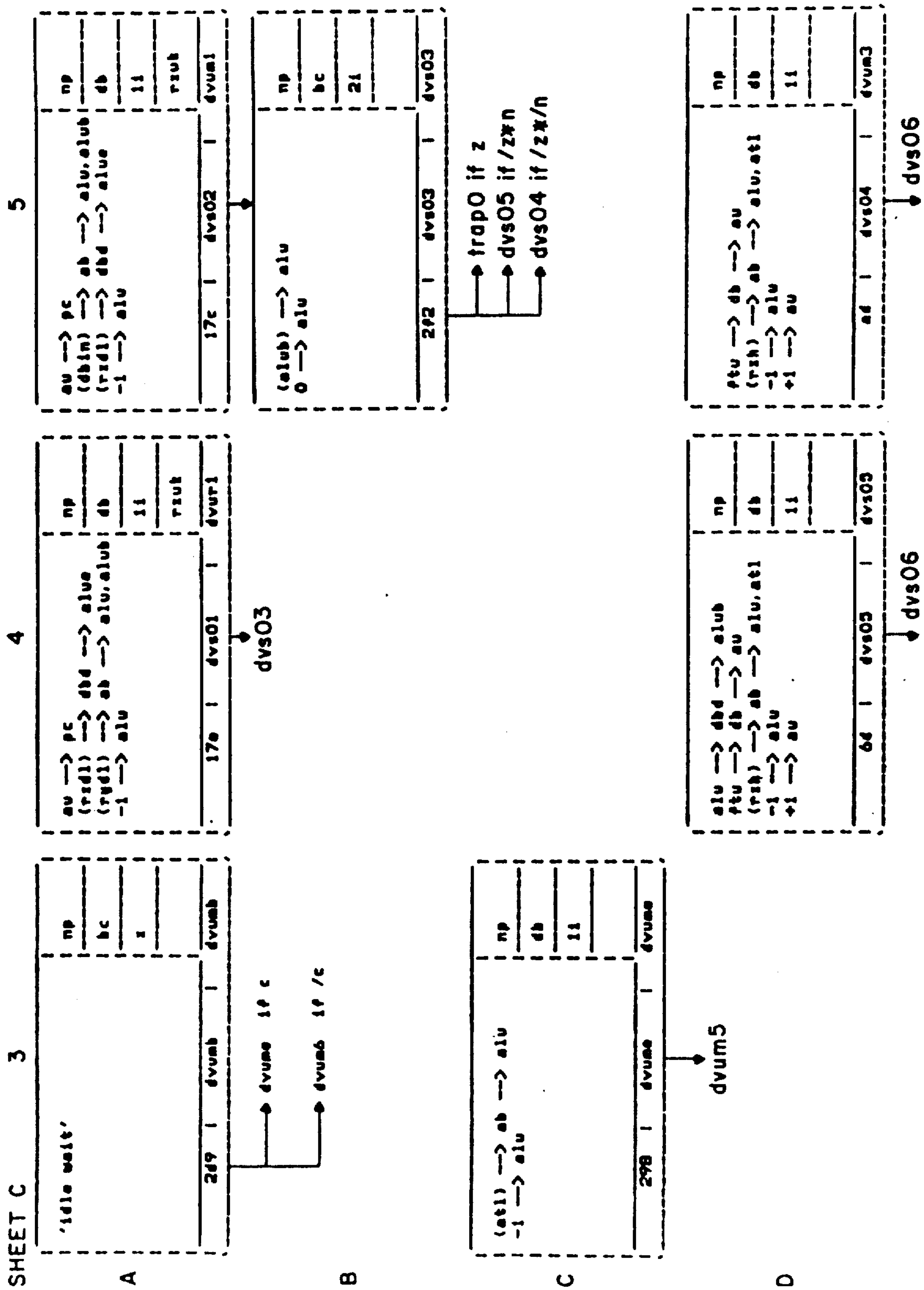
SHEET C
A
B
C
D
3
4
5
'idle wait'
dvum5
dvs03
dvs06
dvs06
trap0 if z
dvs05 if /z*n
dvs04 if /z*/n

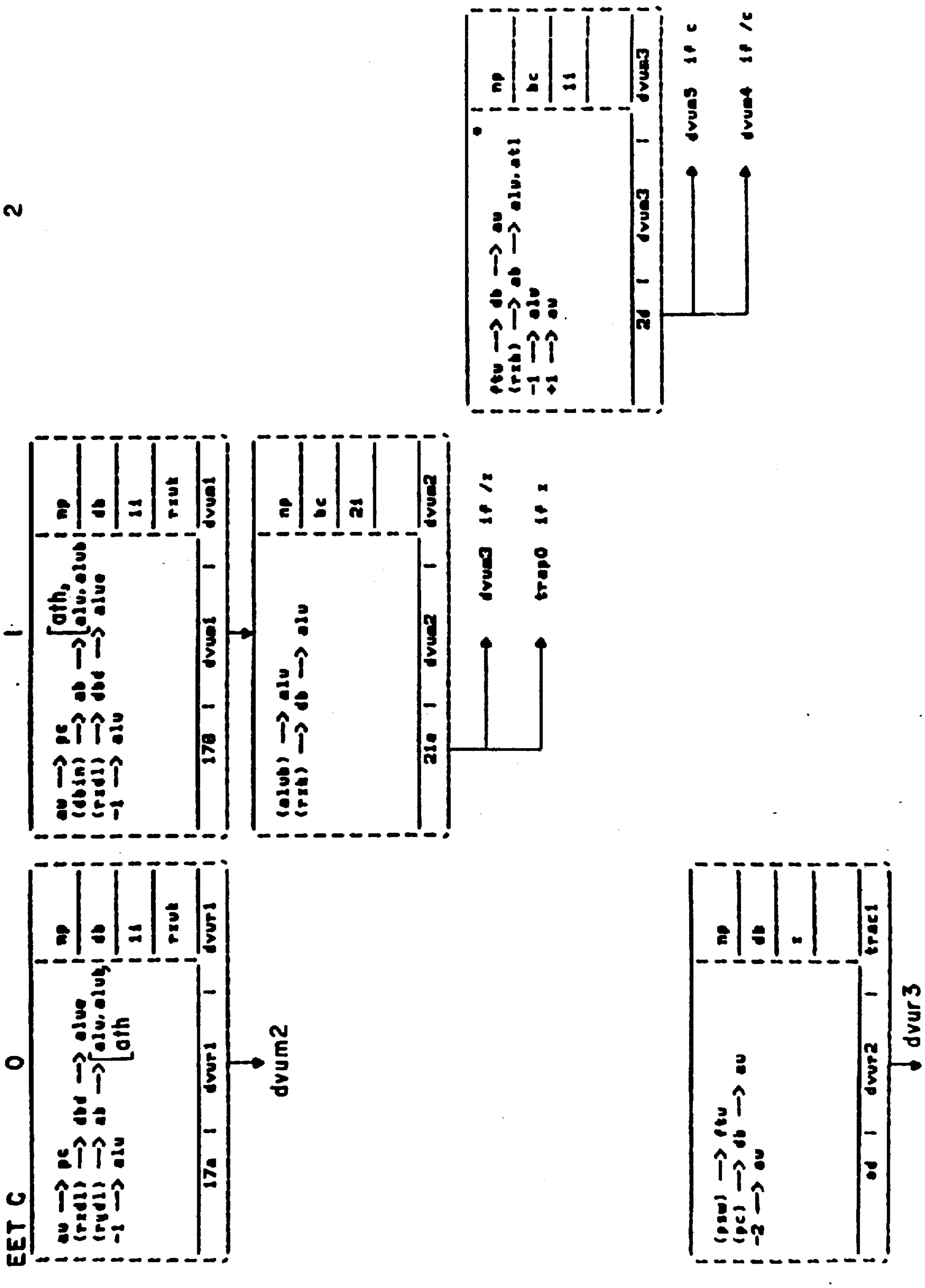
EET C
0
1
2
au —> pc
(rzdl) —> dbd —> alue
(rydl) —> ab —> alu,alub
ath
-1 —> alu
17a
dvur1
np
db
11
rzuk
dvum2
au —> pc
(dbin) —> ab —> ath
(rzdl) —> dbd —> alue
-1 —> alu
17B
dvum1
(alub) —> alu
(rzh) —> db —> alu
21a
dvum2
np
hc
21
dvum3 if /z
trap0 if z
ftu —> db —> au
(rzh) —> ab —> alu,atl
-1 —> alu
+1 —> au
2d
dvum3
np
hc
11
dvum5 if c
dvum4 if /c
(psw) —> ftu
(pc) —> db —> au
-2 —> au
ad
dvur2
np
db
z
trac1
dvur3

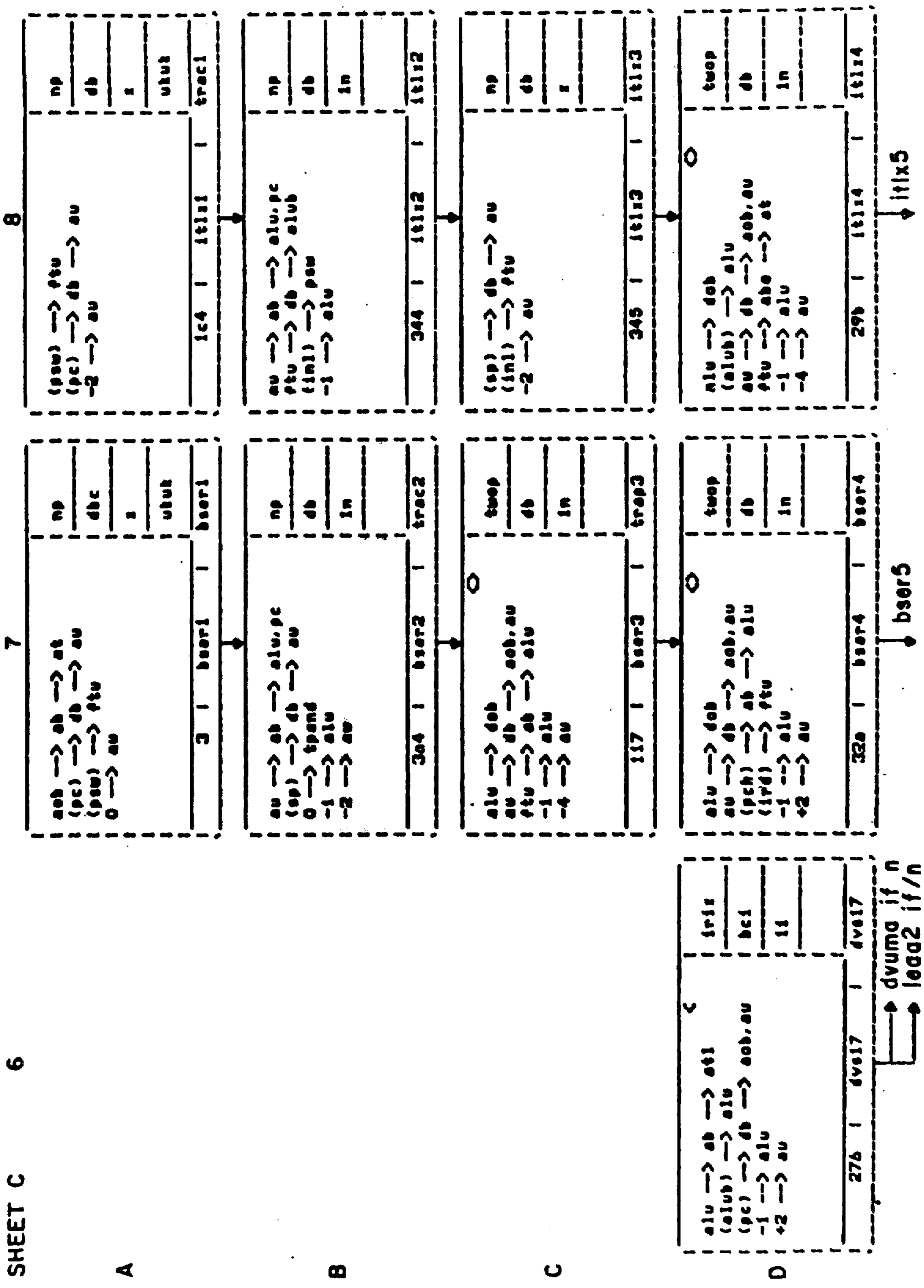
SHEET C
6
7
8
A
B
C
D
bser5
ltlx5
dvuma if n
leaa2 if/n

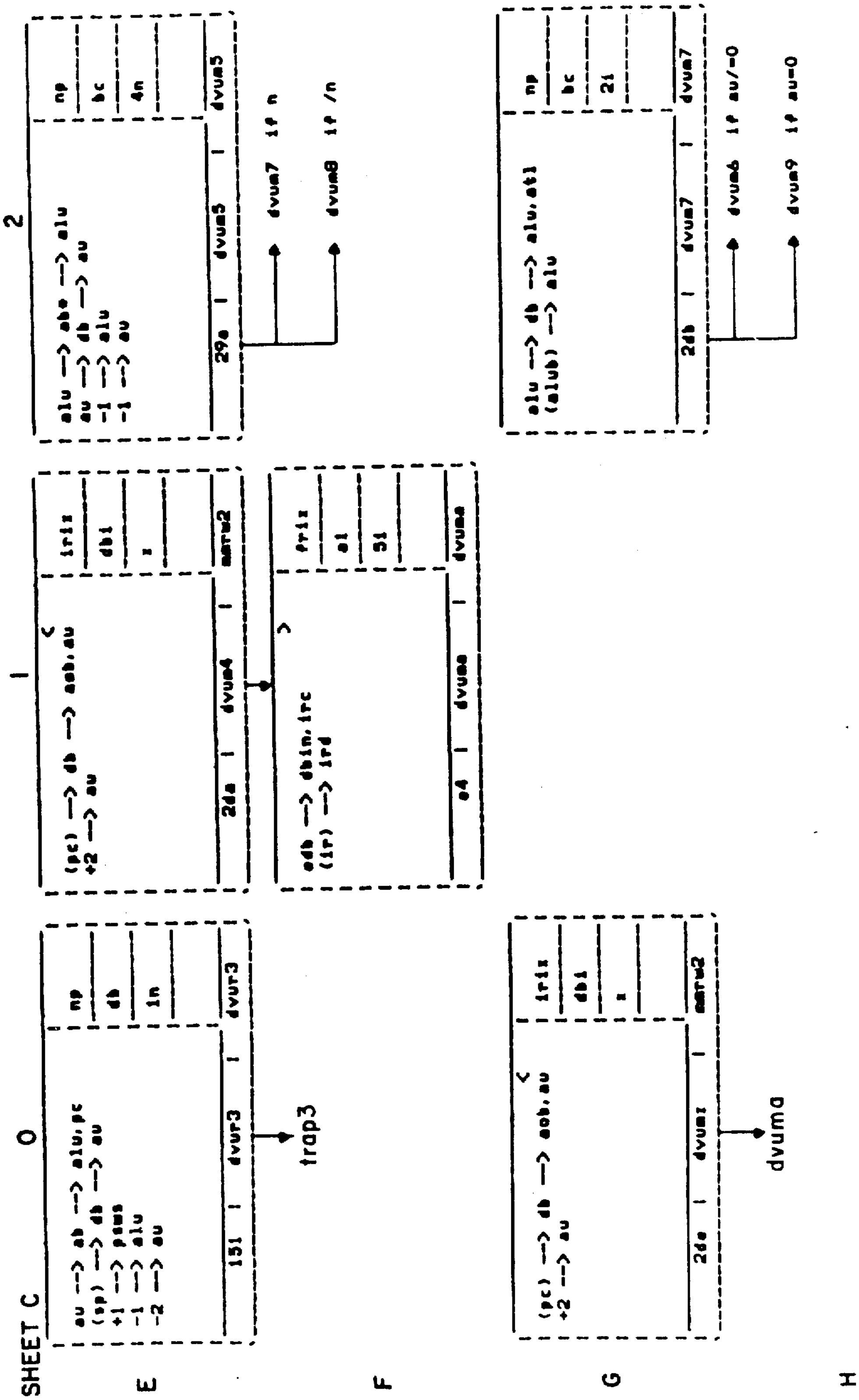
SHEET C
E
F
G
H
0
1
2
trap3
dvuma

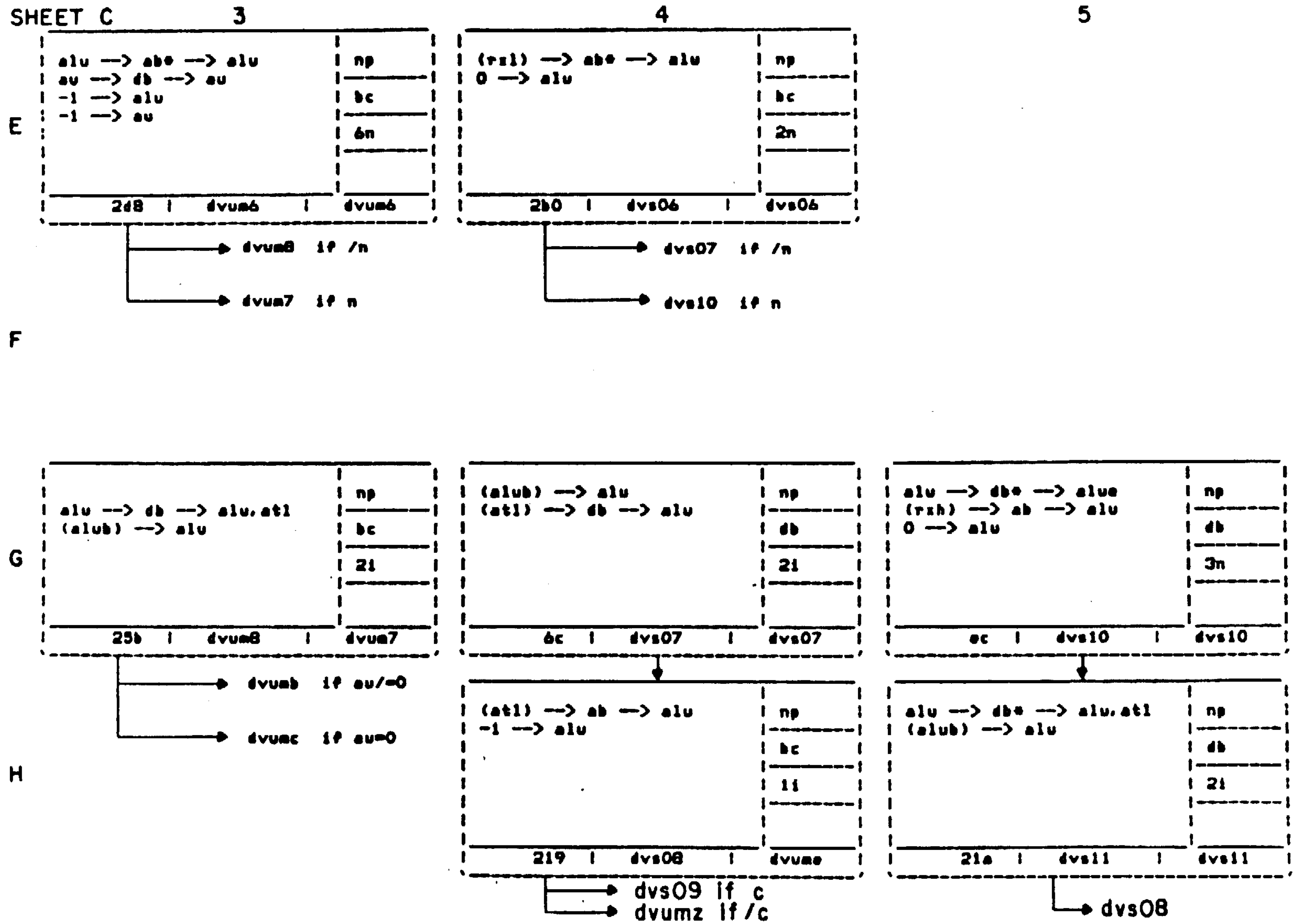
SHEET C
3
4
5
E
F
G
H
alu —> abe —> alu
au —> db —> au
-1 —> alu
-1 —> au
np
bc
6n
2d8 | dvum6 | dvum6
dvum8 if /n
dvum7 if n
(rzl) —> abe —> alu
0 —> alu
np
bc
2n
2b0 | dvs06 | dvs06
dvs07 if /n
dvs10 if n
alu —> db —> alu,atl
(alub) —> alu
np
bc
2i
25b | dvum8 | dvum7
dvumb if au/=0
dvumc if au=0
(alub) —> alu
(atl) —> db —> alu
np
db
2i
6c | dvs07 | dvs07
alu —> dbe —> alue
(rzh) —> ab —> alu
0 —> alu
np
db
3n
ec | dvs10 | dvs10
(atl) —> ab —> alu
-1 —> alu
np
bc
1i
219 | dvs08 | dvume
dvs09 if c
dvumz if /c
alu —> dbe —> alu,atl
(alub) —> alu
np
db
2i
21a | dvs11 | dvs11
dvs08

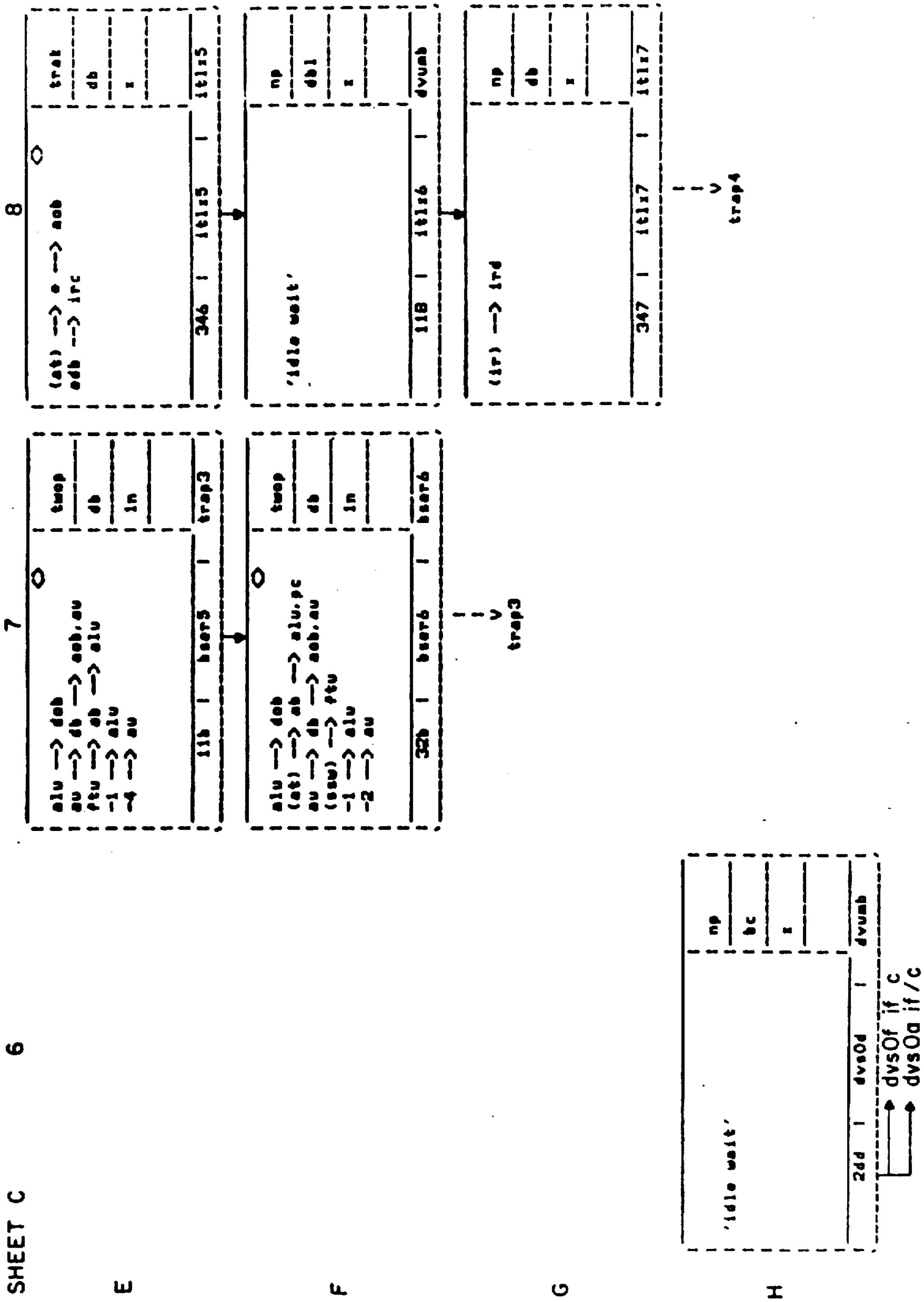
SHEET C
6
7
8
E
F
G
H
alu —> dab
au —> db —> aob,au
ftu —> ab —> alu
-1 —> alu
-4 —> au
11b
bser5
trap3
twap
db
in
alu —> dab
(at) —> ab —> alu,pc
au —> db —> aob,au
(ssw) —> ftu
-1 —> alu
-2 —> au
32b
bser6
trap3
(at) —> a —> aob
adb —> irc
346
itlz5
trak
db
'idle wait'
11B
itlz6
dvumb
np
dbl
(ir) —> ird
347
itlz7
np
db
trap4
'idle wait'
2dd
dvs0d
dvumb
np
bc
dvs0f if c
dvs0a if/c SHEET C 9
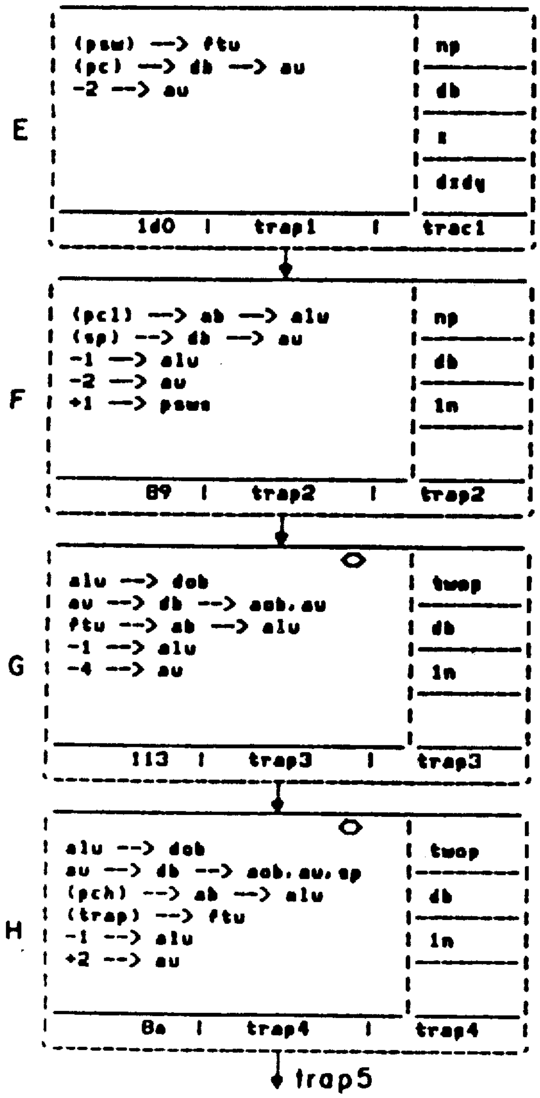

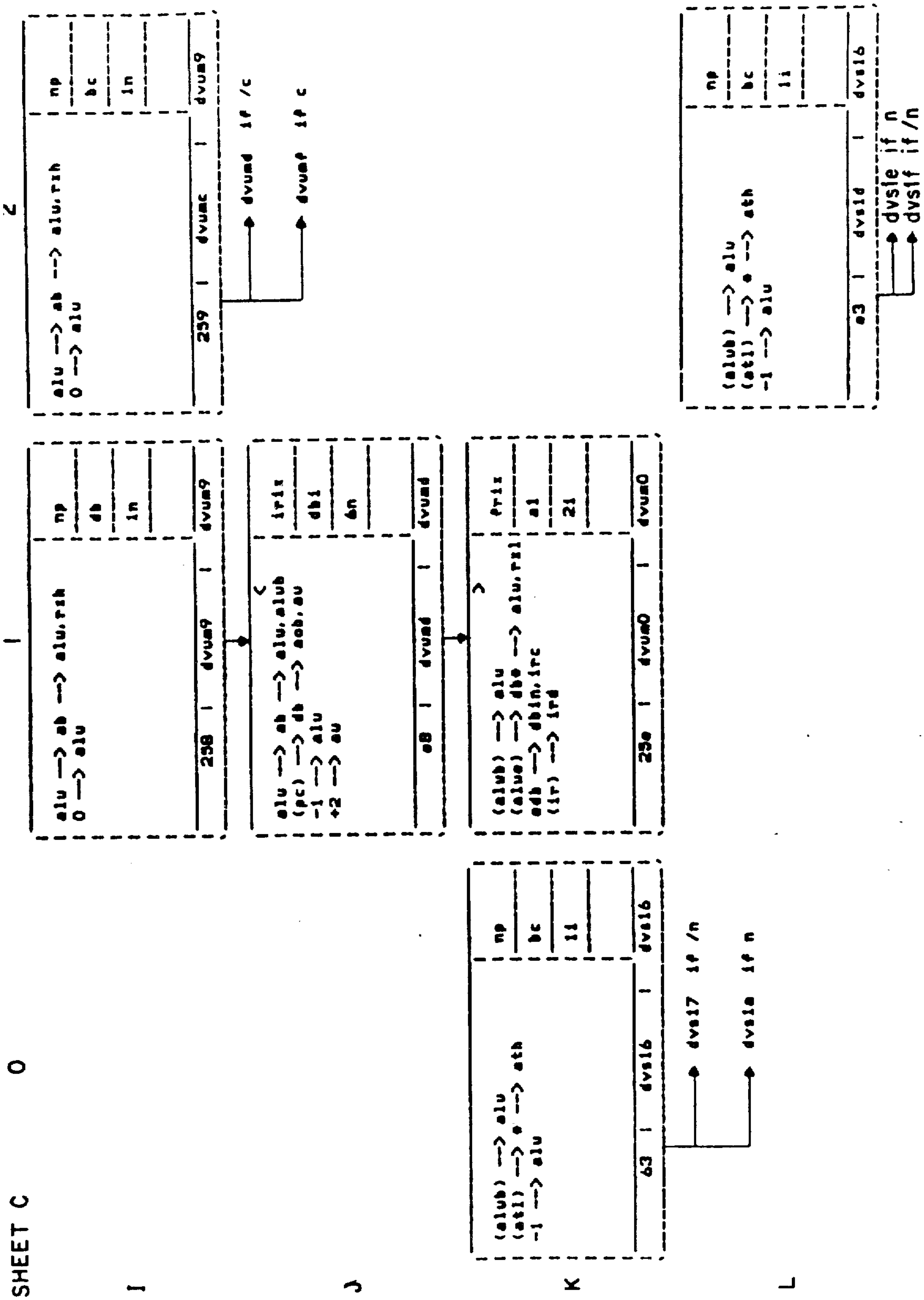
SHEET C
I
J
K
L
alu ---> ab ---> alu,rxh
0 ---> alu
258
dvum9
np
db
ln
259
dvumc
bc
dvumd if /c
dvumf if c
alu ---> ab ---> alu,alub
(pc) ---> db ---> aob,au
-1 ---> alu
+2 ---> au
e8
dvumd
irix
dbi
(alub) ---> alu
(alue) ---> dbe ---> alu,rxl
adb ---> dbin,irc
(ir) ---> ird
25e
dvum0
frix
a1
21
(alub) ---> alu
(atl) ---> e ---> ath
-1 ---> alu
63
dvsi6
li
dvsi7 if /n
dvsie if n
e3
dvsid
dvsie if n
dvsif if /n

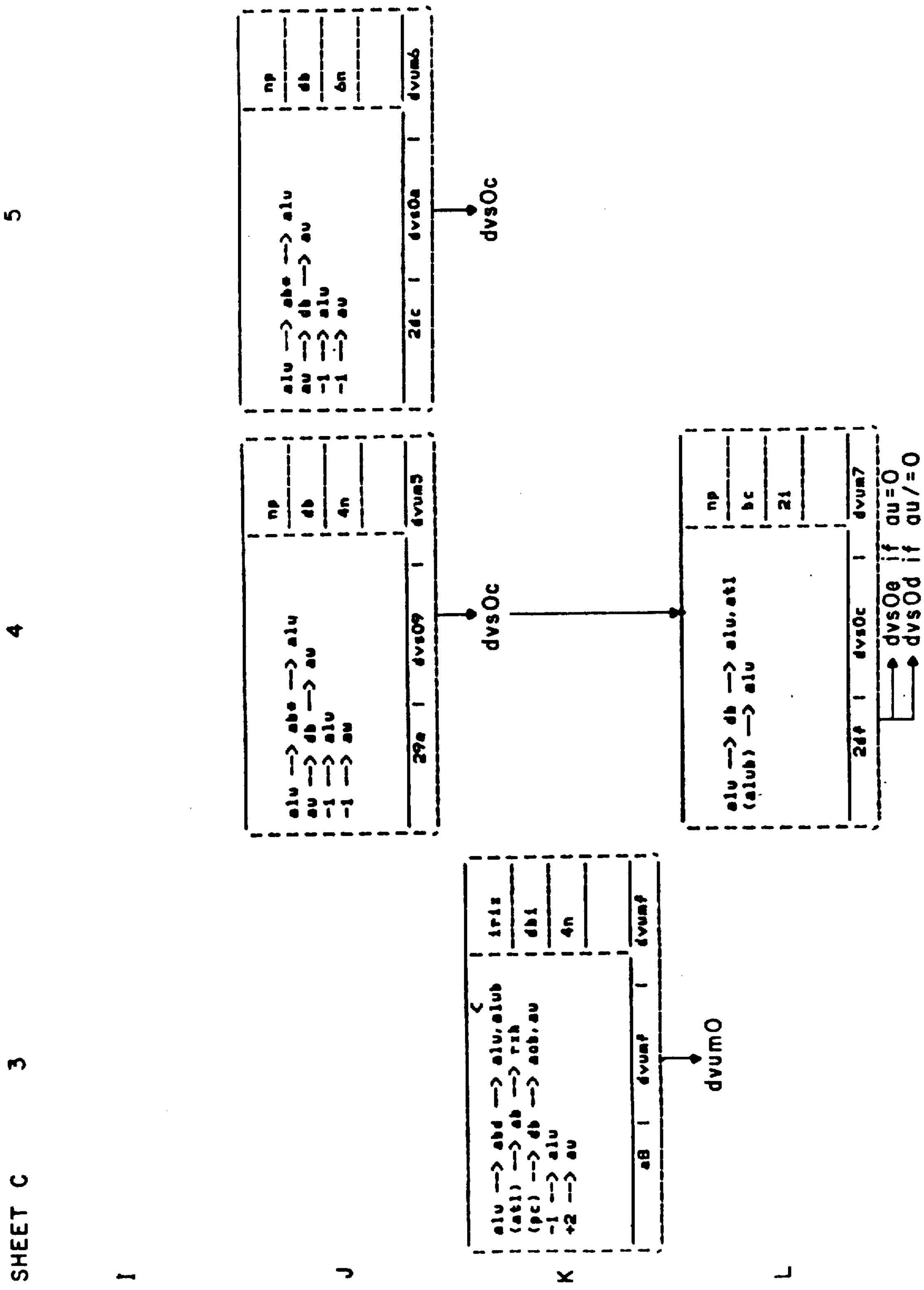
SHEET C
3
4
5
I
J
K
L
alu --> abd --> alu,alub
(atl) --> db --> rzh
(pc) --> db --> aob,au
-1 --> alu
+2 --> au
aB
dvumf
dvumf
dvumO
alu --> abe --> alu
au --> db --> au
-1 --> alu
-1 --> au
29a
dvs09
np
db
4n
dvum5
dvsOc
alu --> abe --> alu
au --> db --> au
-1 --> alu
-1 --> au
2dc
dvsOa
np
db
6n
dvum6
dvsOc
alu --> db --> alu,atl
(alub) --> alu
2df
dvsOc
np
bc
21
dvum7
dvsOe if au=O
dvsOd if au/=O

SHEET C 9

I
```
 alu --> dob                      | twop
 (alub) --> alu                   | db
 au --> db --> aob,au             | x
 ftu --> abe --> at               |
 -1 --> alu                       |
 -4 --> au                        |
      29f | trap5 |                 itlx4
```

J
```
 (at) --> db --> aob,au           | trix
 au --> pc                        | db
 edb --> dbin                     | x
 +2 --> au                        |
 reset pren                       |
      2fe | trap6 |                 ldmd4
              |
              v
            jmal1
```

K

L
```
 au --> aob                       | trin
 (dbin) --> dbe --> au            | db
 edb --> dbin,irc                 | x
 (rya) --> ab --> au              | rxry
      1d6 | mpil1 |                 adswl
              |
              v mpil 2
```

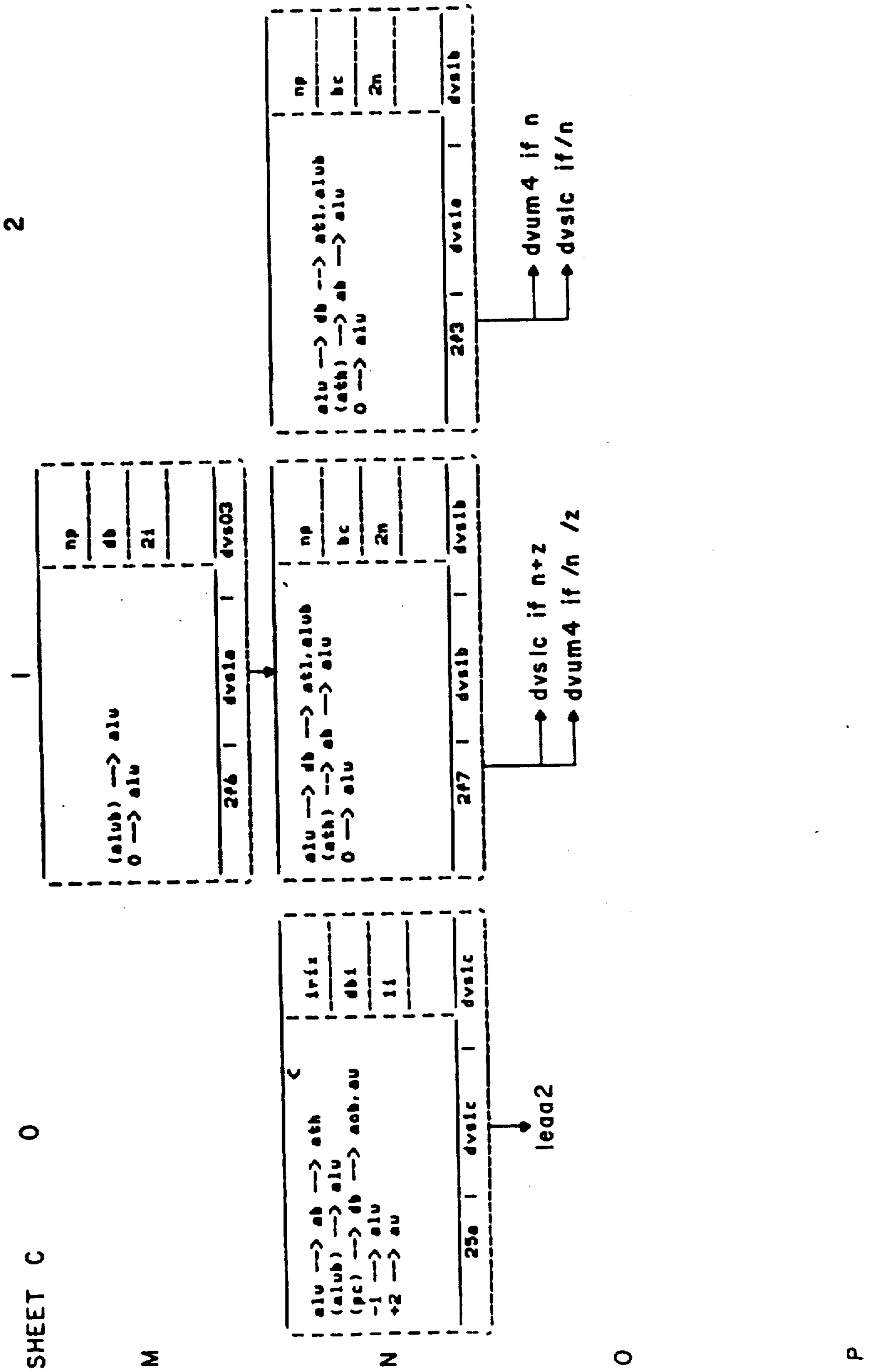
SHEET C
dvum4 if n
dvslc if /n
dvslc if n+z
dvum4 if /n /z
leaa2

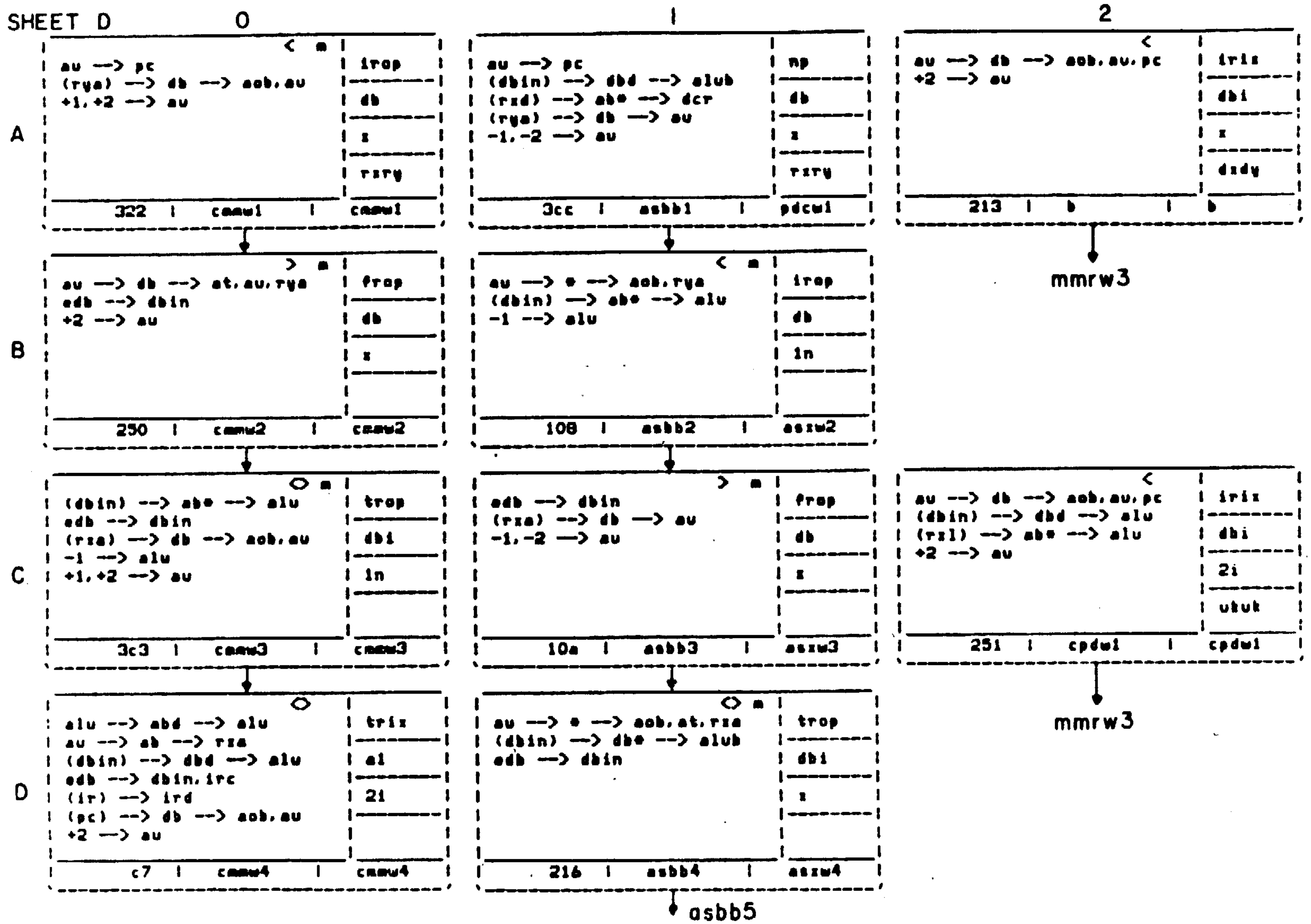
SHEET D
0
1
2
A
B
C
D
au --> pc
(rya) --> db --> aob,au
+1,+2 --> au
< m
irap
db
z
rxry
322 | cmmw1 | cmmw1
au --> pc
(dbin) --> dbd --> alub
(rxd) --> abe --> dcr
(rya) --> db --> au
-1,-2 --> au
np
db
z
rxry
3cc | asbb1 | pdcw1
au --> db --> aob,au,pc
+2 --> au
<
irix
dbi
z
dxdy
213 | b | b
mmrw3
au --> db --> at,au,rya
edb --> dbin
+2 --> au
> m
frap
db
z
250 | cmmw2 | cmmw2
au --> e --> aob,rya
(dbin) --> abe --> alu
-1 --> alu
< m
irap
db
1n
108 | asbb2 | aszw2
(dbin) --> abe --> alu
edb --> dbin
(rxa) --> db --> aob,au
-1 --> alu
+1,+2 --> au
<> m
trap
dbi
1n
3c3 | cmmw3 | cmmw3
edb --> dbin
(rxa) --> db --> au
-1,-2 --> au
> m
frap
db
z
10a | asbb3 | aszw3
au --> db --> aob,au,pc
(dbin) --> dbd --> alu
(rxl) --> abe --> alu
+2 --> au
<
irix
dbi
2i
ukuk
251 | cpdw1 | cpdw1
mmrw3
alu --> abd --> alu
au --> ab --> rxa
(dbin) --> dbd --> alu
edb --> dbin,irc
(ir) --> ird
(pc) --> db --> aob,au
+2 --> au
<>
trix
a1
21
c7 | cmmw4 | cmmw4
au --> e --> aob,at,rxa
(dbin) --> dbe --> alub
edb --> dbin
<> m
trap
dbi
z
216 | asbb4 | aszw4
asbb5

147
148
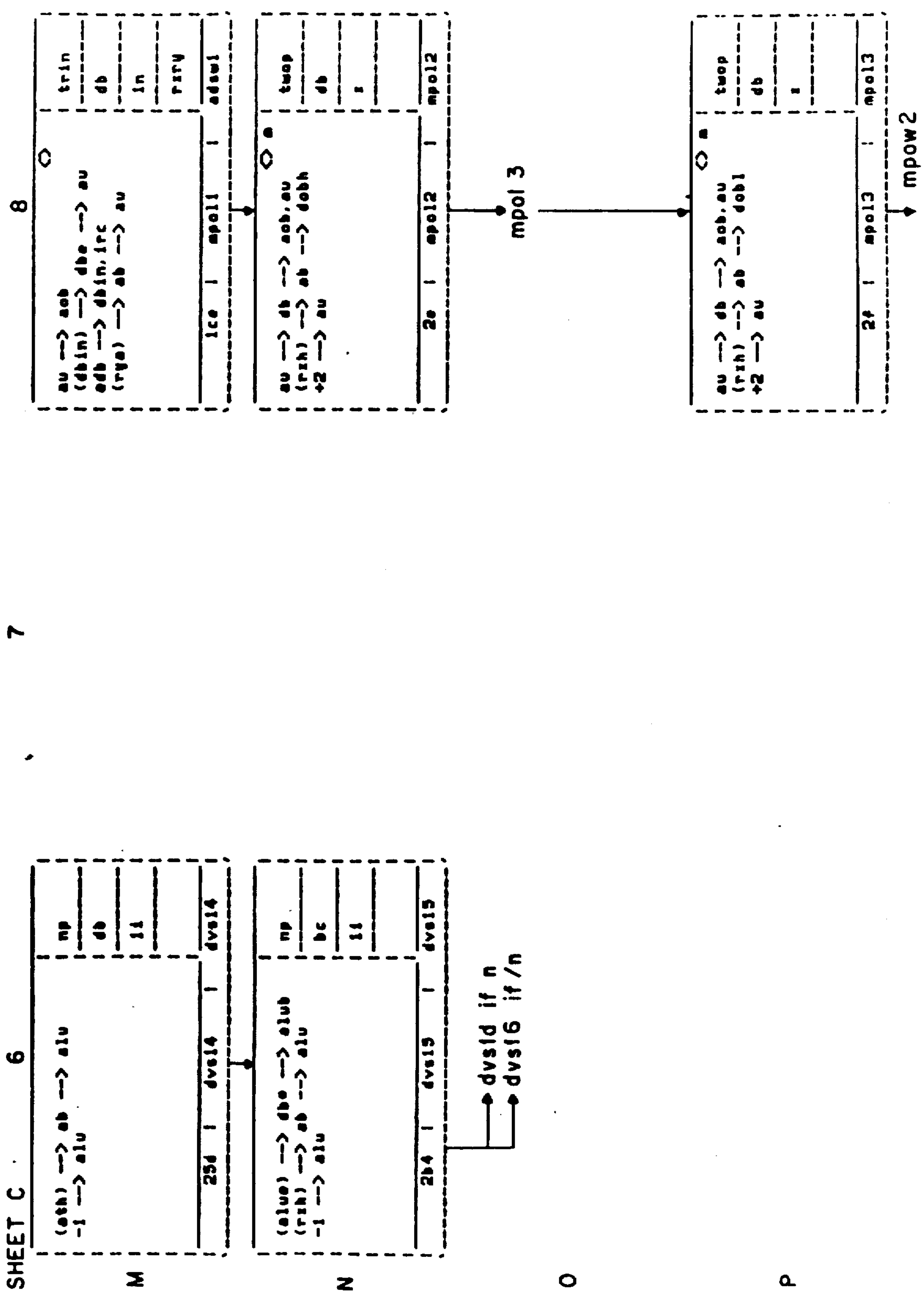

SHEET C 9
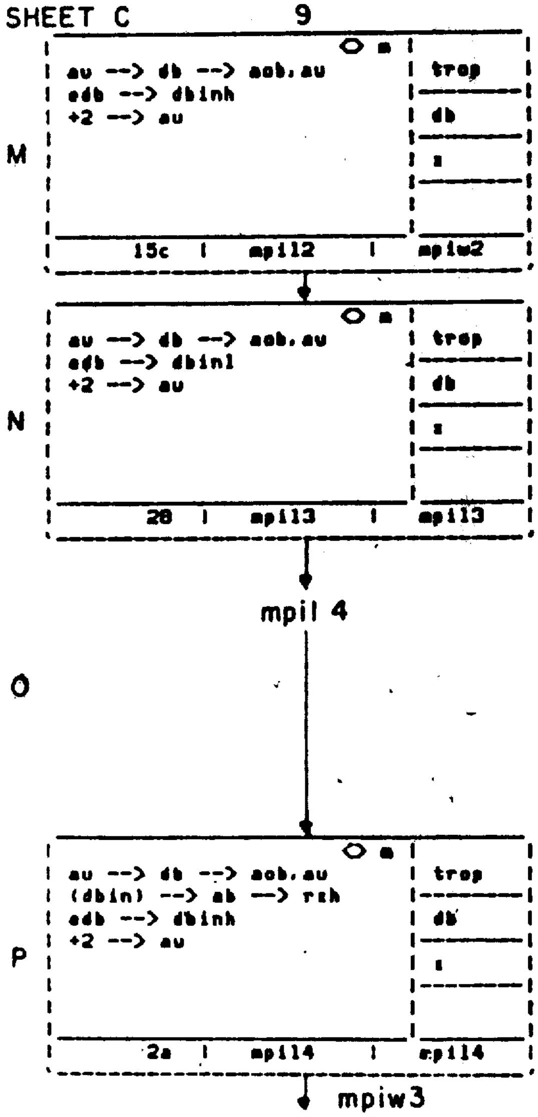

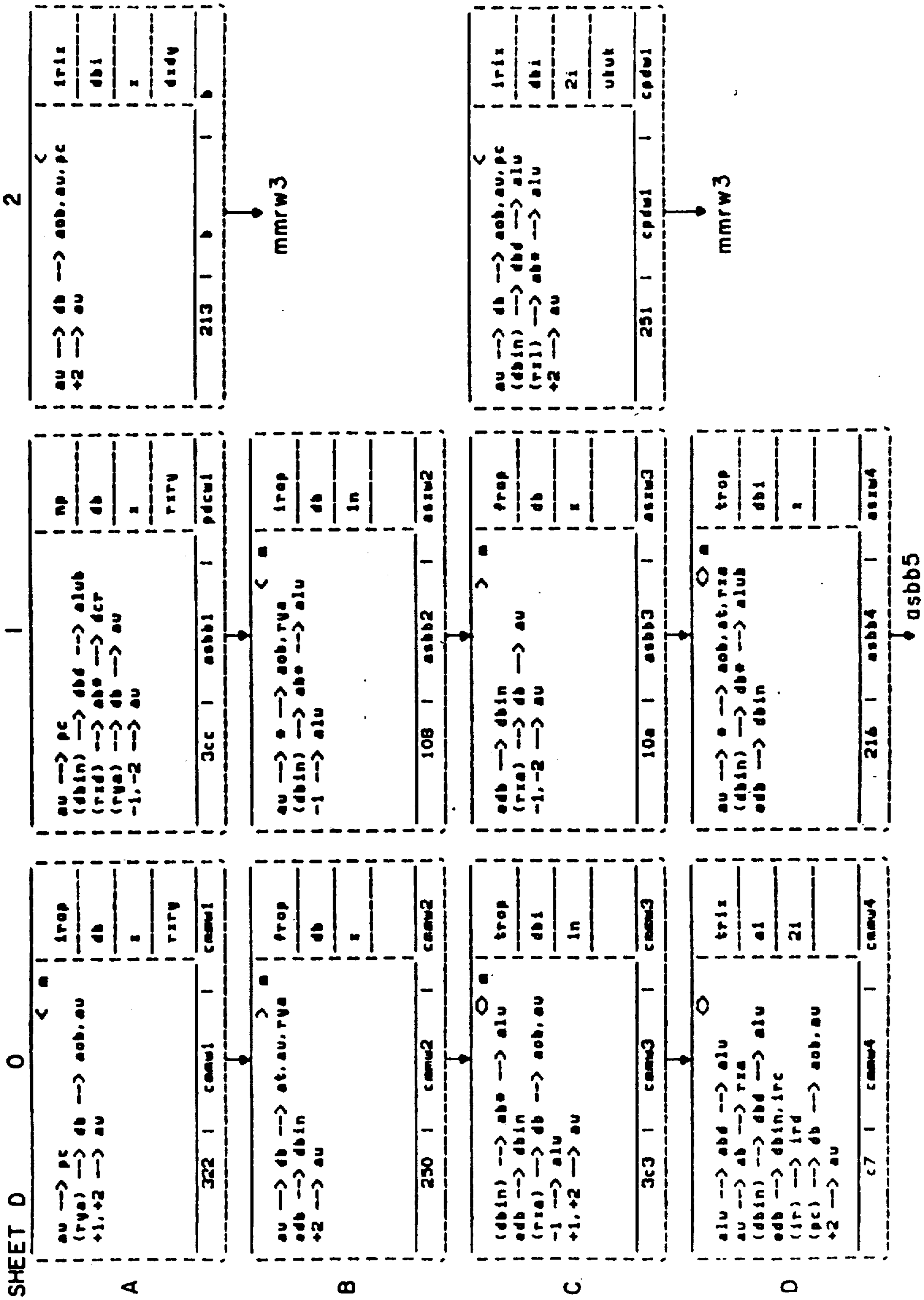
SHEET D
0
1
2
A
B
C
D
mmrw3
mmrw3
asbb5

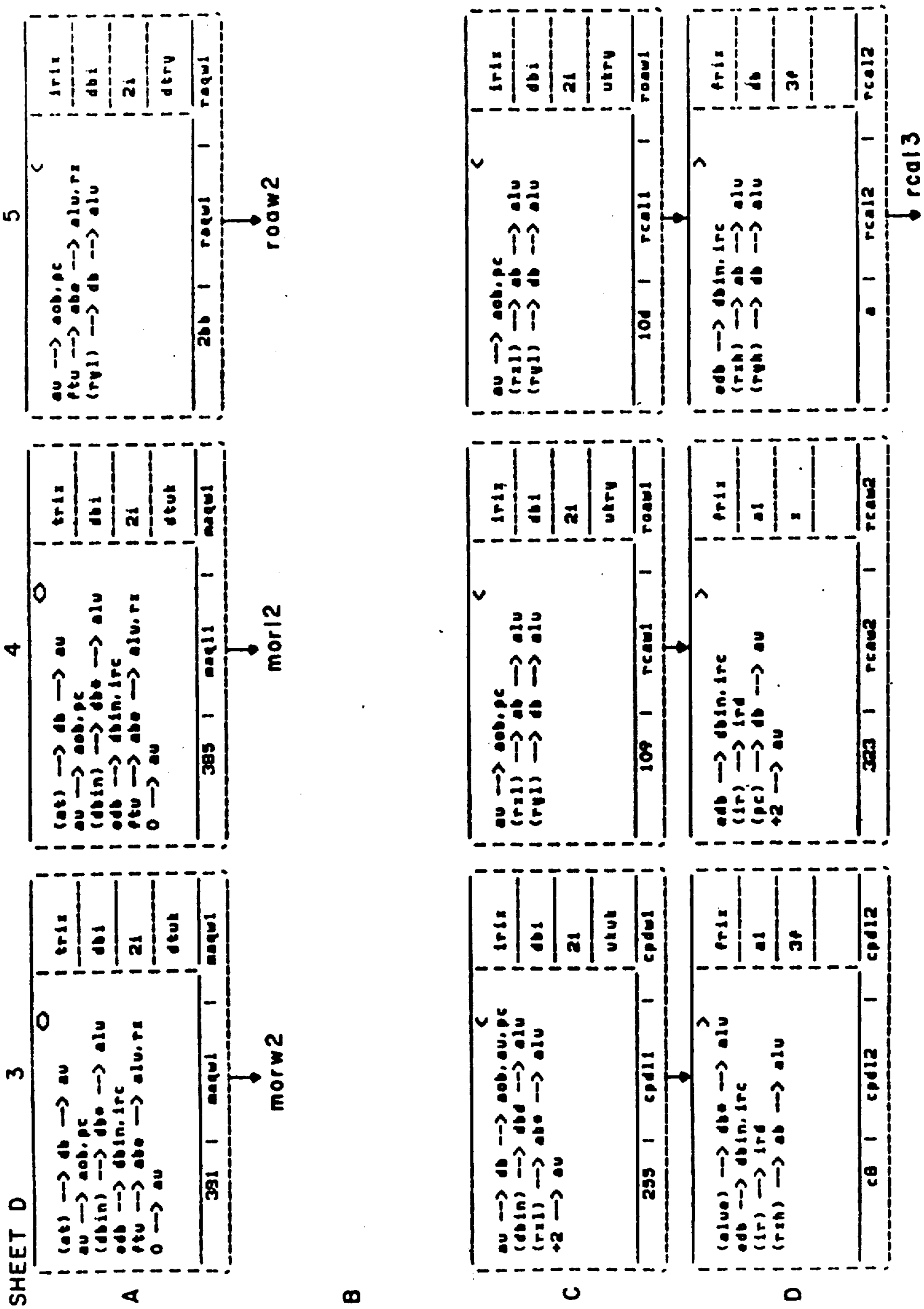
SHEET D
A
B
C
D
3
4
5
morw2
morl2
roaw2
rcal3

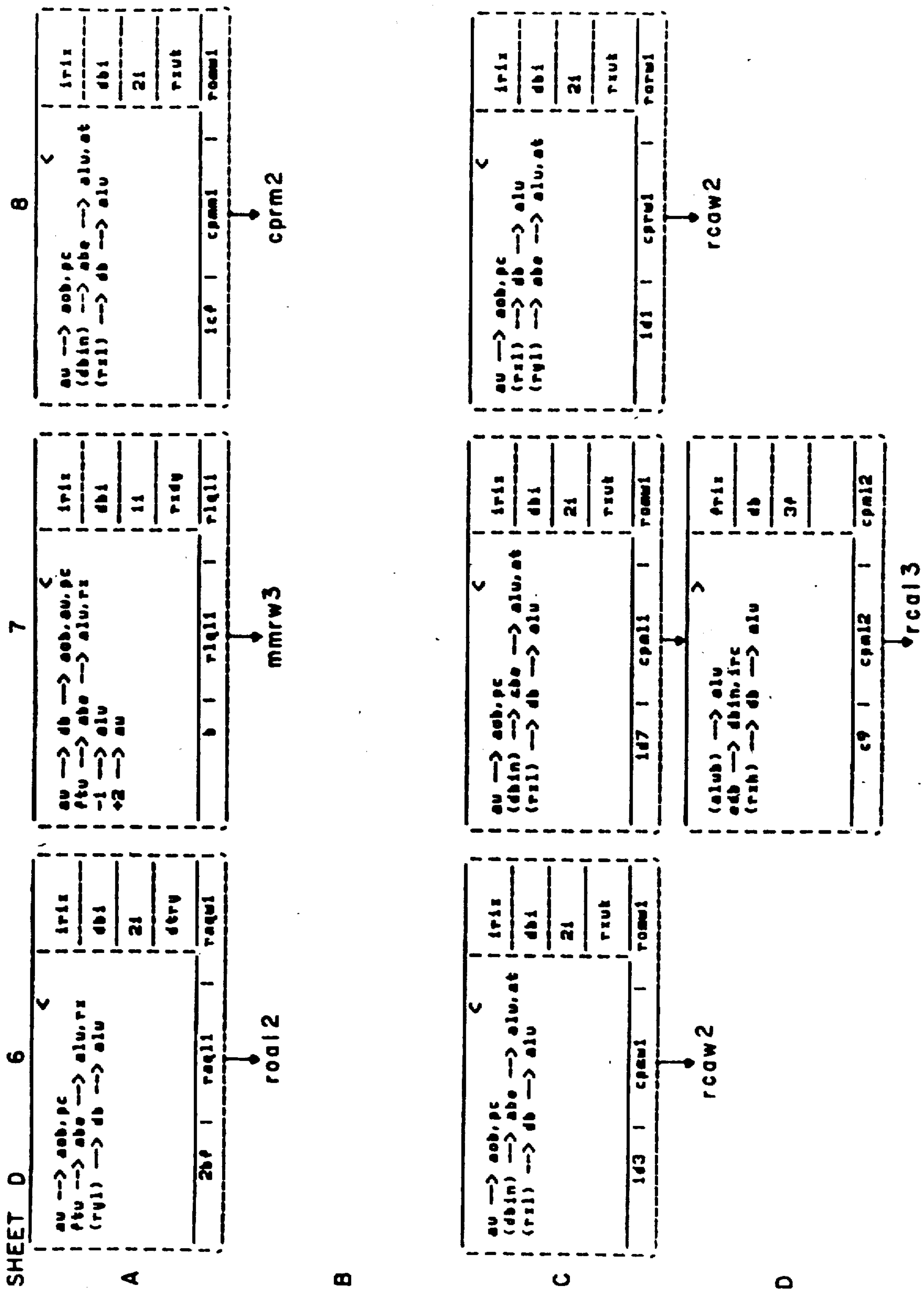
SHEET D
6
7
8
A
B
C
D
au —> aob,pc
ftu —> abe —> alu,rz
(ryl) —> db —> alu
2b0
raql1
irix
dbi
2i
dtry
raqwl
roal2
au —> db —> aob,au,pc
ftu —> abe —> alu,rz
-1 —> alu
+2 —> au
rlql1
1i
rtdy
mmrw3
au —> aob,pc
(dbin) —> abe —> alu,at
(rzl) —> db —> alu
1c0
cpmml
rzut
romml
cprm2
1d3
rcaw2
1d7
cpml1
1d1
rcaw2
(alub) —> alu
adb —> dbin,irc
(rzh) —> db —> alu
c9
cpml2
db
30
rcal3

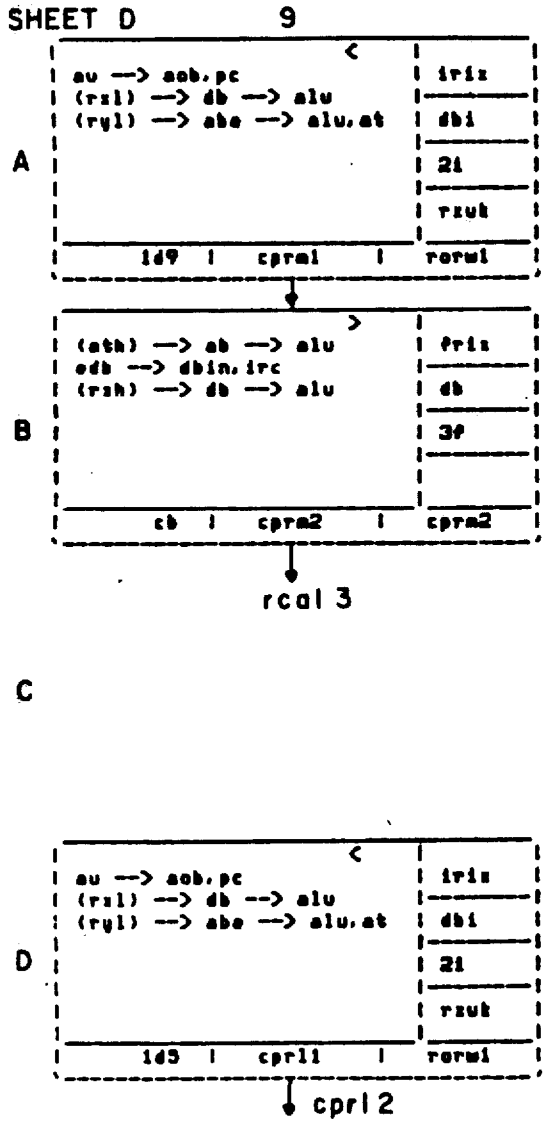
SHEET D
9
A
au --> aob,pc
(rxl) --> db --> alu
(ryl) --> abe --> alu,at
irix
dbi
2i
rxuk
ld9
cprml
rorwl
B
(ath) --> ab --> alu
edb --> dbin,irc
(rxh) --> db --> alu
db
cb
cprm2
cprm2
rcal 3
C
D
au --> aob,pc
(rxl) --> db --> alu
(ryl) --> abe --> alu,at
irix
dbi
2i
rxuk
ld3
cprl1
rorwl
cprl 2

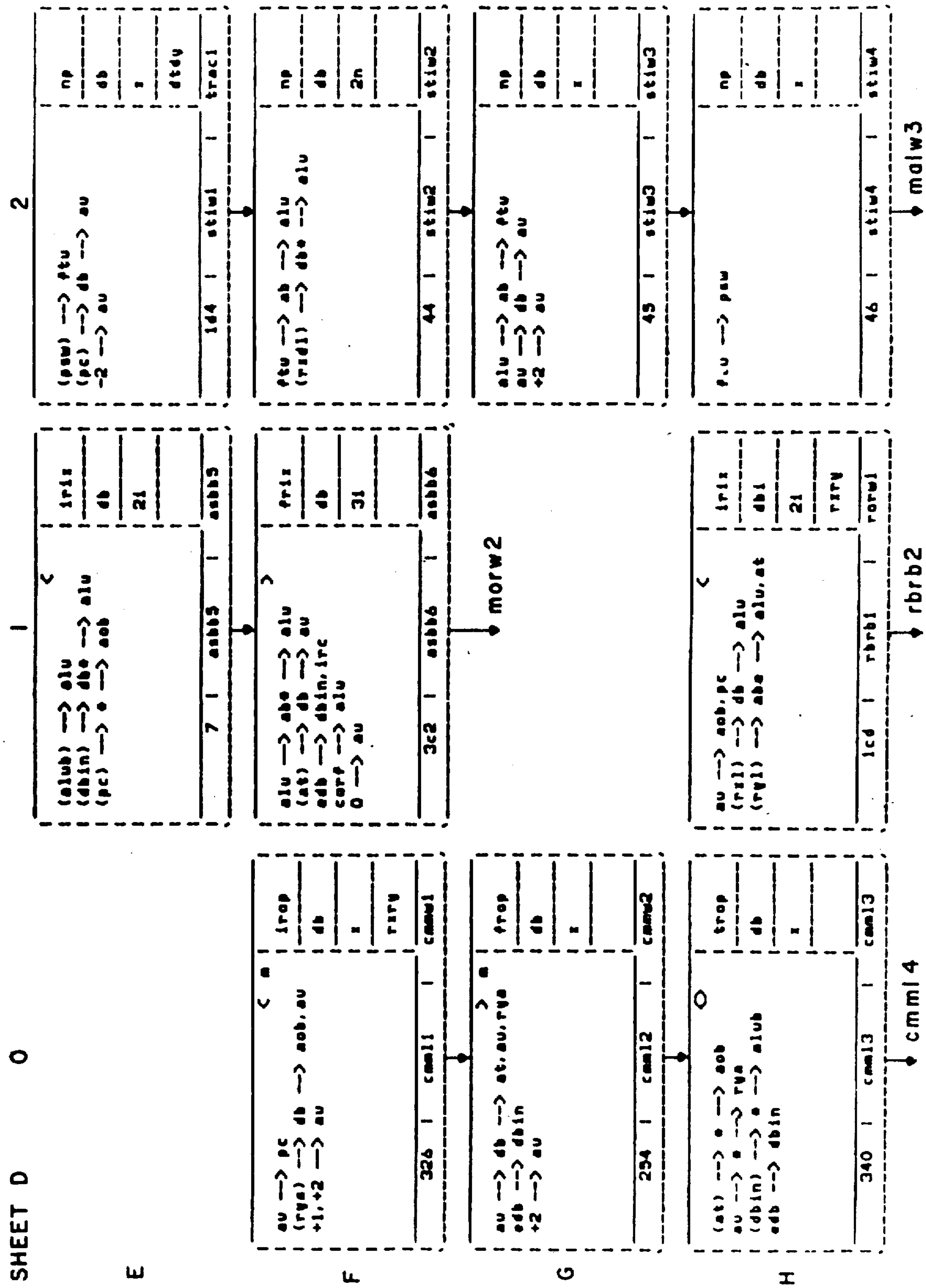
SHEET D
E
F
G
H
0
1
2
morw2
rbrb2
cmml4
malw3

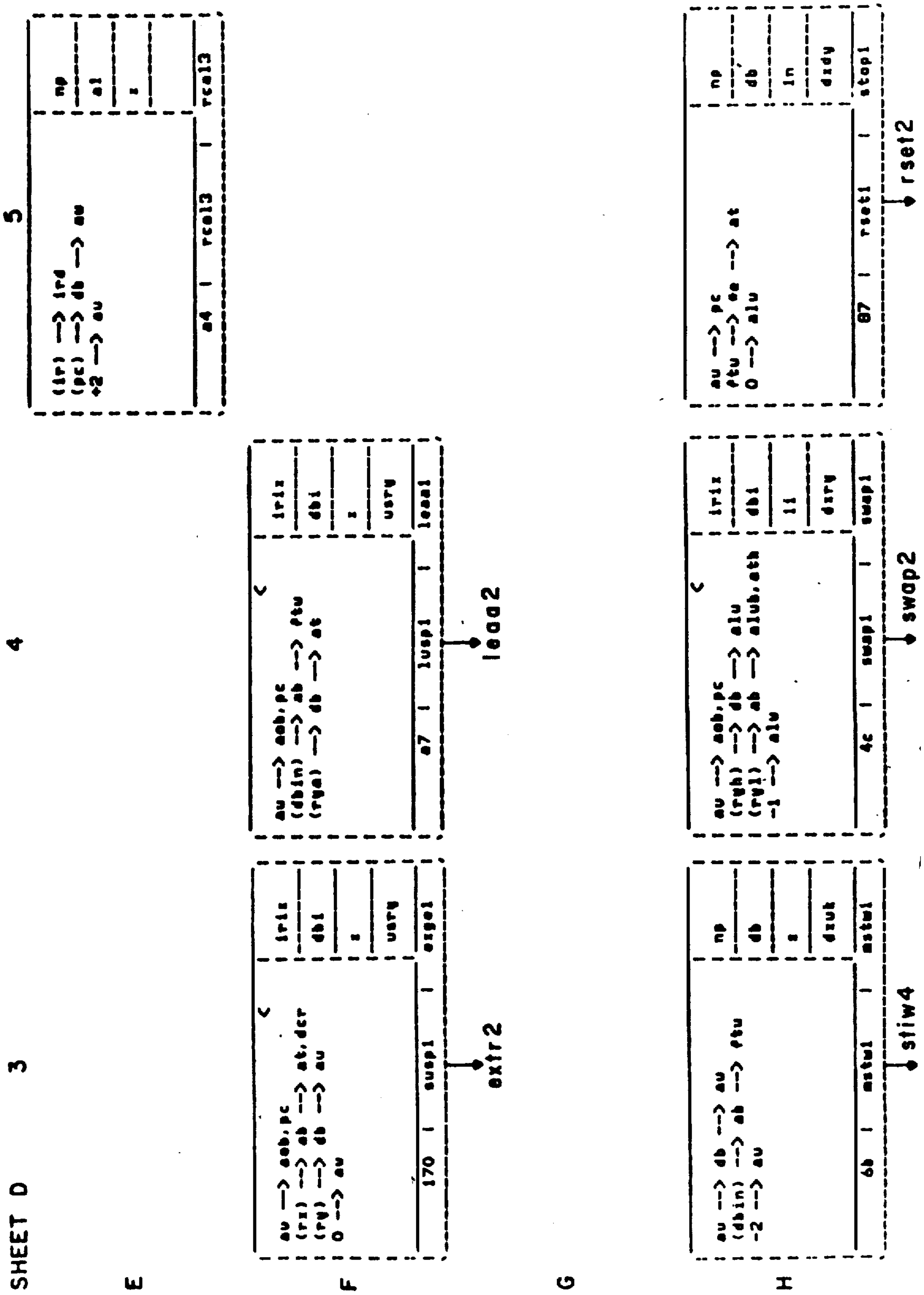
SHEET D
3
4
5
E
F
G
H
extr2
leaa2
swap2
stiw4
rset2

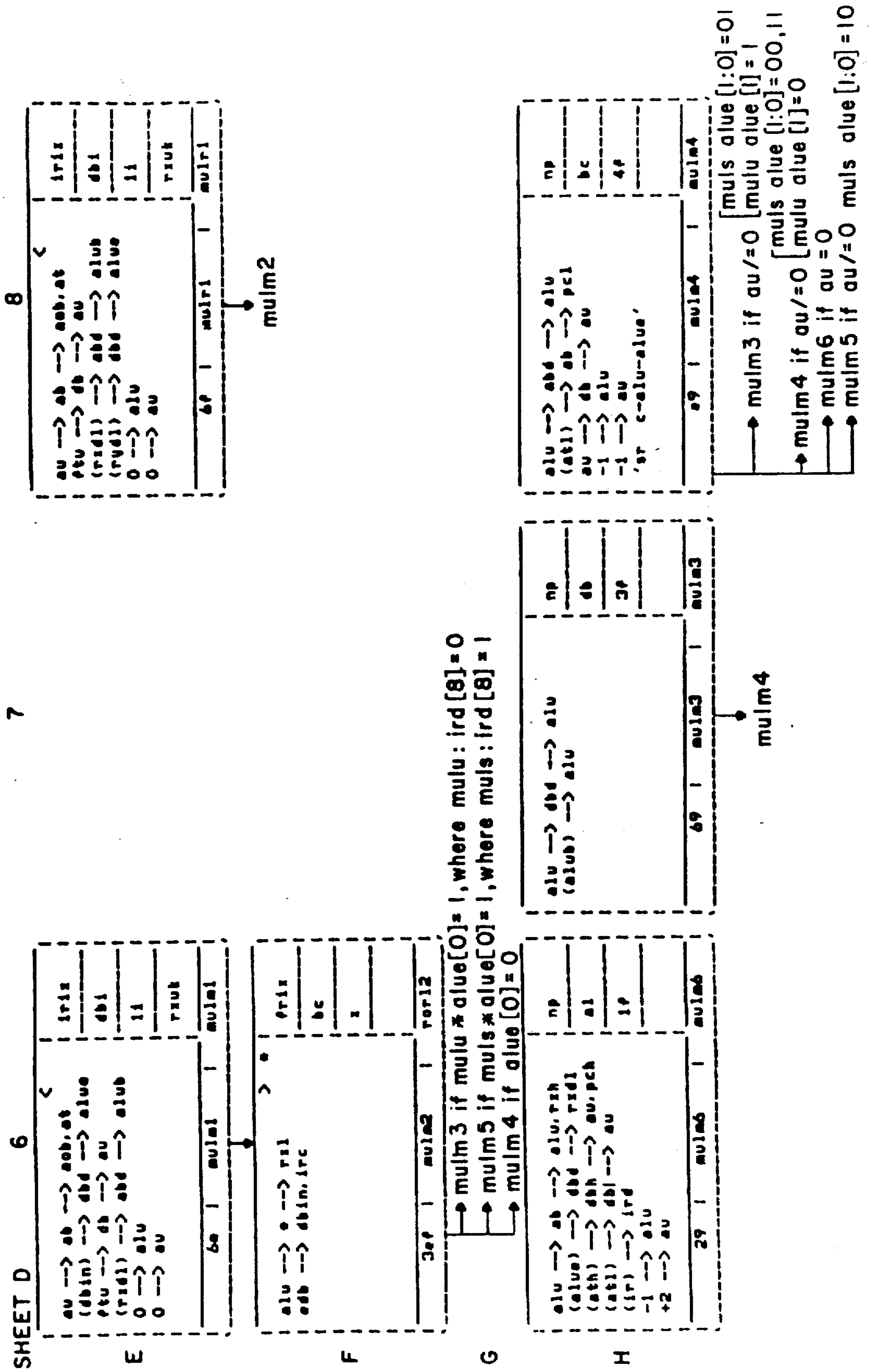
SHEET D
6
7
8
E
F
G
H
mulm2
mulm4
mulm3 if mulu * alue[0] = 1, where mulu: ird [8] = 0
mulm5 if muls * alue[0] = 1, where muls: ird [8] = 1
mulm4 if alue [0] = 0
mulm3 if au/=0 [muls alue [1:0] = 01 / mulu alue [1] = 1]
mulm4 if au/=0 [muls alue [1:0] = 00,11 / mulu alue [1] = 0]
mulm6 if au = 0
mulm5 if au/=0 muls alue [1:0] = 10

SHEET D 9
E
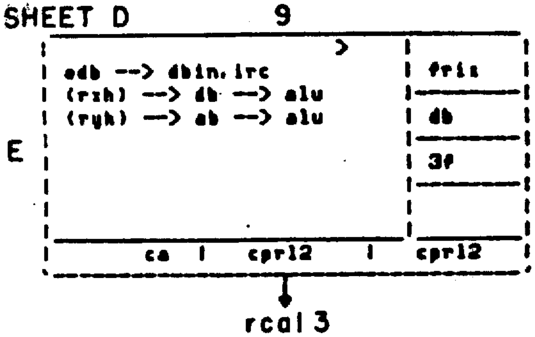
F
G
H
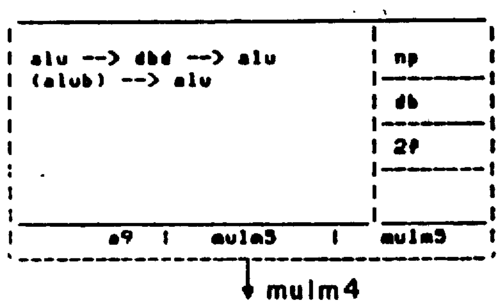

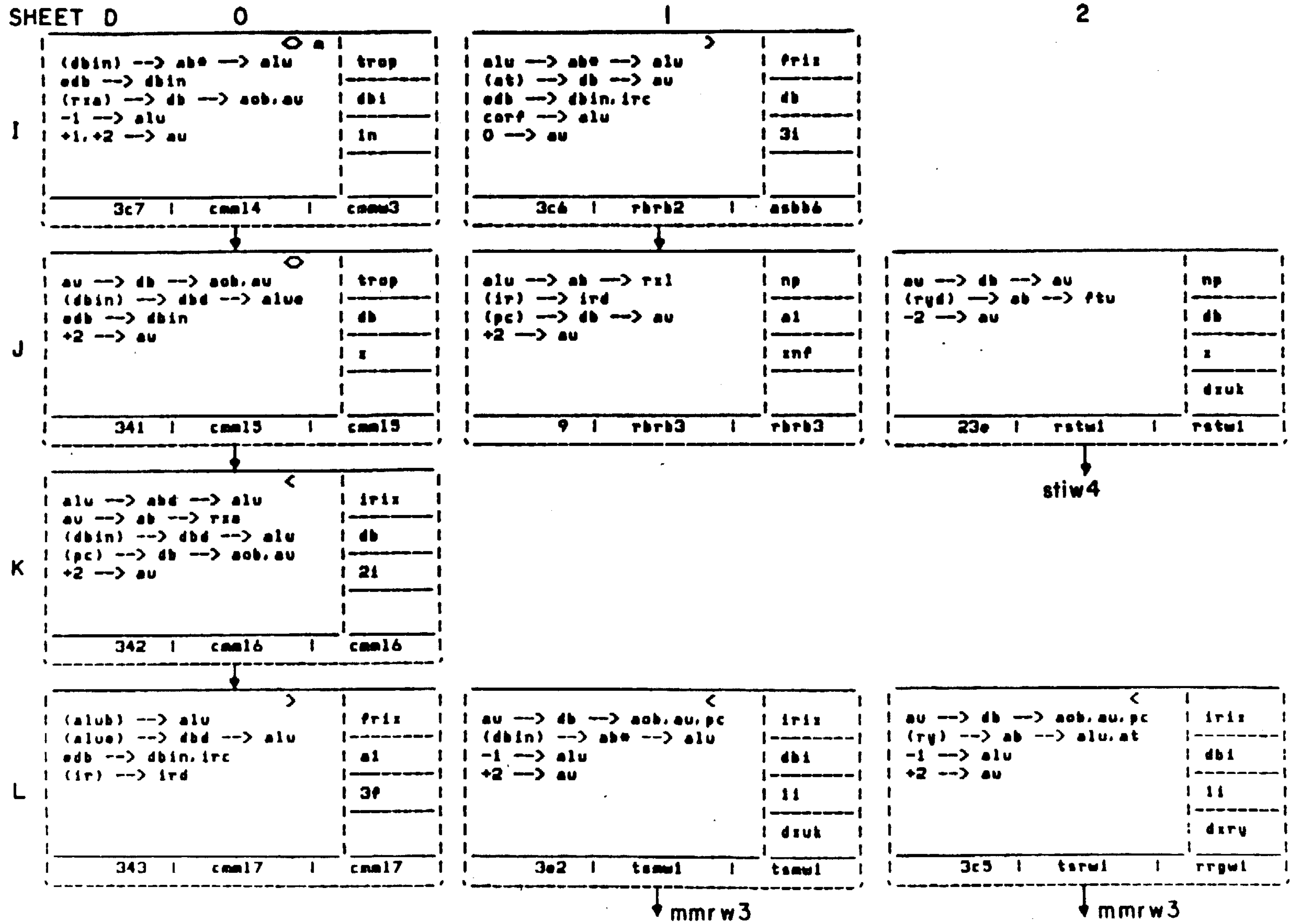
SHEET D
0
1
2
I
J
K
L
(dbin) --> abe --> alu
adb --> dbin
(rxa) --> db --> aob,au
-1 --> alu
+1,+2 --> au
trap
dbi
in
3c7 | cmml4 | cmmw3
alu --> abe --> alu
(at) --> db --> au
adb --> dbin,irc
corf --> alu
0 --> au
frix
db
3i
3c6 | rbrb2 | asbb6
au --> db --> aob,au
(dbin) --> dbd --> alue
adb --> dbin
+2 --> au
trap
db
x
341 | cmml5 | cmml5
alu --> ab --> rxl
(ir) --> ird
(pc) --> db --> au
+2 --> au
np
al
xnf
9 | rbrb3 | rbrb3
au --> db --> au
(ryd) --> ab --> ftu
-2 --> au
np
db
x
dxuk
23e | rstwl | rstwl
stiw4
alu --> abd --> alu
au --> ab --> rxa
(dbin) --> dbd --> alu
(pc) --> db --> aob,au
+2 --> au
irix
db
2i
342 | cmml6 | cmml6
(alub) --> alu
(alue) --> dbd --> alu
adb --> dbin,irc
(ir) --> ird
frix
al
3f
343 | cmml7 | cmml7
au --> db --> aob,au,pc
(dbin) --> abe --> alu
-1 --> alu
+2 --> au
irix
dbi
li
dxuk
3e2 | tsmwl | tsmwl
mmrw3
au --> db --> aob,au,pc
(ry) --> ab --> alu,at
-1 --> alu
+2 --> au
irix
dbi
li
dxry
3c5 | tsrwl | rrgwl
mmrw3

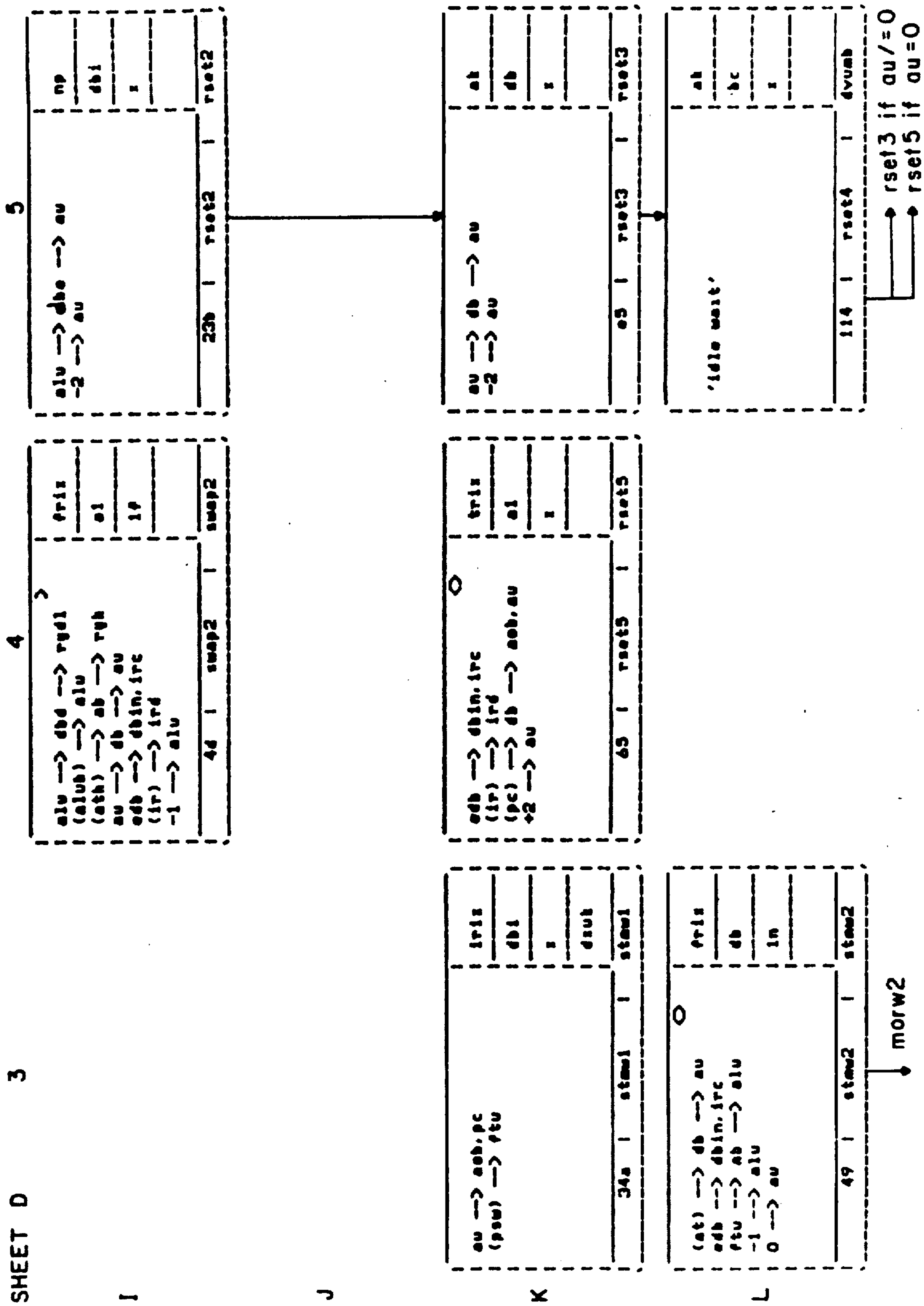
SHEET D
3
4
5
I
J
K
L
morw2
rset3 if au/=0
rset5 if au=0

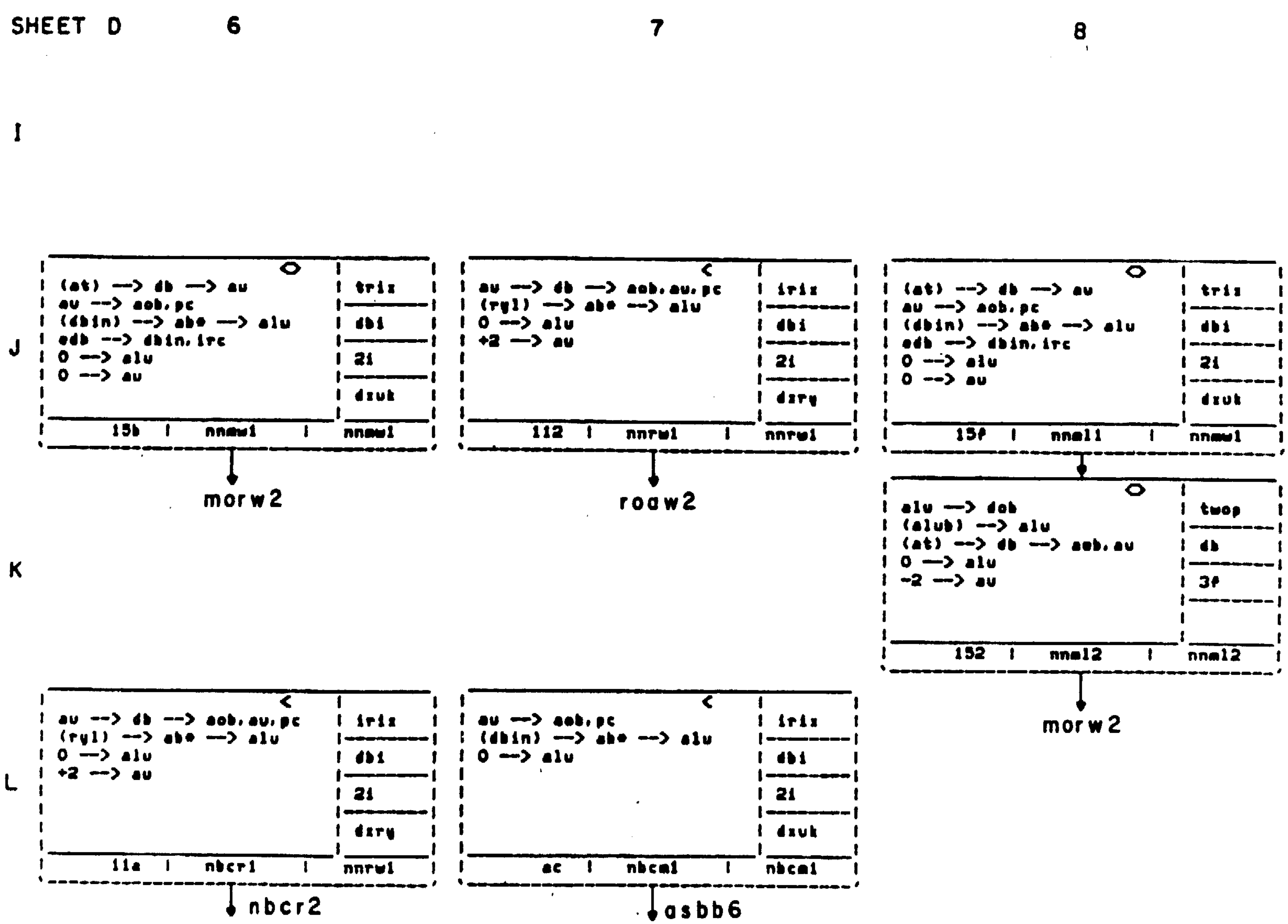
SHEET D
6
7
8
I
J
K
L
(at) --> db --> au
au --> aob,pc
(dbin) --> abe --> alu
edb --> dbin,irc
0 --> alu
0 --> au
triz
dbi
2i
dzuk
15b
nnmw1
nnmw1
morw2
au --> db --> aob,au,pc
(ryl) --> abe --> alu
0 --> alu
+2 --> au
iriz
dbi
2i
dzry
112
nnrw1
nnrw1
roaw2
(at) --> db --> au
au --> aob,pc
(dbin) --> abe --> alu
edb --> dbin,irc
0 --> alu
0 --> au
triz
dbi
2i
dzuk
15f
nnml1
nnmw1
alu --> dob
(alub) --> alu
(at) --> db --> aob,au
0 --> alu
-2 --> au
twop
db
3f
152
nnml2
nnml2
morw2
au --> db --> aob,au,pc
(ryl) --> abe --> alu
0 --> alu
+2 --> au
iriz
dbi
2i
dzry
11a
nbcr1
nnrw1
nbcr2
au --> aob,pc
(dbin) --> abe --> alu
0 --> alu
iriz
dbi
2i
dzuk
ac
nbcm1
nbcm1
asbb6

SHEET D 9
I
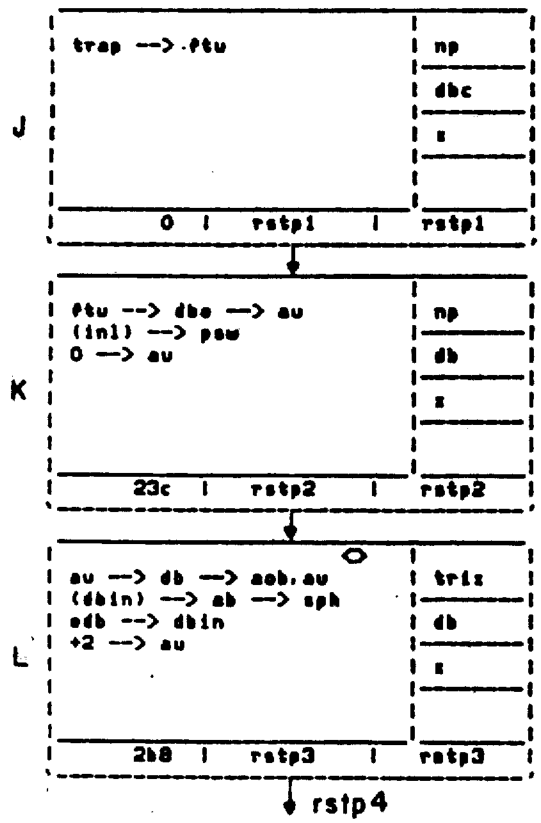

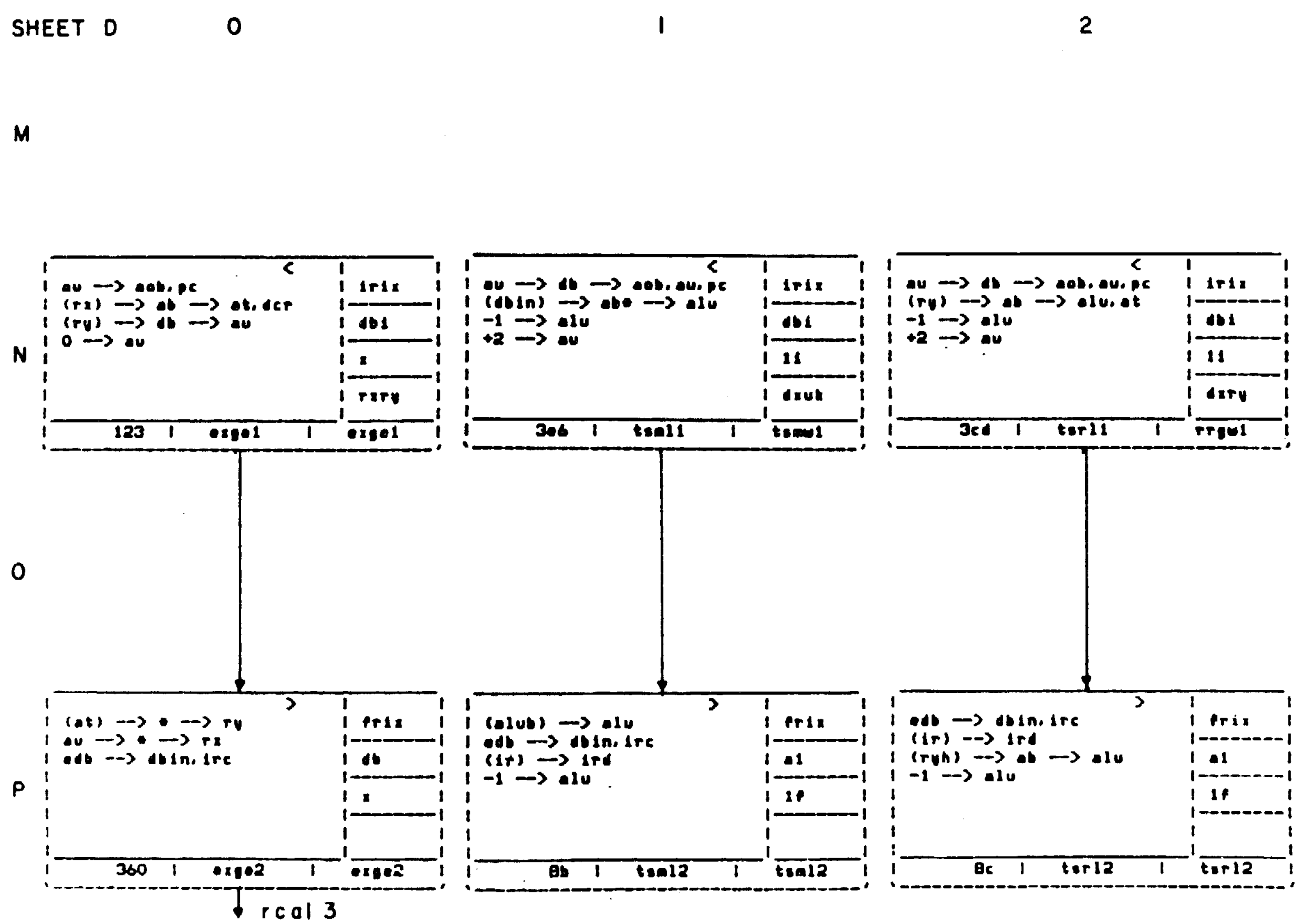
SHEET D
0
1
2
M
N
O
P
au --> aob,pc
(rx) --> ab --> at,dcr
(ry) --> db --> au
0 --> au
irix
dbi
x
rxry
123 | exge1 | exge1
au --> db --> aob,au,pc
(dbin) --> abe --> alu
-1 --> alu
+2 --> au
irix
dbi
li
dxuk
3e6 | tsml1 | tsmw1
au --> db --> aob,au,pc
(ry) --> ab --> alu,at
-1 --> alu
+2 --> au
irix
dbi
li
dxry
3cd | tsrl1 | rrgw1
(at) --> e --> ry
au --> e --> rx
edb --> dbin,irc
frix
db
x
360 | exge2 | exge2
rcal 3
(alub) --> alu
edb --> dbin,irc
(ir) --> ird
-1 --> alu
frix
ai
lf
8b | tsml2 | tsml2
edb --> dbin,irc
(ir) --> ird
(ryh) --> ab --> alu
-1 --> alu
frix
ai
lf
8c | tsrl2 | tsrl2

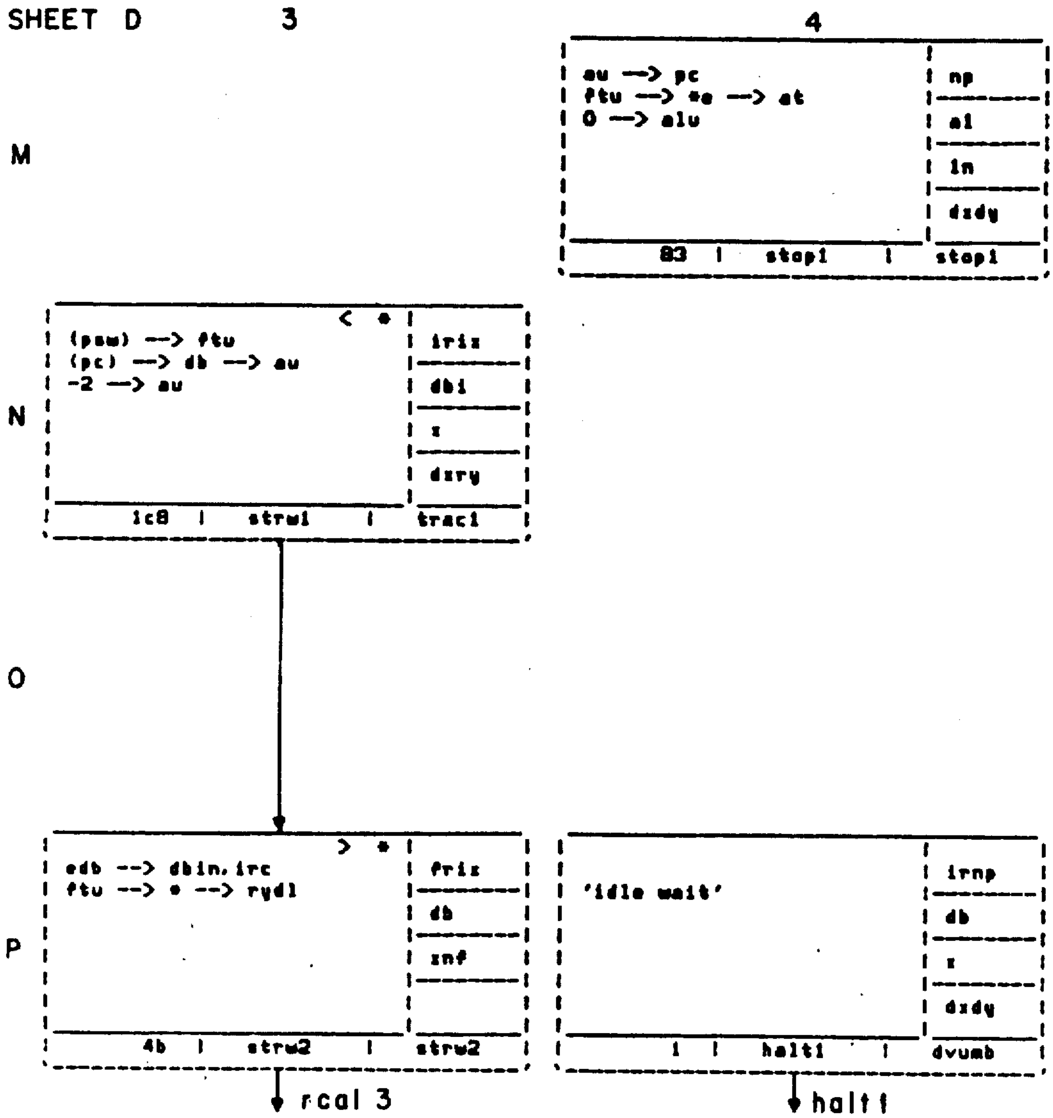
SHEET D
3
4
M
N
O
P
au --> pc
ftu --> *e --> at
0 --> alu
np
al
in
dxdy
83
stop1
stop1
< *
(psw) --> ftu
(pc) --> db --> au
-2 --> au
irix
dbi
x
dxry
1c8
strw1
trac1
> *
edb --> dbin, irc
ftu --> * --> rydl
frix
db
xnf
4b
strw2
strw2
'idle wait'
irnp
db
x
dxdy
1
halt1
dvumb
rcal 3
halt1

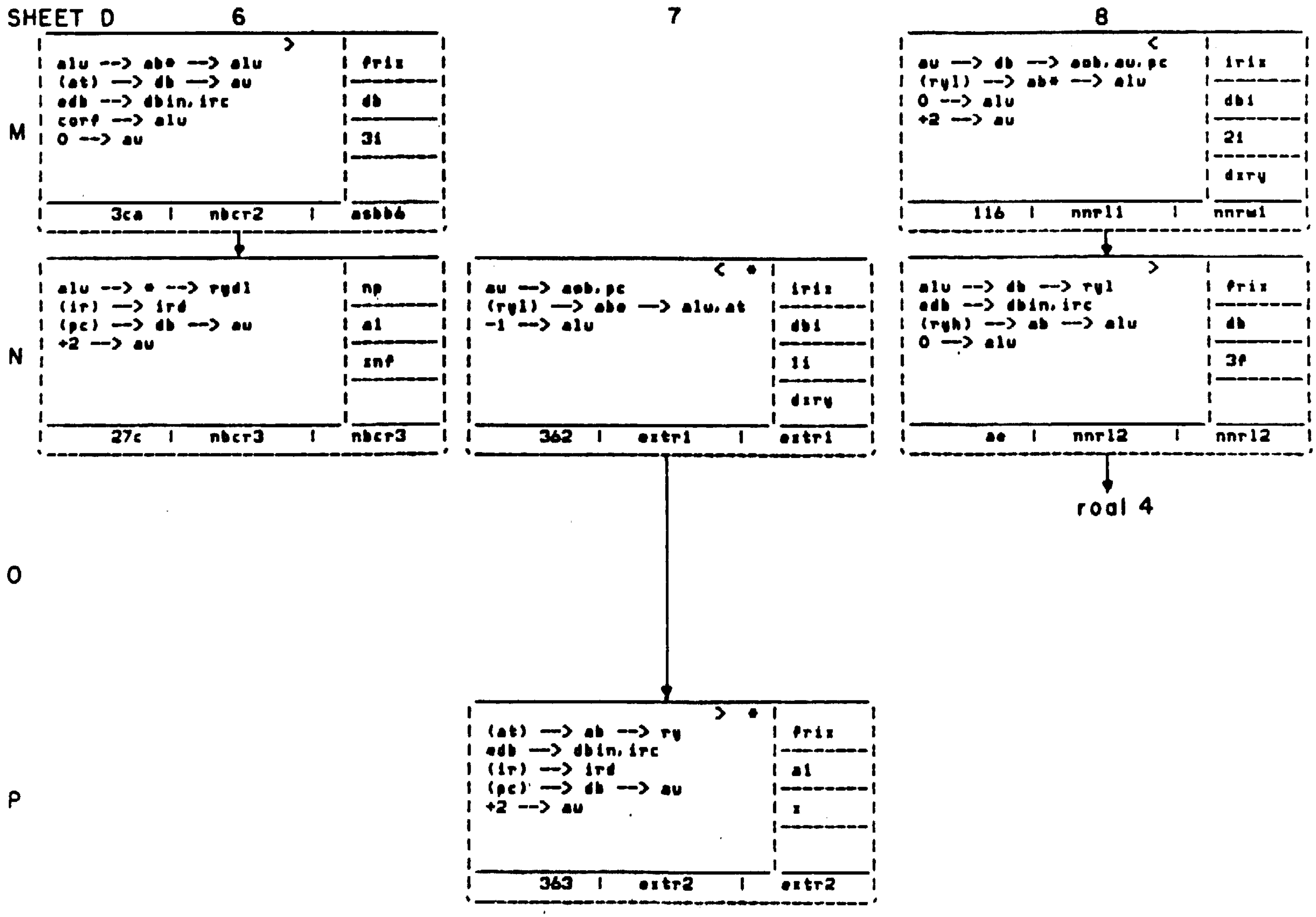
SHEET D
6
7
8
M
N
O
P
alu --> abe --> alu
(at) --> db --> au
edb --> dbin, irc
corf --> alu
0 --> au
frix
db
3i
3ca
nbcr2
asbb6
alu --> e --> rydl
(ir) --> ird
(pc) --> db --> au
+2 --> au
np
a1
znf
27c
nbcr3
nbcr3
au --> aob, pc
(ryl) --> abe --> alu, at
-1 --> alu
irix
dbi
1i
dxry
362
extr1
extr1
au --> db --> aob, au, pc
(ryl) --> ab* --> alu
0 --> alu
+2 --> au
irix
dbi
2i
dxry
116
nnrl1
nnrw1
alu --> db --> ryl
edb --> dbin, irc
(ryh) --> ab --> alu
0 --> alu
frix
db
3f
ae
nnrl2
nnrl2
roal 4
(at) --> ab --> ry
edb --> dbin, irc
(ir) --> ird
(pc) --> db --> au
+2 --> au
frix
a1
x
363
extr2
extr2

SHEET D 9
M N
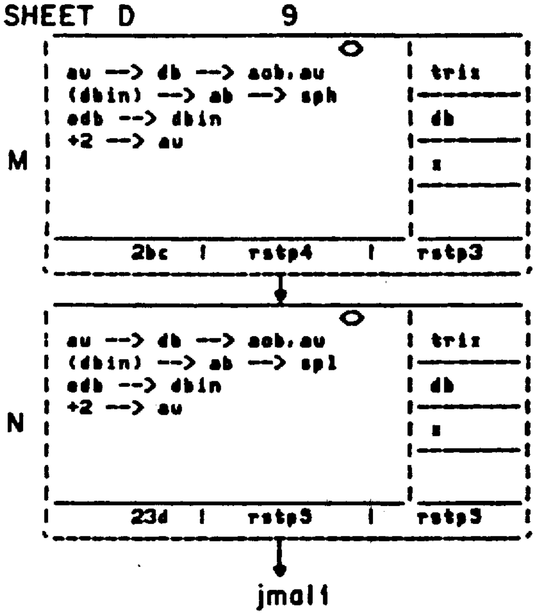
O
P

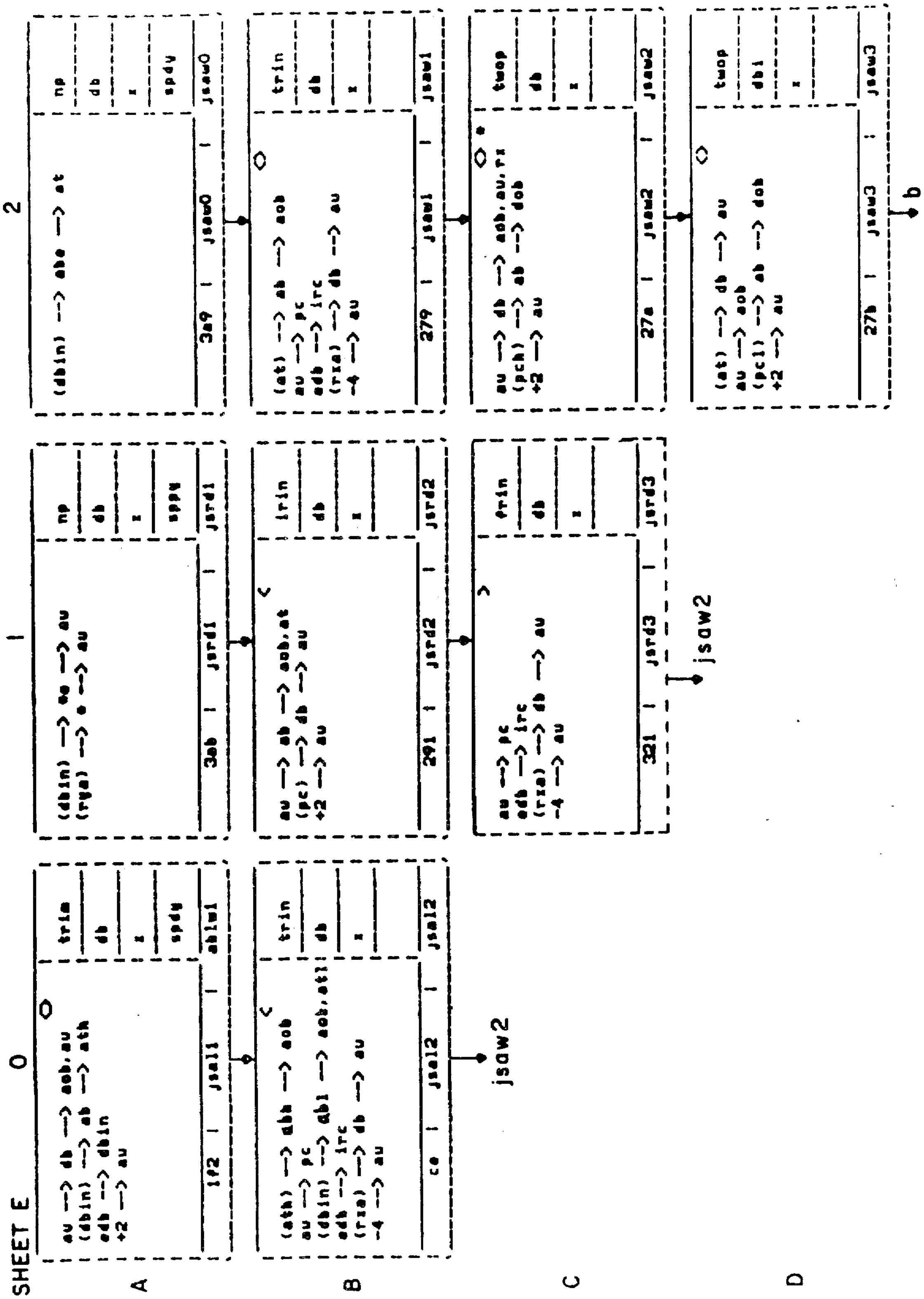

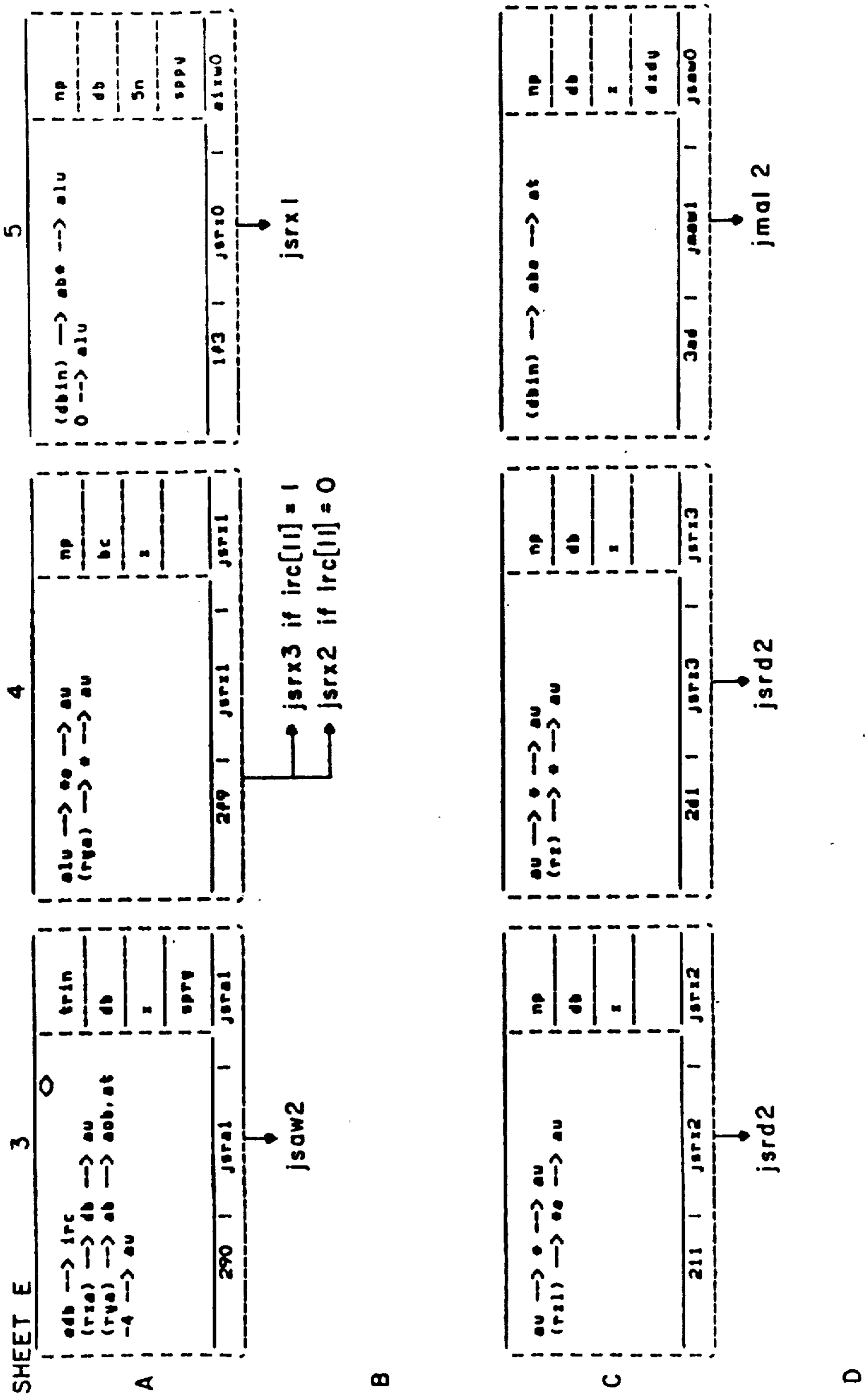
SHEET E
3
4
5
A
B
C
D
jsaw2
jsrx3 if irc[11] = 1
jsrx2 if irc[11] = 0
jsrx1
jsrd2
jsrd2
jmal 2

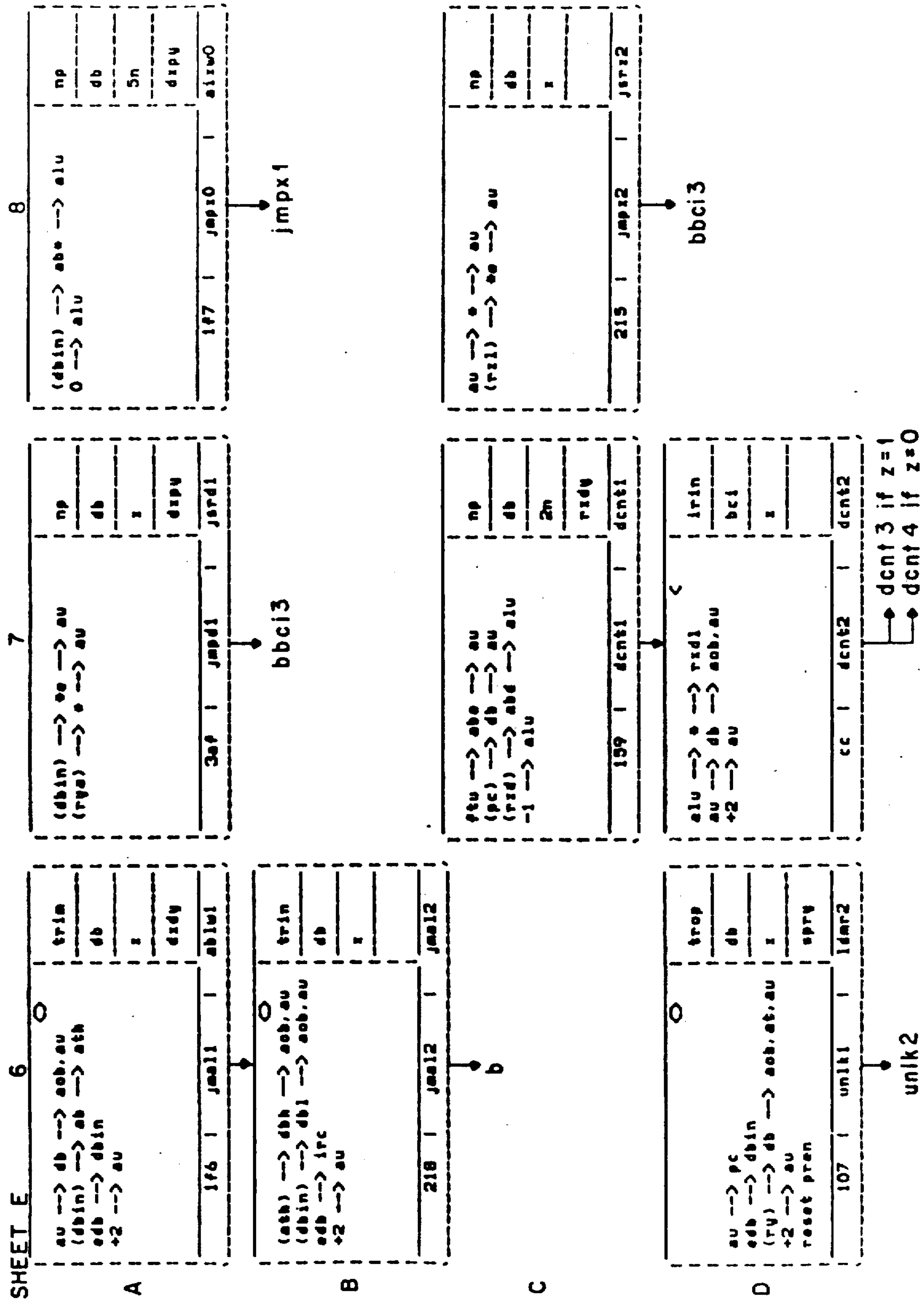
SHEET E
A
B
C
D
6
7
8
jmpx1
bbci3
b
unlk2
dcnt 3 if z=1
dcnt 4 if z=0

SHEET E 9
A
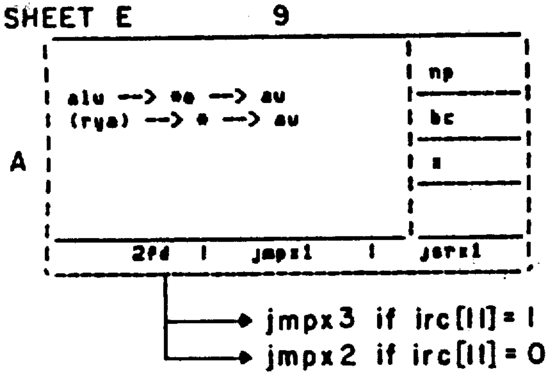
B
C
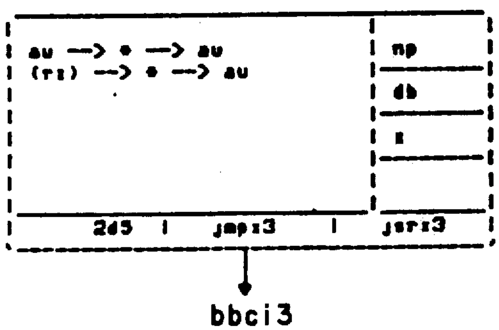
D

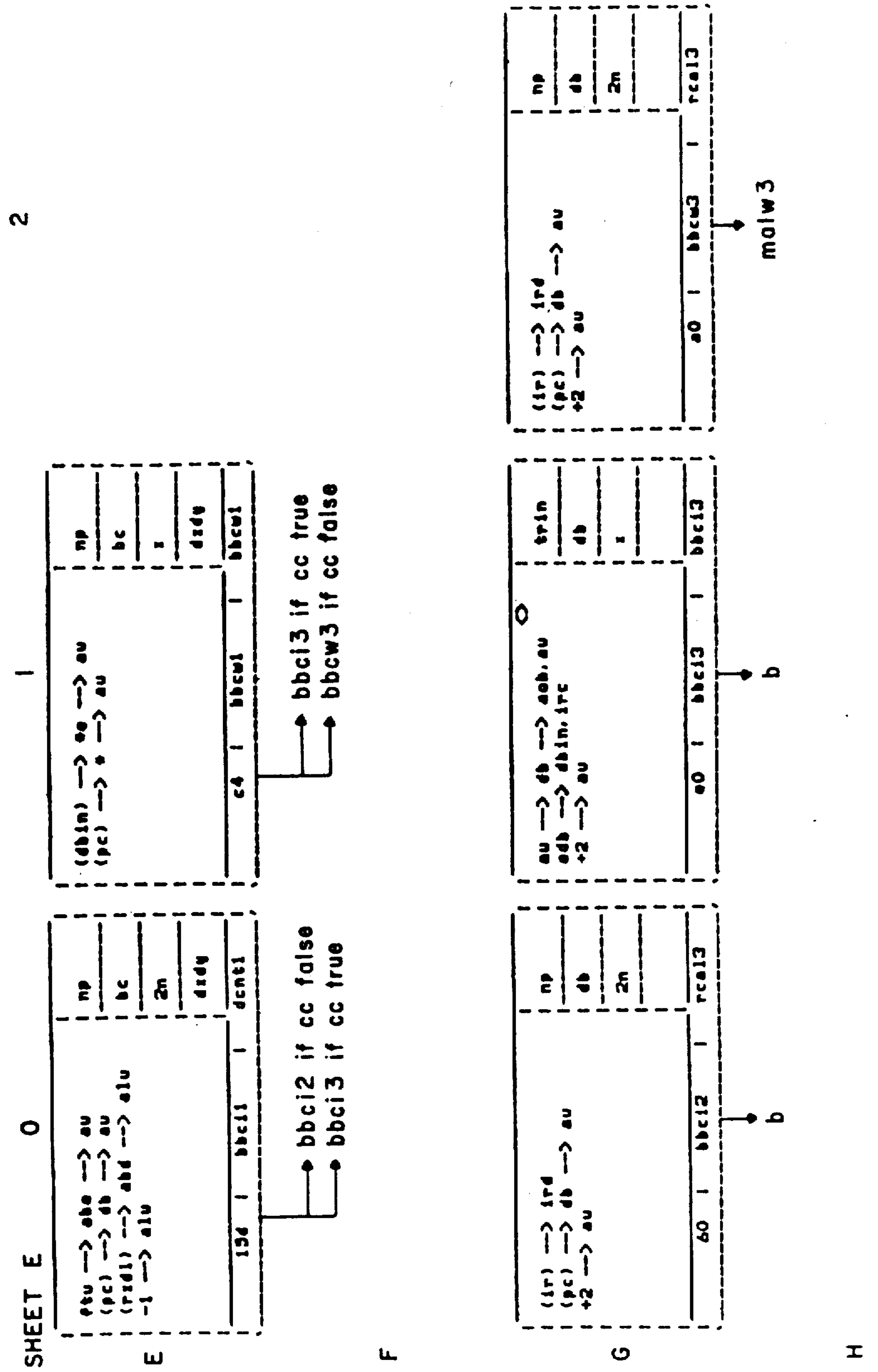
SHEET E
O
I
2
E
F
G
H
bbci2 if cc false
bbci3 if cc true
bbci3 if cc true
bbcw3 if cc false
b
b
malw3

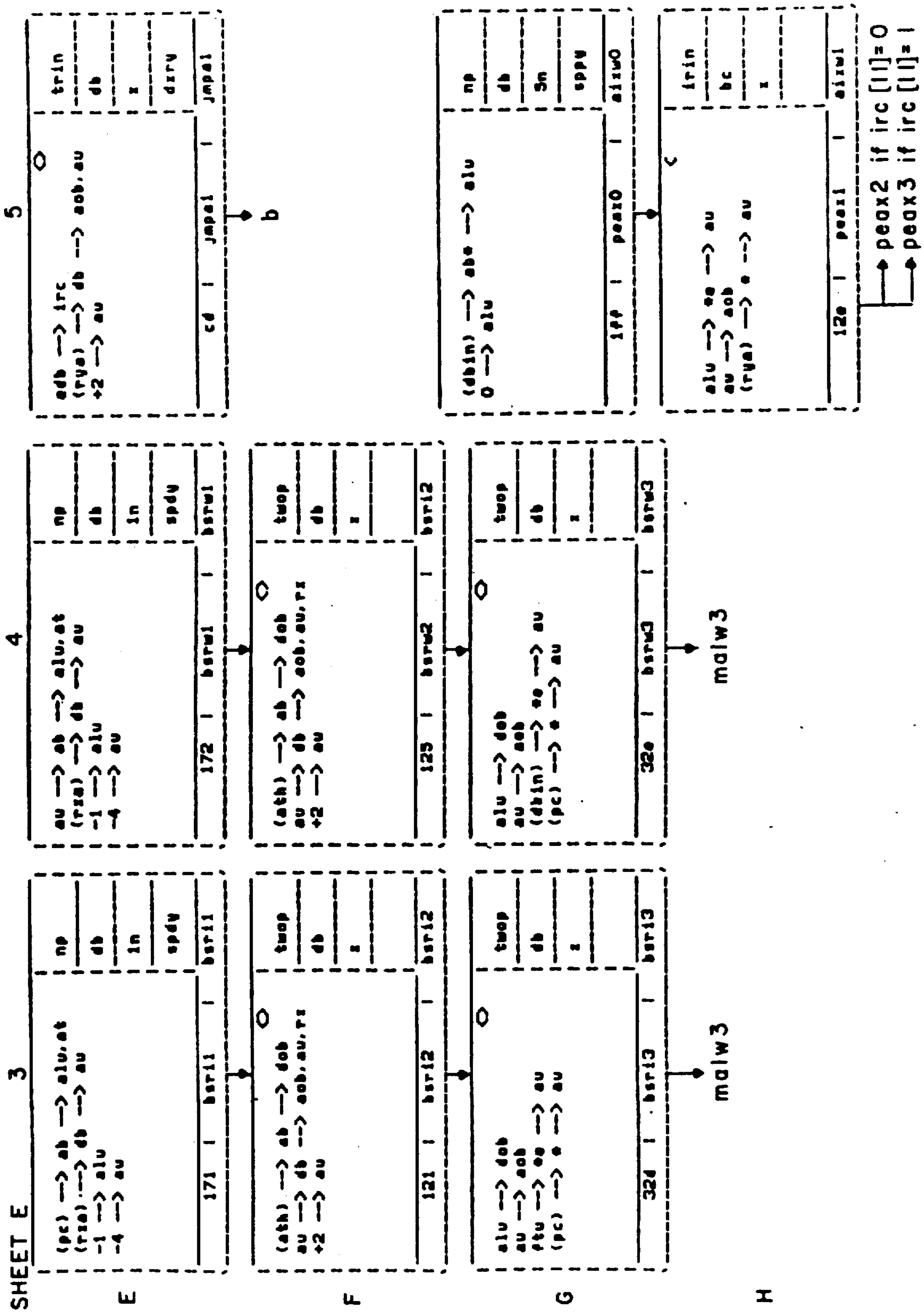
SHEET E
3
4
5
E
F
G
H
malw3
malw3
b
peax2 if irc [11]=0
peax3 if irc [11]=1

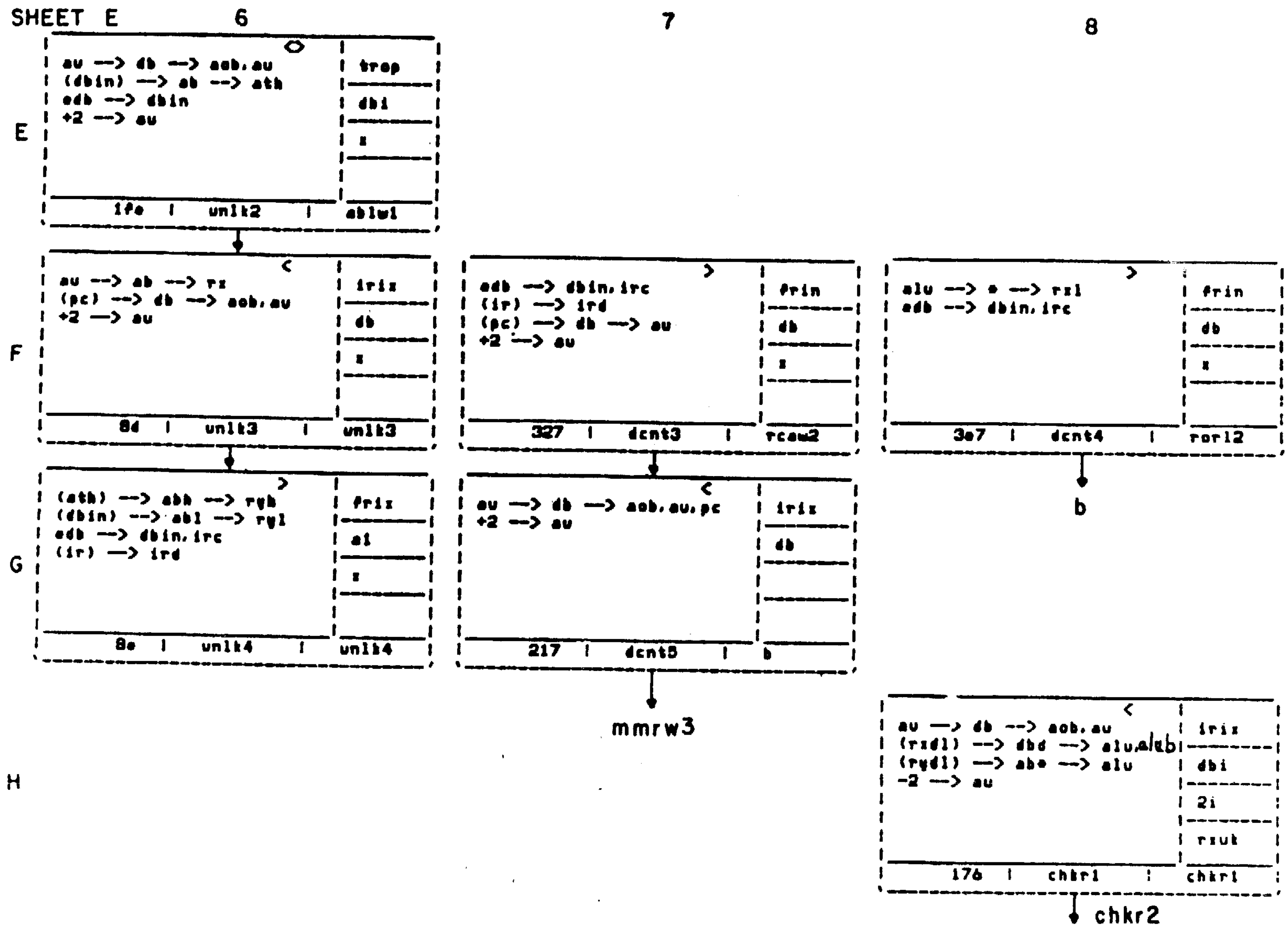
SHEET E
6
7
8
E
F
G
H
au —> db —> aob,au
(dbin) —> ab —> ath
edb —> dbin
+2 —> au
trap
dbi
x
1fe | unlk2 | ablw1
au —> ab —> rx
(pc) —> db —> aob,au
+2 —> au
irix
db
x
8d | unlk3 | unlk3
(ath) —> abh —> ryh
(dbin) —> abl —> ryl
edb —> dbin,irc
(ir) —> ird
frix
a1
x
8e | unlk4 | unlk4
edb —> dbin,irc
(ir) —> ird
(pc) —> db —> au
+2 —> au
frin
db
x
327 | dcnt3 | rcaw2
au —> db —> aob,au,pc
+2 —> au
irix
db
217 | dcnt5 | b
mmrw3
alu —> a —> rx1
edb —> dbin,irc
frin
db
x
3e7 | dcnt4 | rorl2
b
au —> db —> aob,au
(rxdl) —> dbd —> alu,alub
(rydl) —> abe —> alu
-2 —> au
irix
dbi
2i
rxuk
176 | chkr1 | chkr1
chkr2

SHEET E 9
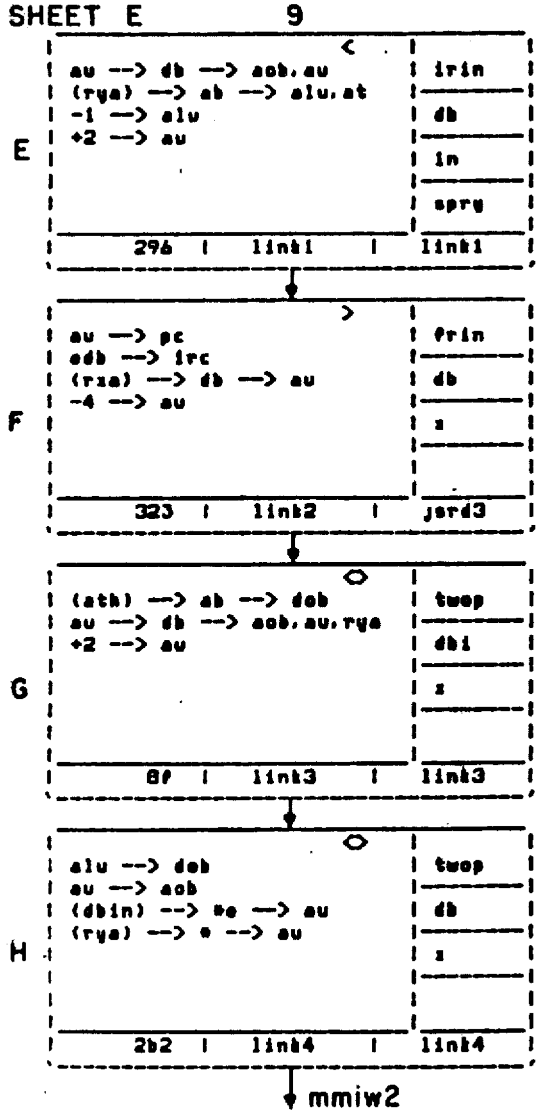

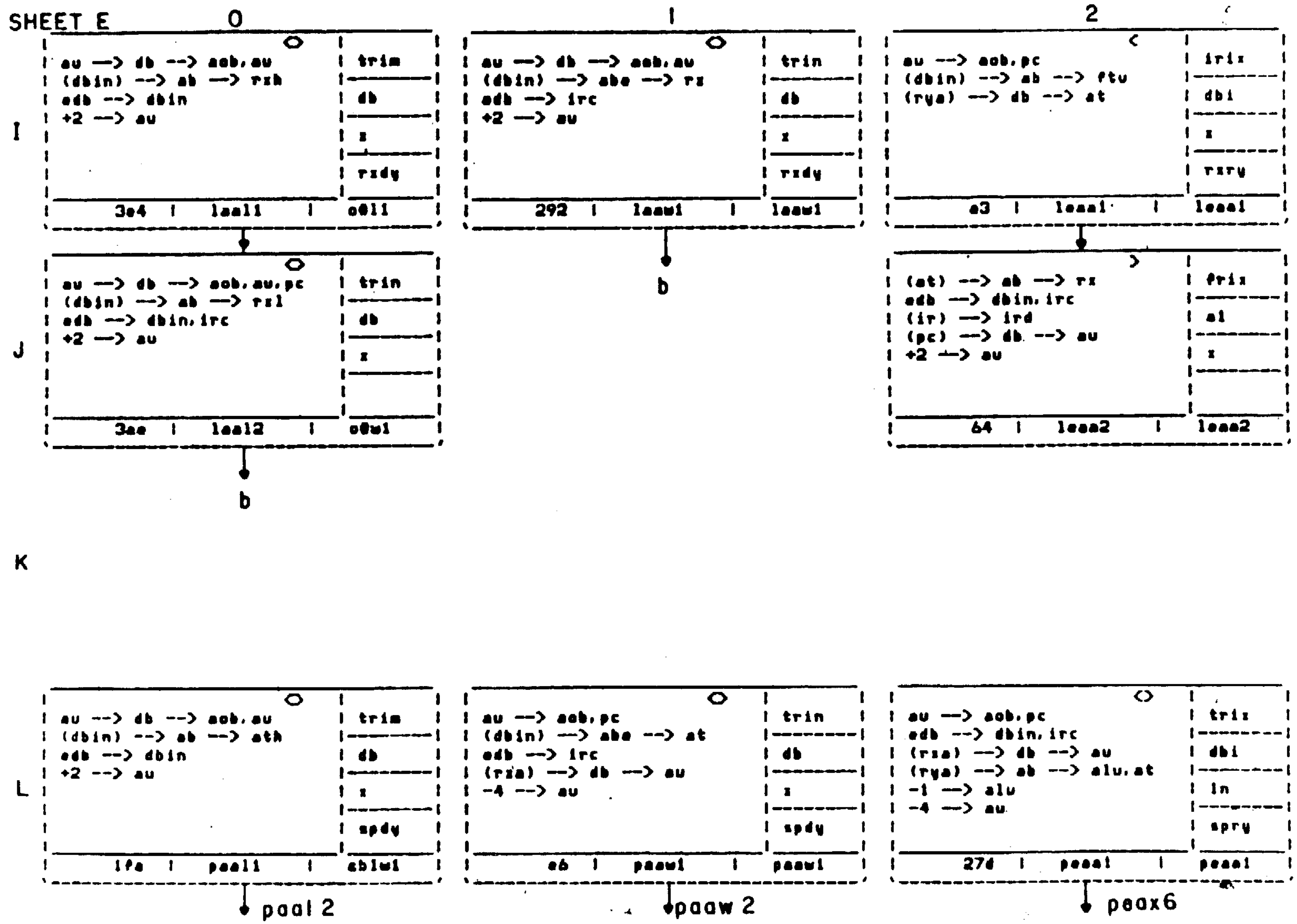
SHEET E
0
1
2
I
J
K
L
au --> db --> aob,au
(dbin) --> ab --> rxh
adb --> dbin
+2 --> au
trim
db
x
rxdy
3e4 | laal1 | o0l1
au --> db --> aob,au
(dbin) --> abe --> rx
adb --> irc
+2 --> au
trin
db
x
rxdy
292 | laaw1 | laaw1
b
au --> aob,pc
(dbin) --> ab --> ftu
(rya) --> db --> at
irix
dbi
x
rxry
a3 | leaa1 | leaa1
au --> db --> aob,au,pc
(dbin) --> ab --> rxl
adb --> dbin,irc
+2 --> au
trin
db
x
3ae | laal2 | o0w1
b
(at) --> ab --> rx
adb --> dbin,irc
(ir) --> ird
(pc) --> db --> au
+2 --> au
frix
al
x
64 | leaa2 | leaa2
au --> db --> aob,au
(dbin) --> ab --> ath
adb --> dbin
+2 --> au
trim
db
x
spdy
1fa | paal1 | ablw1
paal 2
au --> aob,pc
(dbin) --> abe --> at
adb --> irc
(rxa) --> db --> au
-4 --> au
trin
db
x
spdy
a6 | paaw1 | paaw1
paaw 2
au --> aob,pc
adb --> dbin,irc
(rxa) --> db --> au
(rya) --> ab --> alu,at
-1 --> alu
-4 --> au
trix
dbi
ln
spry
27d | peaa1 | peaa1
peax6

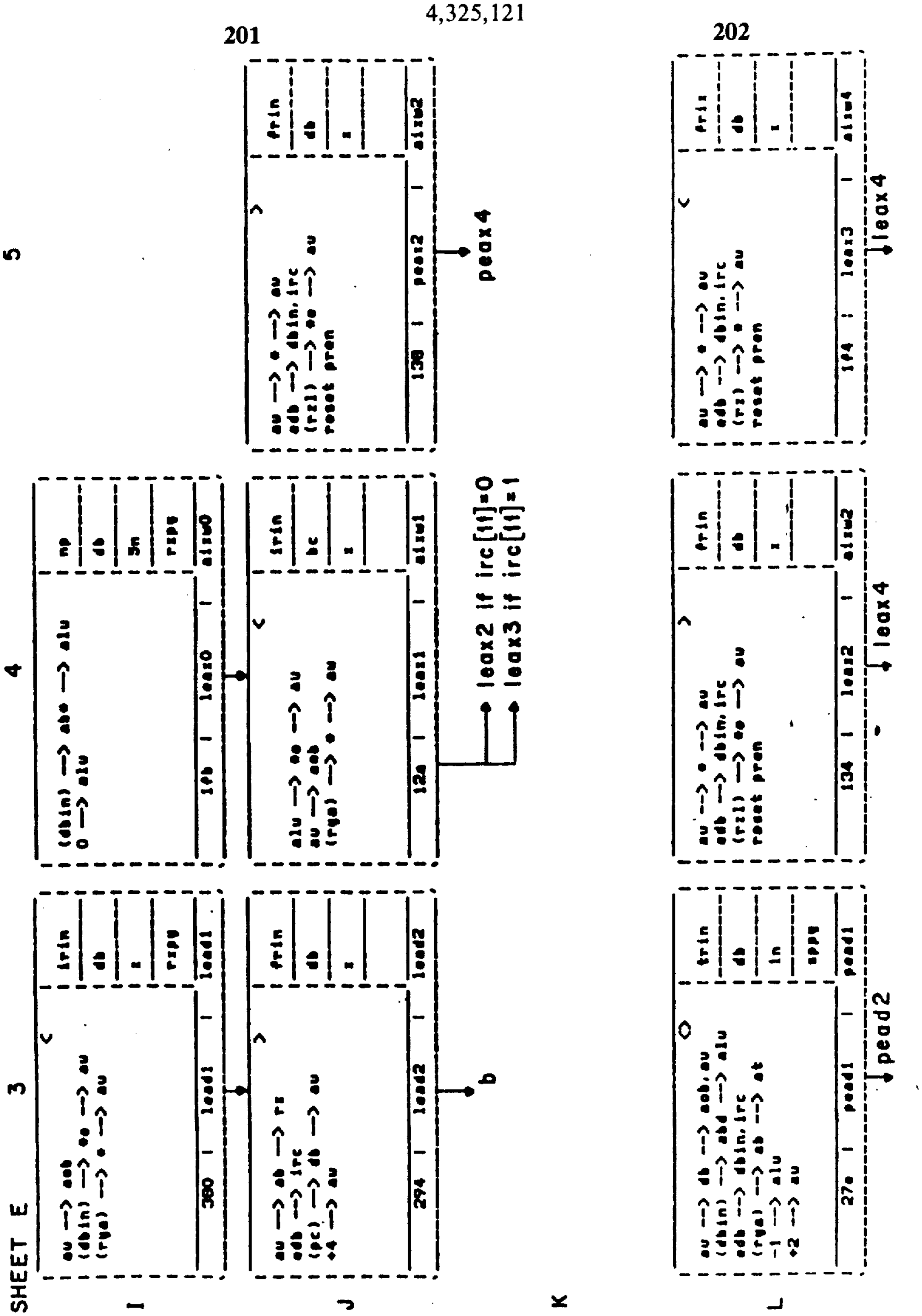
201
202
SHEET E
3
4
5
I
J
K
L
b
peax4
leax4
pead2
leax2 if irc[11]=0
leax3 if irc[11]=1

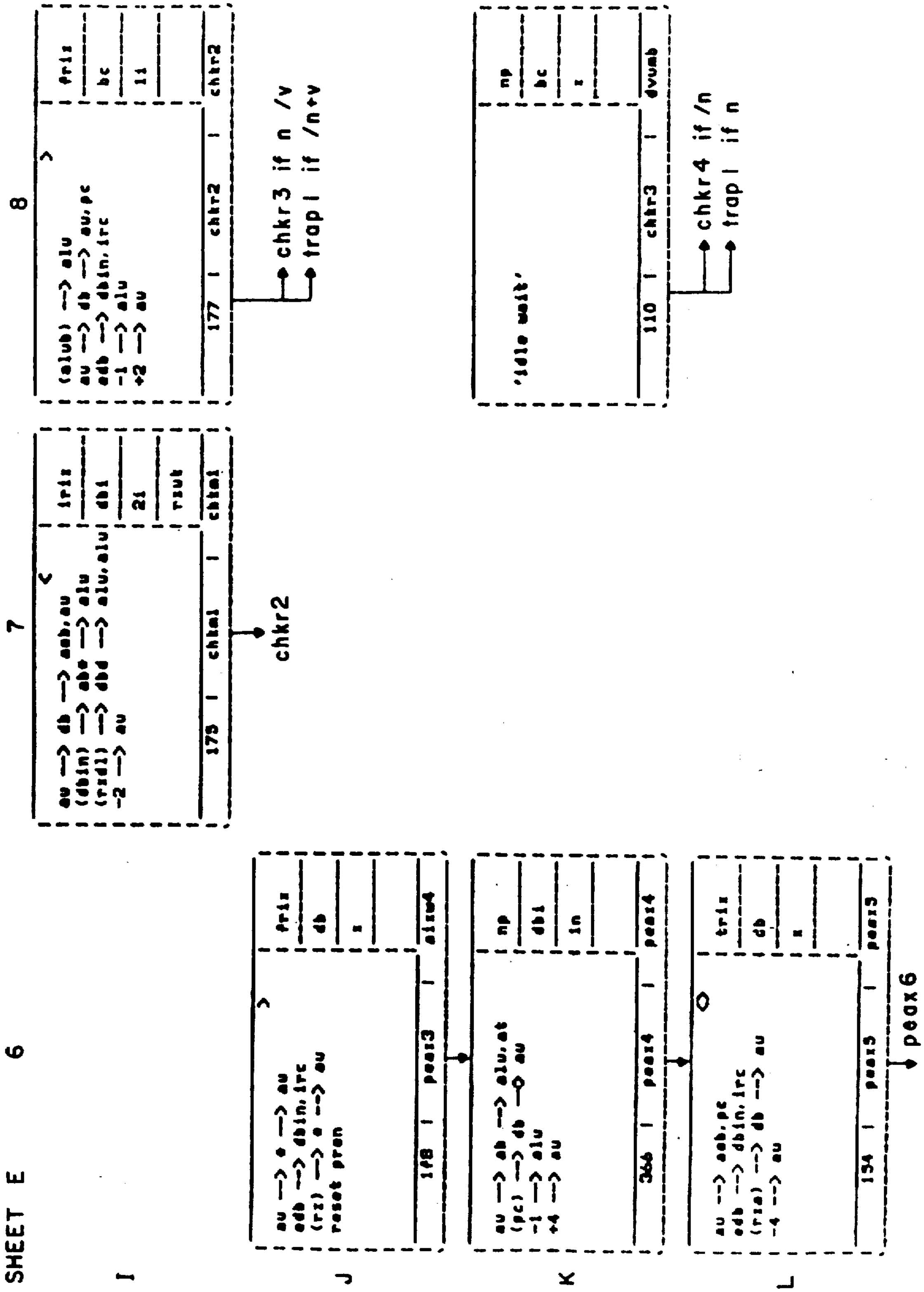
SHEET E
6
7
8
I
J
K
L
chkr2
chkr3 if n /v
trapI if /n+v
chkr4 if /n
trapI if n
peax6

SHEET E 9
I
J
K
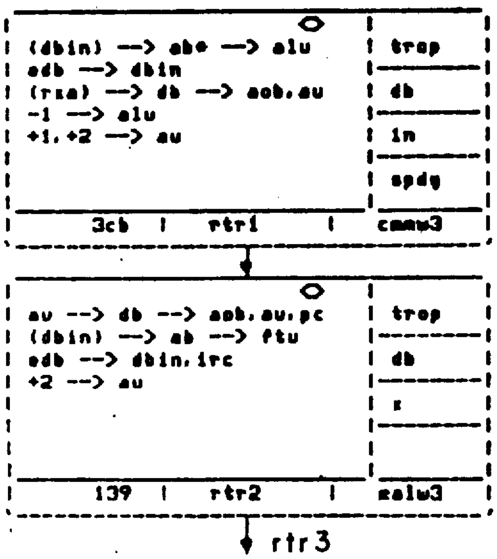
L

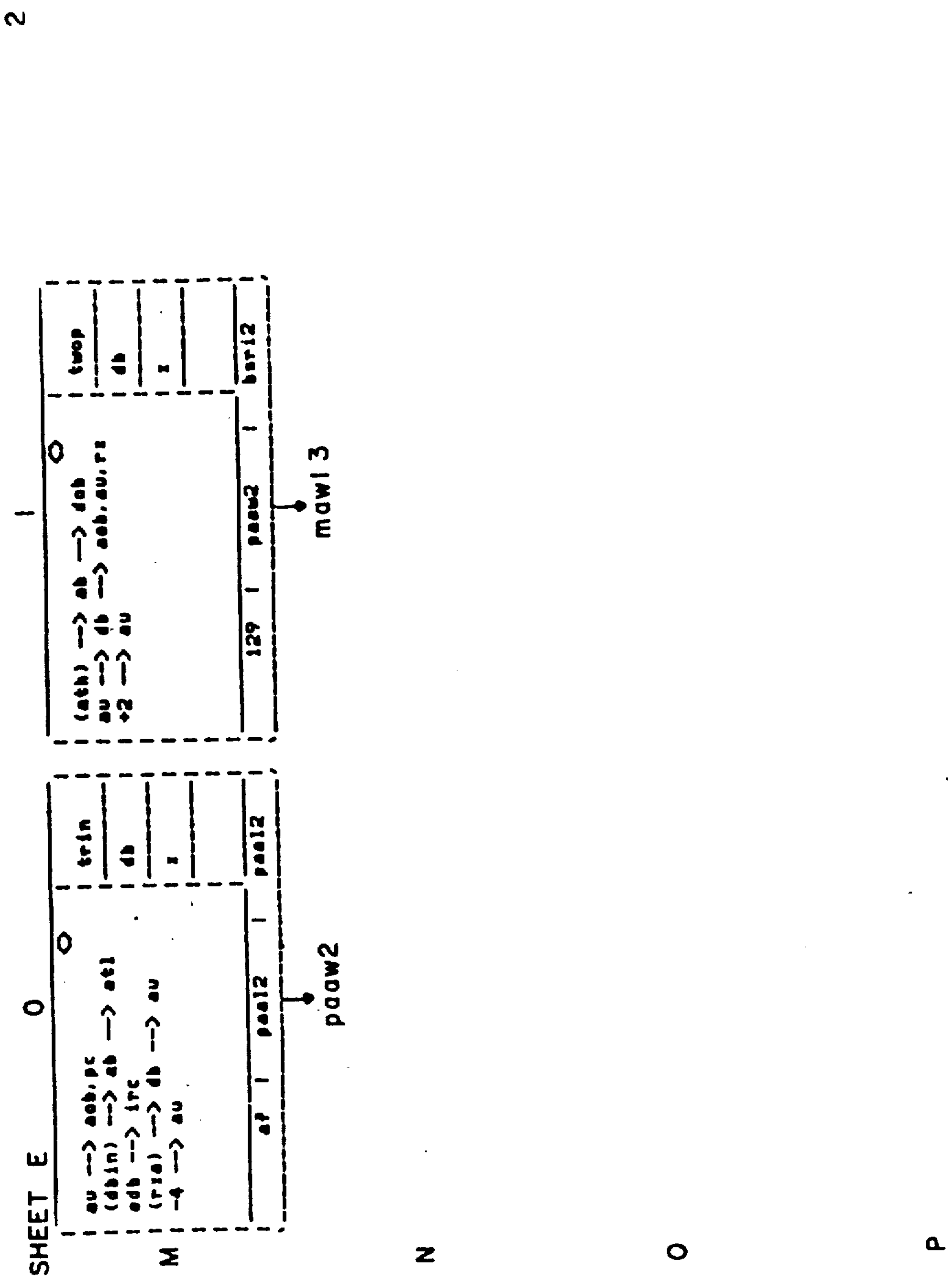
SHEET E
2
0
1
M
N
O
P
paaw2
mawl3
trin
twop
paal2
bsri2
129
paaw2
af

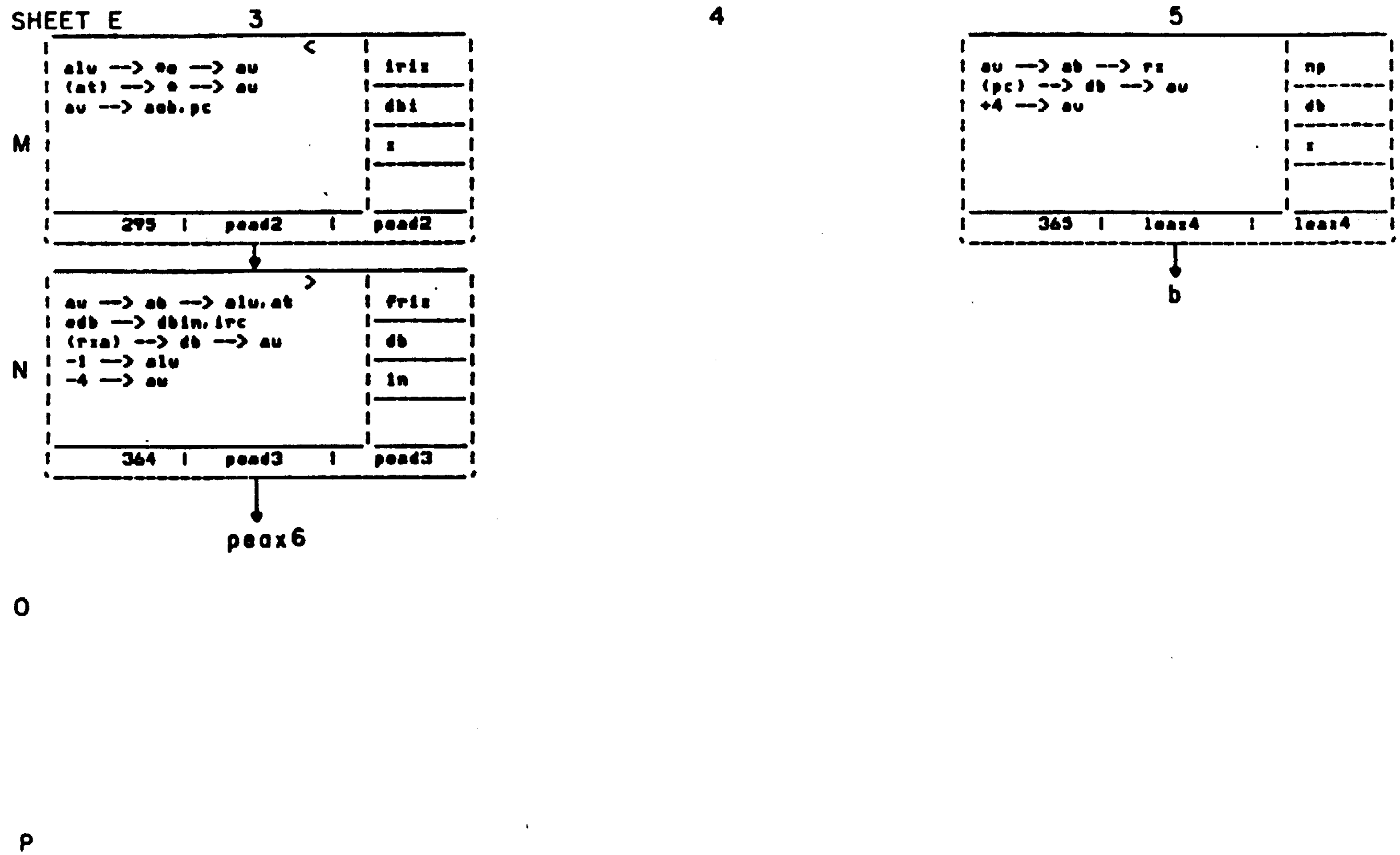
SHEET E
3
4
5
M
N
O
P
(at) --> a --> au
irix
dbi
295
pead2
pead2
au --> ab --> alu,at
(rxa) --> db --> au
-1 --> alu
-4 --> au
frix
db
in
364
pead3
pead3
peax6
au --> ab --> rx
(pc) --> db --> au
+4 --> au
np
db
365
leax4
leax4
b

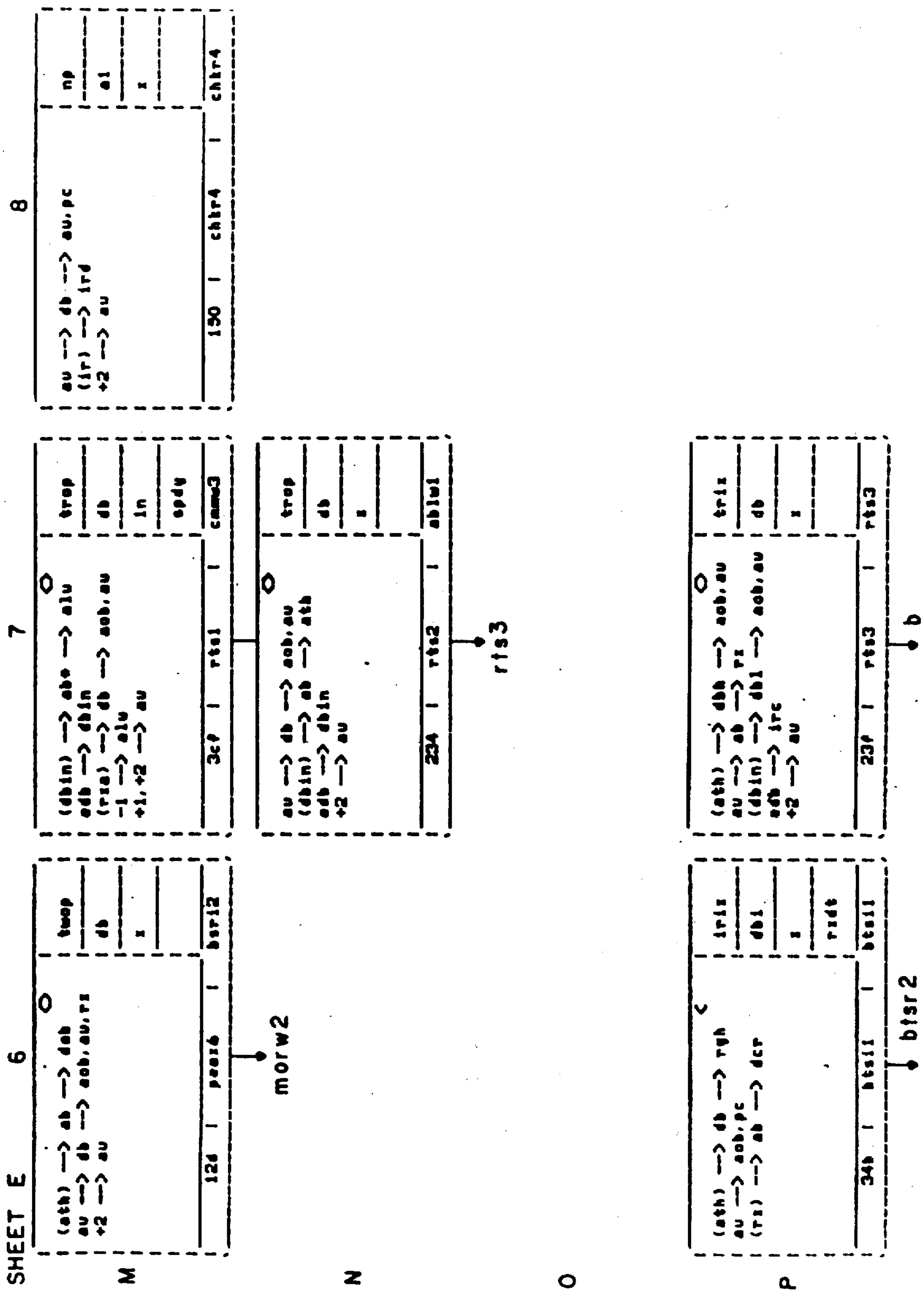
SHEET E
6
7
8
M
N
O
P
morw2
rts3
b
btsr2

SHEET E 9
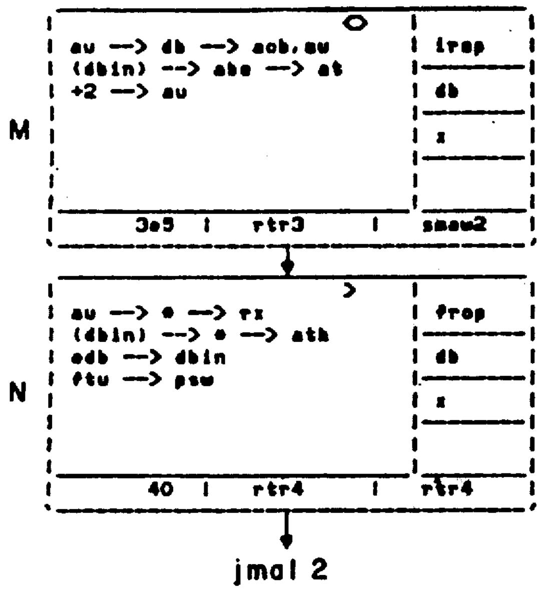
O
P

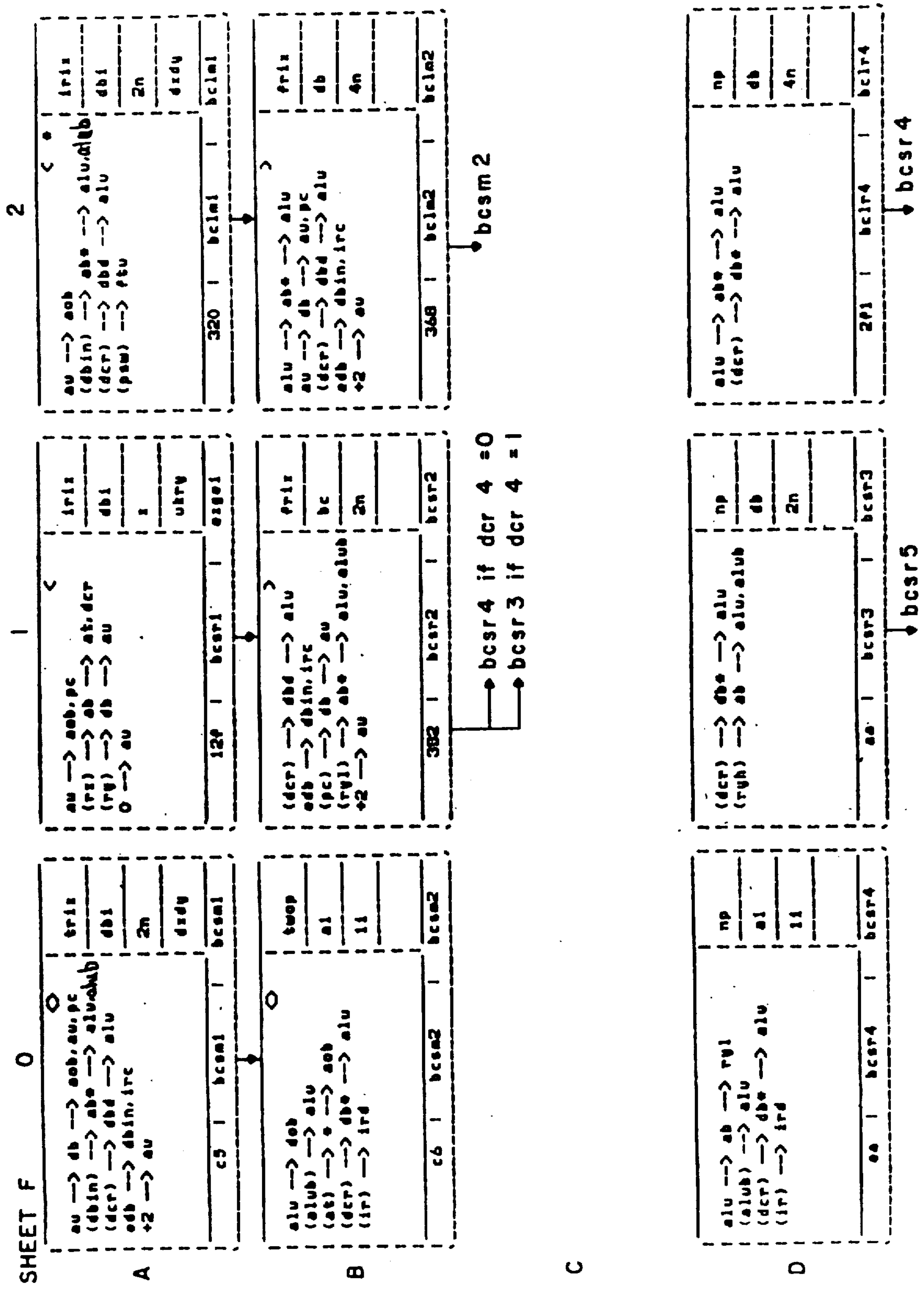
SHEET F
A
B
C
D
0
1
2
bcsm2
bcsr4 if dcr 4 =0
bcsr3 if dcr 4 =1
bcsr5
bcsr4

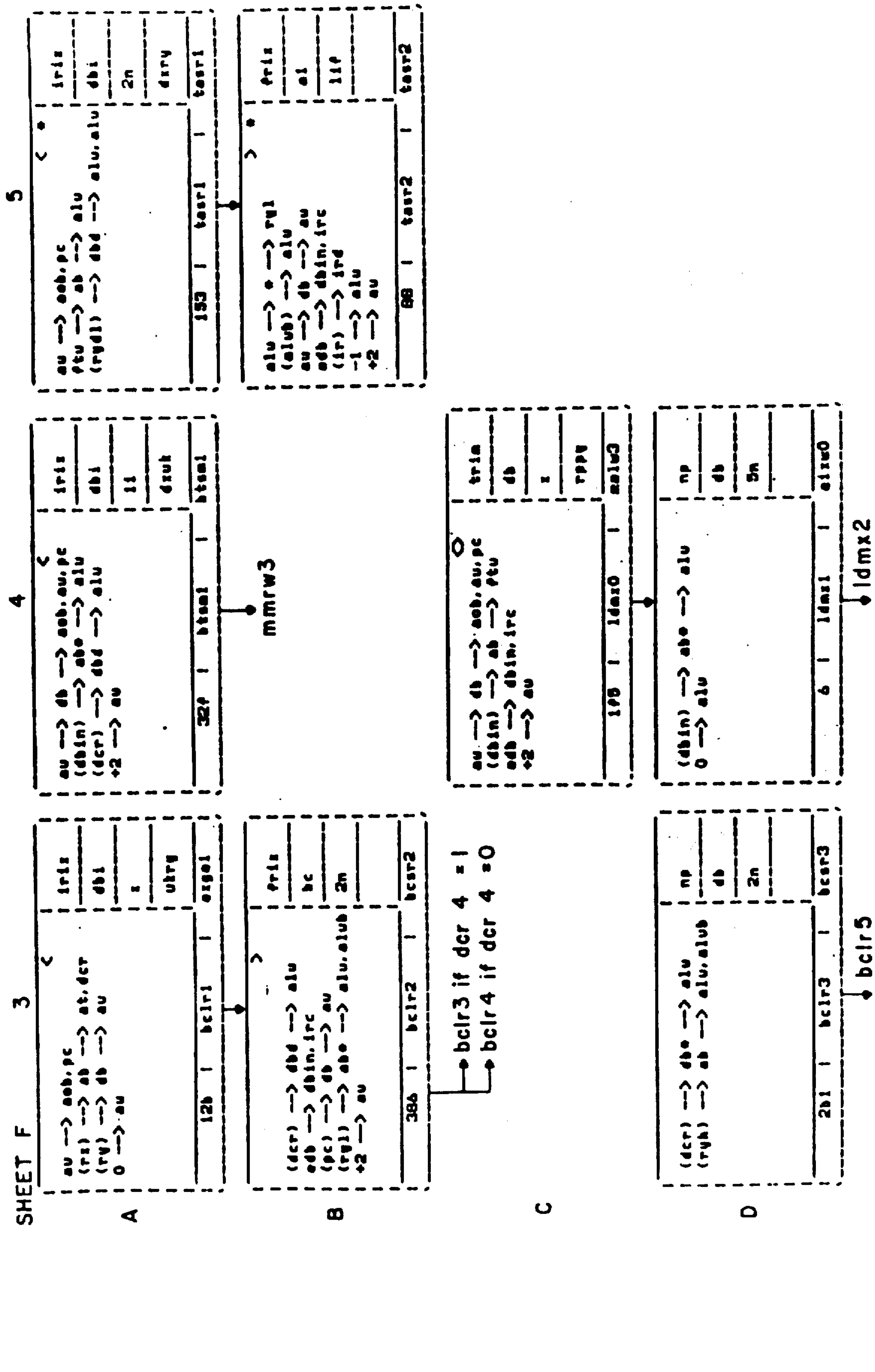
SHEET F
A
B
C
D
3
4
5
mmrw3
ldmx2
bclr5
bclr3 if dcr 4 =1
bclr4 if dcr 4 =0

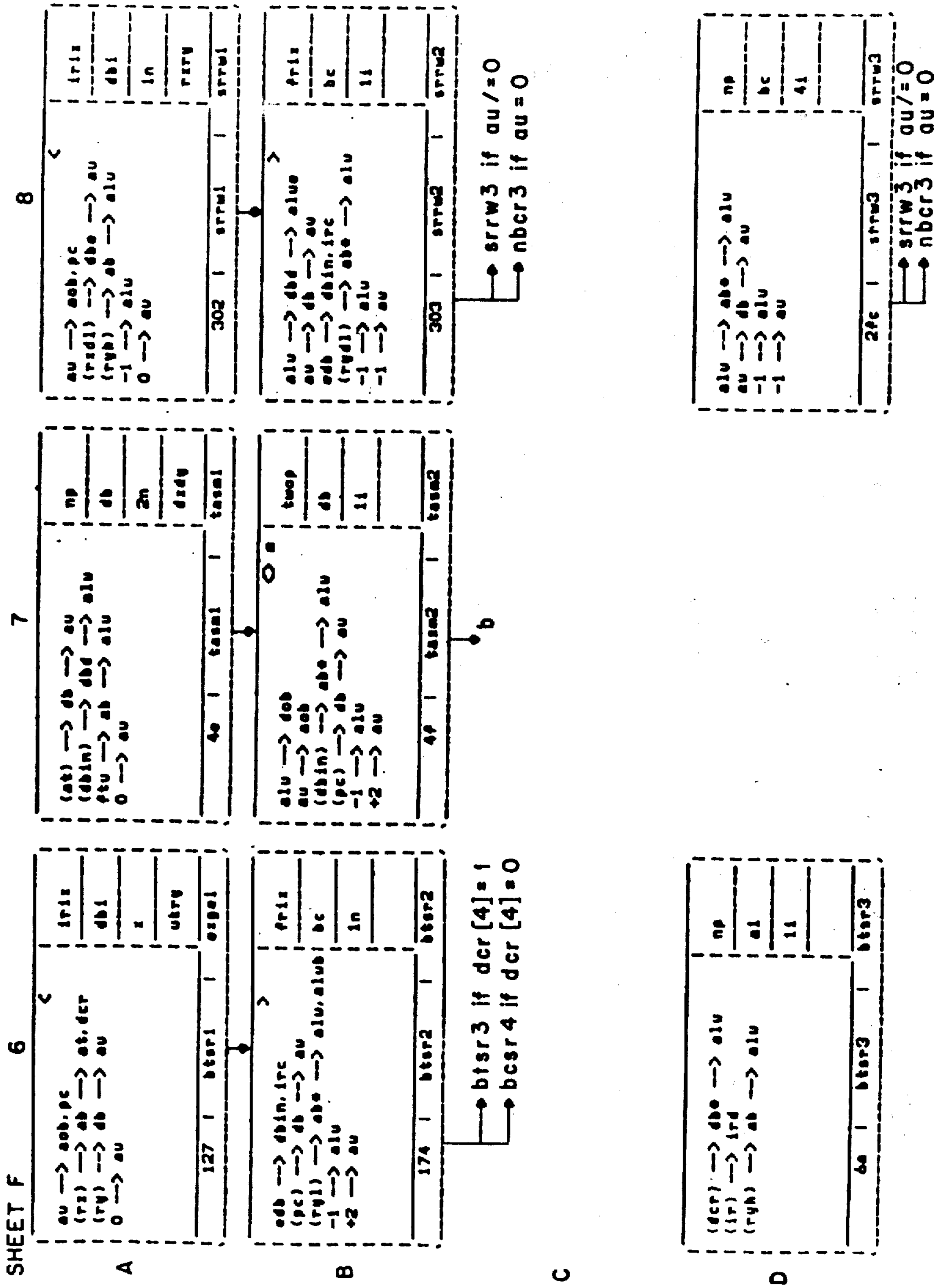
SHEET F
6
7
8
A
B
C
D
btsr3 if dcr [4] = 1
bcsr4 if dcr [4] = 0
srrw3 if au/=0
nbcr3 if au=0
b SHEET F 9
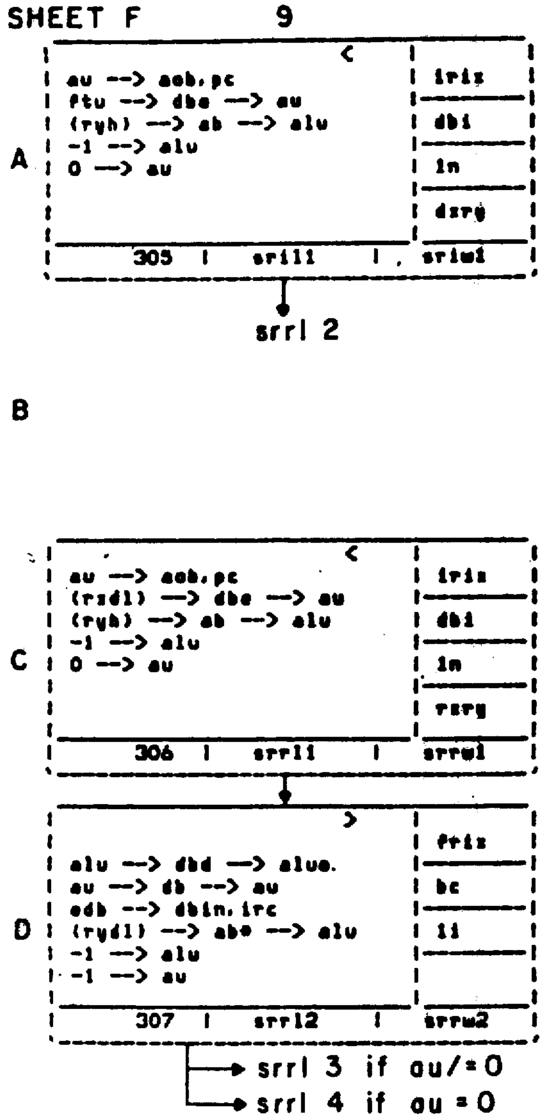

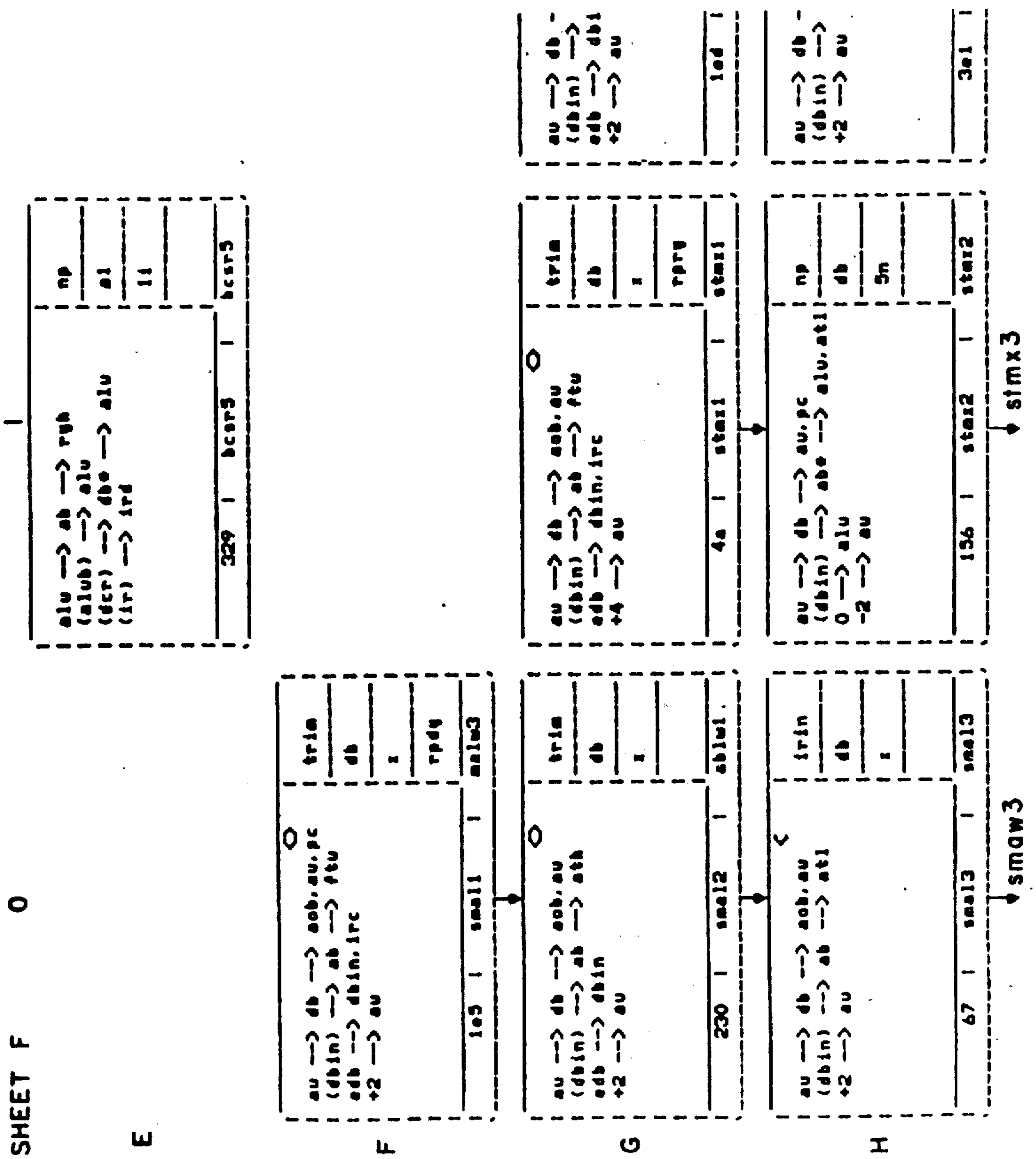
SHEET F
smaw3
stmx3

225
226
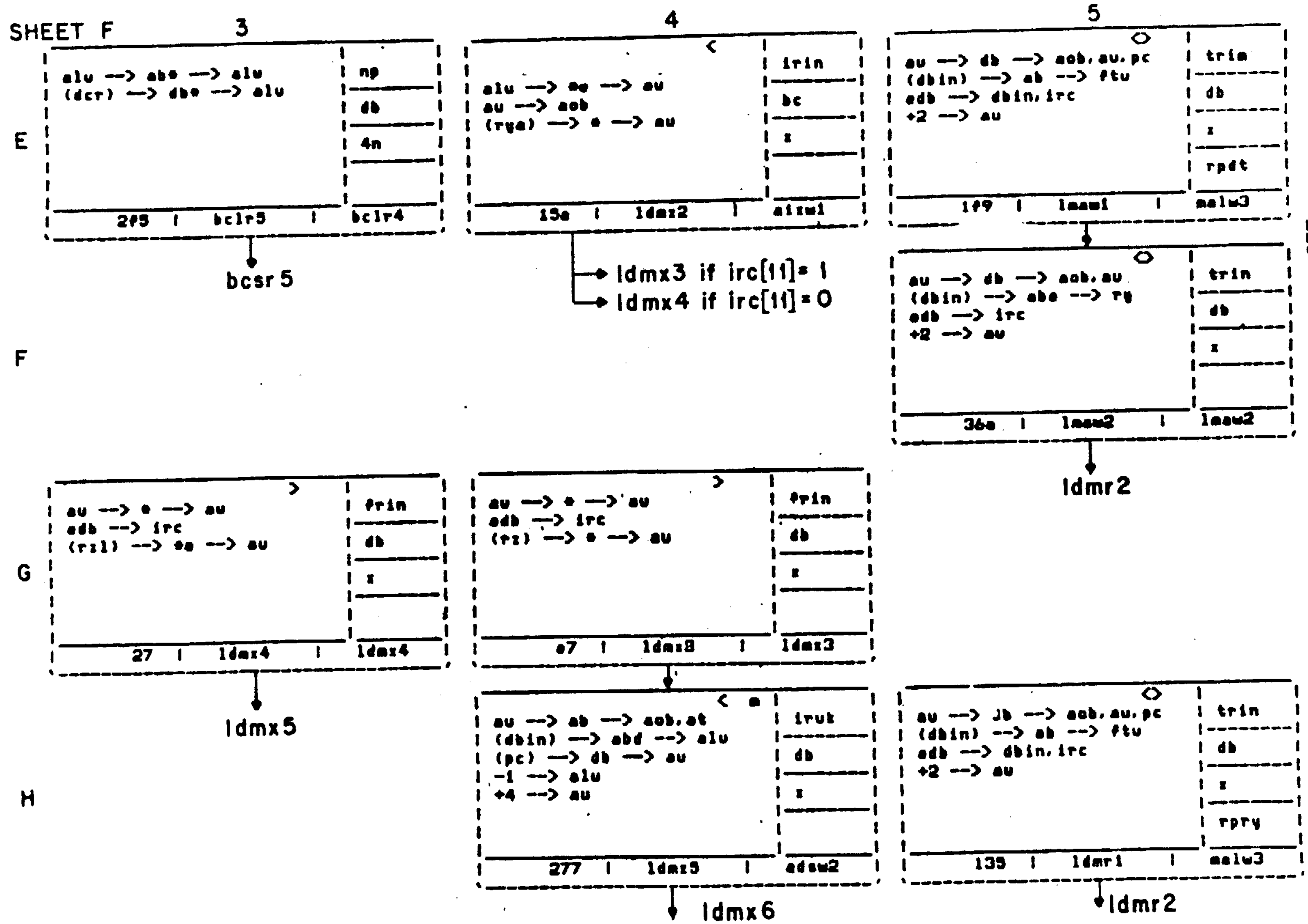

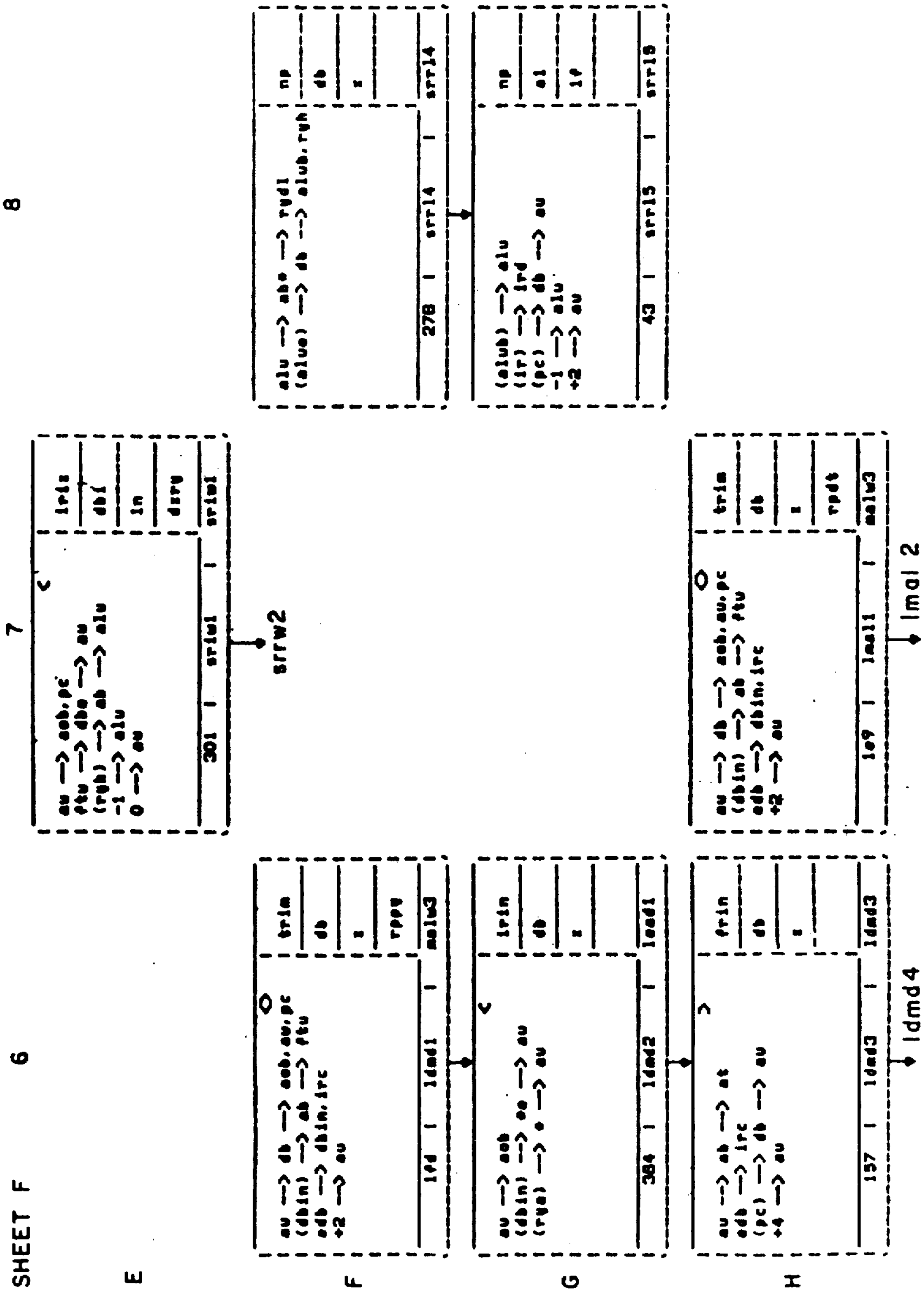
SHEET F
6
7
8
E
F
G
H
srrw2
lmal 2
ldmd4

SHEET F 9
E
F
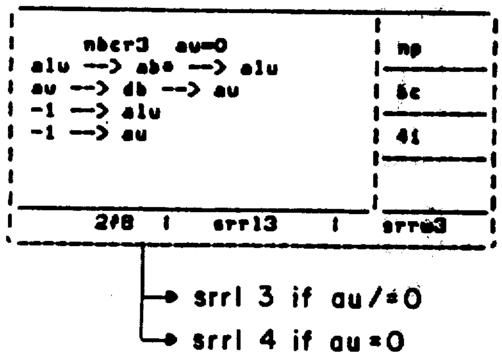
G
H
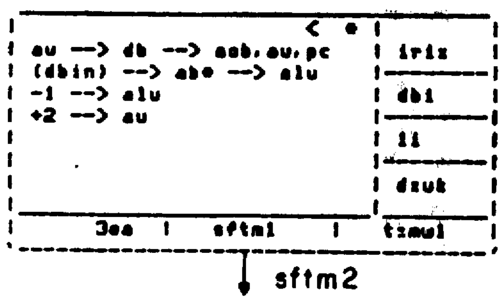

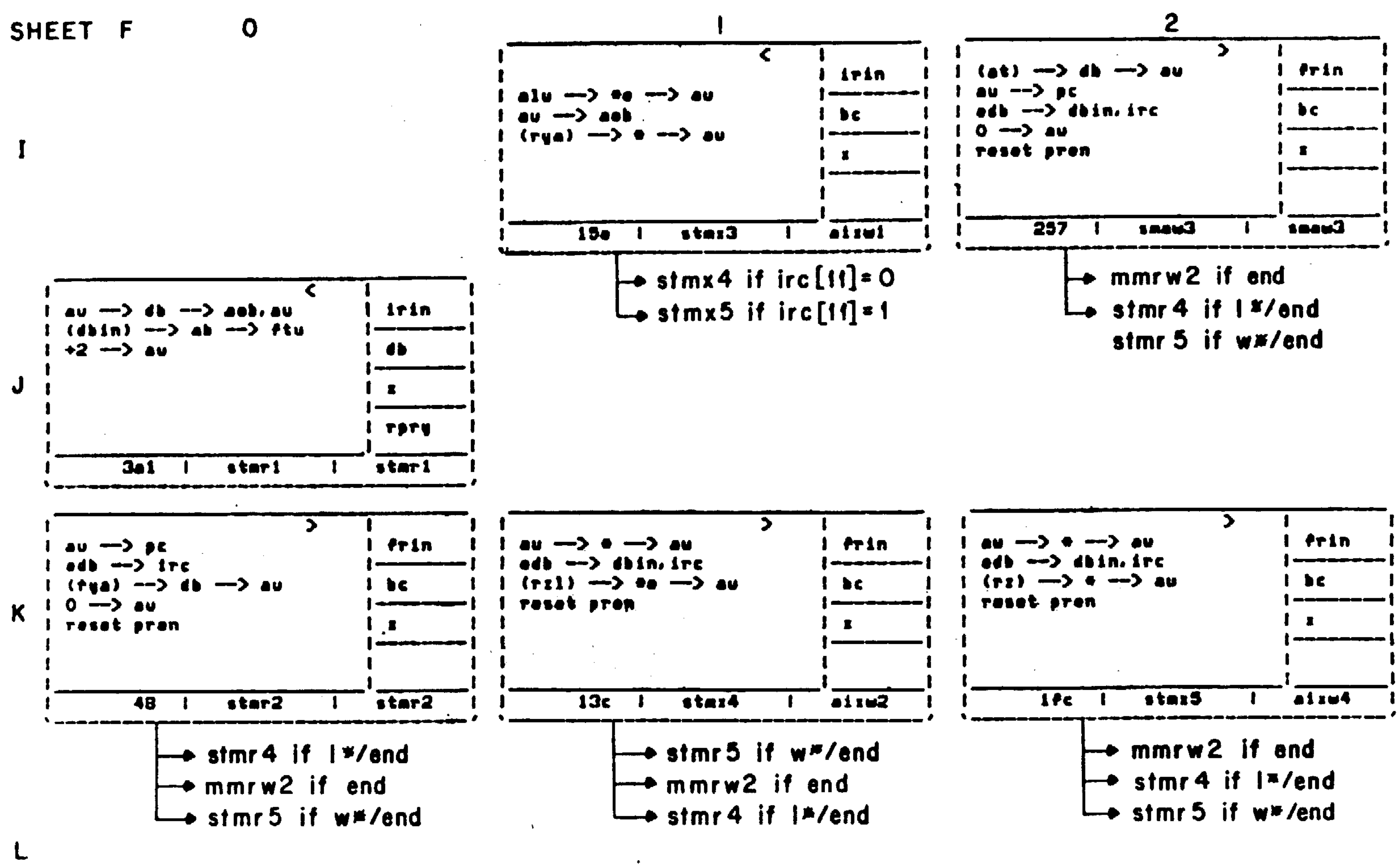
SHEET F
0
1
2
I
J
K
L
alu --> ea --> au
au --> aeb
(rya) --> e --> au
irin
bc
z
15e
stmx3
aixw1
stmx4 if irc[11]=0
stmx5 if irc[11]=1
(at) --> db --> au
au --> pc
adb --> dbin,irc
0 --> au
reset pren
frin
257
smaw3
mmrw2 if end
stmr4 if l*/end
stmr5 if w*/end
au --> db --> aeb,au
(dbin) --> ab --> ftu
+2 --> au
db
rprg
3a1
stmr1
au --> pc
adb --> irc
(fya) --> db --> au
0 --> au
reset pren
48
stmr2
stmr4 if l*/end
mmrw2 if end
stmr5 if w*/end
au --> e --> au
adb --> dbin,irc
(rzl) --> ea --> au
reset pren
13c
stmx4
aixw2
stmr5 if w*/end
mmrw2 if end
stmr4 if l*/end
au --> e --> au
adb --> dbin,irc
(rz) --> e --> au
reset pren
1fc
stmx5
aixw4
mmrw2 if end
stmr4 if l*/end
stmr5 if w*/end

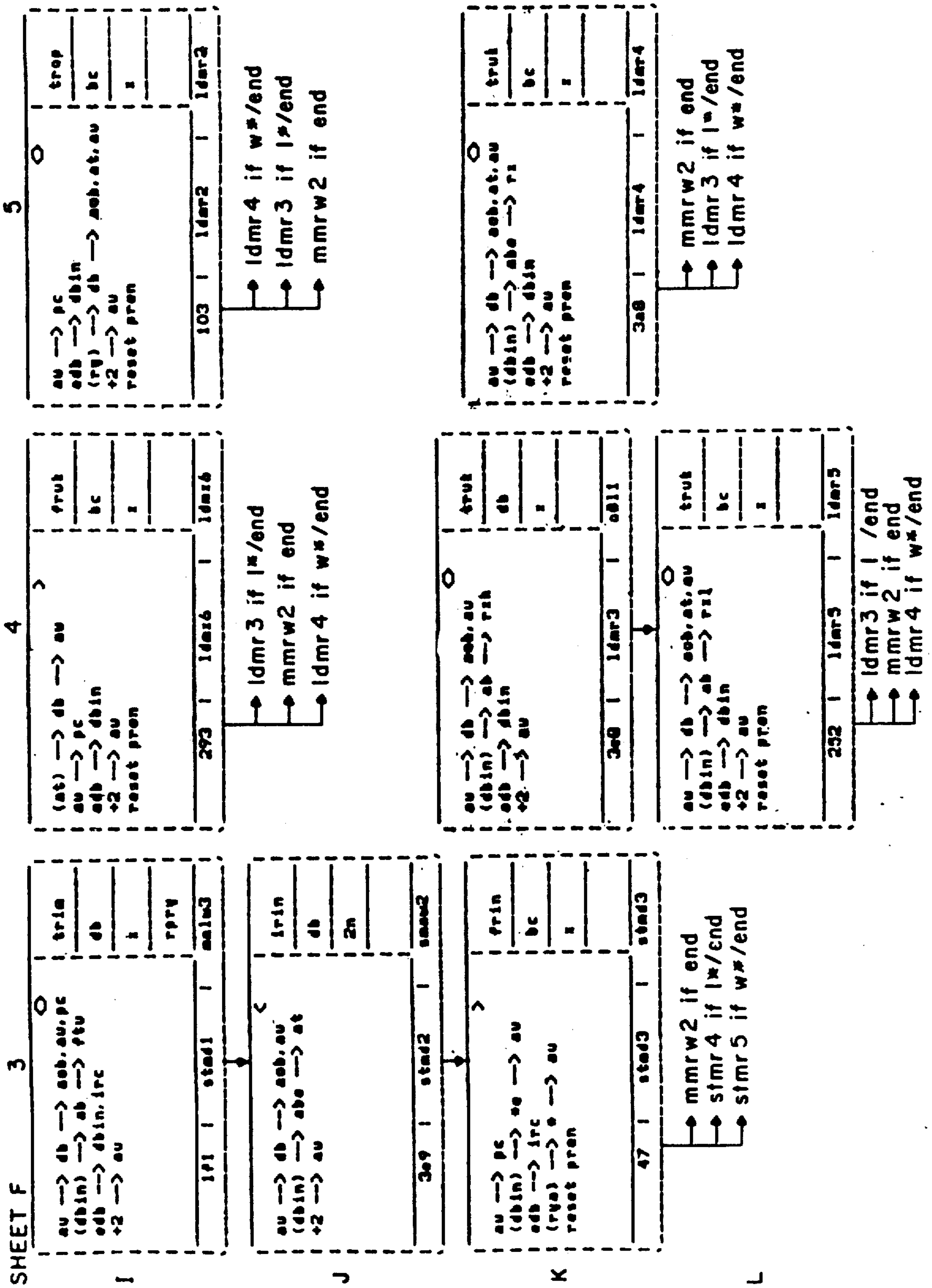
SHEET F
3
4
5
I
J
K
L
ldmr4 if w*/end
ldmr3 if l*/end
mmrw2 if end
ldmr3 if l*/end
mmrw2 if end
ldmr4 if w*/end
mmrw2 if end
ldmr3 if l*/end
ldmr4 if w*/end
mmrw2 if end
stmr4 if l*/end
stmr5 if w*/end

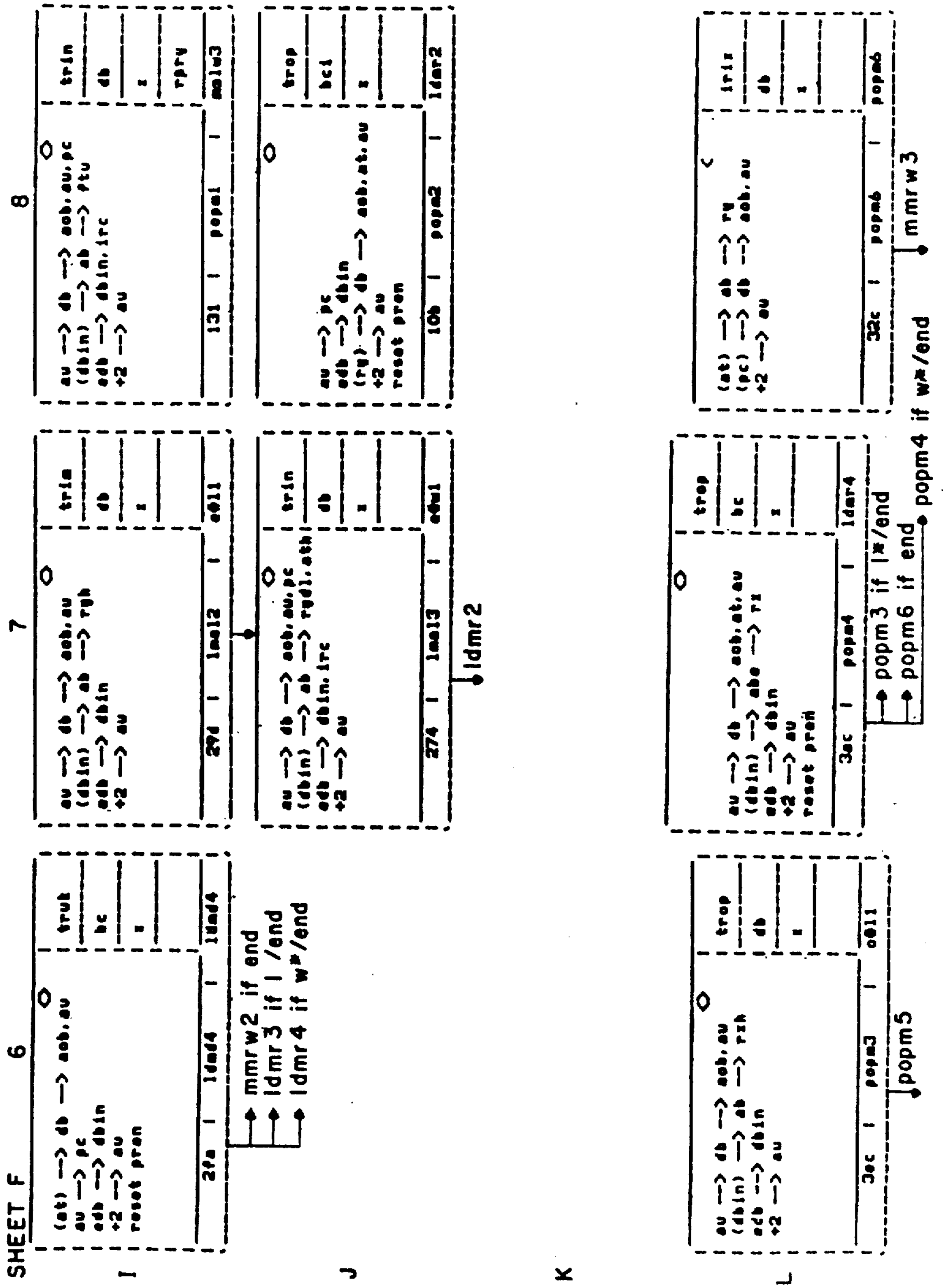
SHEET F
6
7
8
I
J
K
L
mmrw2 if end
ldmr3 if l /end
ldmr4 if w*/end
ldmr2
popm5
popm3 if l*/end
popm6 if end
popm4 if w*/end
mmrw3

SHEET F 9
I
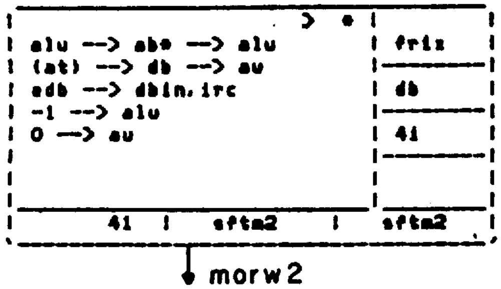
J
K
L
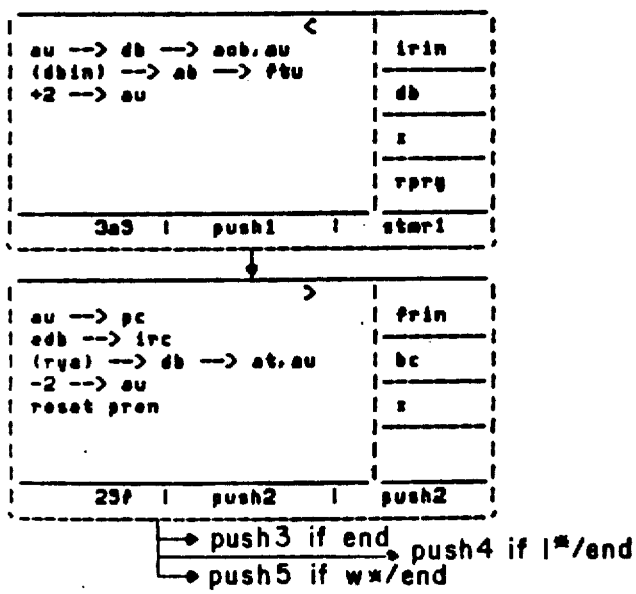

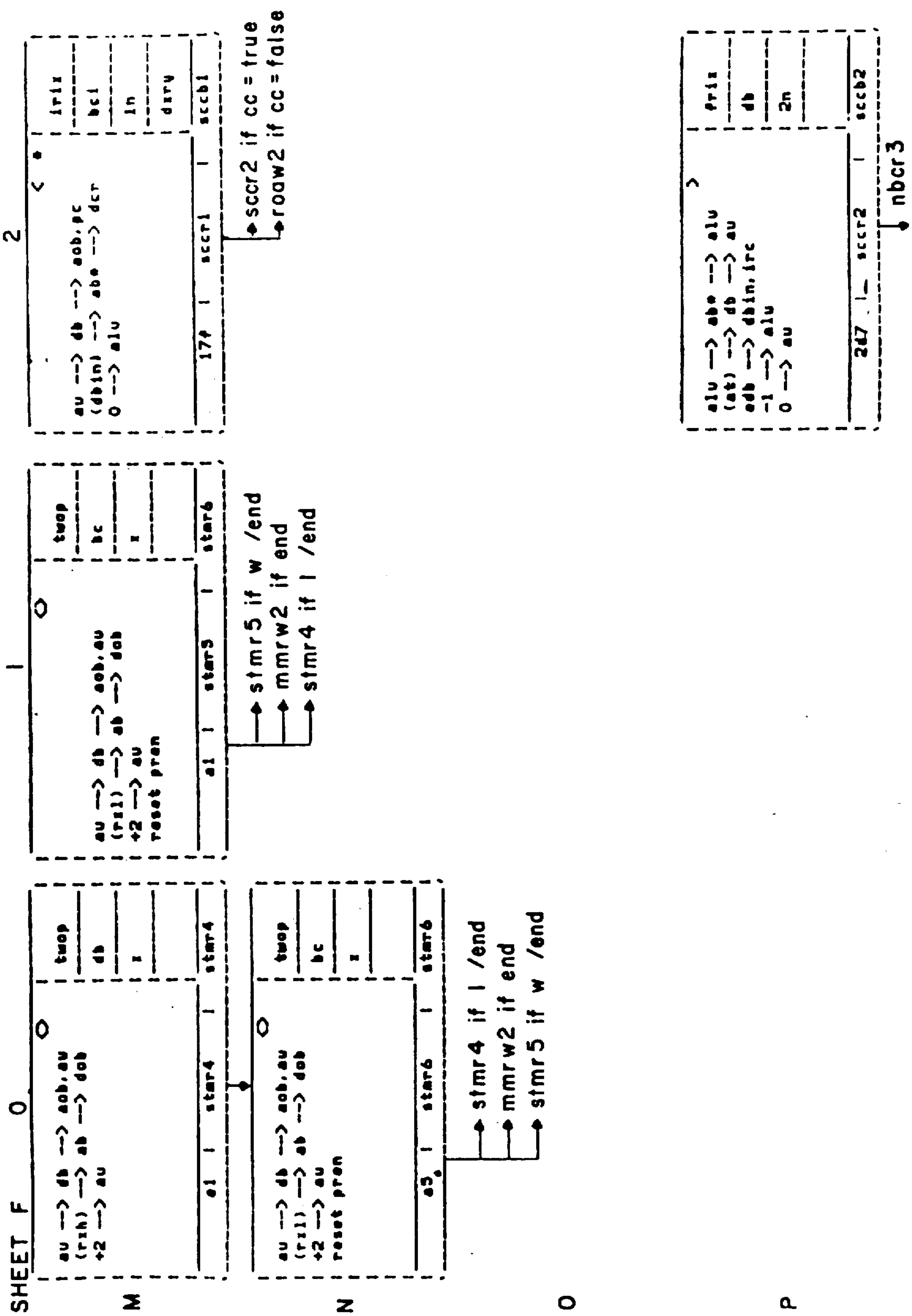
SHEET F
0
1
2
M
N
O
P
stmr4 if l /end
mmrw2 if end
stmr5 if w /end
stmr5 if w /end
mmrw2 if end
stmr4 if l /end
sccr2 if cc = true
roaw2 if cc = false
nbcr3

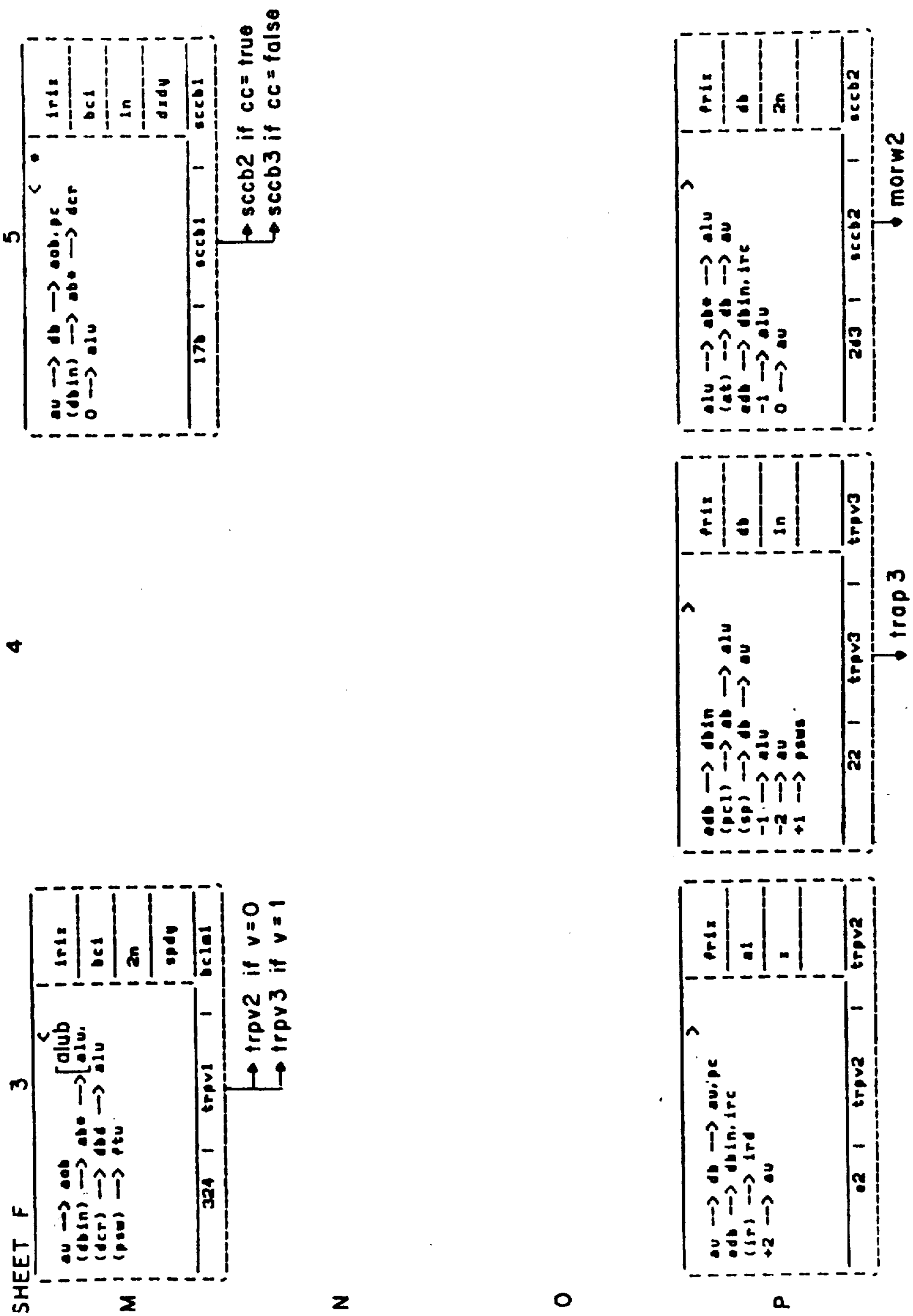
SHEET F
M
N
O
P
3
4
5
sccb2 if cc= true
sccb3 if cc= false
trpv2 if v=0
trpv3 if v=1
trap 3
morw2

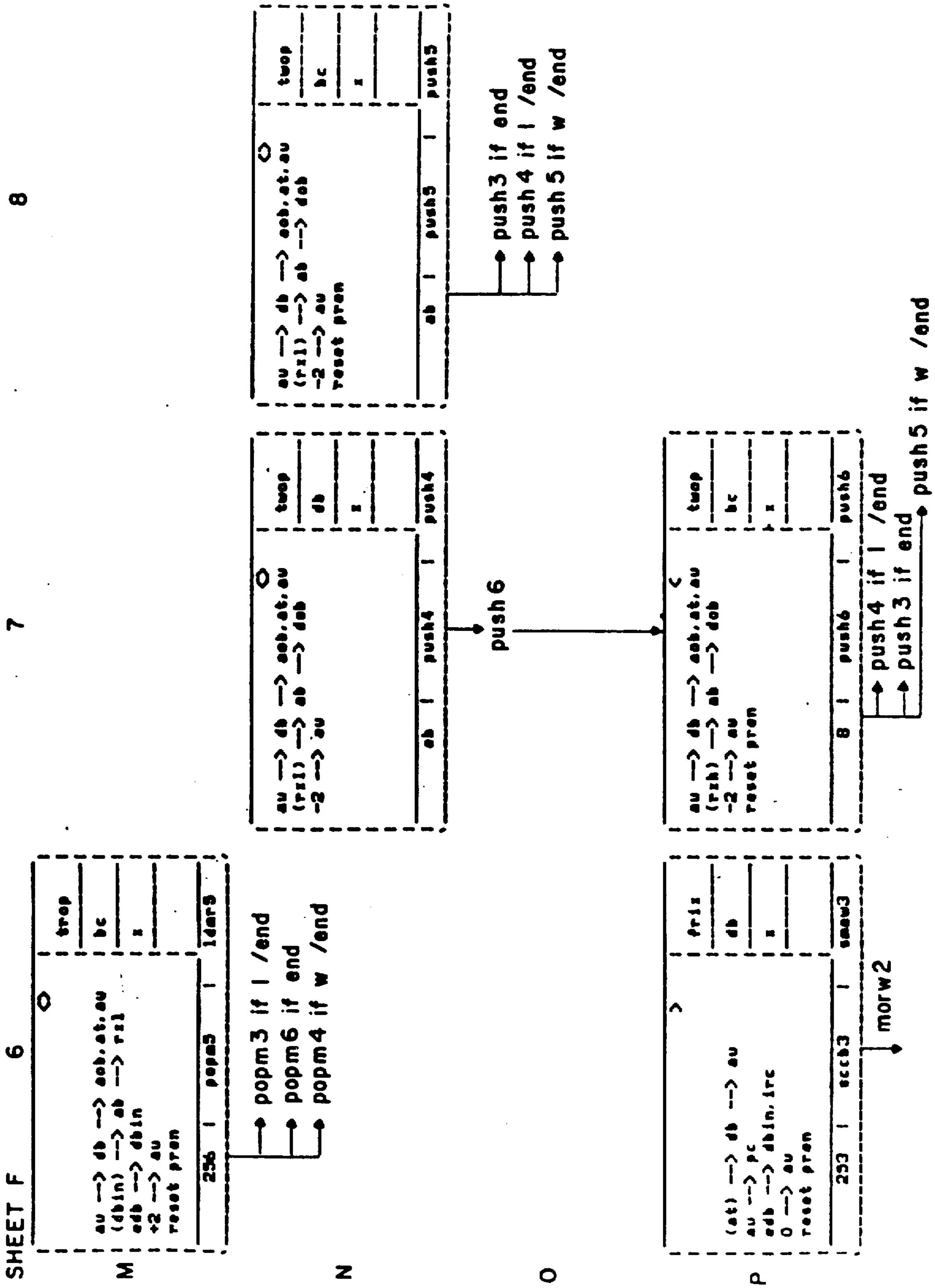
SHEET F
6
7
8
M
N
O
P
popm3 if l /end
popm6 if end
popm4 if w /end
push6
push3 if end
push4 if l /end
push5 if w /end
push4 if l /end
push3 if end
push5 if w /end
morw2

SHEET F 9

M

N

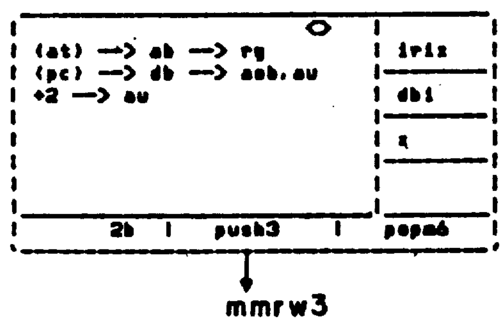

O

P

We claim:

1. A data processor adapted for microprogrammed operation and including an execution unit for executing sequentially a plurality of macroinstructions provided to the data processor from a macroinstruction memory, the data processor having a control unit for controlling the operation of the execution unit, the control unit comprising:

a. a first control store having an input for receiving a selected address during a first interval, and an output for providing first address information;
b. a second control store having an input for receiving the selected address, and an output for providing execution unit control information during the first interval;
c. means for storing a macroinstruction provided by the macroinstruction memory,
d. decoding means coupled to the means for storing a macroinstruction and responsive to a field of the macroinstruction for providing as an output a plurality of addresses,
e. address selection means coupled to the decoding means for receiving the plurality of addresses, and responsive to the address information from the output of the first control store for providing the selected address from one of said plurality of addresses for presentation to the first and second control stores during a subsequent interval
f. whereby the execution unit control information is sequenced by the first control store and provided to the execution unit by the second control store.

2. A data processor as recited in claim 1 wherein: the first and second control means are read-only-memories each having a plurality of addressable words.

3. A data processor as recited in claim 2 wherein: the selected address corresponds to an address within the first control means, the addressed word within the first control means being provided at the output port of the first control means.

4. A data processor as recited in claim 3 wherein: at least one of the addressable words contained by the second control means is addressed by both a first and a second selected address, the first and second input words addressing different addressable words within the first control means.

5. A data processor adapted for microprogrammed operation and including an execution unit for executing a plurality of macroinstructions, the data processor comprising:

a. first means for receiving a macroinstruction;
b. control means including first and second control stores, the control means including an input port for receiving a control store address and first and second output ports, the first control store being coupled by a selection means to the first output port for providing sequencing information in response to the control store address, the second control store being coupled to the second output port for providing control information to the execution unit;
c. the selection means coupled to the first means and coupled to the first output port of the control means, the selection means being responsive to the received macroinstruction and to the sequencing information provided by the first control store for supplying the control store address to the input port of the control means, d. whereby an address field of the macroinstruction is decoded to provide a sequence of execution unit control signals during a macroinstruction cycle, the sequence being determined by the first output part and the control information to the executor unit being provided by the second output port.

* * * * *

UNITED STATES PATENT AND TRADEMARK OFFICE

CERTIFICATE OF CORRECTION

PATENT NO. : 4,325,121

DATED : April 13, 1982

INVENTOR(S) : Thomas G. Gunter et al

It is certified that error appears in the above-identified patent and that said Letters Patent is hereby corrected as shown below:

Column 246, claim 4, line 51, change "input" to --selected--;
Column 246, claim 4, line 52, change "words" (first occurrence) to --addresses--;
Column 248, claim 5, line 3, change "part" to --port--; and
Column 248, claim 5, line 3, change "executor" to --execution--.

Signed and Sealed this

*Sixth* Day of *March 1984*

[SEAL]

*Attest:*

GERALD J. MOSSINGHOFF

*Attesting Officer* *Commissioner of Patents and Trademarks*